United States Patent [19]
Takeuchi et al.

[11] Patent Number: 6,134,025
[45] Date of Patent: Oct. 17, 2000

[54] DOT IMAGE DATA OUTPUT APPARATUS

[75] Inventors: Akihiko Takeuchi; Takashi Kawana, both of Yokohama; Kaoru Seto, Chigasaki; Michio Itoh, Hachiohji; Hiroshi Atobe; Daisuke Murata, both of Yokohama; Atsushi Kashihara, Hachiohji; Hiroshi Mano, Tokyo; Hiroshi Sasame, Yokohama; Hiromichi Yamada, Yokohama; Masaharu Ohkubo, Yokohama; Masaki Ojima, Yokohama; Tetsuo Saito; Seiji Uchiyama, both of Tokyo, all of Japan

[73] Assignee: Canon Kabushiki Kaisha, Tokyo, Japan

[21] Appl. No.: 08/440,489

[22] Filed: May 12, 1995

Related U.S. Application Data

[62] Division of application No. 08/404,201, Feb. 14, 1995, which is a continuation of application No. 08/054,025, Apr. 30, 1993, abandoned, which is a continuation of application No. 07/403,410, Sep. 6, 1989, abandoned.

[30] Foreign Application Priority Data

| Sep. 8, 1988 | [JP] | Japan | 63-223449 |
|---|---|---|---|
| Nov. 28, 1988 | [JP] | Japan | 63-298281 |
| Nov. 28, 1988 | [JP] | Japan | 63-298288 |
| Dec. 1, 1988 | [JP] | Japan | 63-304669 |
| Dec. 7, 1988 | [JP] | Japan | 63-310879 |
| Dec. 9, 1988 | [JP] | Japan | 63-309902 |
| Dec. 9, 1988 | [JP] | Japan | 63-309903 |
| Dec. 9, 1988 | [JP] | Japan | 63-311732 |
| Dec. 23, 1988 | [JP] | Japan | 63-325506 |
| Jan. 13, 1989 | [JP] | Japan | 1-006440 |

[51] Int. Cl.[7] .................................................. H04N 1/40
[52] U.S. Cl. .......................... 358/456; 358/443; 358/448; 358/455
[58] Field of Search .................................. 358/442, 443, 358/447, 448, 451, 455, 456, 457, 458, 462, 452, 453

[56] References Cited

U.S. PATENT DOCUMENTS

| 3,828,319 | 8/1974 | Owen et al. | 340/172.5 |
|---|---|---|---|
| 4,194,221 | 3/1980 | Stoffel | 358/283 |
| 4,393,387 | 7/1983 | Kitamura | 346/108 |
| 4,419,691 | 12/1983 | Sing et al. | 358/75 |

(List continued on next page.)

FOREIGN PATENT DOCUMENTS

| 33106 | 8/1981 | European Pat. Off. | G03F 1/00 |
|---|---|---|---|
| 70677 | 1/1983 | European Pat. Off. | H04N 5/84 |
| 204094 | 12/1986 | European Pat. Off. | H04N 1/40 |
| 234809 | of 1987 | European Pat. Off. | H04N 1/40 |

(List continued on next page.)

OTHER PUBLICATIONS

Anderson et al., Binary–Image–Manipulation Algorithms In The Image View Facility:, IBM Journal of Research and Development, vol. 31, No. 1 (Jan. 1987), pp. 16–31.

Câmara Neto et al., "Methods For Image Interpolation Through FIR Filter Design Techniques", ICASSP '83 Proceedings, pp. 391–394.

Diagonal To Square Grid Reconstruction Method, IBM Technical Disclosure Belletin, vol. 31, No. 2 (Jul. 1988), pp. 284–289.

*Primary Examiner*—Thomas D. Lee
*Attorney, Agent, or Firm*—Fitzpatrick, Cella, Harper & Scinto

[57] ABSTRACT

An output apparatus capable of receiving multi-level dot information of a first recording dot density, generating multi-level dot information of a second recording dot density, and transmitting the thus-generated second dot information in a visible way. The output apparatus comprises: a receiving device capable of receiving multi-level dot information of a first recording dot density; a generating device capable of generating multi-level interpolation dot information by applying a predetermined calculation to the thus-received multi-level dot information; and a dot density conversion device capable of generating multi-level dot information of a second, higher recording dot density from said interpolation dot information and the received multi-level dot information, whereby high density image data can be generated from low density image data.

10 Claims, 77 Drawing Sheets

U.S. PATENT DOCUMENTS

| | | | |
|---|---|---|---|
| 4,528,561 | 7/1985 | Kitamura | 340/745 |
| 4,534,059 | 8/1985 | Yamada | 382/54 |
| 4,642,699 | 2/1987 | Ohi | 358/280 |
| 4,672,463 | 6/1987 | Tomohisa et al. | 358/284 |
| 4,675,908 | 6/1987 | Saito et al. | 382/41 |
| 4,679,096 | 7/1987 | Nagashima | 358/287 |
| 4,682,869 | 7/1987 | Itoh et al. | 358/260 |
| 4,686,579 | 8/1987 | Sakamoto | 358/282 |
| 4,698,688 | 10/1987 | Ochi et al. | 358/257 |
| 4,734,786 | 3/1988 | Minakawa | 358/287 |
| 4,776,031 | 10/1988 | Mita | 382/67 |
| 4,811,108 | 3/1989 | Numakura et al. | 358/298 |
| 4,821,334 | 4/1989 | Ogino et al. | 382/50 |
| 4,823,189 | 4/1989 | Haines et al. | 358/75 |
| 4,878,126 | 10/1989 | Ichikawa | 358/451 |
| 4,891,634 | 1/1990 | Ina et al. | 340/723 |
| 4,905,097 | 2/1990 | Watanabe et al. | 358/456 |
| 4,926,268 | 5/1990 | Kawamura et al. | 358/458 |
| 5,018,024 | 5/1991 | Tanioka | 358/457 |
| 5,361,329 | 11/1994 | Morita et al. | 395/102 |
| 5,471,325 | 11/1995 | Abe | 358/524 |

FOREIGN PATENT DOCUMENTS

| | | | |
|---|---|---|---|
| 212990 | 3/1987 | European Pat. Off. | H04N 1/40 |
| 59-11067 | 1/1984 | Japan | H04N 1/22 |
| 59-161975 | 9/1984 | Japan | H04N 1/46 |
| 59-163980 | 9/1984 | Japan | H04N 1/46 |
| 60-182869 | 9/1985 | Japan | H04N 1/40 |
| 61-023470 | 1/1986 | Japan | H04N 1/40 |
| 61-59969 | 3/1986 | Japan | H04N 1/40 |
| 61-201591 | 9/1986 | Japan | H04N 9/79 |
| 62-061474 | 3/1987 | Japan | H04N 1/40 |
| 62-58777 | 3/1987 | Japan | H04N 1/40 |
| 62-149258 | 7/1987 | Japan | H04N 1/40 |
| 62-193457 | 8/1987 | Japan | H04N 1/41 |
| 62-220072 | 9/1987 | Japan | H04N 1/46 |
| 61-012019 | 1/1988 | Japan | G06F 3/12 |
| 63-040477 | 2/1988 | Japan | H04N 1/46 |
| 63-73773 | 4/1988 | Japan | H04N 1/41 |
| 63-109059 | 5/1988 | Japan | B41J 3/00 |
| 61-172664 | 7/1988 | Japan | B41J 3/12 |
| 2102240 | 1/1983 | United Kingdom | H04N 1/28 |
| 2117208 | 10/1983 | United Kingdom | H04N 1/02 |
| 2127647 | 4/1984 | United Kingdom | H04N 1/40 |

| 43 | 44 | 45 | 46 | 47 | 48 | 49 | 50 |
|----|----|----|----|----|----|----|----|
| 42 | 21 | 22 | 23 | 24 | 25 | 26 | 51 |
| 41 | 20 | 7  | 8  | 9  | 10 | 27 | 52 |
| 40 | 19 | 6  | 1  | 2  | 11 | 28 | 53 |
| 39 | 18 | 5  | 4  | 3  | 12 | 29 | 54 |
| 38 | 17 | 16 | 15 | 14 | 13 | 30 | 55 |
| 37 | 36 | 35 | 34 | 33 | 32 | 31 | 56 |
| 64 | 63 | 62 | 61 | 60 | 59 | 58 | 57 |

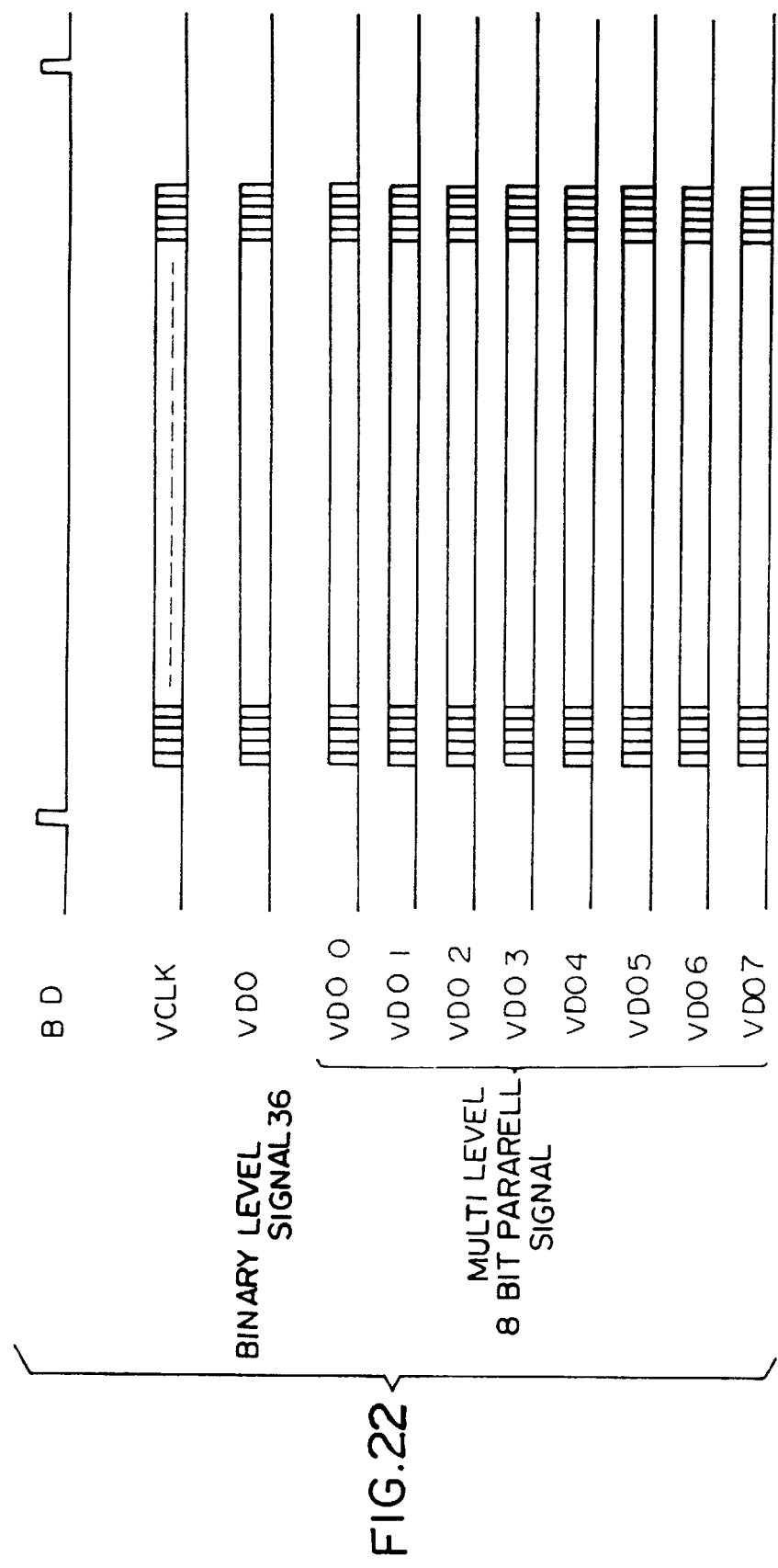

STRUCTURE OF A PIXEL

|   | j-2 | j-1 | j | j+1 | j+2 | | 490 |
|---|---|---|---|---|---|---|---|
| | 56 | 56 | 56 | 60 | 60 | 60 | 64 | 64 | 64 | 64 |

Table (FIG. 69):

| | ... | j-2 | j-1 | j | j+1 | j+2 | ... | | |
|---|---|---|---|---|---|---|---|---|---|
| | 56 | 56 | 56 | 60 | 60 | 60 | 64 | 64 | 64 | 64 |
| i-2 ... | 56 | 56 | 56 | 60 | 60 | 60 | 64 | 64 | 64 | 64 |
| i-1 ... | 56 | 56 | 56 | 60 | 60 | 60 | 64 | 64 | 64 | 64 |
| i ... | 56 | 56 | 56 | 60 | $X_{ij}=60$ | 60 | 64 | 64 | 64 | 64 |
| i+1 ... | 56 | 56 | 56 | 60 | 60 | 60 | 64 | 64 | 64 | 64 |
| i+2 ... | 56 | 56 | 56 | 60 | 60 | 60 | 64 | 64 | 64 | 64 |
| ... | 56 | 56 | 56 | 60 | 60 | 60 | 64 | 64 | 64 | 64 |

| | ... | j-2 | j-1 | j | j+1 | j+2 | ... |
|---|---|---|---|---|---|---|---|
| i-2 ... | | | | | | | |
| i-1 ... | | 57 | 58 | 60 | 61 | 62 | 63 |
| i ... | | 57 | 58 | $X_{ij}=60$ | 61 | 62 | 63 |
| i+1 ... | | 57 | 58 | 60 | 61 | 62 | 63 |
| i+2 ... | | | | | | | |

FIG. 70

| ADDRESS | | | | | | | | |
|---|---|---|---|---|---|---|---|---|
| 00H | 0 | 0 | 0 | 0 | 0 | 0 | 0 | 0 |
| 01 | 0 | 0 | 0 | 0 | 1 | 1 | 0 | 0 |
| 02 | 0 | 0 | 0 | 1 | 0 | 1 | 0 | 0 |
| 03 | 0 | 0 | 0 | 1 | 0 | 1 | 1 | 1 |
| 04 | 0 | 0 | 0 | 1 | 1 | 0 | 0 | 1 |
| 05 | 0 | 0 | 0 | 1 | 1 | 0 | 1 | 1 |
| 06 | 0 | 0 | 0 | 1 | 1 | 1 | 0 | 0 |
| 07 | 0 | 0 | 0 | 1 | 1 | 1 | 0 | 1 |
| 08 | 0 | 0 | 0 | 1 | 1 | 1 | 1 | 0 |
| 09 | 0 | 0 | 0 | 1 | 1 | 1 | 1 | 1 |
| 0A | 0 | 0 | 1 | 0 | 0 | 0 | 0 | 1 |
| 0B | 0 | 0 | 1 | 0 | 0 | 0 | 1 | 1 |
| 0C | 0 | 0 | 1 | 0 | 0 | 1 | 0 | 1 |
| 0D | 0 | 0 | 1 | 0 | 1 | 0 | 0 | 0 |
| 0E | 0 | 0 | 1 | 1 | 0 | 0 | 0 | 0 |
| 0F | 0 | 0 | 1 | 1 | 1 | 1 | 0 | 0 |
| 10 | | | | | | | | |
| 11 | | | | | | | | |

FIG.75

| ADDRESS | UPPER | | LOWER | |
|---|---|---|---|---|
| 00H | 0 | 0 | 0 | 0 |
| 01 | 0 | 0 | 0 | 0 |
| 02 | 0 | 0 | 0 | 0 |
| 03 | 0 | 0 | 0 | 0 |
| 04 | 0 | 0 | 1 | 0 |
| 05 | 0 | 0 | 0 | 0 |
| 06 | 0 | 0 | 1 | 0 |
| 07 | 0 | 0 | 1 | 1 |
| 08 | 0 | 0 | 0 | 0 |
| 09 | 0 | 0 | 0 | 1 |
| 0A | 0 | 0 | 1 | 0 |
| 0B | 0 | 0 | 0 | 0 |
| 0C | 0 | 0 | 1 | 0 |
| 0D | 0 | 0 | 0 | 0 |
| 0E | 0 | 0 | 0 | 0 |
| 0F | 0 | 0 | 0 | 0 |
| 10 | | | | |
| 11 | | | | |

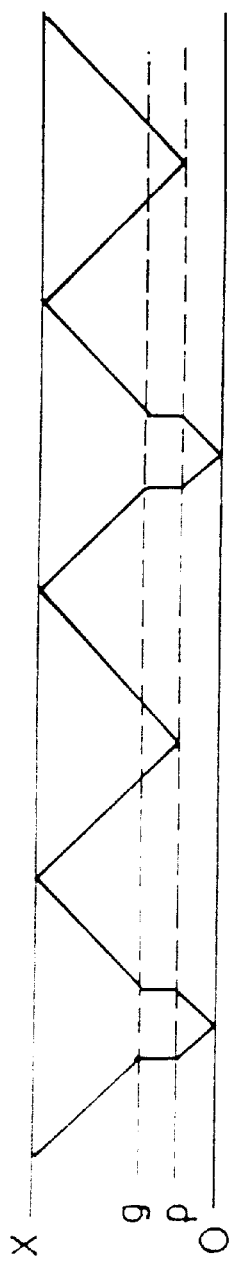
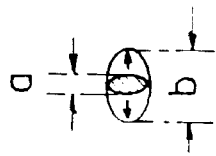
FIG.85(a)
FIG.85(b)
FIG.85(c)
FIG.85(d)

DOT IMAGE DATA OUTPUT APPARATUS

This application is a division of application Ser. No. 08/404,201 filed Feb. 14, 1995, which is a continuation of application Ser. No. 08/054,025 filed Apr. 30, 1993, which is a continuation of application Ser. No. 07/403,410 filed Sep. 6, 1989, both now abandoned.

FIELD OF THE INVENTION

The present invention relates to an image data output apparatus for a laser beam printer or the like, and, more particularly to improvement in the quality of the formed image after the change in the density of the recording dot when image data is received from outside the system for the purpose of forming an image on the basis of the thus-received image data, or an improvement in the quality of the image when a binary processing is conducted for the purpose of transmitting the formed image as a visible image.

BACKGROUND OF THE INVENTION

As an output apparatus for a computer, an image data output apparatus in which a laser beam printer or the like is used, and more particularly, a recording apparatus has been widely used. Since many advantages such as high image quality, low noise, and the like can be obtainable from the apparatus of the type described above, the field of the disk top publishing (to be abbreviated to "DTP") has been rapidly promoted.

Furthermore, due to the current tendencies of a high memory capacity, high speed processing, low cost, high grade function realized in the host computers or the controllers for the printers above, a variety of processings can be performed not only in the binary, that is, black and white printing but also in a dither method, density pattern method, or expressing of half tone images by means of pulse width modulation. In the current tendency above, a laser beam printer has been widely used as an alternative to a wire dot printer due to its high quality image recording performable at the time of recording a so-called text data in a word processing field. The major portion of the laser beam printers capable of printing text data has been conventionally arranged to display a record density of 240 dpi (dot/inch) or 300 dpi (dot/inch). The thus-arranged record density for the laser printers is a density of the level that is at least higher than that arranged for the wire dot printers, and these recording density is capable of realizing a sufficiently high grade image as the output in the usual word processing operations. As for the memory for the controller, thanks to the tendency of the relative cost reduction, the capacity of the level with which the recording density of the level described above can be secured.

For example, a laser beam printer capable of performing a printing with the printing density of 300 dpi comprises, as shown in FIG. 1:

a printer engine portion 151 capable of conducting a printing on a photosensitive drum on the basis of dot data; and a printer controller 152 arranged to receive code data transmitted from an external host computer 154, to generate page information consisting of dot data on the basis of the thus-received code data, and to transmit dot data successively to the printer engine portion 151. The host computer 154 is arranged to be loaded with a program by a floppy disk 155 having an application software so that this application software is started so as to function as, for example, a word processor. A variety of the application software such as the word processor software has been manufactured and widely used so that users processes and stores a multiplicity of data items by using the thus-processed application softwares.

Then, an example of a portion of the printer engine portion 151 of the conventional laser beam printer will be described with reference to FIG. 2.

Referring to FIG. 2, paper sheets 1 each serving as a recording medium are accommodated in a paper cassette 2. A paper supply cam 3 separates only the uppermost sheet of the paper sheets 1 stacked on a paper cassette 2, and the front portion of the thus-separated paper sheet 1 is, by a conveying means (omitted from illustration), conveyed to a position of paper supply rollers 4 and 4', this paper supply cam 3 being arranged to be intermittently rotated whenever the paper sheet 1 is supplied. A reflection type photosensor 18 detects light reflected by the paper sheet 1 through an aperture 19 formed in the bottom of the paper cassette 2 whereby a fact that there is no paper sheet is detected.

The paper sheet roller 4 and 4' rotates with slightly pressing the paper sheet 1 when the paper sheet 1 is, by the paper supply cam 3, conveyed to a gap by the paper supply cam 3 so that the paper sheets 1 are conveyed. When the paper sheet 1 has been conveyed and the front portion thereof has reached the position corresponding to the resist shutter 5, the conveyance of the paper sheet 1 is stopped by the resist shutter 5 but the paper supply rollers 4 and 4' continue their rotation with slipped with respect to the paper sheet 1 and with generating conveying torque. In this case, when the resist shutter 5 is moved upward by actuating the resist solenoid 6 so as to release the shutting, the paper sheet 1 can be conveyed to the conveying rollers 7 and 7'. The operation of the resist shutter 5 is conducted by arranging a certain timing with respect to the image to be formed due to the imaging of the laser beam 20 on the photosensitive drum 11. The photosensor 21 detects a fact whether or not the paper sheet 1 is present at the position corresponding to the resist shutter 5.

A rotary polygon mirror 52 is arranged to be rotated by a motor 53 for the polygon mirror 52 so that a beam 20 transmitted from a semiconductor laser 51 is introduced into the surface of the photosensitive drum 11 via a reflecting mirror 54. As a result, a recorded image (a Latent Image) is formed on the photosensitive drum 11. A beam detector 55, which is disposed at the position at which the scanning operation with the beam 20 starts, transmits a BD signal when it detects the beam 20, this BD signal serving as a timing signal for starting the writing of the image in the main scanning direction.

Then, the paper sheet 1 is supplied with the conveying torque from the conveying rollers 7 and 7' which supply the torque as an alternative to the paper supplying rollers 4 and 4, so that the paper sheet 1 is conveyed to the photosensitive drum 11 at which the image exposed to the photosensitive drum 11 is transferred to the paper sheet 1 by cooperation of an image cleaner 12, a charger 13, a developer 14, and a transferal charger 15. The paper sheet 1 to which the image has been transferred is then fixed by fixing rollers 8 and 8', and is discharged into a stacker by paper discharge rollers 9 and 9'.

Referring to this drawing, a guide 30 restricts the direction of the conveyance of the paper sheets 1. In addition to the paper feeding from the paper cassette 2, manual feeding of each paper sheet 1 through the paper feeder 16 is able to be conducted. The paper sheet 1 which has been manually fed to the gap from the manual supply roller 17 on the paper feeder 16 is pressed with a light load by this manual supply roller 17. As a result, similarly to the conveyance of the paper sheet 1 conducted by the paper supply rollers 4 and 4, the paper sheet 1 which has been manually fed is conveyed by the manual supply roller 17 to the position at which the front portion thereof reaches the position corresponding to the resist shutter 5. At this position, the paper supplying rollers 4 and 4' are rotated with being slipped. The ensuing conveyance sequence is arranged to be the same as that of the case in which the paper sheet 1 is fed from the paper cassette 2.

The fixing roller 8 includes a fixing heater 24 so that the image recorded on the paper sheet 1 can be thermally fixed by controlling the surface temperature of the fixing roller 8 at a predetermined temperature on the basis of the temperature detected by a thermistor which can be brought into contact with the surface of the fixing roller 8 with being slipped. Reference numeral 22 represents a photosensor capable of detecting whether or not the paper sheet 1 is present at a position corresponding to the fixing rollers 8 and 8'.

The printers such as that shown in FIG. 1 are not used solely, but are each arranged to be connected to the controller by using an interface cable so as to receive a command of printing and an image signal from the controller for the purpose of performing the printing sequence. The structure of the interface cable of the type described above and the signal to be transmitted/received through the interface cable will be described briefly.

FIG. 3 is a view which illustrates various interface-signals to be transmitted/received between a usual printer and a controller of a conventional type. These interface signals will be described respectively.

PPRDY SIGNAL

PPRDY signal is a signal which is capable of notifying a fact that the power for the printer has been turned on so that the printer is able to be operated.

CPRDY SIGNAL

CPRDY signal is a signal which is capable of notifying the printer of a fact that the power for the controller has been turned on.

RDY SIGNAL

RDY signal is a signal which is capable of notifying the controller of a fact that the printer is able to start its action or to continue the same whenever PRNT signal, to be described later, is received from the controller. When the printing action cannot be performed due to, for example, the paper sheet in the paper cassette 2 has been used up, a state FALSE is realized.

PRINT Signal

PRINT signal is a signal for commanding the printer to start printing action, or for commanding the same to continue its printing action if this printer is performing the printing action.

VSREQ Signal

VSREQ signal is a signal which is capable of representing a fact that the printer has prepared for receiving VSYNC signal when both the RDY signal and PRNT signal are in state TRUE, the VSYNC signal being to be described later.

VSYNC Signal

VSYNC signal is a vertical (in the sub-scanning direction) synchronizing signal for the image to be printed, this signal being transmitted from the controller to the printer for the purpose of making the printer synchronize the image on the drum with the paper sheet.

BD Signal

BD signal is a horizontal (in the main scanning direction) synchronizing signal which is capable of representing a fact that the laser beam is positioned at a position at which the laser beam starts its main scanning action.

VDO Signal

VDO signal is a signal representing the image to be printed, this signal being arranged to be transmitted from the controller. Thus, the printer transmits TRUE of this signal as a black component of the image to be transmitted, while the same transmits FALSE as a white component.

SC Signal

SC signal is a bi-directional serial 8-bit signal capable of transmitting both COMMAND and STATUS to be described later. The COMMAND serves as a command signal to be transmitted from the controller to the printer, while STATUS serves as a signal for notifying the state and to be transmitted from the printer to the controller. Both the controller and the printer employ SCLK signal to be described later as a synchronizing signal when this signal is transmitted/received. Since this signal is in the form of a bi-directional signal, SBSY and CBSY signals need to be employed for the purpose of controlling the transmission and receipt of the signals. The COMMAND is a serial signal formed by 8 bits and it comprises the following control commands:

a command of realizing a paper supply mode for bringing the printer into a energy saving state in which only the fixing heater is turned off, that is, a so-called paper-supply mode is realized;

a command of cancelling the paper-supply mode in which the paper supply mode is cancelled and the fixing heater is turned on;

a command of supplying the paper sheet in the paper supply cassette; and a command of manually supplying the paper sheet.

On the other hand, the STATUS is a 8-bit serial signal for notifying the states of the printer such as a state in which the temperature of the fixer has not as yet been raised to a level at which the printing can be performed and therefore the printer is in an waiting mode, a state in which a paper jam has occurred, or a state in which the paper cassette has exhausted the paper sheet.

SCLK Signal

SCLK signal is a synchronizing pulse signal for making the printer fetch the COMMAND, or for making the controller fetch the STATUS.

SBSY Signal

SBSY signal is used to occupy an SC signal line and an SCLK signal line prior to the transmission of the STATUS conducted by the printer.

CBSY Signal

CBSY signal is used to occupy the SC signal line and the SCLK signal line prior to the transmission of the COMMAND conducted by the controller.

GNRST Signal

GNRST signal is a reset signal for making the controller initialize the state of the printer.

Then, the relative action between the printer portion and the controller portion will be described with reference to a system structural view which illustrates the connection and the structure of the printer and the controller.

It is provided that a power switch for the printer is switched on and a power switch for the control is also switched on. In this case, the printer initializes the internal states of the printer and transmits the PPRDY signal to the controller. On the other hand, the controller initializes the internal state of the controller and transmits the CPRDY signal to the printer. The printer then transmits the RDY signal to the controller, this RDY signal representing a fact that the fixing heater 24 accommodated in the fixing rollers 8 and 8' has been actuated and the temperature of the surfaces of the fixing rollers 8 and 8' have been raised to a level at which the fixing can be conducted.

The controller transmits, after it has received the RDY signal, the PRNT signal to the printer if necessary for conducting the printing. When the printer has received this PRNT signal, the photosensitive drum 11 thereof is rotated and the potentials of this photosensitive drum is initialized equally. Simultaneously with this, the paper supply cam 3 is moved in the cassette paper supply mode so that the paper sheet 1 is conveyed until the front portion thereof reaches the position for to the resist shutter 5. In the manual feed mode, the paper sheet which has been manually fed from the paper feeder 16 is, by the manual supply roller 17, to the position for the resist shutter 15. When the printer is enabled to perform the printing as a result of receipt of the VDO signal, the VSTEQ signal is transmitted to the controller.

The controller transmits the VSYNC signal to the printer after it has received the VSREQ signal. When the printer receives this VSYNC signal, it actuates the resister solenoid 6 in synchronization with the thus-received VSYNC signal so that the resist shutter 5 is released. As a result, the paper sheet is conveyed to the photosensitive drum 11. The controller makes the BD signal transmitted from the printer a horizontal synchronizing signal after it has transmitted the VSYNC signal and successively transmits the image signal VDO to be recorded to the printer, this transmission of the image signal VDO being conducted in synchronization with the horizontal synchronizing signal. The image signal VDO is transmitted in synchronization with the synchronizing clock signal VCLK.

The printer forms a latent image on the photosensitive drum 11 by flashing the laser beam in response to the image signal (VDO signal). The thus-formed latent image is developed by the developer by adhering toner. The thus-developed image is transferred on to the paper sheet by the transferral charger 15, and is fixed by the fixing rollers 8 and 8' before being discharged.

When the paper feed mode of the printer is then switched from the cassette feed mode to the manual feed mode, the controller synchronizes the 8-bit serial codes which correspond to the paper feed modes with the SCLK pulse signal so as to transmit the thus-synchronized 8-bit serial codes to the printer.

In a case where the printer has received the cassette feed mode code, the cassette feed mode is realized in which the manual feed roller 17 is not operated, but the paper supply cam 3 is operated so that the paper is supplied from the paper cassette 2. On the contrary, in a case where the printer has received the manual feed code, the mode is changed to the manual feed mode in which the paper supply cam 3 is not operated, but manual feeding by operating the manual feed roller 17 can be enabled.

When the power for the printer is switched on for the first time, the cassette feed mode is realized as its initial mode.

The signal GNRST is capable of initializing the printer due to the command given by the controller. When this signal from the controller is received, printer stops all of its job and resets it so that the state is reset to the state immediately after the power is switched on. This signal is, for example, used for the purpose of unifying the states of the printers in a case where a plurality of printers are connected to the controller.

FIG. 4 is a view which illustrates a signal processing circuit for use in a conventional laser beam printer. The signal processing circuit acts to input, in synchronization with the clock VCLK for transmitting the image signal, the 1-bit binary signal VDO serving as a black and white image signal and 8-bit parallel multi-level signals VD00 to VD07 serving as half-tone image signals, and this circuit also acts to transmit the thus-input multi-level signals VD00 to VD07 to a dither processing circuit 38. The logical sum of the multi-level signal which has been half-tone processed by the dither processing circuit 38 and the binary signal is calculated in an OR circuit 39, and a synthesized signal is transmitted from the thus-calculated logical sum. The thus-transmitted synthesized signal is input to a laser driver 40 so that a laser 51 is actuated and therefore the printed image is formed on the photosensitive body.

Referring to FIG. 4, reference numeral 37 represents the above-described SC signal so as to be used in a bi-directional serial communication with the controller 152 via a connector 32. Thus, the COMMAND is transmitted from the controller 152, while the STATUS is transmitted from the printer engine 151. Reference numeral 34 represents a print board in which the above-described dither processing circuit 34, the OR circuit, and the like, this print board 4b being connected to the sole connector 32 via a cable 33. The connector 32 is connected to the controller 152 from which the binary signal VDO, multi-level VD00 to VD07, and the clock VCLK are transmitted.

The dither processing method which is conducted by the processing circuit 38 is widely used when half-tone images are expressed with the printers of the type described above. As shown in FIG. 5, this method comprises the steps of:

forming an 8×8 matrix;

making comparisons between a predetermined threshold and the image information VD00 to VD07 for each of the pixels; and printing/non-printing is determined on the basis of the results of the comparisons made as described above.

If an image which uniformly displays its density level of "30" is processed by the matrix shown in FIG. 5, a print formed as shown in FIG. 6 is realized. When all is said, the dither processing method is a half-tone production method by density of each element.

There is a density pattern method available as a similar method to the above-described dither method. The difference of this method from the dither method lies in that the threshold and the image information is not made comparison for each of the pixels, the density pattern method comprising the steps of: forming 8×8 density matrices; collectively determining the correspondence between the matrices and the density levels; and printing specific patterns. Since the density pattern method is well known, the description about it is omitted here.

Another method is available for the purpose of expressing the half-tone, that is, a pulse width modulation method. A usual example of the circuit for use in this method is shown in FIG. 7. According to the conventional example shown in FIG. 4, the pulse width modulation processing is arranged to be conducted in the dither processing circuit 38. Referring to FIG. 7, the modulation circuit comprises a pattern signal generating circuit 401, a D/A converter 400, and an AND circuit 402. In the AND circuit 402, a digital image signal which has been dither processed is D/A-converted so as to be subjected to a comparison made with the pattern signal. As a result, the printing is, as shown in FIG. 8, conducted if the image signal is larger than the pattern signal.

FIG. 11 is a detailed block diagram which illustrates a half-tone processing portion of the above-described printer, in particular, a pulse width modulation processing portion is shown. The tone processing portion shown in FIG. 11, for simple description, is shown in the form of a processing portion in which 4-bit data is processed. Referring to FIG. 11, reference numeral 511 represents a γ correction ROM to which image data items VIDEO 0 to VIDEO 7 of 4-bit density (16 gradations) are input from outside and capable of transmitting 4-bit image data which has been γ-corrected. FIG. 12 is a view which Illustrates a conventional example of the γ correction characteristic. Reference numeral 512 represents a latch capable of latching the γ-corrected image data by using the image clock signal VCLK. Reference numeral 515 represents a counter clock generator capable of generating the counter clock signal SCLK whose frequency is 16 times that of the image clock signal VCLK. Reference numeral 514 represents a counter capable of counting the counter clock signal SCLK. That is, since an input pixel displays 16 gradations, 16 counts are made between the image clock signals VCLK. Reference numeral 513 represents a digital comparator arranged to make a comparison between the output from the latch 512 and the same from counter 514 so as to pulse-width modulate the image data which has been γ-corrected whereby a laser driver (omitted from illustration) is operated with this pulse-width modulation signal.

As described above, the structure and the operation of the conventional recording apparatus such as the laser beam printer, that is, the apparatus for transmitting the image data are arranged. The conventional image data output apparatus such as the laser beam printer encounters the following problems:

(a) When the image formed by using the conventional application program which has been developed for the density of 300 dpi is transmitted to the printer for the density of 600 dpi, high quality recorded image cannot necessarily be obtained.

(b) Since some controllers are arranged to correspond to only binary signals, the function capable of processing multi-level data cannot act if the function of this type is provided for the printer.

(c) If the number of the gradations of the image data transmitted from an external equipment such as a host computer or the like is not the same as that of the printer, any effective action cannot be conducted.

(d) If the γ correction is conducted on the printer side, the number of the gradations can be substantially decreased.

(e) Fogs in white portions and lack in black portions cannot be prevented from generation in the reproduced images, such defects being particularly apparent when the density of the input image signal is converted into a pulse signal which operates the laser according to the above-described pulse width modulation method.

(f) It is impossible to properly control both the resolution and the gradation.

(g) It is impossible to freely determine the angle of the screen.

The problem in the item (a) will be specifically described.

The printer engine portions have been intended to realize a high print density for the purpose of obtaining a higher quality. As a result, printer engines displaying the print density of 600 dpi or higher have been disclosed. The printer controller connected to the thus-disclosed high density printer engine (600 dpi) conventionally include the data memory whose capacity corresponds to this print density (600 dpi). For example, a 600 dpi-printer engine includes a memory of 4 times 300 dpi. The exclusive application software which has been developed for this 600 dpi-printer can be used without any problem. However, a multiplicity of conventional application softwares for the 300 dpi printers cannot be used intact in the 600 dpi high density printers.

The reason for this will be described with reference to FIG. 9.

FIG. 9 is a view which illustrates the structure of dots forming a character "a" to be printed at a print density of 300 dpi. If this character is printed at a print density of 600 dpi with the structure of the dots employed intact, the size Of the character becomes the half in length and width respectively. The reason for this lies in that that the period of the pixel clock when the print density is 600 dpi is the half of that when the same is 300 dpi.

Therefore, the interpolation of data needs to be conducted. In order to interpolate data, a method is available which comprises the steps of: simply doubling the length of the structure of dots in length and width; the structure of dots for the 300 dpi is applied to the 600 dpi. When the structure of dots is converted according to this method, the size of the character can be maintained. However, the rough contour of the character generated at the print density of 300 dpi is intact maintained to the printing conducted at the print density of 600 dpi. Therefor, the thus-printed character cannot exhibit the significant quality which suits the performance of the 600 dpi printer engine.

When, for example, when a multi-level signal is processed by the controller, the cost of the memory of the controller becomes excessive and time taken to complete the processing of the pixel signal is lengthened. Therefore, the number of bits and the resolution of the multi-level signals which can be processed by the controller are inevitably restricted. In other words, due to the restriction in the number of bits and the resolution of the multi-level signal caused from the restriction of the controller side, the multi-level signals cannot be processed and transmitted in a manner suitable for the performance of the printer which exhibits both high grade gradation and improved resolution.

Then, the problem shown in item (b) will be described. When the printer engine portion includes, as shown in FIG. 4, a connector 32 to which both binary signals and multi-level signals can be input, this connector 32 needs to be a connector of a type having a multiplicity of pins although the multi-level signal line is not necessary in a case where the controller to be connected to the printer engine portion comprises a cheap type which is able to process only binary signals. Furthermore, a multi-level signal processing circuit 38 performs a roll to raising the total cost of the printer engine portion. In the other words, it is preferable that the multi-level signal system and the binary signal processing system are arranged to be in the form of a module.

Then, the problems shown in item (c) will be described.

When a half-tone image is output by a printer such as a laser beam printer in which the conventional electrophotographing technology shown in FIGS. 1 and so on, a proper binary processing such as a half tone dot processing or the dither processing is conducted by the host computer 154 or the like prior to output of the half tone image data to the printer. According to this method, since the binary signals are used, the data transmission to the printer and data compression can be readily conducted. However, a problem arises in that information about the direction in the depth of the density is lost, causing the resolution of the image of a multi-level image having the number of gradations to deteriorate in particular. Furthermore, due to the difference in the diameter or the density of the dots to be recorded by the printer, the correspondence between the dither pattern and the density of the formed image tends to be varied. That is, if the same dither patterns are input, a low density image is formed in a certain printer since the dots distributed to the relatively white portion are lost, while a high density image is formed in another printer since the dots distributed to the portion adjacent to the relatively black portion are crushed. As a result, it is difficult to form the same images by using a plurality of printers of the different types on the basis of the image data which has been subjected to the same image processings.

Another type of a method has been disclosed which comprises the steps of:

transmitting image data to which information about the direction of the depth for each dot to the printer; and performing the multi-level output by the printer on the basis of the thus-transmitted information or performing the half-tone output by adding a proper binary processing such as dither processing or the like. According to this method, fine half-tone adjustment can be conducted by the printer and the compatibility can be achieved for the host computer and the printer, respectively.

However, when the multi-level image data of the type described above is transmitted for the purpose of being recorded, the number of the output gradations from the host computer and the number of the gradations processed by the printer cannot always agreed with each other. For example, in a case where the number of the gradations transmitted from the host computer is 6 bits and the number of the gradations input to the printer is 8 bits, the two components above cannot, intact, be connected to each other.

That is, any effective counter measure has not as yet been able to be taken against the case in which the number of the gradations of the image data transmitted from an external device such as the host computer and the number of the gradations of the same processed in the printer do not agree with each other.

Then, the problem shown in item (d) will be described. As can be clearly seen from FIG. 12, although there are 16 gradations from 0 to F in the conventional γ correction, the number the gradations to be output becomes substantially 10. The reason for this lies in that the gradient of the γ correction curve becomes gradual in the input gradation range of "3" to "C". As a result, the number of the gradations of the image data substantially decreases after the γ correction. The same fact is involved in a case where the input image data becomes 8 bits (256 gradations).

The problem shown in item (e) will be described.

In a case where the input image signal VDO is a signal read from an image scanner, the amplitude of the analog video signal VA is, as shown in FIGS. 11 and 13 smaller than that of a chopping wave SAW. It leads to a fact that a noise component such as portions a and b generates also in the portion in which complete white or complete black image is intended to be formed by the printing. The component such as the above-described component a generates a fog, while the component such as the component b generates lack in black portion. Both of these components leads to deterioration in the quality of the image. If the image clock and the chopper wave arranged to have the same period, the above-described problem can be overcome. However, the range in which both dark and light tone can be expressed can be inevitably reduced due to the characteristics of the printer, causing the tone reproduction to deteriorate. Therefore, the structure described above is not preferably used for expressing the half-tone images.

Then, the problem in item (f) will be described.

In the above-described dither method, each of the density degrees is expressed with the size of the predetermined dither matrix. Therefore, when the lowest density (the lightest tone) is expressed in, for example, a usual 8×8 matrix, a tone of 1/64 is, as shown in FIG. 14, the theoretical lowest density. Recently, in the printers designed on the basis of the electrophotography system, the major portion of them has includes a light-exposure type printing portion. In the printer of the type described above, a pixel for printing is designed in the form of a circle or an ellipse as an alternative to a square. Furthermore, as shown in FIG. 15, each of the pixels are arranged to be printed with a relatively larger size than a normal pixel since the complete black printing needs to be conducted and the portion in which the non-uniformity caused from the scanning pitch can occur needs to be printed in complete black.

As a result, when the lowest density is expressed, the tone whose density is higher than the above-described theoretical lowest density 1/64 tone becomes the lowest density unit. This problem is also involved in the inject type printers and the like.

Furthermore, when the light tone whose density is at the next level to 1/64 is expressed, 2/64 tone which is the tone in this region can be rapidly changed is needs to be used.

As described above, when the area to be printed is increased by one pixel in the dither matrix, the change in the medium tone can be reduced since, for example, tone 33/64 is the next tone to tone 32/64. However, the above-described light tone whose density is approximated to 1/64 display a rapid visible change. In particular, the tone of the human body or the like which is intended to be expressed can be disordered in these intermediate tone regions, causing a so-called "false contour" to be generated.

In order to precisely express the light tone of the type described above, it might be considered to employ a method arranged such that the area gradation is raised by enlarging the size o the dither matrix. However, although a smooth tone change can be generated in the relatively low density regions, the roughness becomes excessive in the dither matrix, causing a rough image which an insufficient quality to be obtained.

Furthermore, since the actual printing is so conducted as to be larger than one pixel, the portion of the solid black portion from which one pixel is removed can be substantially crushed in a case of a darker tone regions, for example, in the tone of 63/64. As a result, in the dark tone regions, the difference in the tone between 63/64 and 64/64 becomes little. Therefore, the number of gradations can be substantially decreased.

In an electrophotography type printers, the background exposure type printers arranged such that the non-printed portion is exposed to light encounters the similar problem above, as well as the image exposure type printers. That is, in the printers of this system, a solid black print is formed when the entire surface is exposed to light. In this case, since the portion to be exposed is formed in a shape other than a square and due to the involved scanning non-uniformity, a dot whose size is smaller than a true pixel is used for printing when a pixel is printed (no exposure) in a manner in the contrary to the image exposure system. On the other hand, when one pixel is removed to form a white portion, a dot whose size is larger than the true pixel is used. Therefore, a considerable improvement can be obtained in the light tone regions with respect to the image exposure system. However, the false contour cannot be prevented.

The adverse influence caused from the shape of the spot formed by the laser beam made upon the resolution and the tone reproduction is also involved in the above-described density pattern method not only in the dither method.

Then, an adverse influence of the shape of the spot made upon the gradation expression in the above-described pulse width modulation system will be described. As described above, a multiplicity of gradations can be obtained in a small area according to the pulse width modulation system. For example, when a comparison is made between a pattern signal which forms a cycle with the signals for three pixels and image data, the data expression for the quantity of data about the image information can be conducted simply by signals for three pixels. Therefore, infinite gradation expressions exhibiting high resolution can be obtained.

However, the minimum print width is involved in the electrophotography system due to the particle size of toner, developing characteristics, and laser characteristics. That is, referring to FIG. 16, width a1 is the minimum level with which an actual image can be formed. Therefore, the lightest tone involves a restriction so that the expression is restricted to the limited density expressions as shown in FIG. 17.

Then, the problem shown in item (g) will be described.

When a half-tone image is intended to be obtained in the form of a hard copy, the above-described area gradation method arranged on the basis of the dither method is widely used. This method is arranged such that a matrix 8×8 is formed with the pixel density of the printer arranged to be 300 dpi whereby a desired gradation is expressed on the basis of an assignment of the pixel to be printed on the basis of the image data. In this case, the resolution (to be called "the number of lines") is arranged to be 37.5 lines for each inch when the half tone is expressed and thereby the number of gradations is made to be 64. The above-described number of lines and the number of gradations are not limited to the above description. For example, a variety of arrangements such as a matrix of 4×4 pixels, 75 lines, and 16 gradation can be employed to meet the requirement by the operator.

The expression of the half tone needs a screen angle to be determined as its factor in addition to the number of lines and gradations. Since the tone of the image is varied due to the position at which the half tone pattern grows and the way of the growth, a required image is formed by varying these factors by determining the screen angle.

FIG. 18 is a schematic view which illustrates a specific example of the half tone pattern when the screen angle is varied. FIG. 18A is a view which illustrates the half tone pattern is allowed to grow diagonally with the screen angle made to be 45°, while FIG. 18B is a view which illustrates the case in which the half tone pattern is allowed to grow longitudinally with the screen angle made to be 90°. FIG. 18 C is a view which illustrates a case in which the half tone pattern is allowed to grow laterally with the screen angle made to be 0°.

The function of varying the screen angle is widely used and is serving as a critical function in the DTP field.

However, in the above-described conventional technology, the screen angle assigned is involved to be limited by the pixel density of the printer, causing restricted printer angles to be obtained.

For example, when a gradation expression is conducted with 6 pixels×6 pixels an 12 pixels of 6×6 =36 pixels are printed, the printed image becomes as shown in FIG. 19A when the screen angle is 90°, while, the printed image becomes as shown in FIG. 19B when the screen angle is 45°. When the screen angle is 0°, the printed image becomes as shown in FIG. 19C. As for the intermediate expressions, a pattern shown in FIG. 19D is obtained when the screen angle is 63°, while a pattern shown in FIG. 19E is obtained when the screen angle is 27°.

As described above, a problem arises in that when the gradation is expressed with 6 pixels×6 pixels, the screen angle variation is limited to the above-described five variation. For example, when a screen angle of 85° is intended to be obtained, the expression is involved to be conducted at the angle of 90°.

On the other hand, when the half tone is expressed by the above-described pulse width modulation method, there is determined only few types of the pattern signal such as SAW shown in FIG. 13. Therefore, a problem arises in that the screen angle cannot varied freely.

That is, the screen angle cannot be freely and finely determined.

The above-described problems shown in items (a) to (g) is made intensive as follows:

The image output system for laser beam printer and the like comprises: a host computer or a controller such as the personal computer; a printer including a development portion and a fixing portion and capable of transmitting visible images; and a printer engine capable of establishing an interface between the above two components and performing the image formation. Since printers exhibiting a high resolution of 600 dpi has been developed recently, the engine portion needs to harmonize with the conventional host computer side including the application softwares and with the printer portion exhibiting the high resolution. Furthermore, when the host computer side becomes capable of corresponding to the high resolution image formation, the printer engine needs to have a function to maintain the high resolution output performance of the printer.

SUMMARY OF THE INVENTION

According to the present invention, the above-described problems can be overcome and an image data output apparatus such as a printer engine is provided which is capable of harmonizing a controller or host computer side for supplying image data with an image output portion having a high resolution image output performance.

An object of the present invention is to provide an image data output apparatus capable of printing with a high printing density (for example, 600 dpi) if a variety of conventional application softwares capable of processing half tone image arranged for low printing density (for example, 300 dpi) are used intact.

Another object of the present invention is to provide an image data output apparatus from which high grade reproduced images can be obtained.

A further object of the present invention is to provide an image data output apparatus, if necessary, whose cost can be reduced and which can be improved to correspond to multi-function.

In order to achieve the above-described objects, the image data output apparatus according to the present invention comprises:

first signal-receiving circuit means capable of receiving binary dot image information;

first processing circuit means capable of signal-processing the binary dot image information received by the first signal receiving circuit means, the processing circuit means being arranged to be a module individually contained in a first individual unit;

second signal-receiving circuit means capable of receiving multi-level dot information;

second processing circuit means capable of signal-processing the multi-level dot information received by the second signal receiving circuit means, the processing circuit means being arranged to be a module individually contained in a second individual unit; and a coupling circuit means capable of coupling the first individual unit containing the first processing circuit means and the second individual unit containing the second processing circuit means for the purpose of processing an output signal from the second processing circuit means and an output signal from the second processing circuit means in either of the units.

According to the output apparatus structured as described above, both binary data and multi-level data can be simultaneously processed and in which unnecessary multi-level data processing system can be removed only in the case where the data to be transmitted comprise binary data only, causing the required cost to be deteriorated.

An aspect of the present invention lies in that the second unit also includes a binary data receiving means and the thus-received binary data is arranged to be transferred to the first unit, the external data supply apparatus and the data output apparatus according to the present invention can be collectively established.

An aspect of the present invention lies in that both the first unit and second unit include binary data receiving means and thereby the received binary data can be synthesized or selected.

In order to achieve the above-described object, an image data output apparatus according to the present invention comprises:

first signal-receiving means capable of receiving binary dot information;

second signal-receiving means capable of receiving multi-level dot information;

second processing means capable of signal-processing the multi-level dot information received by the second signal-receiving means;

generating means capable of generating binary dot information from the multi-level dot information received by the second signal receiving means;

synthesizing means capable of synthesizing the binary dot information generated by the generating means and the binary dot information received by the first signal-receiving means; and first processing means capable of signal-processing the synthesized binary dot information so as to be transmitted as a visible image.

According to the output apparatus structured as described above, the component which approximates the binary image signal can be extracted and generated form the multi-level image signal, and the output image can be improved in the quality by synthesizing the generated binary signal and the transmitted binary signal.

In order to achieve the above-described object, an image data output apparatus according to the present invention comprises:

signal receiving means capable of receiving multi-level dot information from outside;

first half tone processing means capable of dither-processing the multi-level dot information which has been received, the first half tone processing means then transmitting a first half tone signal;

second half tone processing means capable of pulse width modulation processing the multi-level dot information, the second half tone processing means then transmitting a second half tone signal; and output means capable of selecting either the first or second half tone signal, the output means then transmitting it as a visible image.

According to the output apparatus structured as described above, since the half tone processing system is designed to be two systems, that is, the dither processing system and the pulse width modulation system, which are arranged to be selectable, the half tone processing suitable for the source image can be conducted, so that high grade output image can be obtained In order to achieve the above-described object, an image data output apparatus according to the present invention comprises:

dot information receiving means capable of receiving dot information;

density changing means capable of density changing processing the received dot information in accordance with a predetermined data interpolation logic selected from a plurality of data interpolation logics provided, wherein the density changing means has a plurality of the data interpolation logics, whereby the plurality of data interpolation logics can be selectively assigned from an external device via communication means.

According to this structure, the interpolation logic can be selected from outside in accordance with the source image so that high grade output image can be obtained.

In order to achieve the above described object, an image data output apparatus according to the present invention comprises:

first signal-receiving means capable of receiving binary dot information; and data conversion means capable of data-converting the received binary dot information in accordance with a predetermined data conversion logic, wherein the data conversion means has a plurality of the data conversion logics whereby the plurality of data conversion logics can be selectively assigned from an external device via communication means.

According to this structure, data conversion logic can be selected from outside in accordance with the source image so that high grade output image can be obtained.

In order to achieve the above-described object, an image data output apparatus according to the present invention comprises:

dot information receiving means capable of receiving dot information;

density changing means capable of density changing processing the received dot information in accordance with a predetermined data interpolation logic selected from a plurality of data interpolation logics provided, wherein the density changing means has a plurality of the data interpolation logics, whereby the plurality of data interpolation logics can be selectively assigned from an external device via communication means.

According to this structure, the logic with which the binary image is generated from the multi-level image can be selected from outside in accordance with the source image, a high grade output output image can be obtained.

A still further object fo the present invention is to provide an image output apparatus capable of being connected to various host computer and processing the input binary image data and multi-level image data. In order to achieve this object, an image output apparatus according to the present invention and capable of transmitting an image in a visible manner, the apparatus comprising:

first input means capable of inputting a multi-level image signal;

second input means capable of inputting a binary image signal;

gradation converting means capable of converting the input multi-level image signal into a binary type image signal so as to expressed by a gradation which corresponds to the multi-level image signal;

selection/synthesizing means capable alternately selecting either the binary type image signal or the binary image signal or synthesizing both the binary type image signal and the binary image signal; and means capable of visibly recording or displaying an output signal from the selection/synthesizing means.

According to this structure, the image output apparatus can individually input the multi-level image data and the binary image data and transmit selectively either of them or after synthesizing them in a visible manner. Therefore, the host computer side becomes no need of converting and processing the binary image data into the multi-level image data. The image output apparatus becomes no need of bringing the binary image data intact into a multi-level data before again bringing it to binary data. Furthermore, the deterioration in the quality of image can be prevented.

The other object of the present invention is to to provide an image output apparatus capable of receiving multi-level image data having a certain dot density, generating multi-level image data having a dot density which is higher than the certain dot density, and transmitting the thus-generated image data as a visible image.

In order to achieve this object, an output apparatus according to the present invention and capable of receiving multi-level dot information of a first recording dot density, generating multi-level dot information of a second recording dot density from the received dot information, and transmitting the generated second dot information in a visible manner, the output apparatus comprises:

signal receiving means capable of receiving multi-level dot information of the first recording dot density;

generating means capable of generating multi-level interpolation dot information by subjecting the received multi-level dot information to a predetermined calculation; and dot density converting means capable of generating multi-level dot information of a second recording dot density of higher level from the interpolation dot information and the received multi-level dot information.

According to this structure, since multi-level image data having higher dot density can be generated and then the thus-generated multi-level image data can be transmitted as a visible image, the necessity of previously preparing image data having a second recording dot density of a high level is eliminated so that image data of a first recording dot density of a low density which has been processed by the conventional software can be used intact.

In order to achieve the above-described object, an image forming apparatus according to the present invention and capable of inputting image data of a certain recording dot density and forming an image of a higher recording dot density with respect to the certain recording dot density, the apparatus comprises:

storage means capable of storing input image data;

determination means capable of determining a fact that image data of a plurality of reference pixels surrounding a subject pixel to be interpolated is contained in an image of a binary expression or in an image of a multi-level manner expression; and data interpolating means capable of generating data for interpolating the subject pixel by a calculation method defined by the result of the determination made by the determining means.

According to this structure, since multi-level image data of further higher dot density can be generated and then transmitted as a visible image, and a fact whether the original image data of the first recording dot density is contained in the binary expression or not is determined so as to conduct the interpolation which corresponds to the result of the determination, the sharpness of the binary data in the original image can be retained intact in the recorded image.

In order to achieve the above-described object, an output apparatus according to the present invention and capable of receiving multi-level dot information of a firs recording dot density, generating multi-level dot information of a second recording dot density from the received information, and transmitting, in a visible manner, second dot information which has been thus generated, the output apparatus comprises;

signal receiving means capable of receiving multi-level dot information of a first recording dot density;

a plurality of types of interpolation dot generating means a plurality of types of interpolation dots capable of making a reference with the dot of a pixel disposed at a predetermined position of the received dot information, the generating means capable of generating a plurality of types of interpolation dots then generating a multi-level interpolation dot at a specific position from the reference pixel;

density difference detection means capable of detecting the difference in the density between dots of the reference pixel when the interpolation dot is generated; and switch means capable of selectively switching the plurality of interpolation dot generating means in accordance with the result of detection made by the density difference detection means.

According to this structure, multi-level image data of further higher dot density can be generated and then transmitted as a visible image. Furthermore, a fact whether original image data of the first recording dot density is contained in the binary expression can be determined in accordance with the difference in the density between the reference pixels.

The other object of the present invention is to provide an image forming apparatus capable of always transmitting the most suitable image by adjusting the number of gradations of image data transmitted from an external equipment such as a host computer to correspond to the number of gradations of the apparatus.

In order to achieve this object, an image forming apparatus according to the present invention and capable of inputting multi-level data and forming a half tone image, the apparatus comprises:

conversion means capable of converting the number of gradation of input multi-level image data to correspond to the number of gradations of the image forming apparatus; and image forming means capable of forming an image in accordance with image data whose gradation has been converted.

According to this structure, an effect can be obtained, the effect being such that the most suitable image can be always transmitted regardless of the number of gradations of the input image data by adjusting the number of gradations of image data transmitted from an external device such as a host computer with the number of gradations of the apparatus.

In order to achieve this object, an image forming apparatus according to the present invention and capable of forming a half tone image by inputting multi-level image data, the apparatus comprises:

conversion means capable of converting the number of gradation of input multi-level image data to correspond to the number of gradations of the image forming apparatus;

gradation correction means capable of correcting the gradation of the image data whose gradation has been converted by the conversion means;

changing means capable of changing the correction characteristics of the gradation correction mean; and image forming means capable of forming an image in accordance with a multi-level image data whose gradation has been corrected by the changing means.

According to this structure, an effect can be obtained such that an image forming can be conducted in correspondence with the characteristics of the input multi-level image data by adjusting the number of gradations of multi-level image data transmitted from an external device with the number of gradations of the apparatus and by then correcting the image data whose gradation has been converted.

The other object of the present invention is to provide an image output apparatus in which the gradation of the input can not be deteriorated if a gradation correction is applied thereto.

In order to achieve this object, an image output apparatus according to the present invention comprises:

signal receiving means capable of receiving N-bit multi-level image signal from outside;

gradation correction means capable of conducting non-linear gradation correction of the N-bit multi-level image signal and transmitting M-bit (M>N) multi-level image signal which expresses a gradation exceeding $2^N$;

modulation means capable of modulating the density of the M-bit multi-level image signal at a resolution of $2^M$; and output means capable of transmitting the modulation signal as a visible image.

According to the image output apparatus structured as described above, the gradation correction means transmits M-bit (M>N) multi-level image signal which at least expresses $2^M$ gradations which is the same as that of input by conducting non-linear gradation correction (for example γ correction) of N-bit multi-level image signal. As a result, resolution (the number of bits=M) of the output increases in accordance with the inclination of non-linear gradation correction curve, so that output without deteriorating the number of gradations of input is formed. It is preferable that the printing of the multi-level density image is conducted in accordance with the dither method or pulse width modulation method.

The other object of the present invention is to provide an image processing apparatus with which high grade half tone image exhibiting high gradation and reduced noise can be obtained.

In order to obtain this object, an image processing apparatus according to the present invention and including forming means capable of forming a half tone image signal in accordance with input image signal, the apparatus comprises:

output means capable of transmitting an image signal having a predetermined level of density;

comparison means capable of making a comparison between the value of the level of the input image signal and a predetermined threshold; and selection means capable of selecting either the image signal having the predetermined density and the half tone image signal.

According to this structure, since the apparatus operates such that a half tone image signal is formed in accordance with an input image signal, a comparison is made between the level of the input image signal and the predetermined value, and either the predetermined image signal or the half tone image signal is selected in accordance with the result of the comparison, a half tone image exhibiting an excellent gradation and high quality can be obtained.

The other object of the present invention is to provide an image output apparatus capable of controlling both the resolution and gradation in the most suitable way. In order to achieve this object, an image output apparatus according to the present invention and capable of expressing half tone by area modulation means on the basis of an image signal which has been changed to an electric signal, the output apparatus comprises:

means capable of changing the area of expression unit at the time of expressing the half tone image in accordance with the level of the density of the image signal.

According to the image output apparatus structured as described above, the unit area by means of the area gradation means is varied by the level of the half tone when a half tone image is expressed. Therefore, the most suitable balance can be obtained between the resolution and gradation. That is, in the half tone level in which a high resolution is required, the unit area is made a predetermined small value, while in the half tone level in which a high gradation is required, the unit area is made a large value. As a result, the most suitable resolution or gradation can be obtained in accordance with the level of the half tone.

The portion in which a high resolution is strictly required from the image characteristics for the half tone expression, that is, the portion in which the rough surface of the image appears excessively has tone adjacent to the central portion in the half tone levels, that is, it is near the density level of 0.5 to 1.0. The rough surface of the image cannot appear excessively in the light or dark regions. In the tone adjacent to the central portion, a high resolution can be obtained by making the unit area small. On the other hand, tone in the dark region or tone in the light region does not excessively display the rough surface. However, the image quality can easily deteriorate due to false outlines. Therefore, the above-described unit area is brought to a large value for the purpose of obtaining a high resolution in the tone of the type described above.

As a result, half tone expression displaying both excellent resolution and gradation can be realized.

The other object of the present invention is to provide an image output apparatus capable of improving the resolution and increasing the number of gradations and with which the screen angle can be finely and freely set. In order to achieve this object, a recording apparatus capable of generating a pulsated half tone image by means of a data input portion thereof to which multi-level image data is input and modulation means capable of pulse width modulating the multi-level image data, the recording apparatus comprises:

means capable of receiving a predetermined command from an external device; and means capable of shifting position at which generation of the pulsated half tone image starts upon receipt of the command.

According to this structure, the half tone image is reproduced by means of pulse width modulation, and the position at which the generation of the half tone image is shifted in accordance with the command from the external device. Aa a result, the resolution can be improved and the number of gradations can be increased. Furthermore, the screen angle can be freely and finely set.

DESCRIPTION OF THE DRAWINGS

FIG. 22 is a timing chart which illustrates timing for transmitting a binary signal and a multi-level signal according to the basis embodiment shown in FIG. 20;

FIGS. 69 and 70 are views which illustrate an example of the conversion of image data according to other modified example;

FIG. 75 is a view which illustrates an address map for a γ correction ROM according to the modified example shown in FIG. 72;

FIG. 77 is a view which illustrates an address map for a γ correction ROM 2 according to other modified example;

FIG. 82 is a schematic view which illustrates the structure of the matrix according to the modified example of the dither processing;

FIG. 85 is a schematic view which illustrates the state of growth of print pattern in response to the pattern signal shown in FIG. 84;

DESCRIPTION OF PREFERRED EMBODIMENTS

Figure 1:
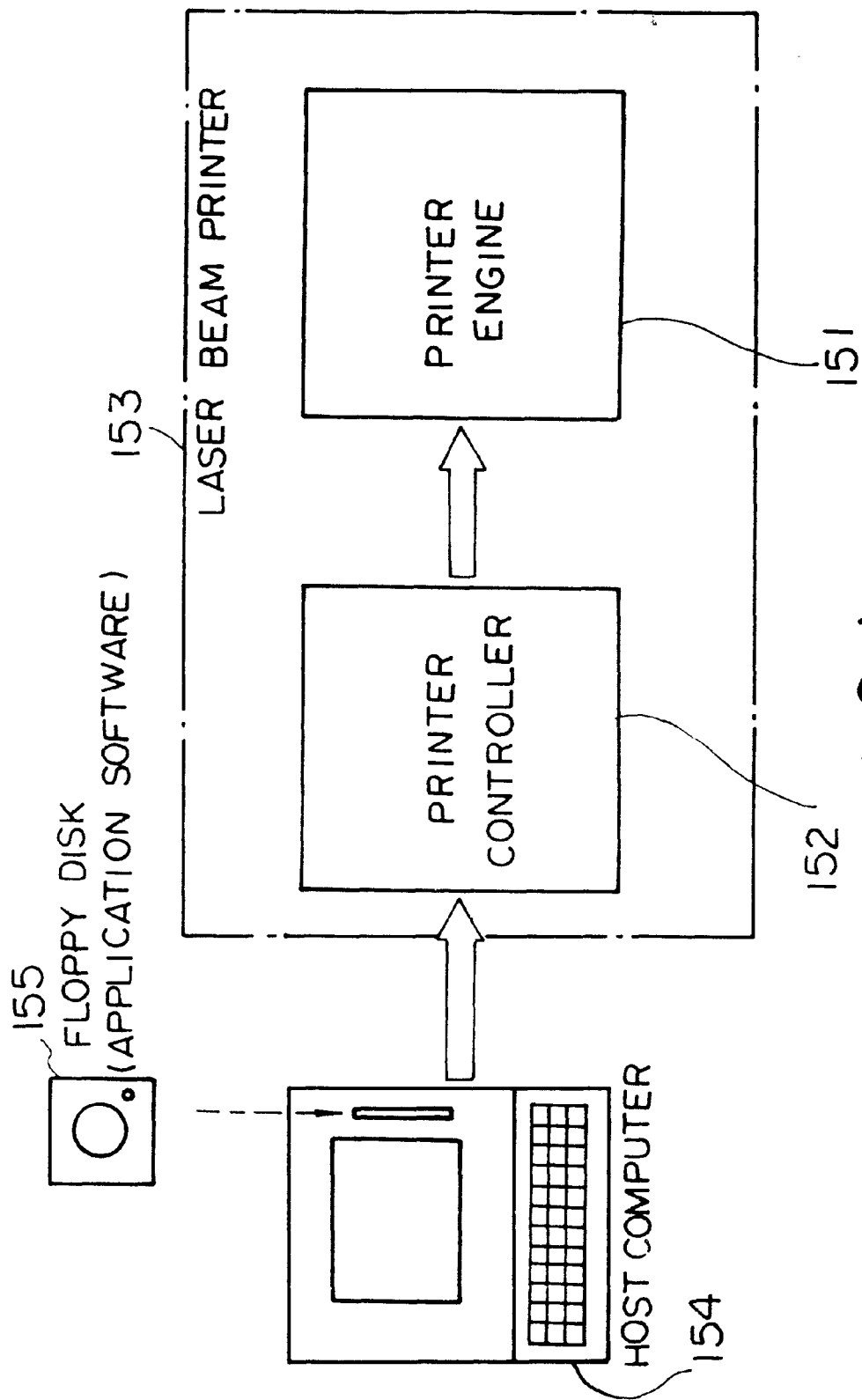
FIG. 1 is a view which illustrates connections established between a host computer, a printer controller, and a printer engine.

An embodiment in which an image data output apparatus according to the present invention is applied to an image forming portion of a laser beam printer will be, in detail, described with reference to the drawings.

[Overall Structure of an Image Forming Circuit]

FIG. 20 is a view which illustrates, in a block diagram form, the overall structure of an image forming system, in which an image processing circuit to be inserted into a printer engine portion 151 is illustrated and connectors 62 and 63 are provided therein in order to establish a connection with an external printer controller. In order to make the description simple, a structure is employed which is formed such that the printing dot density of the printer engine portion according to this embodiment is arranged to transmit data of 600 dots/inch at the portion for realizing the flashing motion of the laser, and an external printer 152 is arranged to transmit data of 300 dots/inch. That is, an engine portion 151 of the laser printer according to this embodiment is arranged such that the printer recording mechanism of 600 dip and the printer controller shown in FIGS. 1 and 2 can be applied thereto. In other words, the conventional 300 dip application softwares can be intact used so that a high grade recorded image of 600 dpi is obtained.

Referring to the same drawing, an image forming circuit structured as described above comprises two printed-circuit boards 60 and 61. The printed-circuit board 61 comprises a printed board capable of processing multi-level data, and is connected to the above-described print board 60 capable of processing binary data via connectors 65 and 64.

Variations of the connection established between the controller 152 and the engine portion 151 will be described. In a case where the printer controller 152 is provided with a function for transmitting binary data only, it is not necessary for the printed-board 61 for multi-level data to be connected to the printer controller 152. Therefore, the printer controller 152 is, via the connector 62, connected to the printed-board 60 for binary data. On the other hand, in a case where the printer controller 152 is provided with a function for transmitting multi-level data, the printed-board 61 for multi-level data is, as shown in FIG. 21B, connected to the printer controller 152. In this case, the printer controller 152 is connected to the connector 63. The printed-boards 60 and 61 are connected to each other via the connectors 64 and 65. As described above, the printed-board 61 for multi-level data is designed to be in the form of a module which is arranged to be individual from the printed-board 60 for binary data so that they can be optionally connected to each other if necessary.

In general, since the printed-board for multi-level data raises the overall cost, the system construction can be enabled with respect to a variety of printer controllers by way of arranging the stricture (unit) thereof to be individual from the printed-board 60 for binary data.

Then, the outline of the processing of data transmitted from the controller 152 will be described.

From Controller to Engine (Transmission of Binary Data)

Figure 21A:
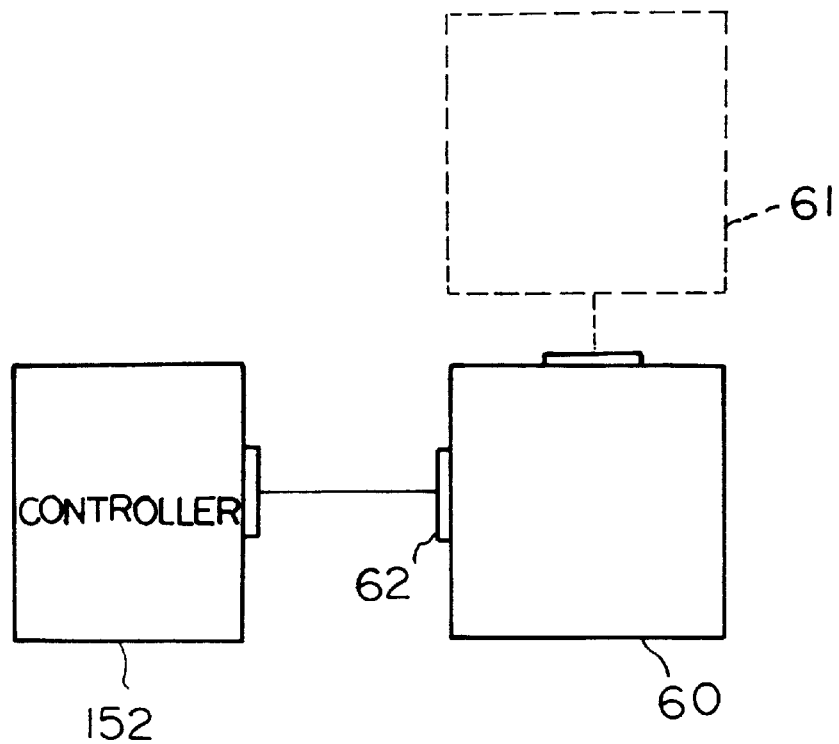
FIGS. 21A an 21B are views each of which illustrates a state in which the print board 60 or 61 is connected to a controller 152.
Figure 21B:
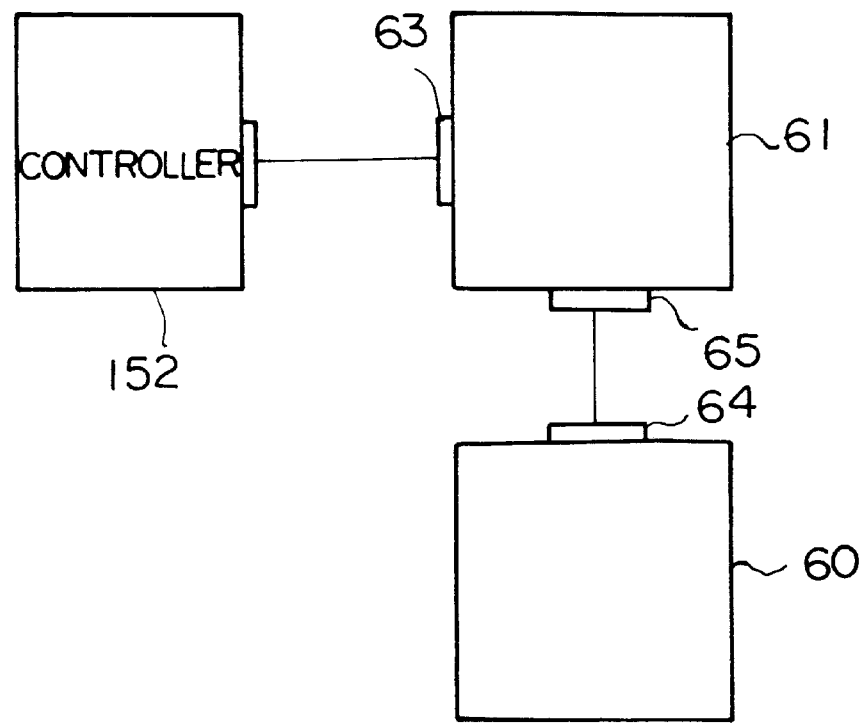

First, a case in which the controller serving as the printer controller and capable of transmitting binary data is, as shown in FIG. 21A, connected to the connector 62 will be described in order to make the summary of the operation of the printed-board 60 for binary data to be understood readily.

Figure 3:
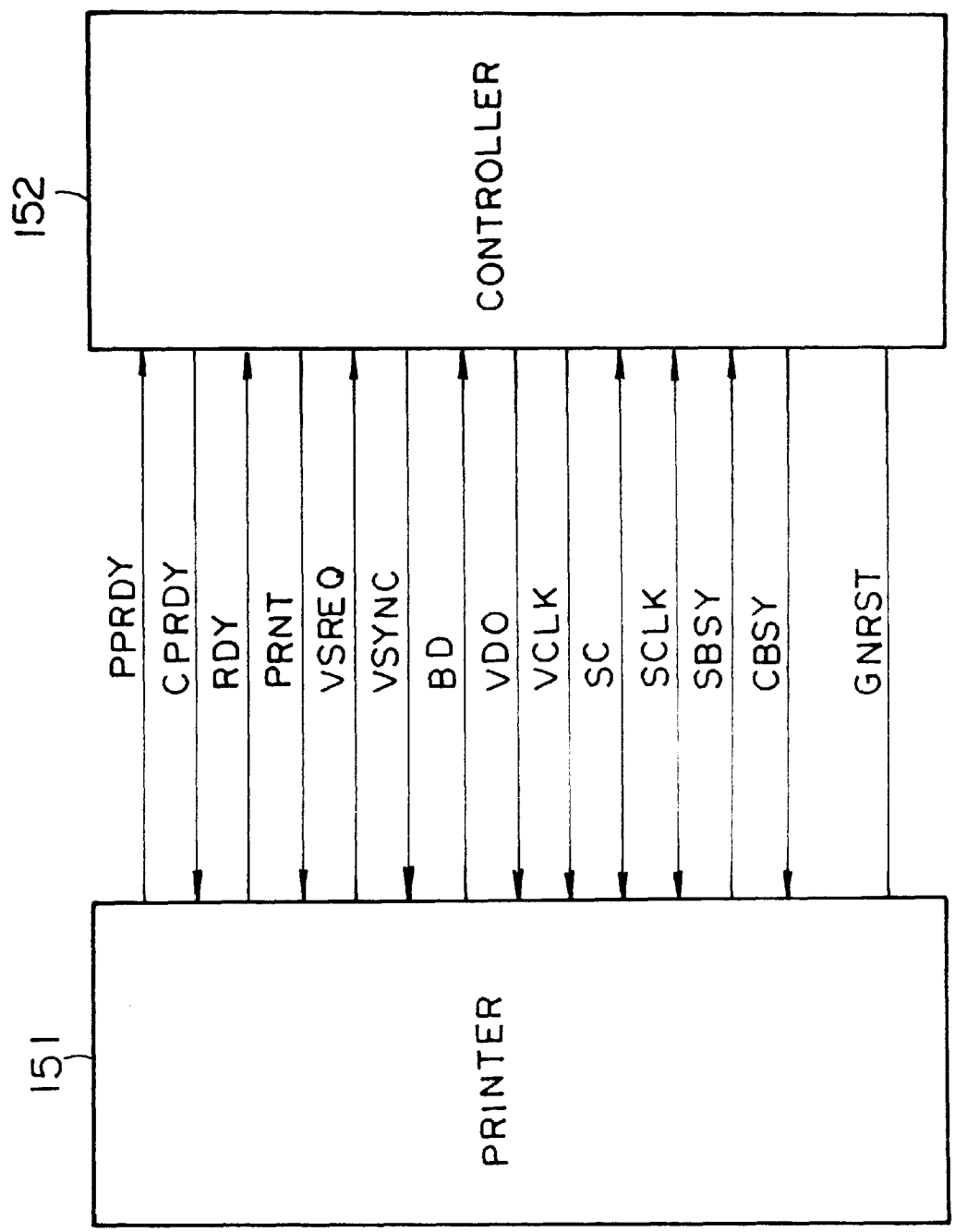
FIG. 3 is a view which illustrates various signals to be transmitted to and from the printer controller and the printer engine.
Figure 4:
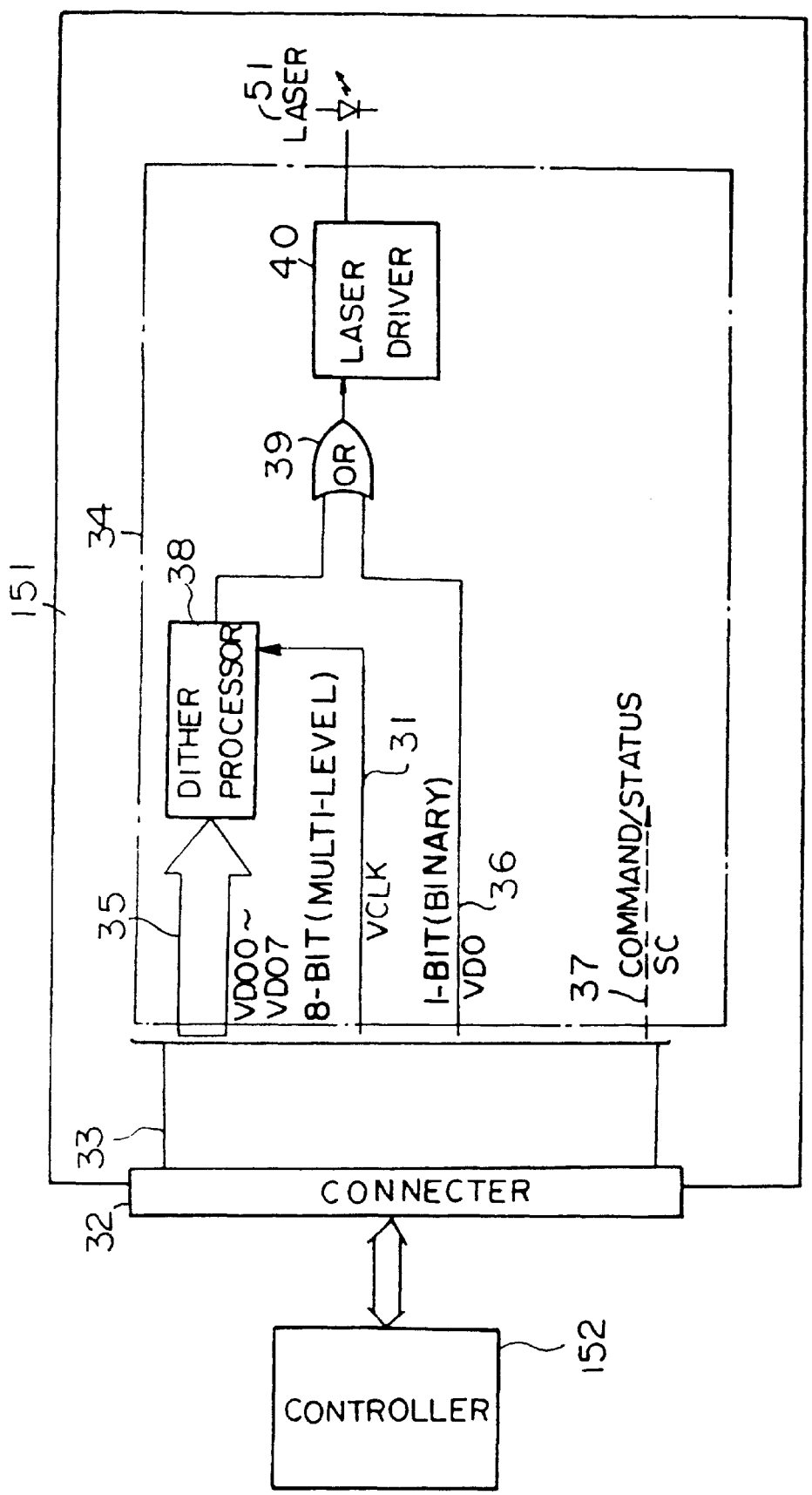
FIG. 4 is a signal processing circuit in a laser beam printer.
Figures 5, 6:
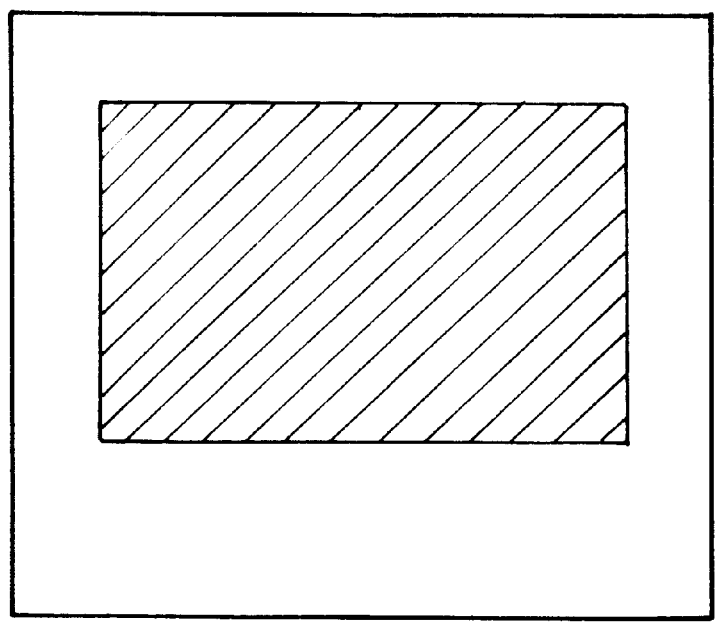
FIG. 5 is a schematic view which illustrates an example of a dither matrix in a conventional dither processing.
FIG. 6 is a schematic view which illustrates an example of a printed pattern formed in accordance with the conventional dither processing.
Figure 7:
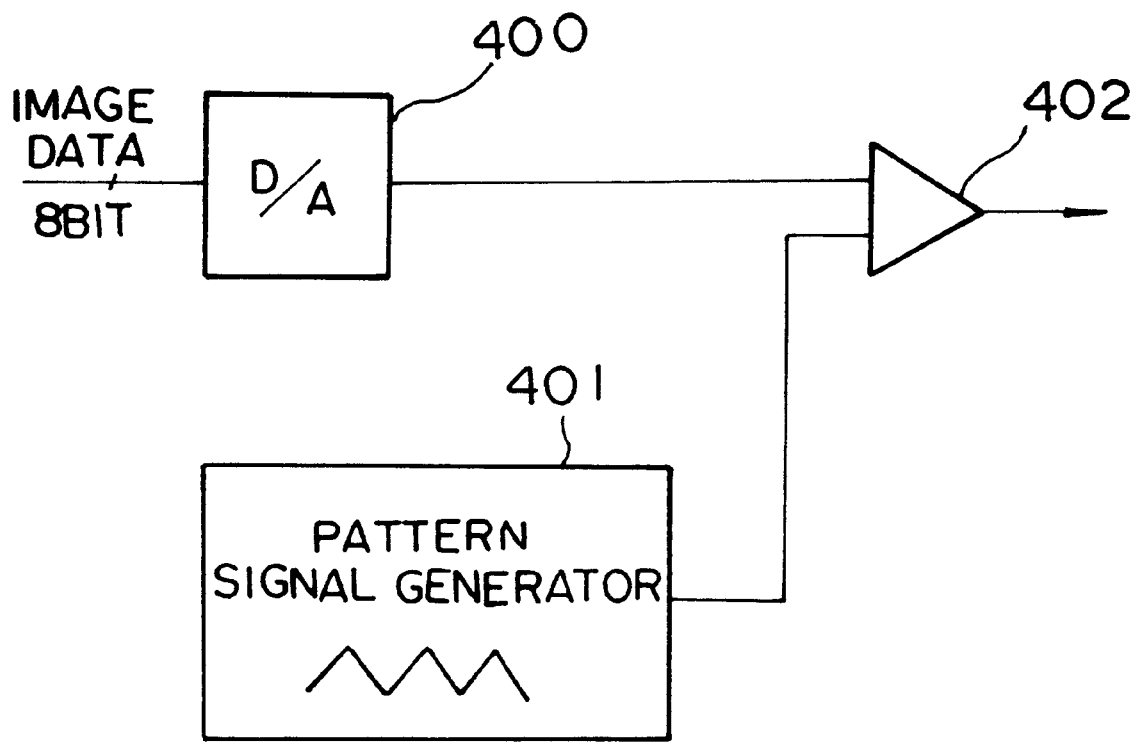
FIG. 7 is a block diagram which illustrates an example of a processing circuit for a conventional pulse width modulation method.
Figure 8:
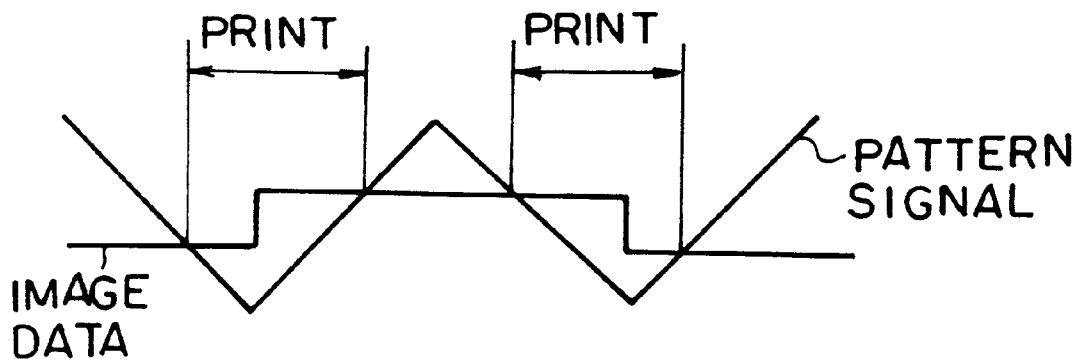
FIG. 8 is a schematic view which illustrates the principle of the above-described pulse width modulation method.
Figure 9:
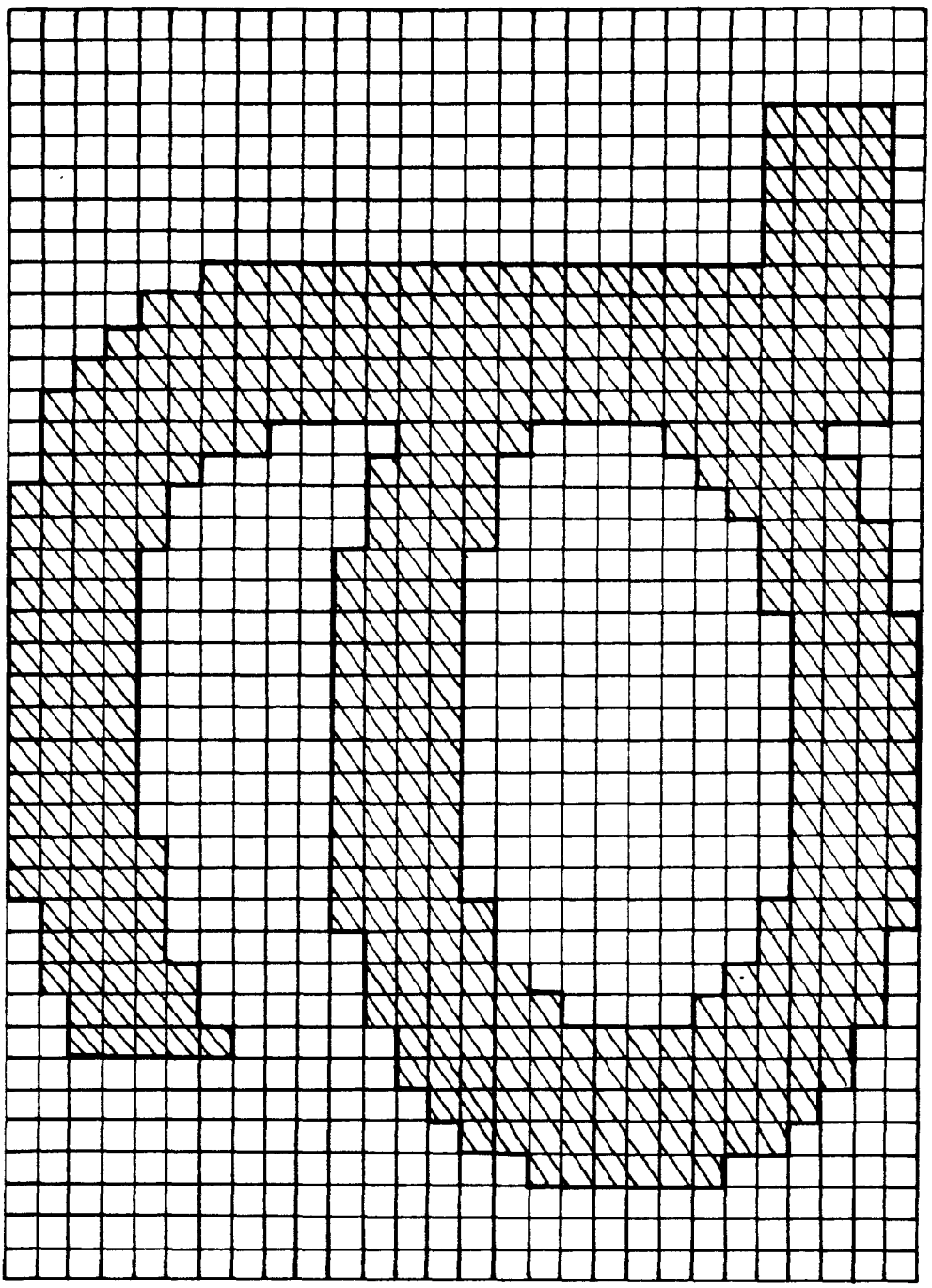
FIG. 9 is a view which illustrates an example of an image transmitting at 300 dpi.

When the printer controller and the printer engine are connected to each other via the connector 62, the various interface signals shown in FIG. 3 are transmitted/received therebetween so that the printer engine 151 performs its printing action in response to these interface signals.

First, the VDO signal 36' serving as a printing signal for a binary (1 bit) image signal of 300 dots/inch is transmitted to the printer controller 152 together with the clock signal VCLK 31' so as to be supplied into a switch circuit 72. A fact whether the VDO signal 36' is introduced into a switch circuit 73 by the switch circuit 72 or is introduced into an OR circuit 66 has been previously determined by a command (#9) supplied from the printer controller 152. When no determination by the command from the printer controller 152 is made, the image signal (the VDO signal) supplied from the connector 62 is arranged to be introduced into the OR circuit 66 upon a determination made that a default state has been generated.

The switch circuit 73 is designed to have another input to which the output from a smoothing circuit 69, to be described later, is supplied. The VDO signal 36' is introduced into a binary data interpolating circuit 67 via the OR circuit 66. In the binary data interpolating circuit 67, a density signal 300 dots/inch is subjected to a data interpolating processing so as to become a 600 dots/inch signal. The VDO signal which has been data-interpolated in the binary data interpolating circuit 67 is introduced into a smoothing circuit 69 in which data expressing a diagonal line is extracted from the VDO signal which has been data-interpolated so that the data expressing a diagonal line is converted into data arranged such that the diagonal line has been subjected to the smoothing processing. A plurality of smoothing processings of this type is provided (see FIGS. 29 and 32) so as to be switched at a command (#10) from the controller 152.

The VDO signal which has been smoothed in the smoothing circuit 69 is then introduced into a laser driver 40 via a switch circuit 73 and an OR circuit 39 so that a laser 51 is turned on.

Figure 20A:
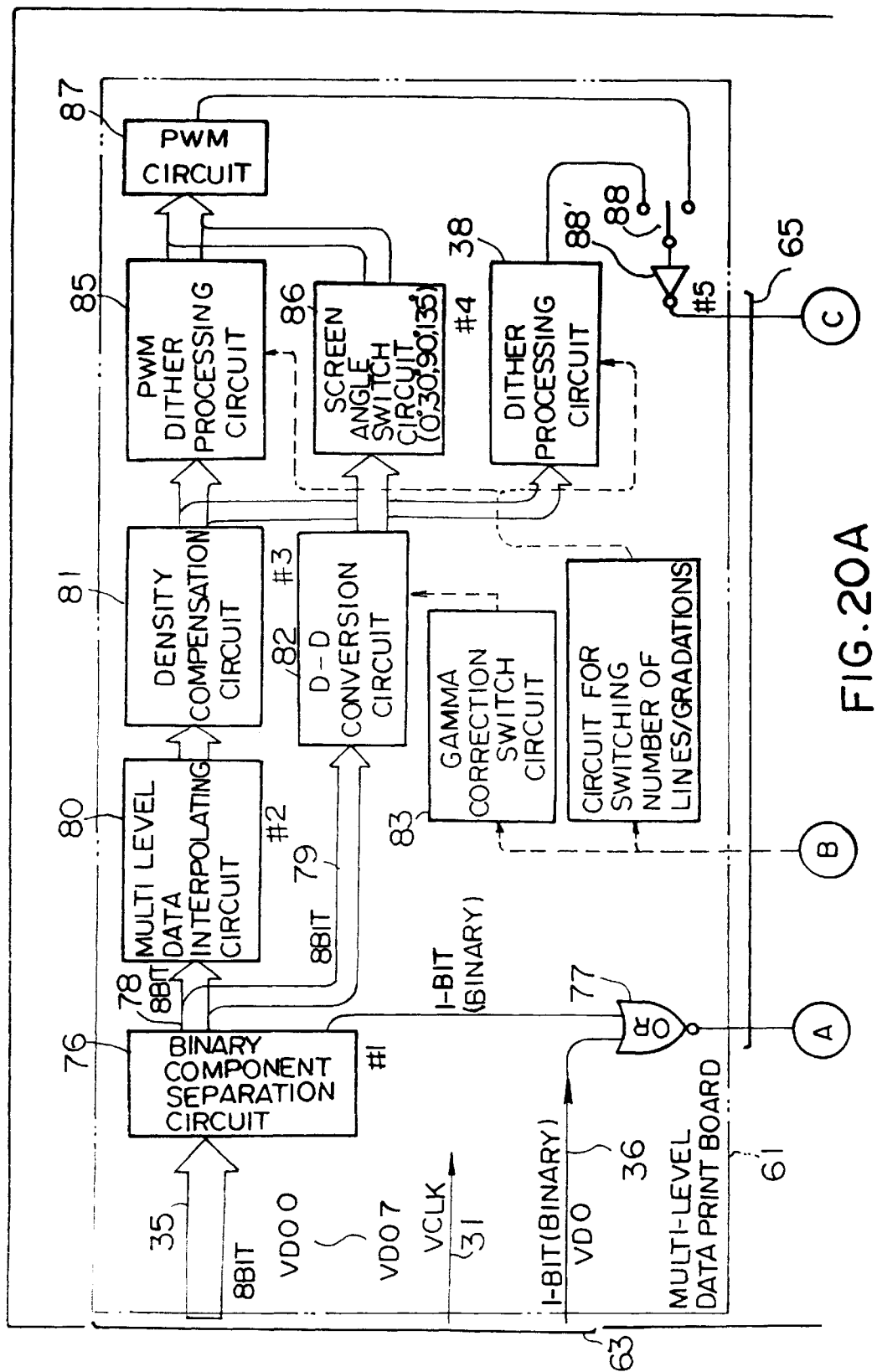
FIGS. 20A and 20B are views which illustrate an image processing circuit according to a basic embodiment.
Figure 20B:
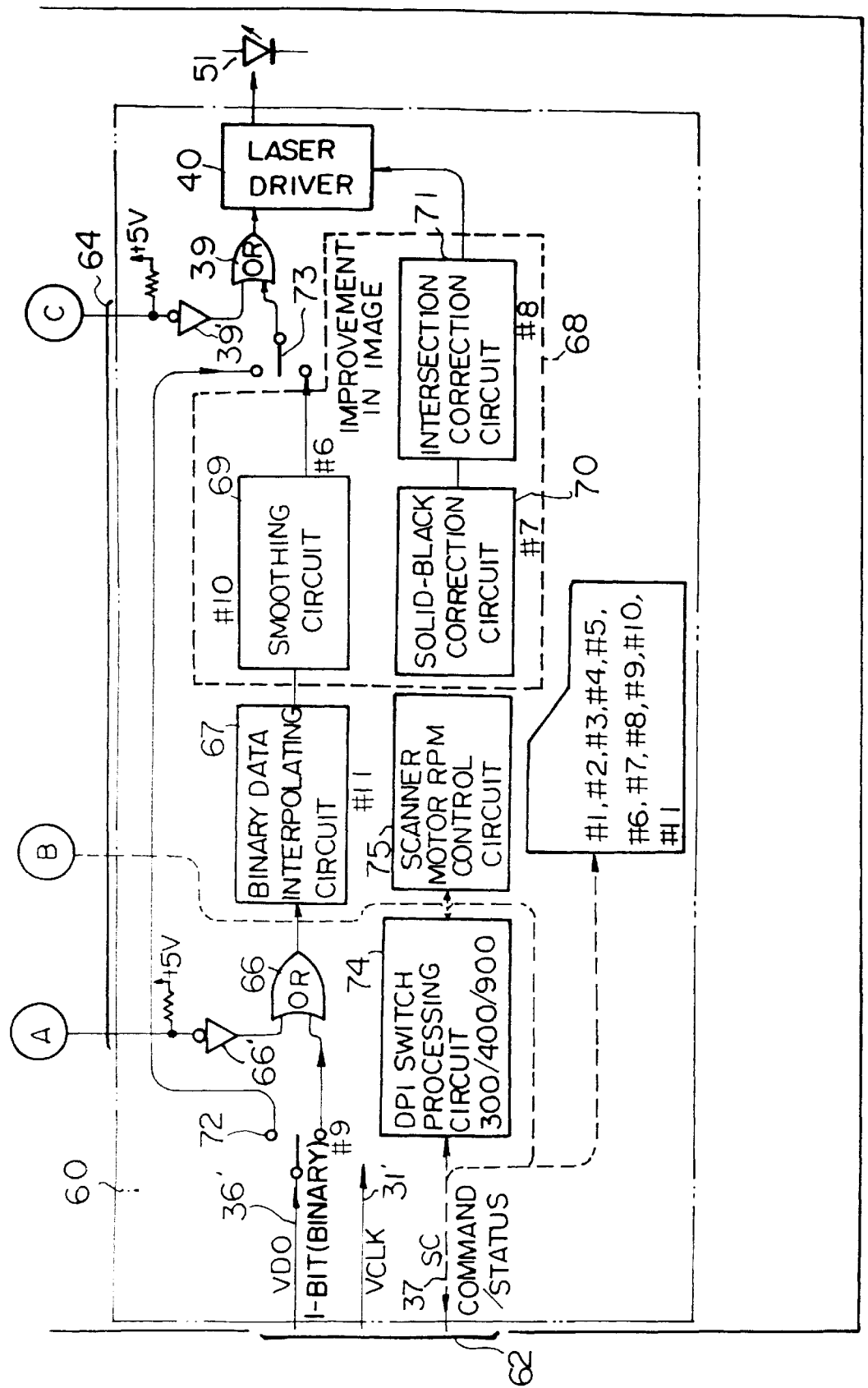

As shown in FIG. 20B, a signal generated by a solid black correction circuit 70 and an intersection correction circuit 71 is, as a control signal, supplied to the laser driver 40. That is, a determination is made by the solid black correction circuit 70 and the intersection correction circuit 71 for the purpose of varying the light quantity of laser to be applied to each of the pixels to be:

$P_N$ (Normal)

$P_L$ (Large)

$P_S$ (small)

As a result, the electric current for emitting laser is changed in the laser driver 40 so as to correspond to each of the pixels for the purpose of improving the quality of the printed image.

Interpolation/Smoothing

Figure 23A:
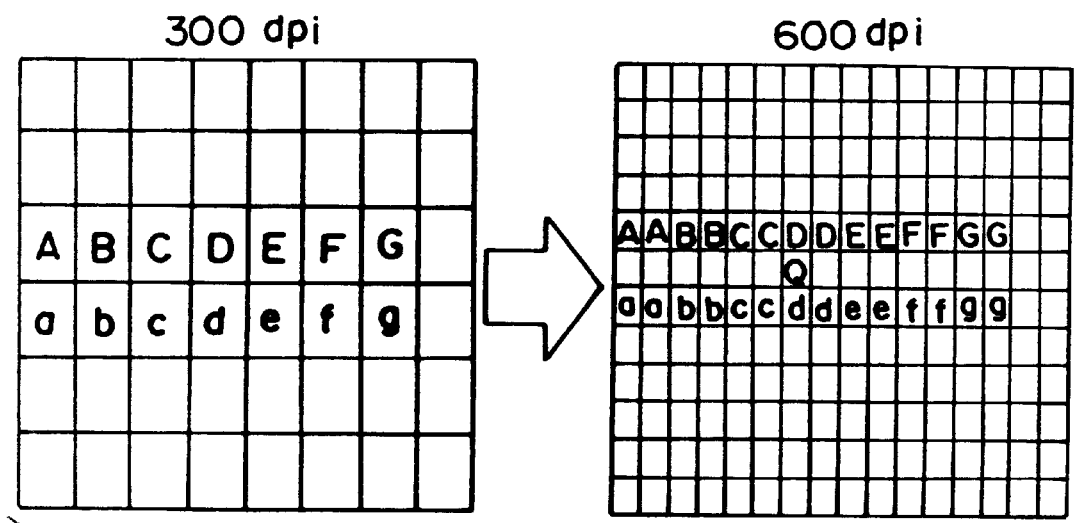
FIGS. 23A to 23C are views which illustrate the interpolating processing of binary data according to the basic embodiment.

FIG. 23A is a view which theoretically illustrates a state in which a binary information of 600 dots/inch is obtained by conducting the smoothing processing and the data interpolating processing of the binary information of 300 dots/inch. Referring to this drawing, the line of symbols a represents a column of binary data of 300 dots/inch, while the line of symbols b represents a column of binary data of 600 dots/inch after the data interpolating processing.

Binary data A to G and a to g of seven bits for 300 dots/inch are data-interpolated in the main scanning direction (in the lateral direction), the data-interpolation being conducted simply with the left dot. As a result, AABBC-CDDEEFFGG and aabbccddeeffgg is obtained before conducting the data-interpolation of the sub-scanning direction (longitudinal direction). Interpolation dot Q in the sub-scanning direction is data-interpolated in accordance with logical expression as follows:

$Q = (B+F) * b * c * d * e * f$
$+ (b+f) * B * C * D * E * F$ $$+(C+E) c * d * e$$

$$D+d$$

$$+A * B * C * D * E * F * G$$

$$+a * b * c * d * e * f * g \tag{1}$$

Figure 24A:
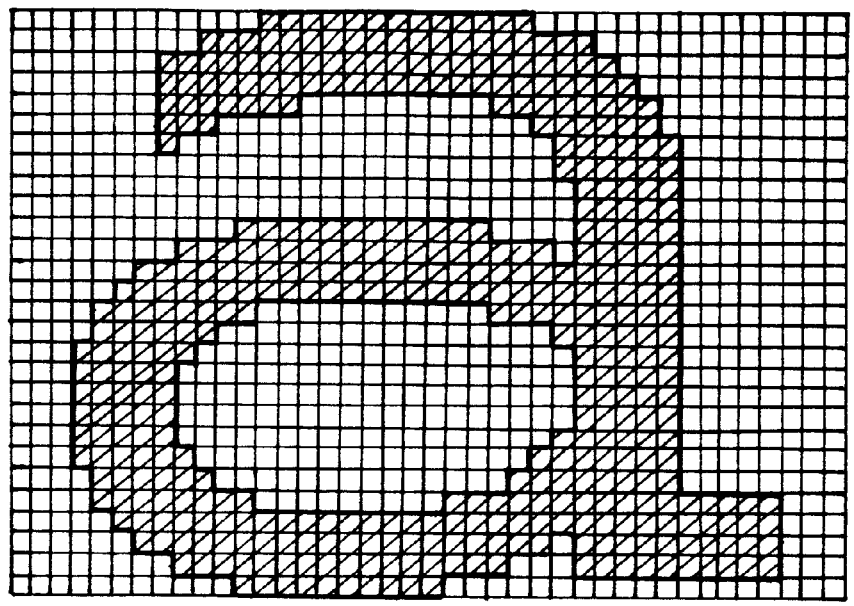
FIGS. 24A and 24B are views which illustrate the change generated when the image of 300 dpi is interpolated into an image of 600 dpi by the binary data interpolating processing according to the basic embodiment.
Figure 24B:
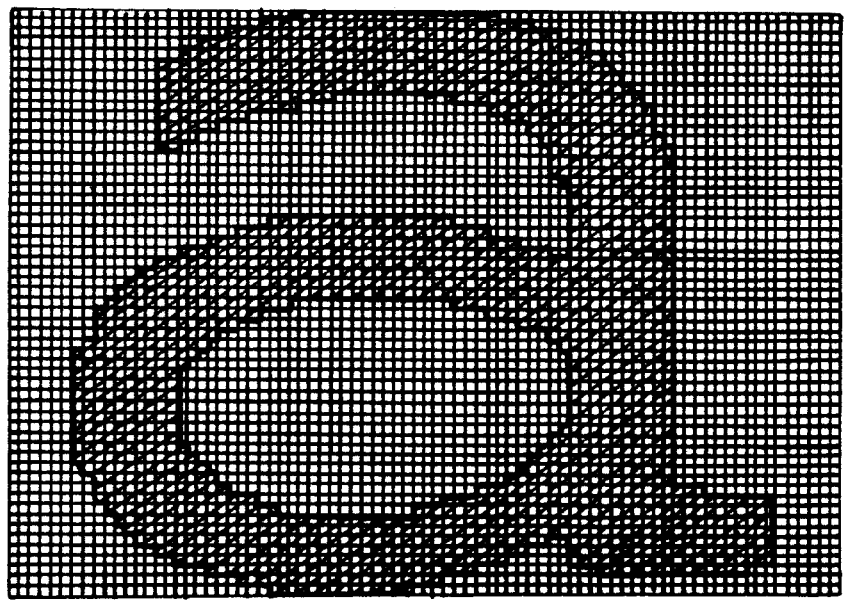

Since the interpolation in the sub-scanning direction is, as a result, conducted together with the smoothing processing, Expression (1) expresses the processing in which the interpolating processing by means of the circuit 67 shown in FIG. 20B and the smoothing processing by means of the circuit 69 are simultaneously conducted. As a result of the interpolation processing and the smoothing processing, the character "a" forming the data column of the printing dot of 300 dots/inch shown in FIG. 24A can be obtained as data (see FIG. 24B) for the printing dot of 600 dots/inch which has been subjected to the smoothing processing. The difference between the result of the processing obtained from the conventional example shown in FIG. 10 and the result of the interpolating/smoothing processing shown in FIG. 24B is made apparent from the comparison of them.

Figure 23B:
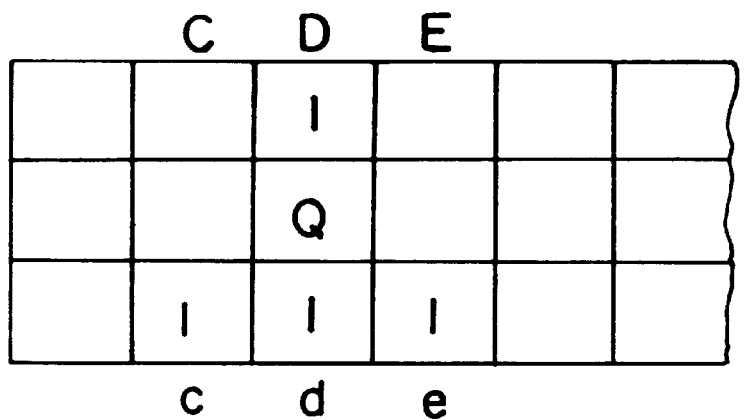
Figure 23C:
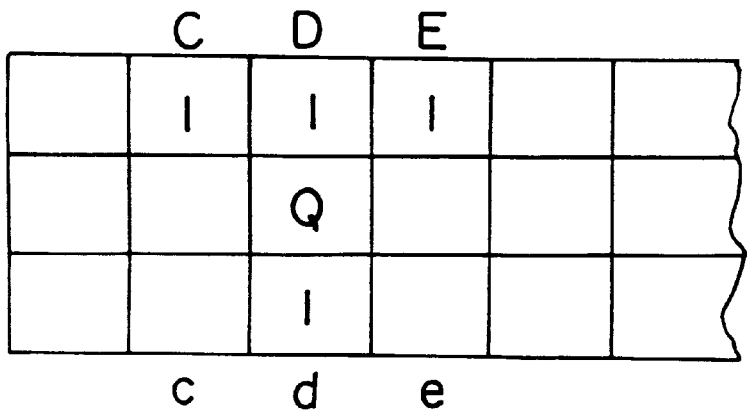

FIGS. 23B an 23C shows the following logical portion $$(C+E) c * d * e$$

of Expression (1) as an example. The results of the interpolation shown in FIG. 23B and 23C intuitionally illustrates the validity of Expression (1).

The logical expression (1) for the data interpolation processing is not limited to the above-described since it is necessary for the expression (1) to be determined such that the quality of the image of various characters, line segments, and graphics can be improved.

Solid Black Interpolating Processing and Intersection Correction Processing

Figures 25A, 25B, 25C:
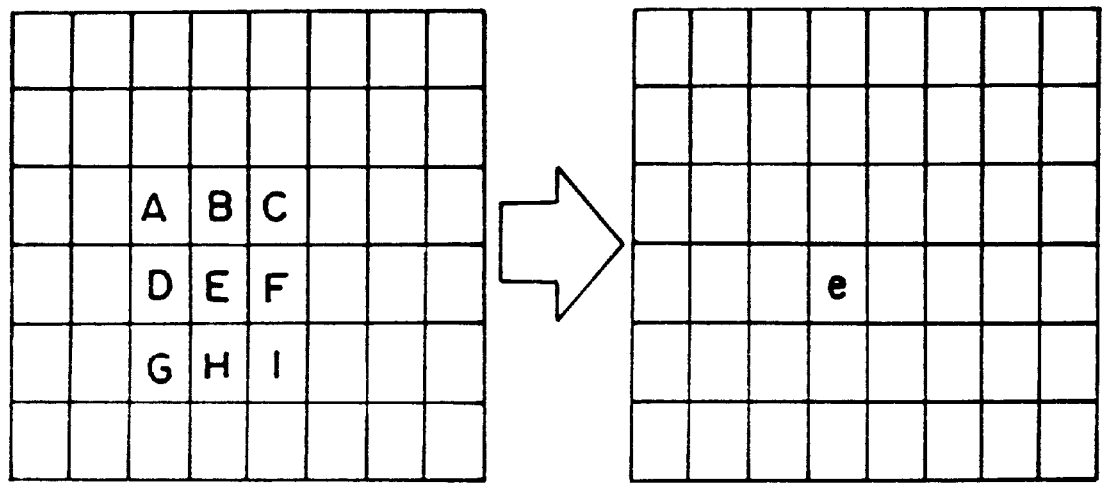
FIGS. 25A to 25C are views which illustrate a solid-back correction processing and intersection correction processing.

FIGS. 25A, 25B, and 25C are views which illustrates the logic for the solid black interpolating processing by means of the circuit 70 and the same of the intersection correction processing by means of the circuit 71, each of the processings being applied to binary data for 600 dots/inch obtained by the above-described data interpolating processing.

Referring to FIG. 25A, a binary data column for 600 dots/inch density is illustrated in FIG. 25A (a) in such a manner that the axis of abscissa stands for the main scanning direction and the axis of ordinate stands for the sub-scanning direction. Symbols e represents the position of the subject pixel when 9 pixels ABCDEFGHI is subjected to the solid black correction processing or intersection correction processing, the position e being the position of the corresponding pixel to which laser is applied.

Then, the case in which the pixels around the pixel e to which laser is applied and which contains the corresponding pixel E shown in FIG. 25A (a) are arranged to be, as illustrated, A t I will be described. As will be described with reference to FIG. 36, the laser driver can vary its laser current to large, intermediate, and small levels in pixel units, with which the light quantity of the laser can be changed and controlled to large quantity of light $P_L$, intermediate quantity of light $P_M$, and small quantity of light $P_S$.

Assuming that pixel E is E="0", that is, when the state is "Not printing", the laser driver 40 does not supply current to the laser 51 so as to make the quantity of light of laser "0". On the contrary, when the pixel E is "1", that is, when the state is "Printing", the quantity of light is arranged to be varied by the dots surrounding the pixel E. This fact will be described.

When all of the dots surrounding the pixel E is "1", that is, $$A=B=C=D=E=F=G=H=I="1" \tag{2}$$

the laser current is enlarged so as to make the quantity of laser light the large level $P_L$, and the laser is turned on. As a result, the size of the toner image corresponding to the pixel developed on the photosensitive drum is enlarged so that a black face without any nonuniformity is reproduced since the gap between a pixel and the neighboring pixel can be covered. Thus, the "solid black correction" is conducted.

Then, "Intersection correction" will be described with also reference to FIGS. 25B and 25C.

When the pixel E is "1", that is, the state is "Printing" and the dots surrounding the pixel E is $$B=D=F=H="1", A=C=G=I="0" \tag{3}$$

or $$A=C=G=I="1", B=D=F=H="0" \tag{4}$$

the laser current is reduced and the quantity of laser light is set to the small level $P_S$.

The logical expression (3) expresses a case in which the pixel E corresponding to the laser lighting position e corresponds to the intersection between the longitudinal line segment BH and the lateral line segment DF (see FIG. 25C). The logical expression (4) expresses a case in which the pixel E is present at the intersection between diagonal line segments AI and CG (see FIG. 25C). That is, these expressions act to extract the intersection of the lines. Since the size of intersection of the line can be easily enlarged (easily made fat) due to a relative increase in the amount of toner adhered, the quantity of laser light is reduced ($P_S$) so as to reduce the amount of the toner adhered and so as thereby to improve the quality of the image of the intersection.

In case other than the above-described cases expressed by expressions (2) to (4), the quantity of laser light is arranged to be the intermediate level $P_M$.

Although the change in the light quantity of laser is realized, in accordance with the description above, by the logical decision on the basis of the 8 dots surrounding the subject pixel E, it may be changed on the basis of a logical expression by using a larger number of the surrounding pixels with a further effective improvement realized in the image quality.

The image quality improving circuit 68 (see FIG. 20B) comprising the binary data interpolating circuit 67, smoothing circuit 69, solid black correction circuit 70, an the intersection correction circuit 71 may be arranged to be arranged of a type in which a plurality of types of processings can be conducted in a sole processing circuit as an alternative to a structure in which individual processing circuits are provided. It is a printer engine 151 shown in FIG. 26 which is arranged to realize the integration of the circuits above, FIG. 26 being to be described later.

Controller→Engine (Transmission of Multi-level Data)

Then, a case in which the multi-level printed circuit board 61 is connected to the binary data printed circuit board 60, and the printer controller is connected to the multi-level data printed circuit board 61 via the connector 63 (see FIG. 21B).

Th printer controller is able to transmit a VDO signal 36 as a binary signal and 8 bits parallel signal 35 (VD00 to VD07) as a multi-level signal via the connector 63 and in synchronization with the clock signal VCLK signal. According to the system formed as shown in FIG. 21B, the printer controller may transmit the binary VDO signal 36 when only the binary signal is printed, while the same may transmit only the multi-level 8-bits parallel signal 35 (VD00 to VD07) when only the multi-level signal is printed. In particular, in a case where the transmitting and printing is performed by synthesizing character data processed in a personal computer as the data and the original image read by an image scanner or the like, it is able to transmit the above-described original image in the form of the multi-level 8 bits parallel signal 35 (VD00 to VD07) simultaneously with the transmission of the above-described character data in the form of the binary VDO signal 36. The data transmission timing in this case is shown in FIG. 22.

As is shown from FIG. 22, both the binary signal VDO 36 and the multi-level signal (VD00 to VD07) 35 are transmitted in synchronization with the transmission clock VCLK. In this case, the binary VDO signal 36 and the multi-level signals VD00 to VD07 corresponding to the clock VCLK of the same timing are arranged to correspond to the same printing position. The multi-level data 35 is transmitted in the form of an 8 bits parallel signal in which the VD07 is arranged to be MSB, while the VO00 is arranged to be LSB.

In a case where the printer controller does not have the function capable of transmitting only multi-level signals of the number of bits lower than the 8 bits (7 bits to 2 bits), the data transmission is so conducted that the necessary number of bits is used from the VD07 which serves as the MSB bit and the lower signals are arranged to be unused signals. The portion of the printer to which signals are input is pulled up by means of a resistor such that when no signal line is connected thereto, the input becomes "0". A countermeasure taken against a case in which the number of the bits processed in the controller and the number of the bits processed in the engine 151 will be described in detail with reference to FIG. 62 as a modified example of this embodiment.

The binary signal VDO 36 is input to an inverter 66' of the binary data print board 60 via the NOR circuit 77 and connectors 65 and 64.

The multi-level signals VD00 to VD07 is input to the binary component separation circuit 76. The binary component separation circuit 76 intact transmits the input multi-level signal VD00 to VD07 to the multi-level data interpolating circuit 80. Simultaneously, it converts the input multi-level signals for the pixels into binary signals so as to transmit them to the binary data board 60 via the NOR circuit 77. That is, this conversion of the signals into the binary signals acts to determine whether or not the value of the multi-level signal 35 exceeds a predetermined level (for example "FE"$_H$) and, if it exceeds this level, it a signal is transmitted to the NOR circuit 77 as the binary data of "1". The multi-level data which has passed through the separation circuit 76 is transmitted to the multi-level data interpolating circuit 80 via the data line 78 or is transmitted to the D—D conversion circuit 82 via the data line 79.

Figure 37:
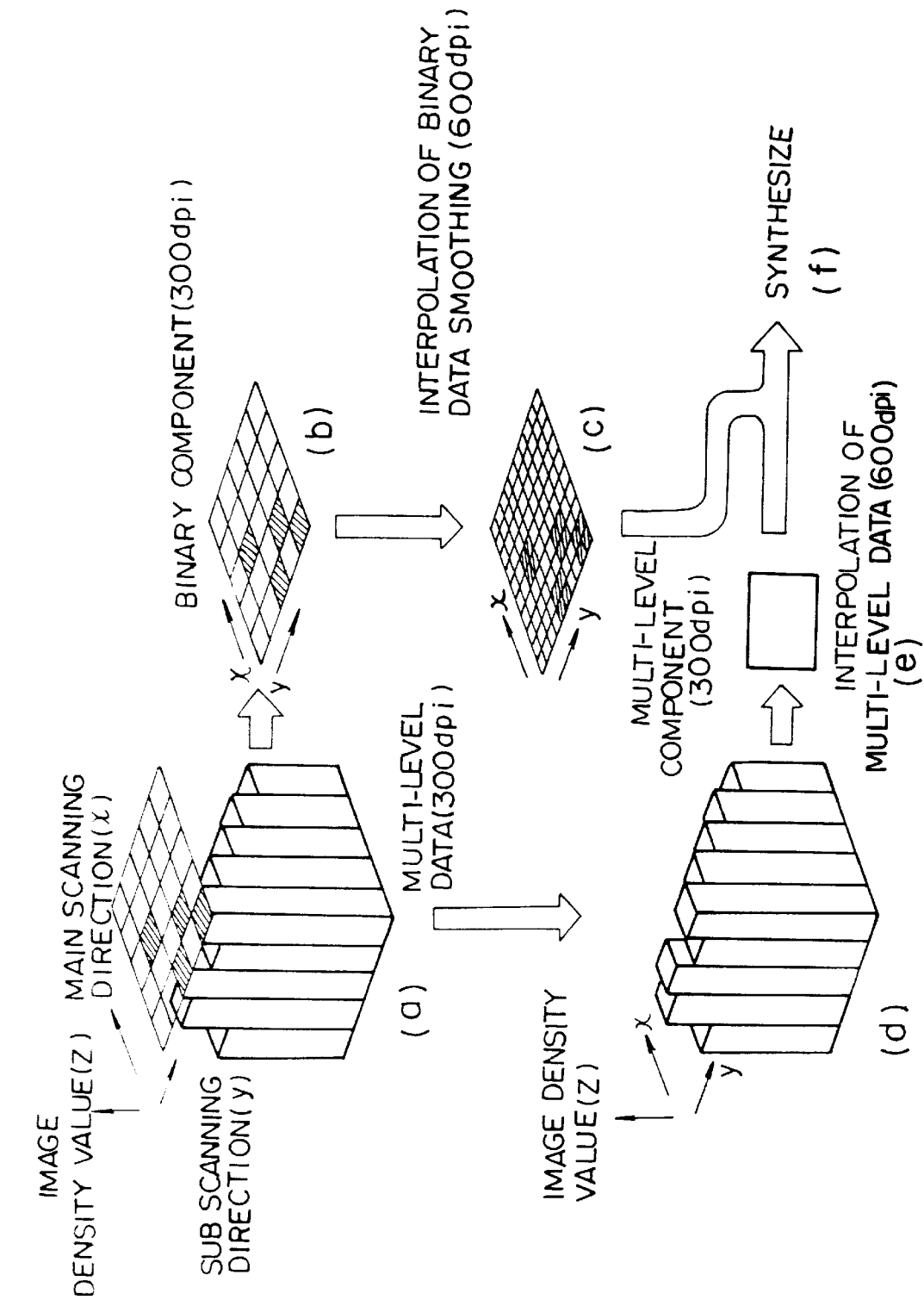
FIG. 37 is a view which illustrates the operation of a binary component separation circuit.

FIG. 37 is a view which illustrates the theory of the operation of the binary component separation circuit 76. Referring to this drawing, FIG. 37 (*a*) is a view which schematically illustrates the 8-bits multi-level data column for the printing data density of 300 dots/inch such that the x-coordinate stands for the main scanning direction, y-coordinate stands for the sub-scanning direction, and y-coordinate stands for the density of image ("00"$_H$ to "FF"$_H$). The binary component separation circuit 76 extracts only pixels the value of the multi-level data of which exceeds "FE"$_H$ from the multi-level data columns for the 300 dots/inch shown in FIG. 37 (*a*) so that the multi-level components are extracted such that the pixels which correspond to this are arranged to be data for "1" in the binary data column and the pixels which does not correspond to this are arranged to be data for "0" in the binary data column. The thus-extracted data is, in the form of a one-bit binary signal, transmitted to the NOR circuit 77. In the NOR circuit 77, the thus-extracted data and the binary signal VDO 36 is ORed so as to be input to the OR circuit 66 in the binary data print board 60 via the connectors 65 an 64. The binary signal input to this OR circuit 66 is subjected to the various processings as the binary signal for the binary data print board 60. FIG. 37 (*c*) is a view which schematically illustrates the state in which the extracted binary signal {see FIG. 37 (*b*)} for the density of 300 dot/inch is, by the above-described circuits 67 and 67, subjected to the data interpolating processing or the smoothing processing.

On the other hand, referring to FIG. 37, the multi-level data is intact transmitted to the multi-level data interpolating circuit (represented by reference numeral 80 shown in FIG. 26) without being processed in particular in the separation circuit 76. In this circuit 80, it is, as shown in FIG. 37 (*e*), converted into data for the density of 600 dots/inch by the multi-level data interpolating processing to be described later. Then, the interpolated data is subjected to the dither processing (by the circuit 38 shown in FIG. 26) or to the pulse width modulation processing (circuit 87 shown in FIG. 26). The thus-dither processed or pulse width modulated signal is the laser driving signal which is input to the switch circuit 88. The switching control is arranged to be conducted by a command (#5 shown in FIG. 20A) issued from the printer controller 152 such that either of the above-described two processing signals is selected so as to be transmitted to the board 60 for binary data via the connectors 65 and 64.

In the OR circuit 39 in the board 60, the laser driving signal transmitted from the board 61 and the laser drive signal of binary data for 600 dpi transmitted via the OR circuits 77 and 66 are ORed and are arranged to drive the laser 51 for the purpose of conducting the printing.

The way of usage of the binary component separation circuit 76 and the roll of the same in this embodiment will be described.

Recently, there are controllers having the following multimedia function as well as a signal function of transmitting image read through an image reader, that is, a controller having a function that a variety of data is, by a personal computer or the like, processed by using a software, and the printing pixel for the thus-processed data is added as the maximum density value "FF"$_H$ of the multi-level signal to the data for the multi-level original image read through an image reader so as to be transmitted to the printer engine. In this case, a variety of data is, as a result, contained in the data for the original image data. However, the proportion of the portion in which the value of data becomes "FF" is relatively reduced. According to this embodiment, by utilizing the characteristics of the multi-level image data, data such as character data or the like to be converted into binary data is separated from data taken in the printer engine so as to be subjected to a separation between the binary data and the multi-level data before being subjected to the image quality processings which suit the types of the data. Then, a high grade image is obtained by synthesizing the signals and by printing them. This is the roll of the binary component separation circuit 76.

The binary component separation circuit 76 selects the action thereof whether or not it separates the binary component in response to the command (#1) issued from the printer controller. In this case, the default state in which no command is transmitted is arranged to be the state in which the separation of the binary component is conducted.

Figure 38:
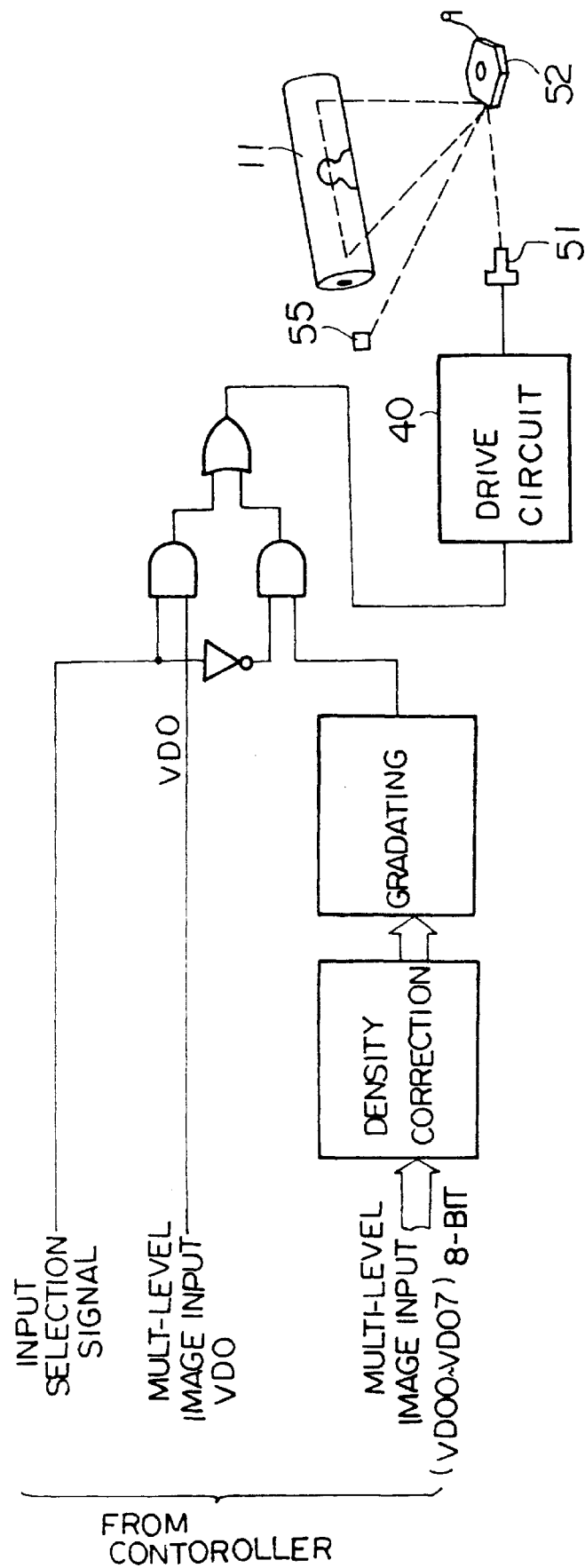
FIG. 38 is a view which illustrates an example of a circuit capable of selecting, in an alternative way, the binary image data and image data which has been pulse-width modulation processed upon a command transmitted from outside the system.

Although the binary data and the interpolated multi-level data are arranged to be overlap-synthesized for the convenience of the description referring to FIG. 37, a signal may in an alternative way selected from the two signals so as to be transmitted by way of the controlling of the OR circuit 39 and the switch 73 by the controller in the structure according to the embodiment shown in FIG. 20. FIG. 38 is a view which illustrates the state of the alternative selection. The input selection signal shown in this drawing is a command transmitted from the controller 152, the input selection signal being capable of selecting either the interpolated binary data and the multi-level data.

(Detail Description of the Print Board for Binary Data)

Then, the processing to be conducted in the binary data print board and the specific structure of the circuit capable of conducting this processing will be described in detail.

Figure 26:
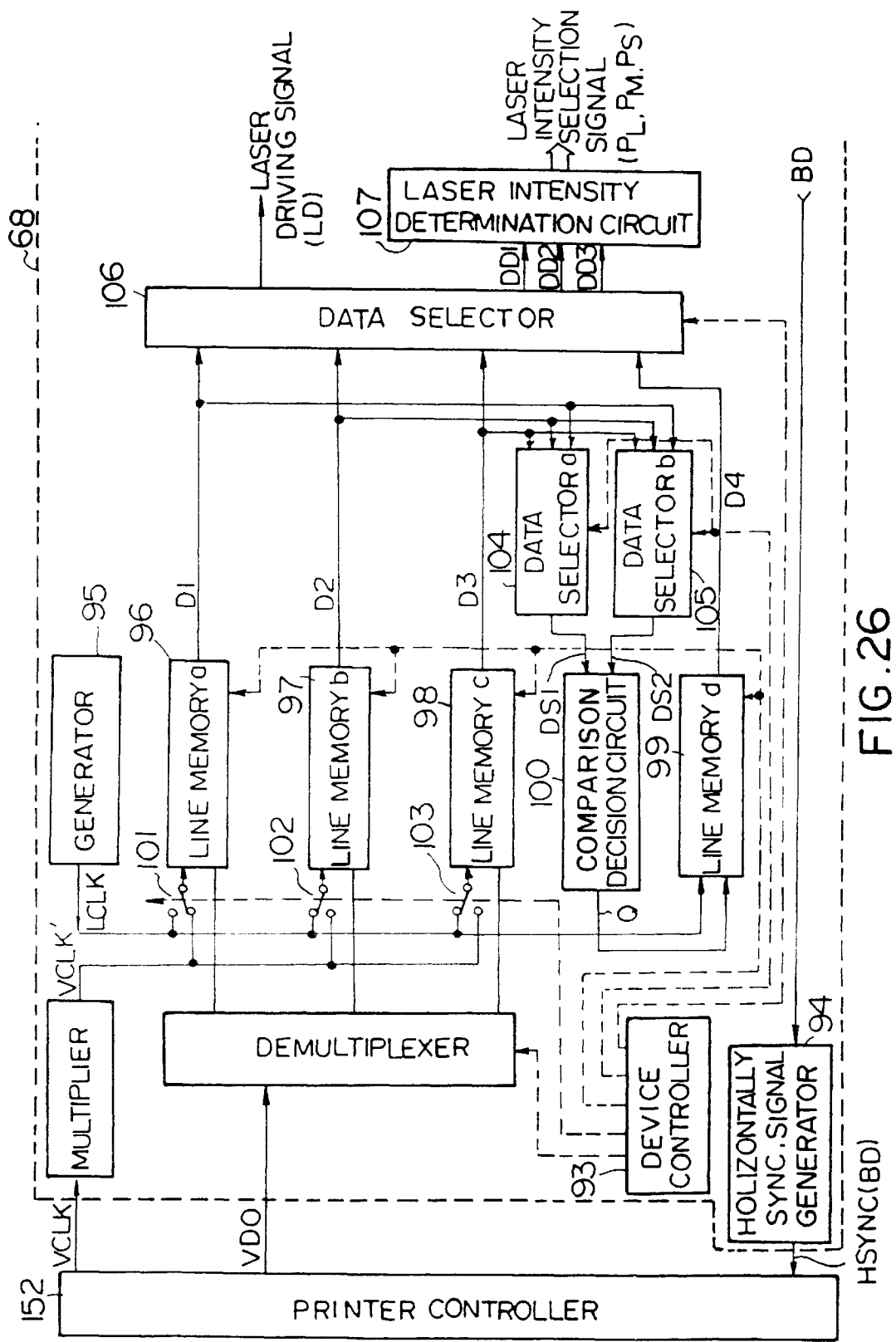
FIG. 26 is a specific circuit capable of conducting the interpolating processing or the like of binary data.

The circuits shown in FIG. 26 are specific example of the binary data interpolating circuit 67, smoothing circuit 69, solid black correction circuit 70, and the intersection correction circuit 71 shown in FIG. 20B.

Referring to this drawing, reference numeral 91 represents a frequency multiplexing circuit capable of obtaining a clock BCLK' whose frequency is doubled that of the image clock VCLK by multiplexing the frequency of this image clock VCLK. An oscillation circuit 95 generates a clock LCLK whose frequency is a quadruple of that of image clock VCLK.

Switch circuits a (101), b (102), and c (103) alternates the clock VCLK or LCLK, respectively, and supplies them respectively as the writing clock or the reading clock for the line memories a to c. A de-multiplexer 92 has a function capable of alternating and the image signal (binary signal) VDO into the line memory a (represented by reference numeral 96), line memory b (represented by reference numeral 97), and line memory c (represented by reference numeral 98). A horizontal synchronization signal generating circuit 94 counts beam detect signals (BD signals) and transmits one horizontal synchronization signal HSYNC whenever two BD signals are input. The printer controller is arranged to treat this horizontal synchronization signal HSYNC as the BD signal.

A device control circuit 93 controls the de-multiplexer 92 and the switch circuits a (101), b (102), and c (103) in response to the BD signal for each line. As a result of this control thus performed, the image signal VDO is written in any of the line memory of the line memories a to c with the clock VCLK'. Simultaneously, an image signal is read in accordance with the clock LCLK from the other two line memories. The above-described operations are successively conducted. That is, when the image signal VDO is written in the line memory a (reference numeral 96), the line memory b (reference numeral 97) and the line memory c (reference numeral 98) conducts the reading action. At the next timing, the line memory b (reference numeral 97) performs the writing action, while the line memory c (reference numeral 98) and the line memory a (reference numeral 96) perform the reading actions. At the next timing, the line memory c (reference numeral 98) performs the writing action, while the line memories a (reference numeral 96) and b (reference numeral 97) perform the reading actions. Thus, the control operations are repeated.

The line memories a, b, and c each has the memory capacity of double the data for 300 dpi in the main scanning direction, that is the memory capacity of data for 600 dpi. Image signals read from line memories a, b, and c is arranged to be D1, D2, and D3, respectively. The control of writing and reading in the line memories a to c and lie memory d and the control of selection of the data selector 104 and 105 are conducted by the device control circuit 93. The data selector c (represented by reference numeral 106) transmits any of the signals D1, D2, D3 read from the line memories a, b, and c and the signal D4 read from the line memory d as the laser driving signal LD. The control of this selection is conducted by the device control circuit 93.

The data selectors 104 and 105 respectively select the two signals which are on the reading action from the signals D1, D2, and D3 read from the line memories a to c. For example, when the line memory a is being writing and the line memories b and c are being reading, the data selector a selects the read data D2 so as to transmit a signal DS1 while the data selector b selects the read data D3 from the line memory c so as to transmit the signal DS2.

Interpolation/Smoothing

The calculation with the above-described Expression (1) is conducted by the comparison discriminating circuit 100. This comparison discriminating circuit 100 inputs the signals DS1 and DS2 so as to make comparison each of data and transmit an output signal Q in accordance with the result of the comparison. The line memory d (represented by reference numeral 99) is a line memory capable of storing this output signal Q and having a line memory of the same level as that for the line memories a, b, and c. The clock used for writing and reading this line memory d (represented by reference numeral 99) is arranged to be the cock LCLK.

Figure 27:
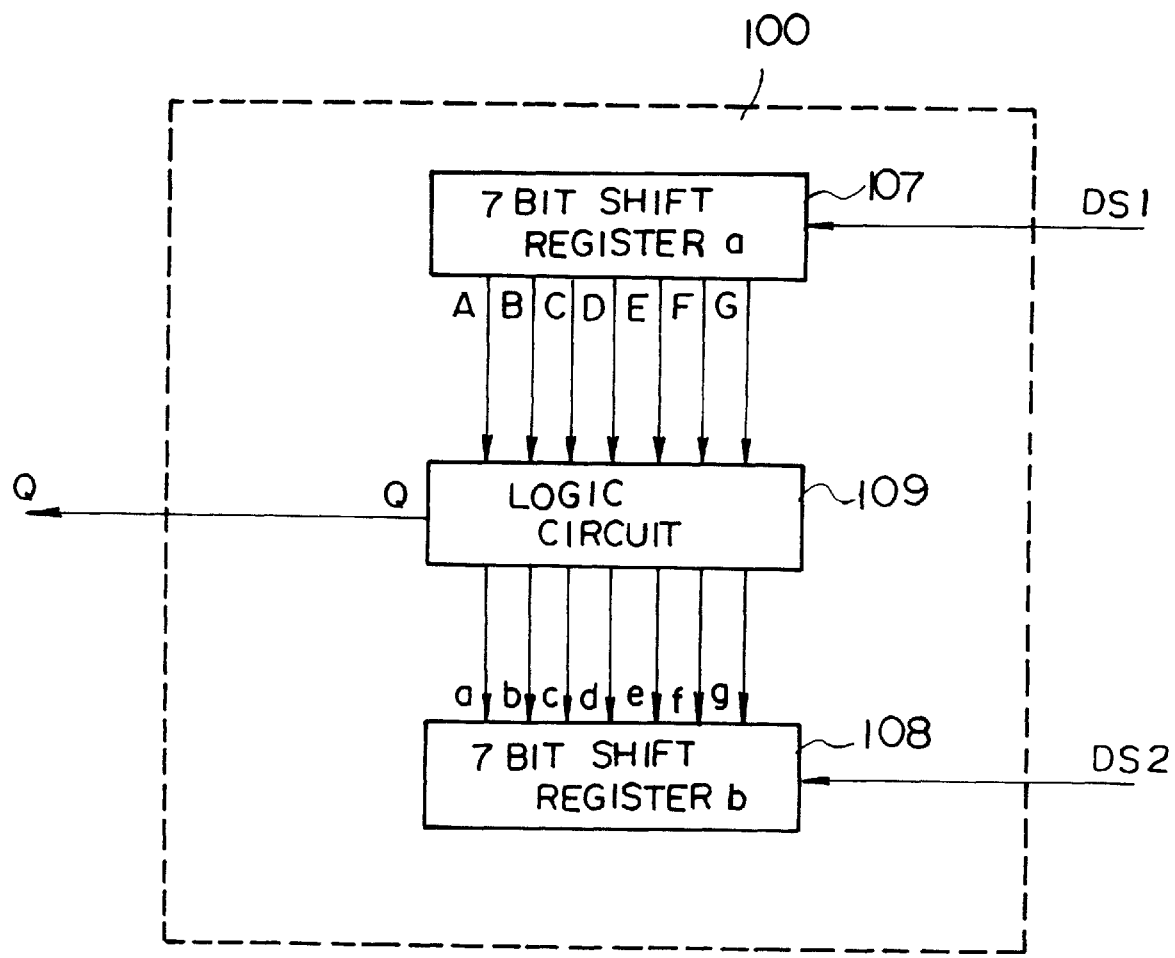
FIG. 27 is a detailed view which illustrates the comparison discriminating circuit 100 in the circuit shown in FIG. 26 and illustrates the image processing circuit according to the basic embodiment.
Figure 28:
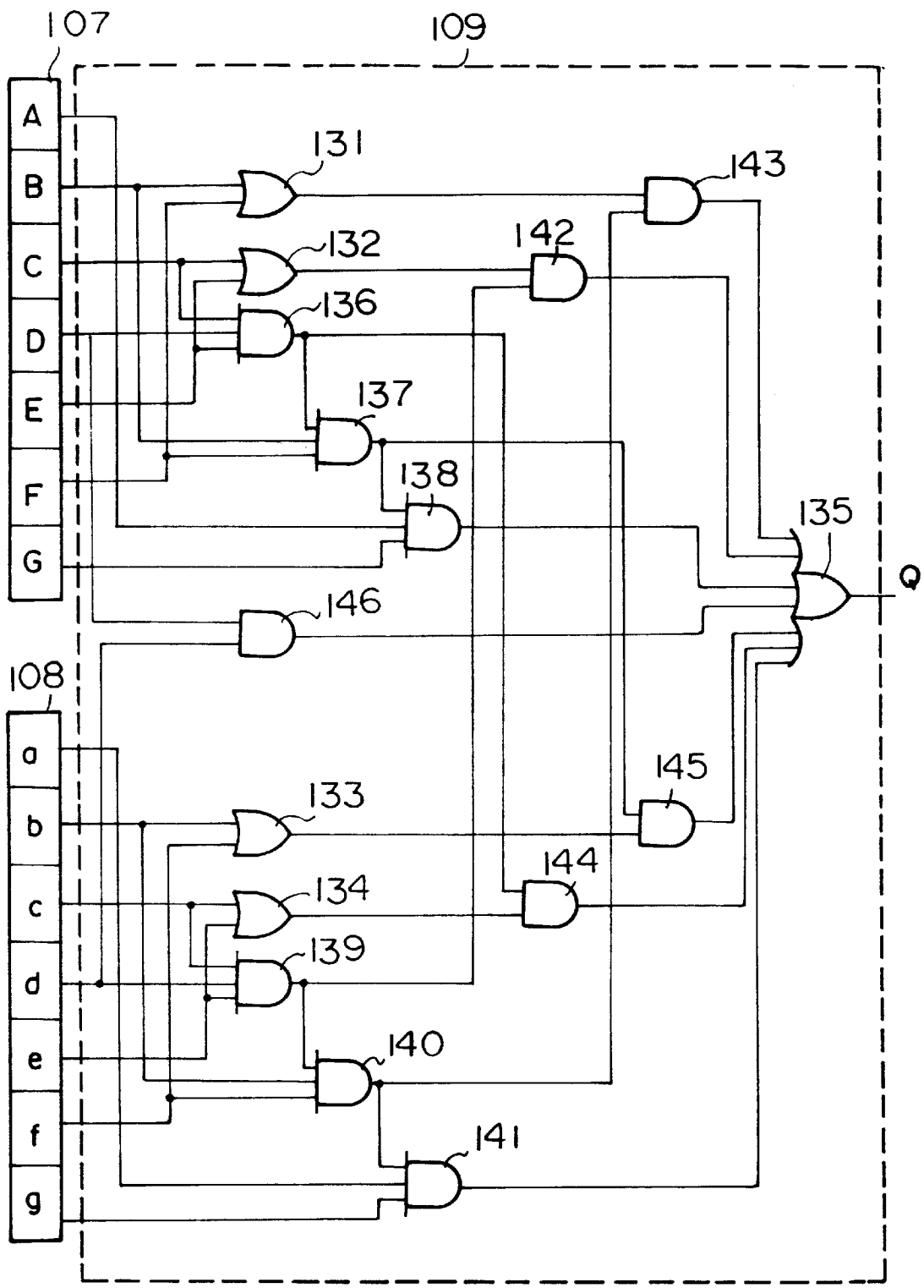
FIG. 28 is a view which illustrates an example of the logical circuit 109 shown in FIG. 27.

The comparison discriminating circuit 100 is structured as show in FIG. 27. Referring to this drawing, the input signals DS1 and DS2 from the data selectors 104 and 105 are input to the shift register a (represented by reference numeral 107) and b (represented by reference numeral 108) of 7 bits, respectively. The shift outputs A, B, C, D, E, F, G and a, b, c, d, e, f, g from each of the shift registers are input to the logical circuit 109. The logical circuit 109 is structured as shown in FIG. 28 and the output signal Q is determined in accordance with the logical expression (1). Referring to FIG. 28, reference numerals 131 to 135 represent OR circuits, and 136 to 146 represent AND circuits. With this logical circuit shown in FIG. 28, the logic of output Q shown in FIG. 29 and expressed in the logic expression (1) is executed. The signal Q obtained from this logical expression is stored in the line memory d (represented by reference numeral 99).

The interpolation data Q written in the line memory d is read as a signal D4 under control of the control circuit 93. The data selector 106 is connected to the outputs of the line memories a, b, c, and d and it selects the line memory output from any of the line memories a, b, c, and d so as to transmit the selected output as the laser driving signal LD. Furthermore, three series outputs in the sub-scanning direction are selected from the outputs D1 to D4 of the line memories a, b, c, and d as the DD1 to DD3 so as to transmit them to a circuit 107 for determining the laser quantity to be described later.

Figure 30:
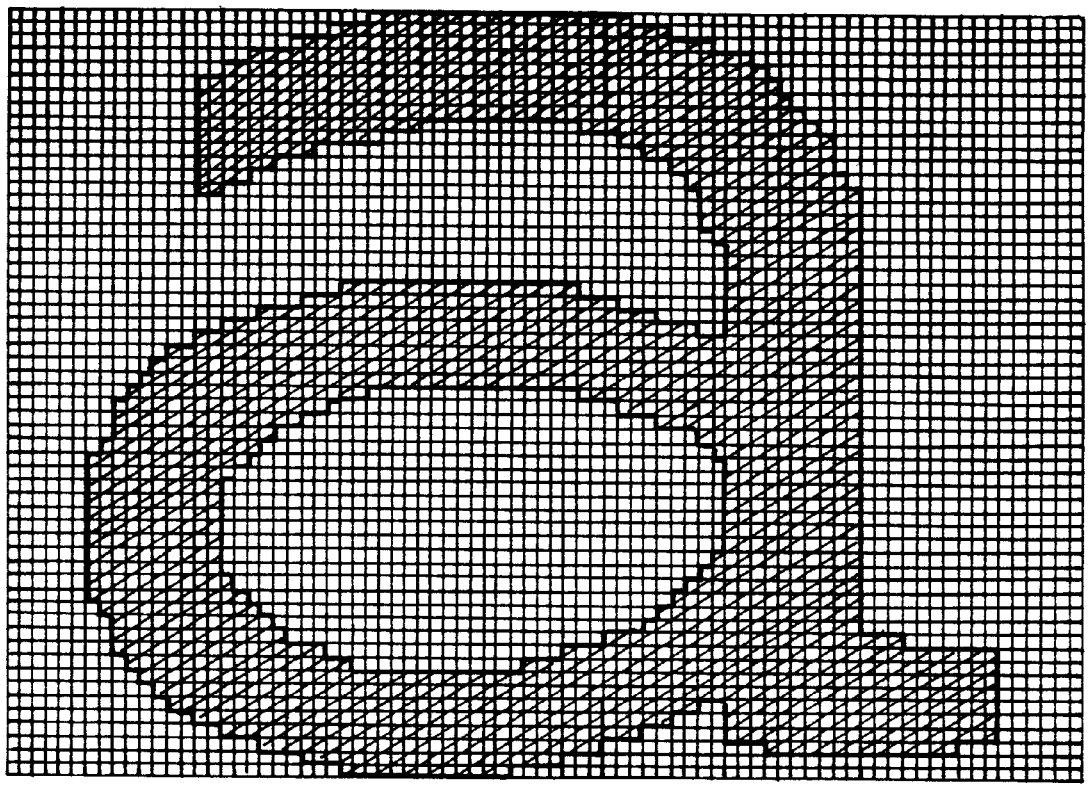
FIG. 30 is a view which illustrates output dot image obtained by using the logical circuit 109 shown in FIG. 28.

The dot image formed by means of the laser driving signal LD becomes as illustrated in FIG. 30. This dot image shown in FIG. 30 is the same as that shown in FIG. 24B.

Figure 31:
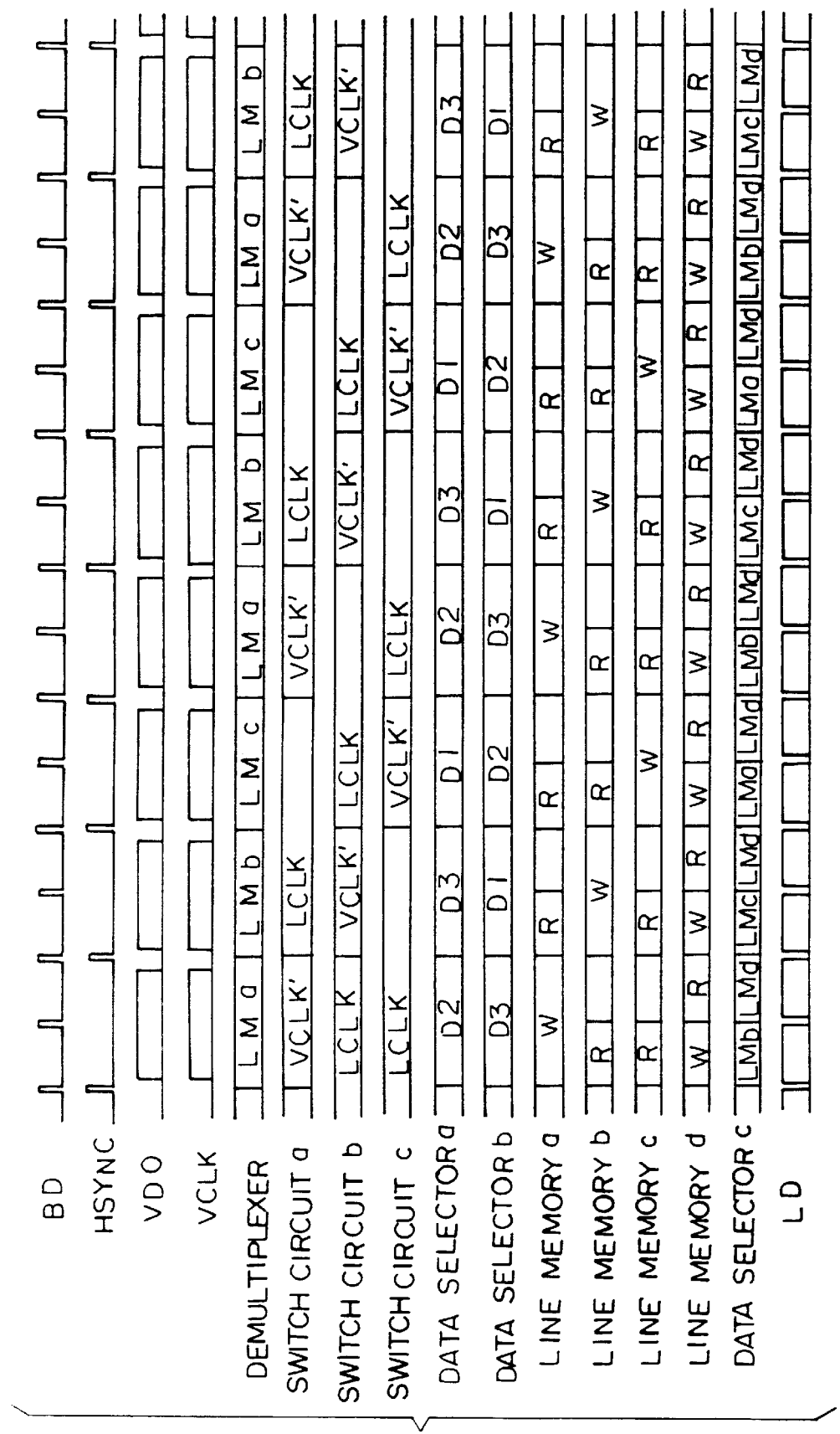
FIG. 31 is a view which illustrates a timing chart of a circuit shown in FIG. 26.

The timing chart of the operation in the circuit shown in FIG. 26 is shown in FIG. 31.

A Modified Example of a Circuit for Interpolation/Smoothing

Figure 32:
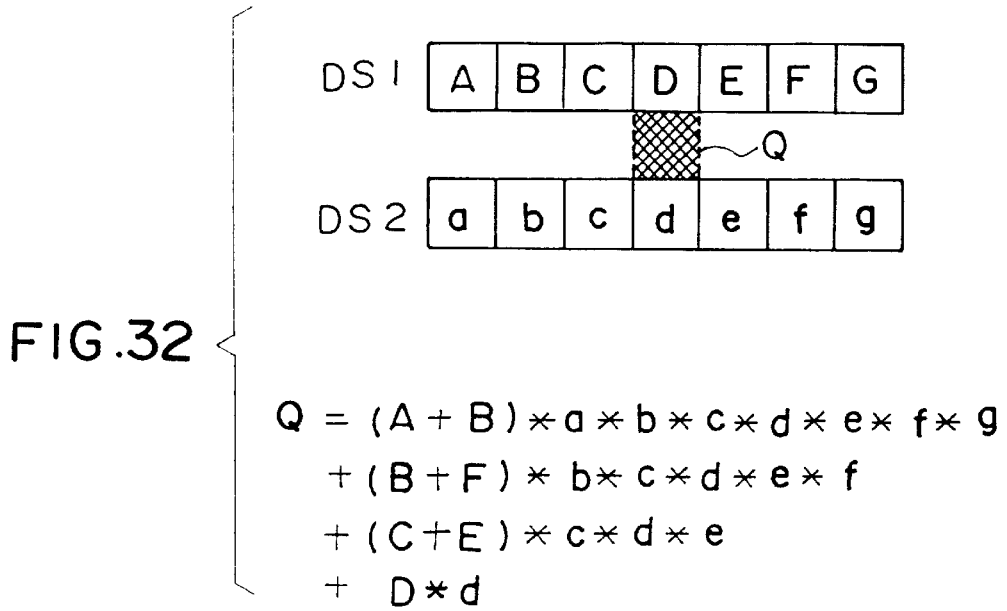
FIG. 32 is a view which illustrates the logical expression in an interpolating processing to be executed in the circuit shown in FIG. 26.
Figure 33:
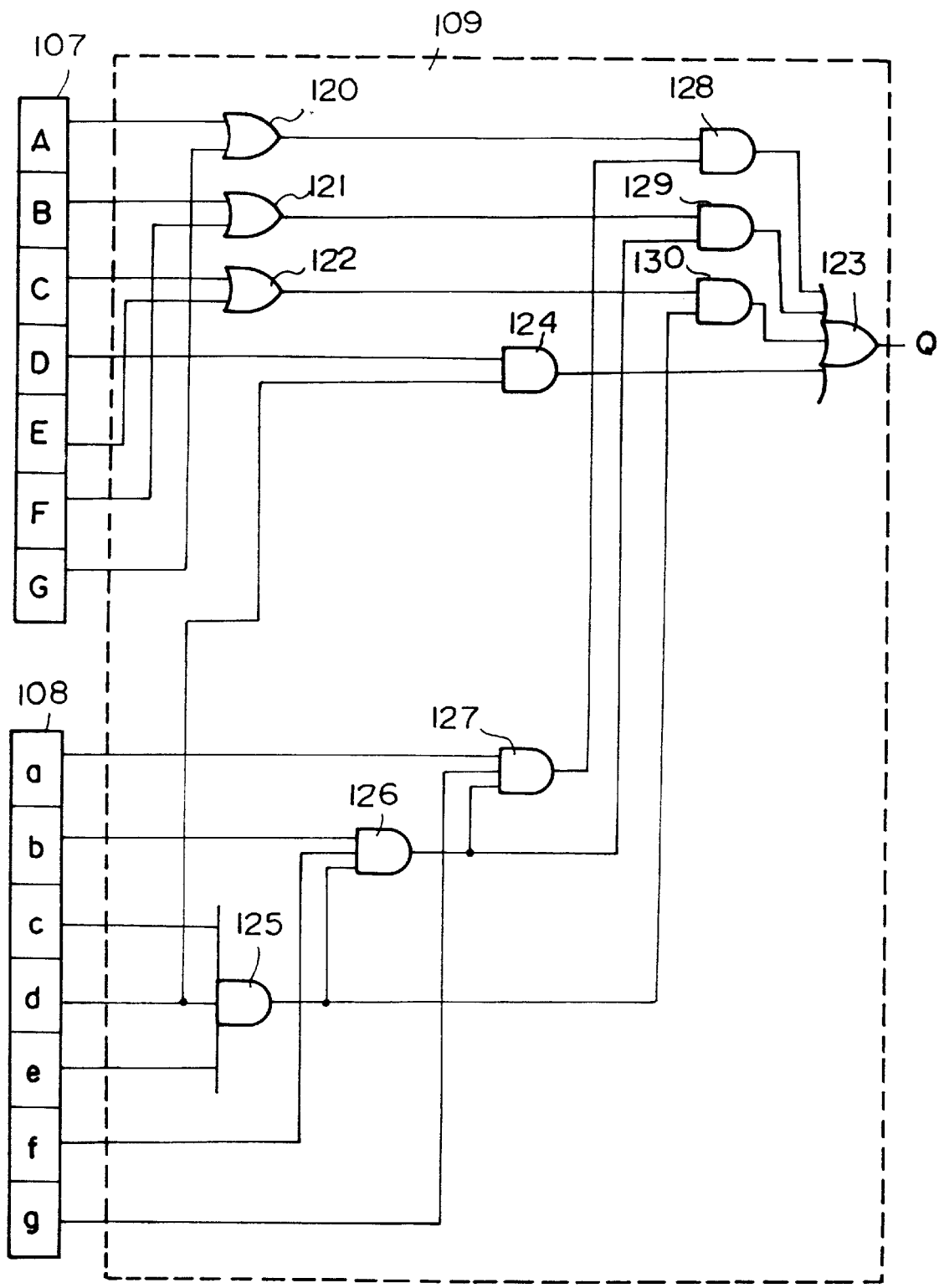
FIG. 33 is a detailed view which illustrates another example of the logical circuit 109.

FIG. 33 is a view which illustrates the logical circuit 109 on the basis of another logic from Expression (1) in the form of a circuit with which this logic is achieved. The logical expression on which the circuit shown in FIG. 33 is based is shown in FIG. 32. The dot image formed by means of the laser drive signal LD becomes as shown in FIG. 34.

Figure 10:
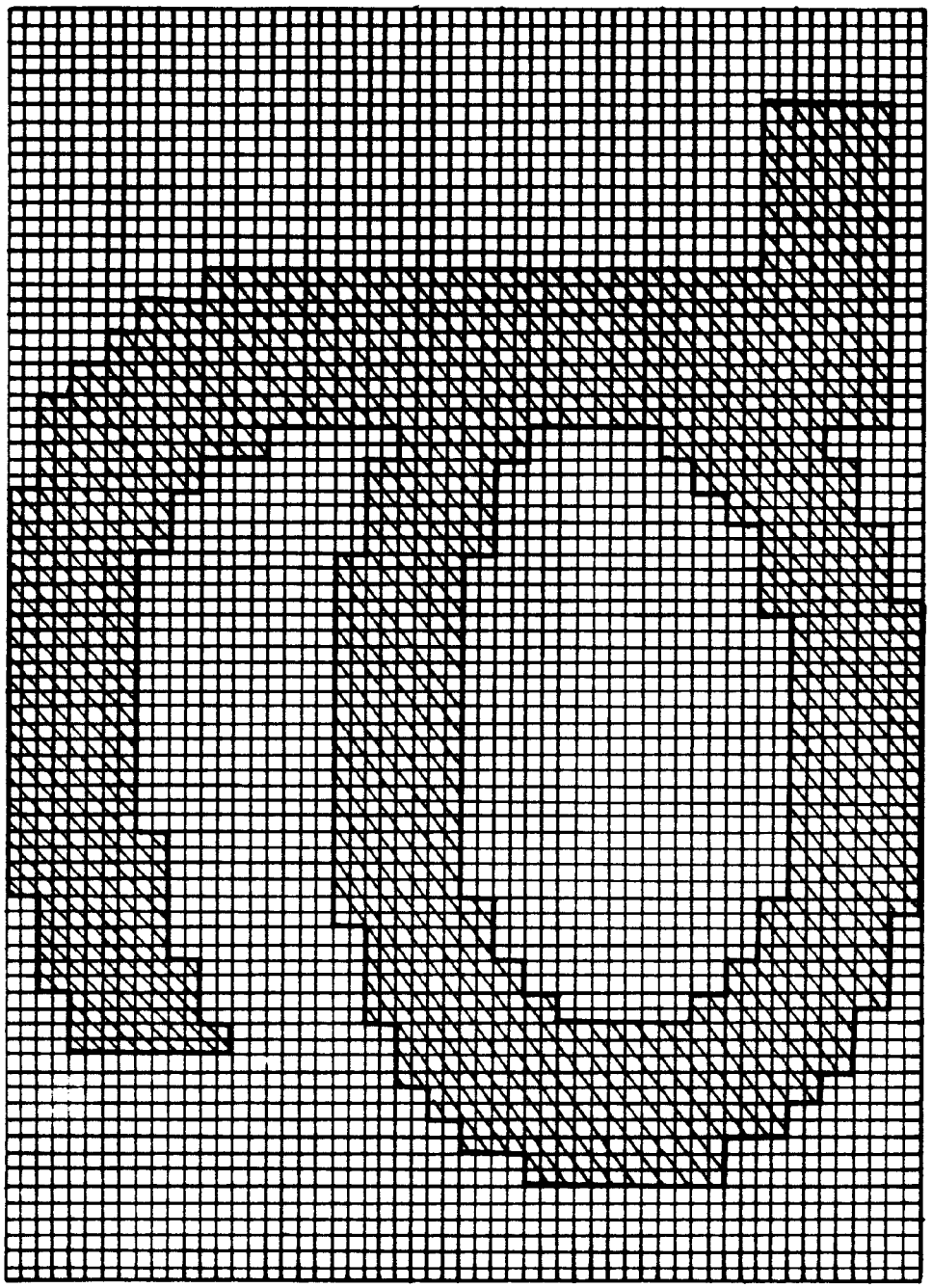
FIG. 10 is a view which illustrates an example of an image transmitting at 600 dpi.
Figure 11:
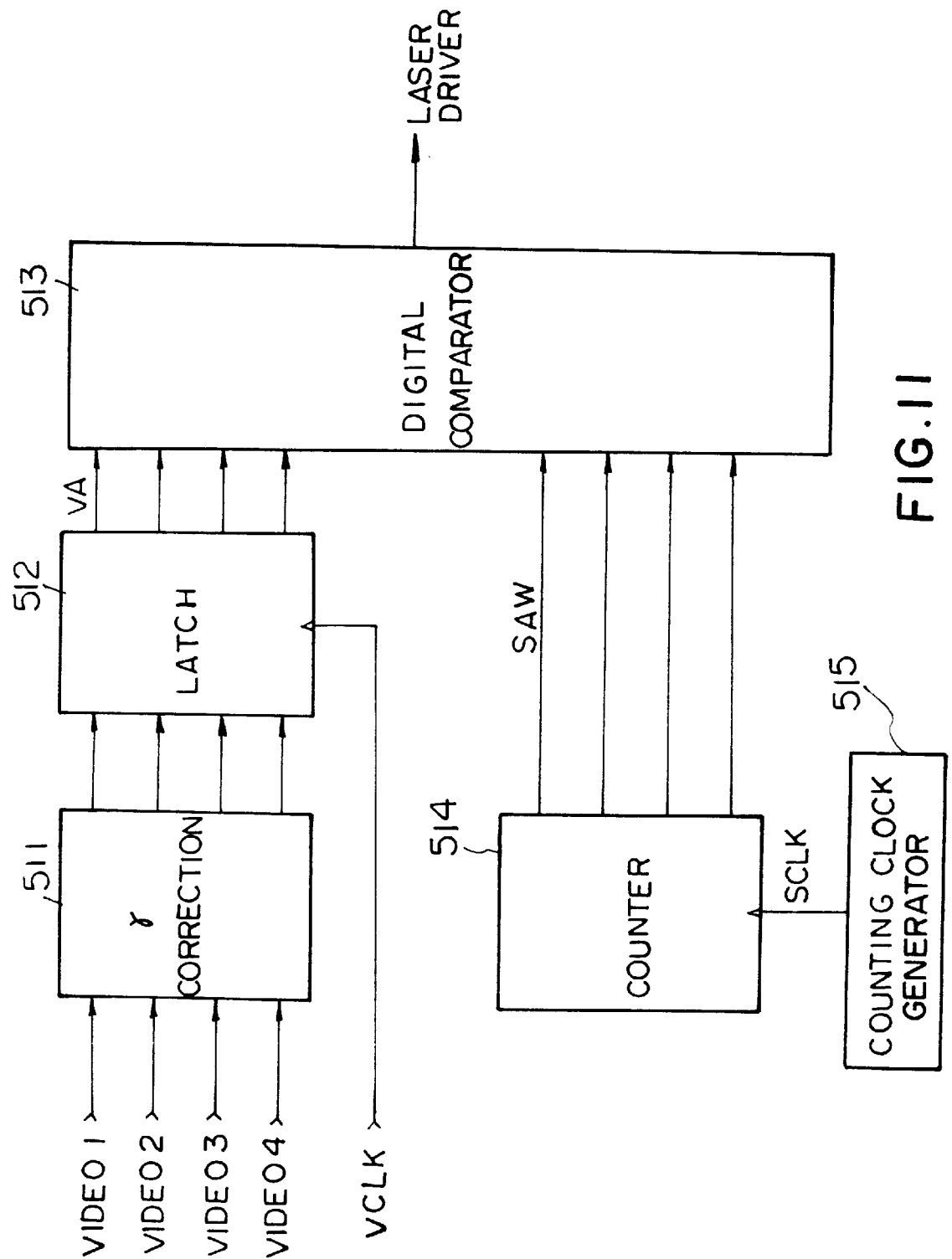
FIG. 11 is a block diagram which illustrates an image processing portion of a conventional image processing apparatus.
Figure 34:
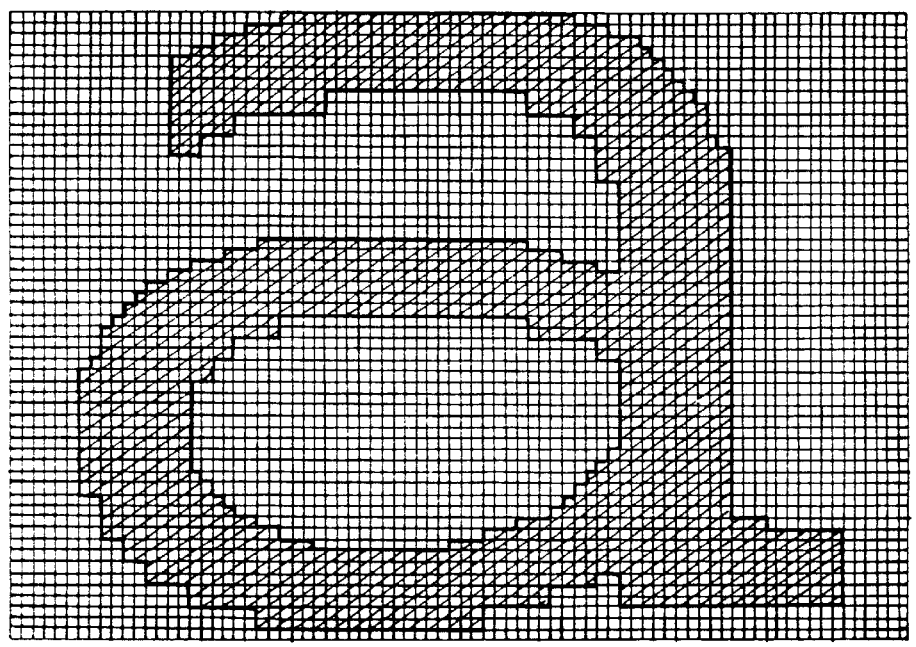
FIG. 34 is a view which illustrates an output dot image obtained by using the circuit shown in FIG. 33.

As is shown in FIGS. 30 and 34, the inclined portions of the character "a" are improved in comparison with that shown in FIG. 10 in which no smoothing processing is conducted but a simple doubling is conducted and thereby the interpolated data of 600 dots/inch is obtained.

Figure 29:
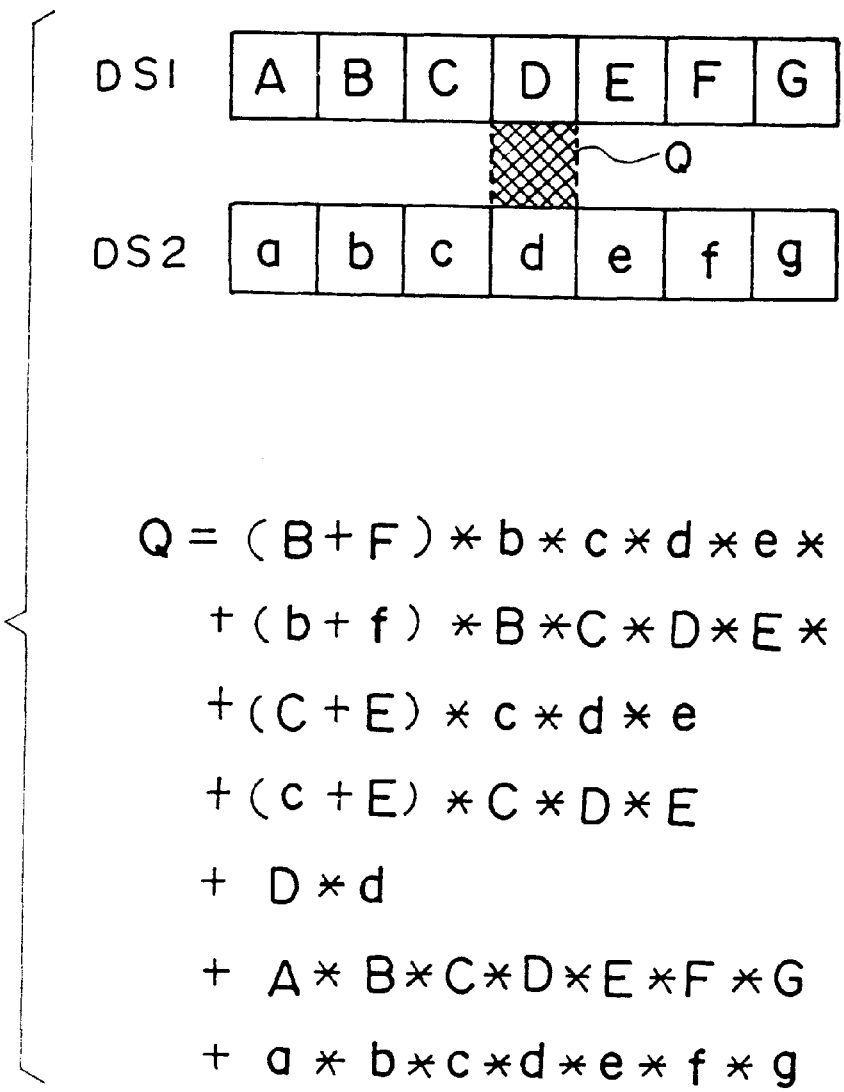
FIG. 29 is a view which illustrates a logical expression of the circuit shown in FIG. 28.
Figure 35:
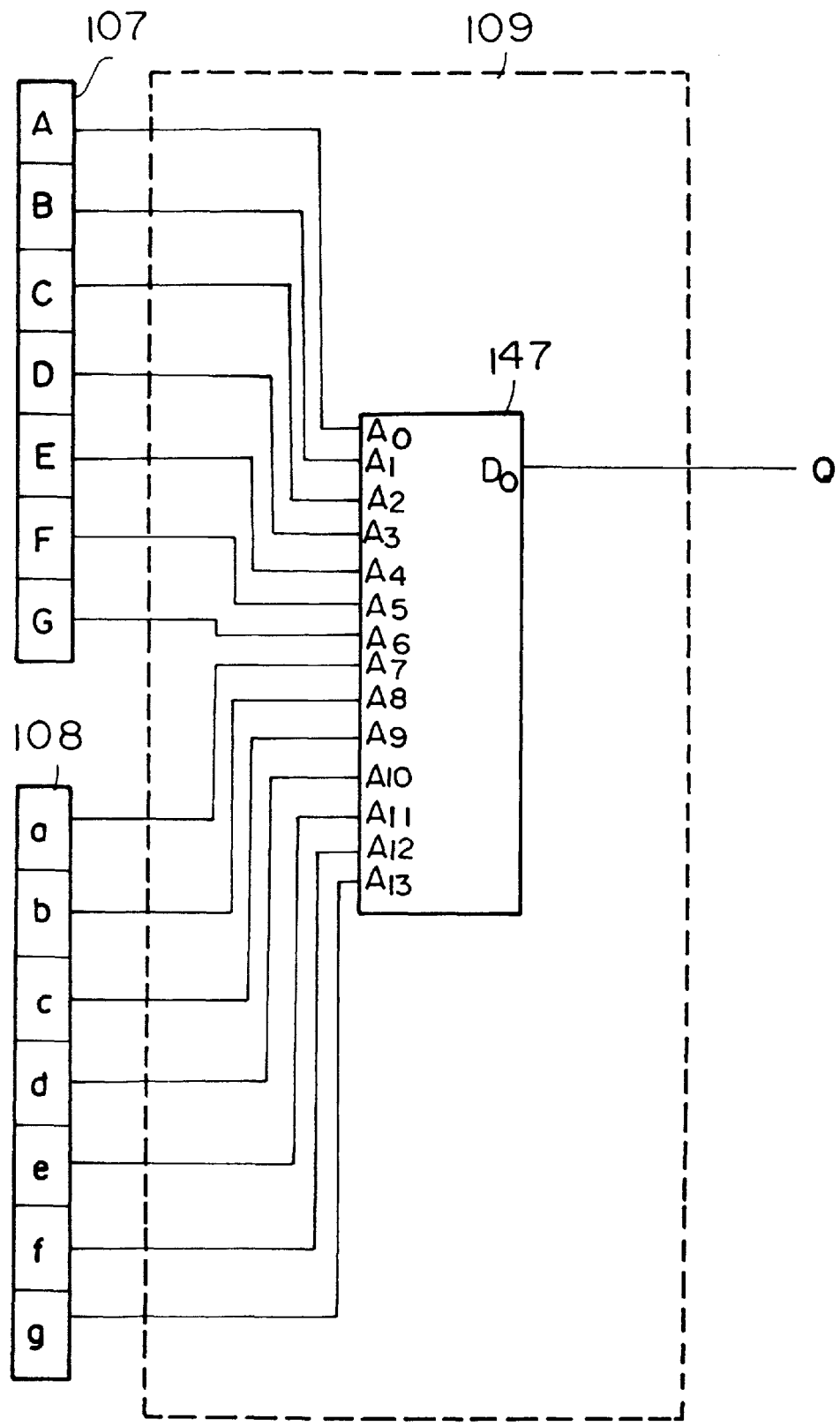
FIG. 35 is a view which illustrates an example in which the logical circuit shown in FIG. 28 is formed by PROMs.

FIG. 35 is view which illustrates an example in which a memory PROM 147 is used as the circuit having the same function as that shown in FIG. 28, in which the input signals A to G and a to g are connected to $A_0$ to $A_{13}$ as the address signals for the PROM47, while the output Q is obtained from a data terminal $D_0$. It may be arranged such that data in accordance with the logical expression shown in FIG. 29 is previously written in the PROM 47.

Detailed Description of Solid Black Correction and Intersection Correction

Then, the laser quantity determining circuit 107 will be described. The laser quantity determining circuit 107 is able to realize the function of the solid black correction circuit 70 and the intersection correction circuit 71 shown in FIG. 26.

As described above, the data selector 106 selects three series outputs from the outputs D1 to D4 from the line memories a, b, c, and d as the DD1 to DD3. The data DD2 which is to be printed now and the data DD1 and DD3 disposed before and after DD2 are input so as to be transmitted to the laser quantity determining circuit 107.

The determining circuit 107 is structured similarly to the above-described comparison determining circuit 100. That is, it has three shift registers of 3 bits to which DD1 to DD3 are input. A predetermined logical circuit (omitted from illustration) performs the determination described with reference to FIGS. 25B and 25C so that a signal for selecting the laser quantity is transmitted. As a result, the laser driving current is controlled so as to switch the laser quantity to any of the above-described levels: large ($P_L$), intermediate ($P_M$), and small ($P_S$) levels.

Figure 36:
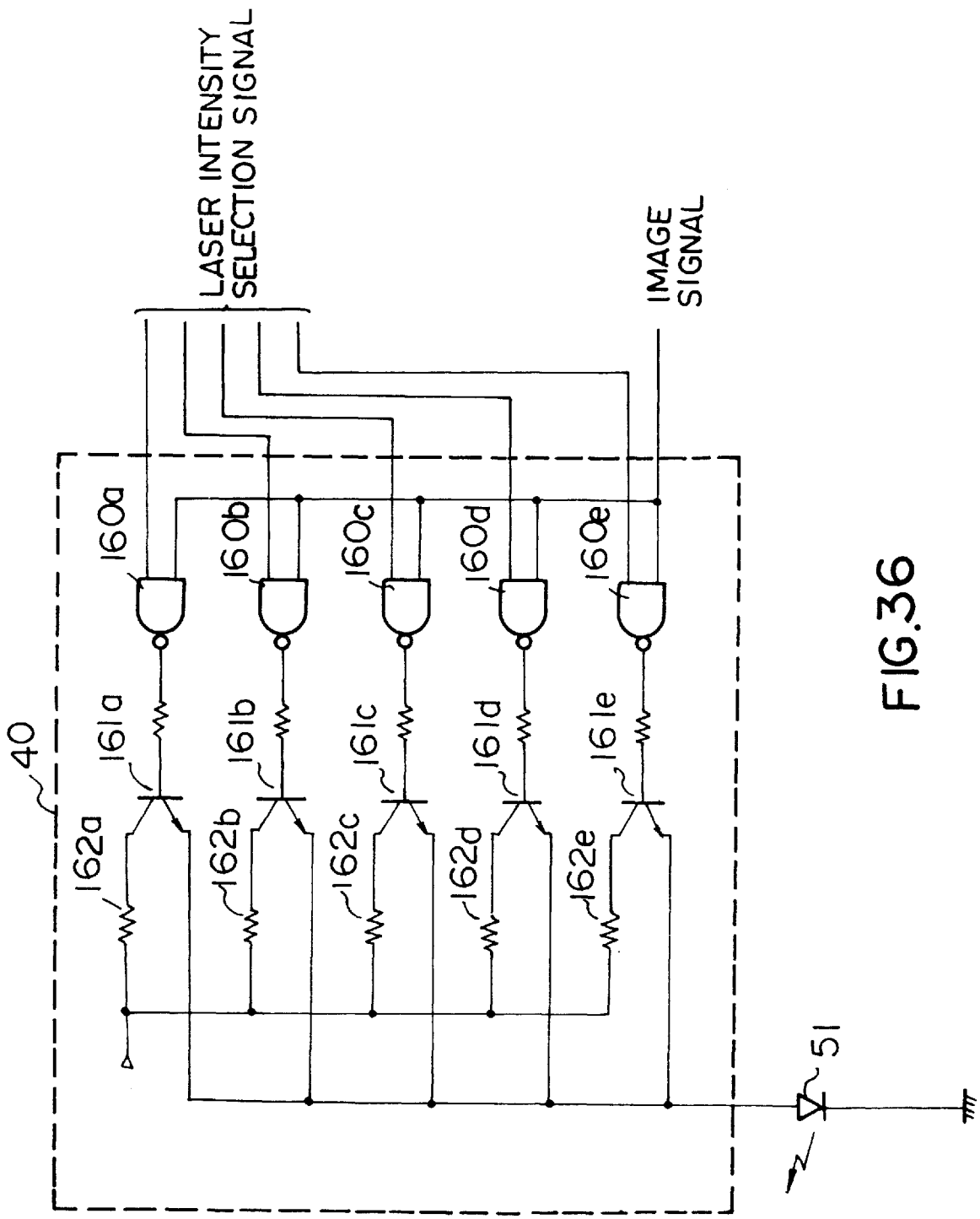
FIG. 36 is a detailed circuit used in a laser driver 40.

FIG. 36 is a view which illustrates the structure of the circuit for the laser driver 40, where reference numerals 160a to 160e represent NAND gates, 161a to 161e represent transistors, and 162a to 162e represent resistors for determining the laser driving current. When any of the laser quantity selection signal connected to one of the input terminal of each of the NAND gates is selected, the corresponding transistor is actuated so that the laser 51 emits laser beam at a predetermined laser driving current.

The comparison determining circuit 100 and the laser quantity determining circuit 107 may be modified as follows: a plurality of logical expressions for the comparison determining circuit 100 and the laser quantity determining circuit 107 are respectively prepared so as to be selected. For example, a structure may be employed which is arranged such that a plurality of sets of data corresponding to each of the logical expressions are stored in the PROM 147 shown in FIG. 35 so that any of the plurality of the logical expressions is selected by a conventional means such as switching the bank. This selection may conducted in accordance with the type of the image data to be printed by way of automatically switching the logical expression to correspond to the cases such as a case in which the data includes "kanji" having a relatively large proportion of the straight portions, a case in which alphabetical character data in which a relatively large curved portions are included, a case in which the data includes graphics such as a triangle or a circle, and a case in which the data includes gradation expression such as photograph or the like formed by means of binary data which has been dither-processed. Alternatively, a logical expression may be determined in accordance with an instruction from the printer controller with the above-described serial command. Furthermore, a stricture may be employed in which the smoothing processing is skipped by a command, the solid black correction processing is skipped, the solid black correction processing is skipped, or the intersection correction processing is skipped.

Switching of Signal Pass

The switching of data pass by means of a variety of switch circuits 72 and 73 shown in FIG. 20 will be described. These switch circuits are controlled also by a command from an external controller 152. Referring to FIGS. 20A and 20B, #1 to #8 represent commands transmitted rom the controller 152 to the engine 151 via the SC line, the commands further including the following commands:

1: instruction of binary component separation processing

2: instruction of smoothing processing of gradation

3: assignment of the compensation of the density characteristics

4: assignment of screen angle

5: instruction of selection of PWM processing/dither processing

6: instruction of smoothing processing

7: instruction of solid black correction

8: instruction of intersection correction

9: switching of pass for the binary data VDO 36'

10: switching of the characteristics of the smoothing processing

11: instruction of binary data interpolation

These commands effects the circuit portions shown in FIG. 20 as the instructions from the controller. For example, if it is the #1: instruction from the binary component separation processing, it is instructed in the binary component separation circuit 76 whether or not the binary component is separated.

When the switch circuits 72 and 73 are switched by a switching command transmitted from the printer controller 152 so as to introduce the VDO signal 36' to the OR circuit 39, the VDO signal 36' is directly introduced to the laser driver 40. In this case, the printer controller 152 transmits a binary signal for 600 dots/inch as the VDO signal. In this case, the printer controller does not necessarily transmit the clock signal VCLK 31'.

Although the binary data interpolating circuit 67 is arranged to conduct the data interpolating processing as the default state, it may select a state in which the data interpolation is not conducted in accordance with the command (#11) from the printer controller. In this case, the printer controller transmits, as the VDO signal 36, a signal for 600 dots/inch. In this case, the printer controller needs to transmit the clock signal VCLK 31' at a frequency which corresponds to 600 dots/inch.

When the multi-data print board 61 is not connected to the connector 64, the image signals to be input to the OR circuits 66 and 39 are automatically set to a state "No printing" as a result of the action of each of the inverters 66' and 39' and the action of the resistor R which has been pulled up to +5 V.

(Detailed Description of the Multi-data Print Board)

The outline of the multi-data print board has been described. Then, each of the circuits in this board will be described in detail. These circuits are arranged to be first operated when they are connected to the binary data print board 60 according to this embodiment and further the printer controller are connected thereto via the connector 63.

Multi-data Interpolating Circuit

The multi-level data interpolating circuit 80 is a circuit capable of inputting 8 bits multi-level data for 300 dots/inch transmitted from the binary component separation circuit 76 so as to data-interpolate it into 8 bits multi-level data for the printing density of 600 dots/inch. This circuit 80 applies the gradation smoothing processing to the interpolated data simultaneously with the data interpolating processing.

FIG. 39 is a view which theoretically illustrates the interpolation of multi-level data to be conducted in the multi-level data interpolating circuit 80, the interpolation being accompanied with the gradation smoothing processing. FIG. 39A is a view which illustrates the multi-level data column of the pixel density of 300 dots/inch in such a manner that the x-axis stands for the main scanning direction and y-axis stands for the sub-scanning direction. FIG. 39B is a view which illustrates the multi-level data when image data of 600 dots/inch is obtained by multi-level data interpolating image data of 300 dots/inch.

Figure 39A:
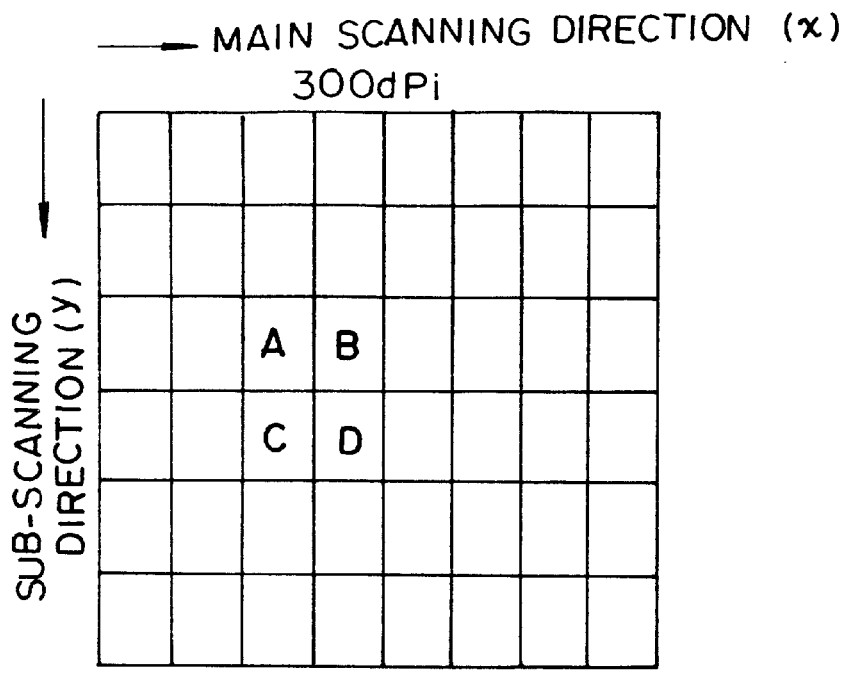
FIGS. 39A to 39D are views which illustrate the operation of a multi-level data interpolating circuit.
Figure 39B:
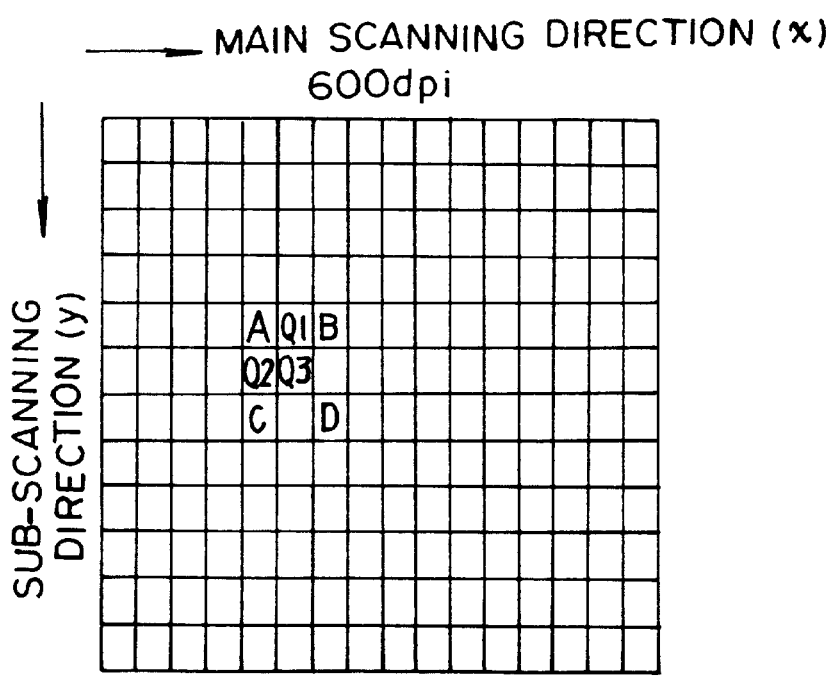

When multi-level data column of 600 dots/inch is obtained on the basis of each of values "00"$_H$ to "FF"$_H$ of the pixels A, B, C, D shown in FIG. 39A, the interpolating processing to be applied to the interpolated pixels Q%$_1$, Q$_2$, and Q$_3$ is conducted as follows:

According to this embodiment, the interpolation logical expression is defined as follows:

$$Q_1=(A+B)/2$$
$$Q_2=(A+C)/2$$
$$Q_3=(A+B+C+D)/4 \tag{5}$$

Figure 39C:
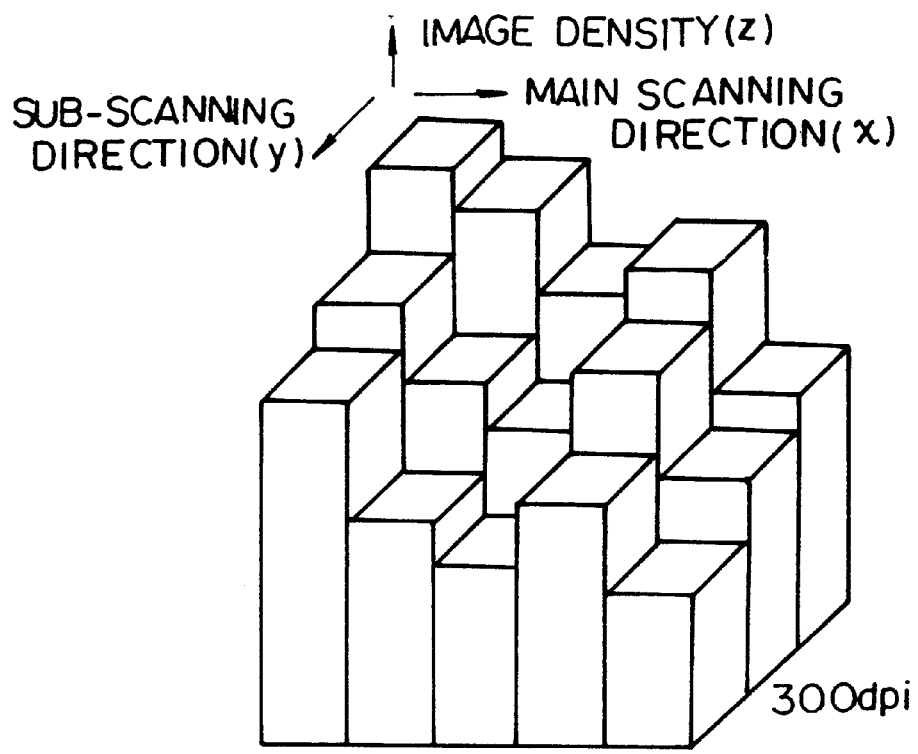
Figure 39D:
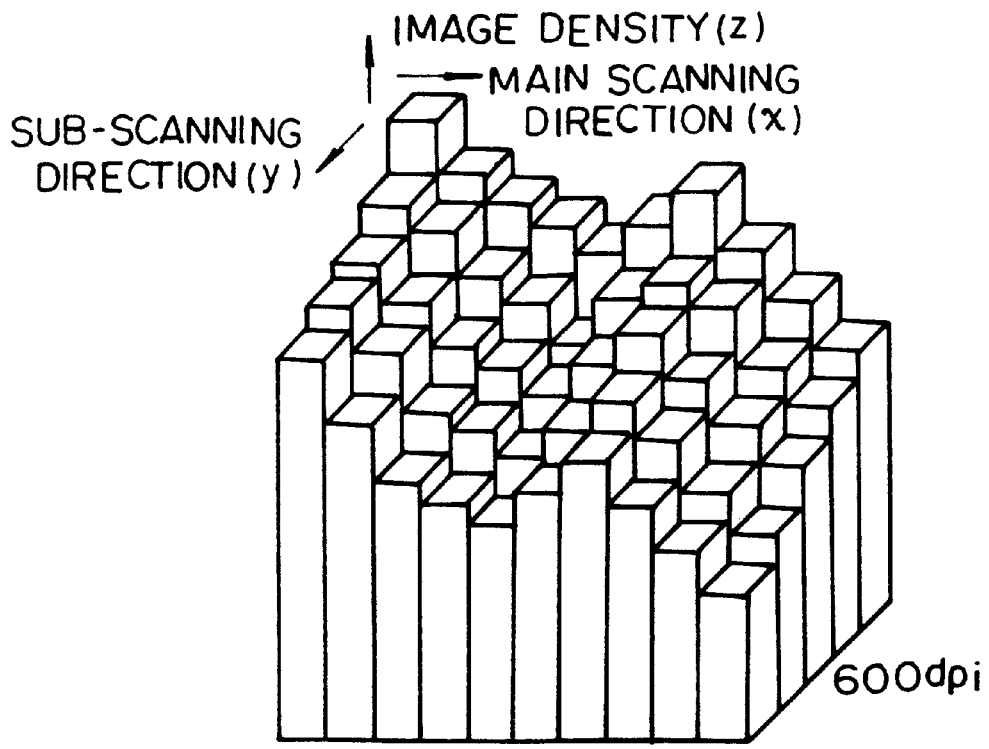

When the data interpolating processing is conducted in accordance with logical expression (5), the multi-level data column of 300 dots/inch shown in FIG. 39C is interpolated into the multi-level data column of 600 dots/inch shown in FIG. 39D. As is shown from this drawing, data interpolated by logical expression (5) is interpolated as the average value of the surrounding pixels so that not only the density of the pixel is raised but also multi-level data for an image whose gradation is smoothed can be obtained. As a result of this processing, a higher grade reproduced image can be obtained with respect to the image reproduced by means of a simple interpolation.

A specific example of the multi-level interpolating circuit 80 will be described in detail with reference to FIG. 40.

Figure 40:
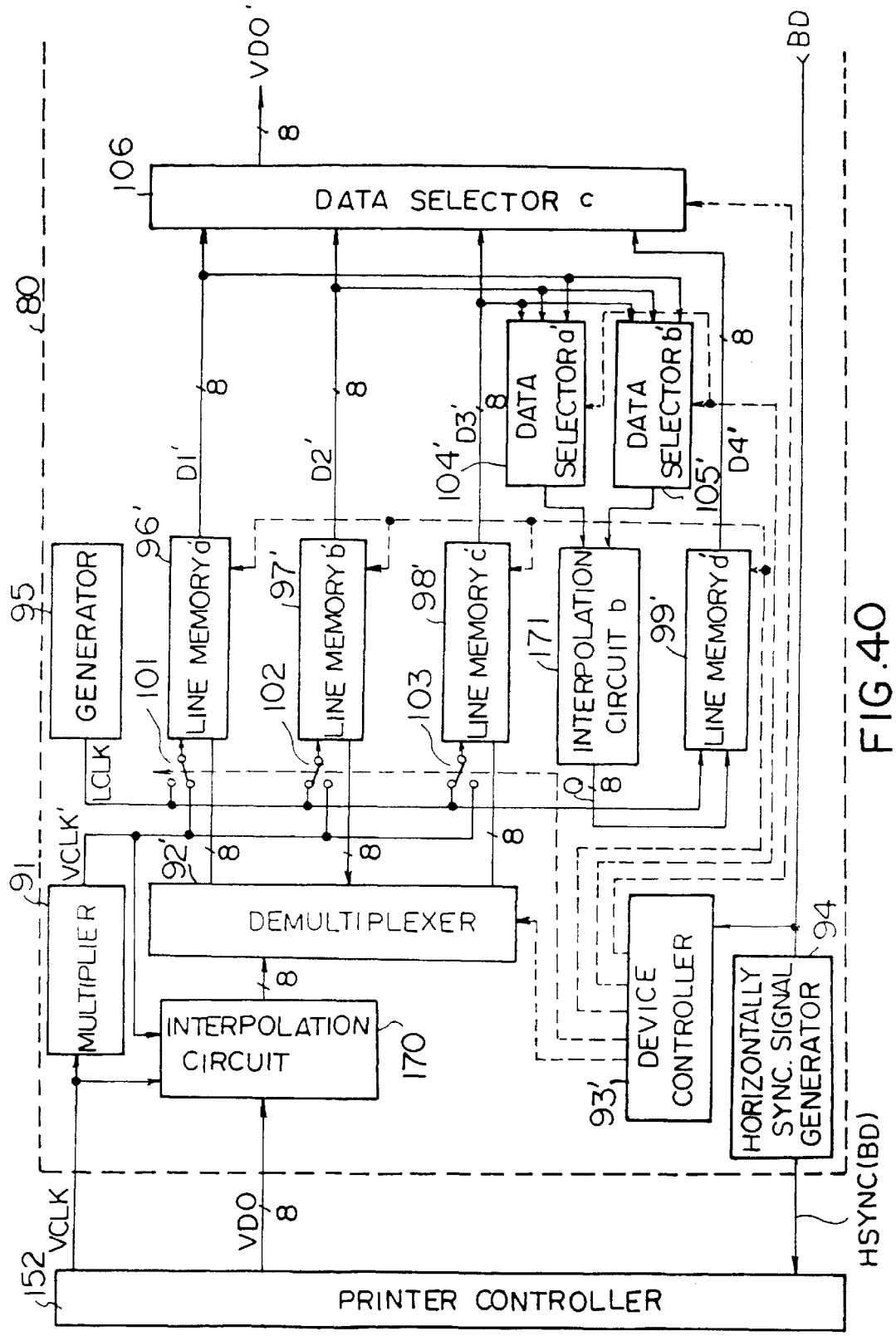
FIG. 40 is a view which illustrates the multi-level interpolating circuit.

Referring to FIG. 40, the binary component separation circuit 76 shown in FIG. 20A is omitted in order to have the specific structure and the operation of the data interpolating circuit 80 understood easily. The same components having the same functions as those shown in FIG. 26 are given the same reference numerals.

Referring to FIG. 40, the printer controller 152 transmits 300 dpi, 256 gradations image signal VDO (according to this embodiment, it comprises 8 bits VD00 to VD07) and the image clock VCLK to the printer engine 151 in response to the horizontal synchronization signal HSYNC transmitted from the horizontal synchronization generating circuit 94. The printer engine 151 forms an image signal VDO for 600 dpi and 256 gradation from this 300 dpi, 256 gradations image signal VDO and the image clock VCLK in the multi-level data interpolating circuit 80 so that it is printed in the printer (see FIG. 2) capable of transmitting a 600 dpi, 256 gradations image.

The frequency multiplexing circuit 91 multiplexes the frequency of the image clock VCLK so as to output the clock VCLK' whose frequency is obtained by doubling the frequency of the image clock VCLK. The oscillating circuit 95 generates the clock VCLK whose frequency is a quadruple of that of the above-described image clock VCL. Either the above-described clock VCLK' or LCLK is alternated in the switch circuits a (101), b (102), and c (103) so as to supplied as the writing clock or the reading clock for the line memories a' to c'. According to this embodiment, the line memories a' to c' having a depth of 8 bits.

As for the interpolations in the main scanning direction and in the sub-scanning direction described with reference to FIG. 39, the interpolation in the main scanning direction is conducted by an interpolating circuit 170 in the interpolating circuit 80 while the interpolation in the sub-scanning direction is conducted by an interpolating circuit 171.

The interpolating circuit a (represented by reference numeral 170) is a circuit capable of obtaining a density of 600 dpi by way of conversion by inserting interpolated data between data for 300 dpi. The de-multiplexer 92' shown in FIG. 40 has a function of alternating the signal interpolated by the interpolating circuit 170 and supplying it to the line memories a', b', and c'. The synchronization signal generating circuit 94 counts the beam detect signal (the BD signal) so as to transmit one horizontal synchronization signal HSYNC whenever the two BD signals are input thereto.

The image signal VDO is, in accordance with the clock VCLK', written in any line memory of the line memories a' to c' by means of the de-multiplexer 92', switch circuit a (represented by reference numeral 101), switch circuit b (represented by reference numeral 102), switch circuit c (represented by reference numeral 103), and the device control circuit 93 capable of the above-described circuits for each line in response to the BD signal. Simultaneously, the image signal is read from the other two line memories in accordance with the clock LCLK. These operations are arranged to be successively conducted so that, when writing in the line memory a (represented by reference numeral 96') is conducted, the line memories b' (represented by reference numeral 97') and c' (represented by reference numeral 98') perform the reading actions, and at the next timing, the line memory b' performs the writing actions, while the line memories c' and a' perform the reading actions. At the next timing, the line memory c' performs the writing action, while the line memories a' and b' perform the reading actions. The above-described control processes are repeated. The writing and reading actions from the line memories a' to c' are the substantially the same as those in the case shown in FIG. 26.

Each of the line memories a', b', and c' has, similarly to the line memories a, b, c (see FIG. 26) has the memory capacity which is a double of the data for the density of 300 dpi in the main scanning direction, that is, the data memory capacity of 600 dpi in the main scanning direction.

The image signals to be read from the line memories a', b', and c' are arranged to be D1', D2', and D3', respectively.

Data selectors a' (represented by reference numeral 104') and b' (represented by reference numeral 105') respectively select two signals read from the read signal groups consisting of D1', D2', and D3' from the line memories a' to c' so as to transmit as DS1' and DS2'. For example, when the line memory a' is conducting the writing action and the line memories b' and c' are conducting the reading actions, the data selector a' selects the read data D2' from the line memory b' so as to transmit the signal DS1', while the data selector b' selects the read data D3 from the line memory c' so as to transmit the signal DS2'.

The interpolating circuit 171 inputs the DS1' and DS2' signals so as to compare and determine the data. As a result, the interpolation in the sub-scanning direction is conducted.

The result of this interpolation in the sub-scanning direction is stored in the line memory 99'. The memory capacity of this line memory 99' is arranged to be the same as that of the line memories a', b', and c'. The clock for writing and reading in this line memory d' is arranged to be LCLK.

The writing and reading from the line memories a' to c' and the line memory d', and selection of the data selectors a' and b' are controlled by the device control circuit 93'.

The data selector c' (represented by reference numeral 106) acts to transmit an 8 bits, 600 dpi interpolated image signal VDO' upon a selection of a signal from a group consisting of signals D1', D2', and D3' read from the line memories a', b', and c' and the signal D4' read from the line memory d'. This selection of the selectors is controlled by the device control circuit 93'.

Figure 41:
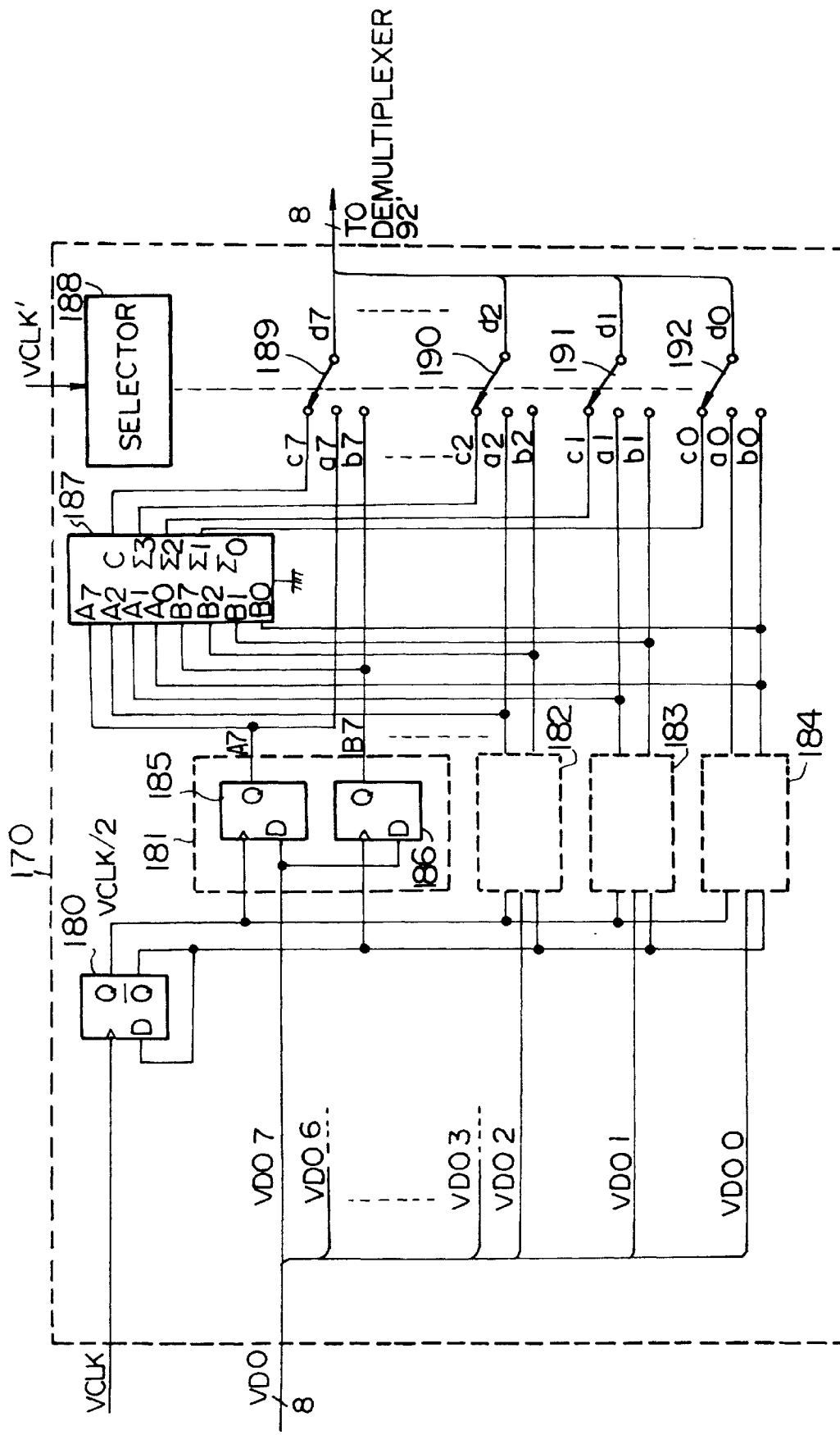
FIG. 41 is a detailed view which illustrates a interpolating circuit 170.

The interpolating circuit a (represented by reference numeral 170) capable of conducting the interpolation in the horizontal direction is structured as shown in FIG. 41. This interpolating circuit 170 comprises a clock multiplexing circuit 180, 2×8 latch circuits (represented by reference numeral 185 or the like) capable of latching the image signal whose one pixel is formed by 8 bits, and an adder 187 capable of conducting an interpolating calculation.

The most significant VD07 of the 8 bits image signal VDO transmitted from the external equipment (the printer controller) is latched alternately in the latches 185 and 186 with a clock VCLK/2 obtained by halving the image clock VCLk by a flip-flop circuit 180. A block 181 is a latch circuit including the latches 185 and 186, the blocks 182 to 184 being arranged to be the same structure. The other image signals VD06 to VD00 are similarly and alternately latched by two latches in the latch circuits 182 to 184. In order to simplify the drawing, the latch circuit and switch circuit for the image signals VD06 to VD00 are omitted, the switch circuit being to be described later. As a result, image data for two pixels are stored in 8 latch blocks (181 to 184) in the main scanning direction.

Each of the 8-bits data for the two pixels which has been latched as described above is added by the adder 187. As a result, the added value is halved so that the average value is calculated by taking the 8 bits (C, Σ7 to Σ1) of higher order from the 9 bits which contain the carry.

Figure 42A:
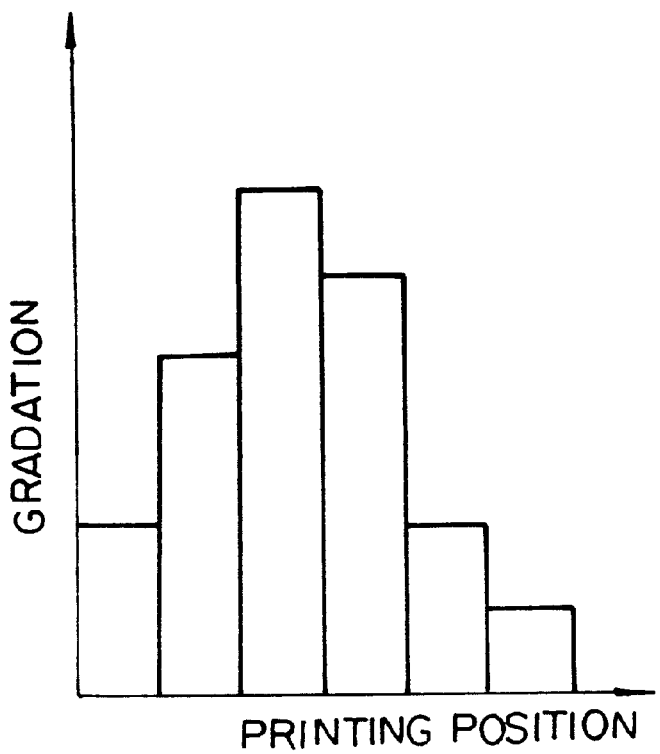
FIGS. 42A and 42B are views each of which illustrates the gradation data before the interpolation and the same after the interpolation.
Figure 42B:
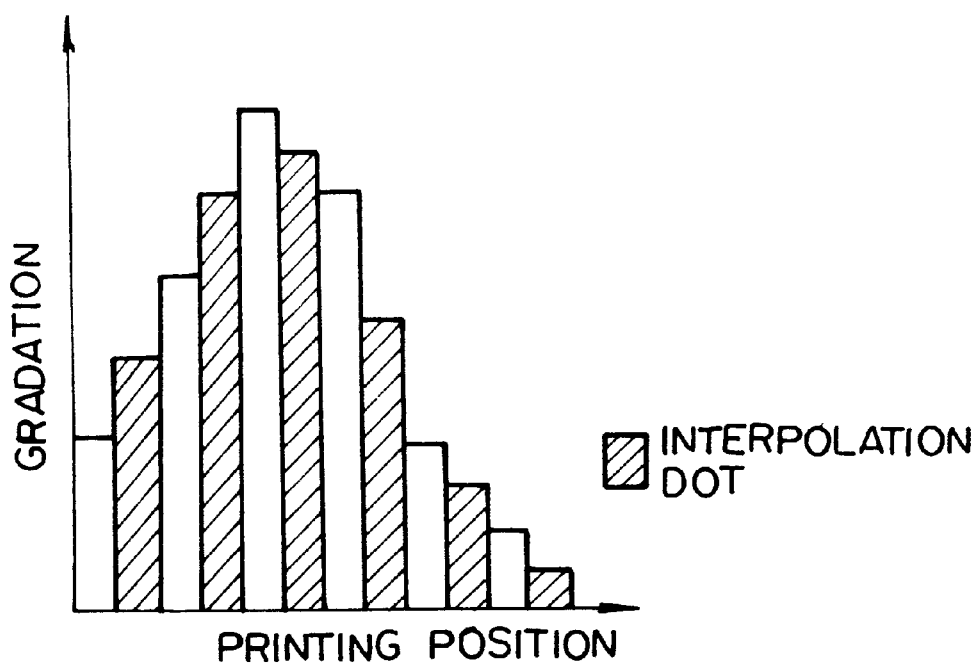

A select circuit 188 inserts the thus-calculated average value between the pixels in the main scanning direction for the VDO signal by switching and controlling the switch circuits 189 to 192. That is, each of these switches first selects a terminal a, a terminal C (the output of the adder with the next VCLK', and a terminal b is selected with the next VCLK'. As a result of this processing, the 300 dpi, 256 gradations data shown in FIG. 42A is made as that shown in FIG. 42B exhibiting a smooth gradation.

Figure 43:
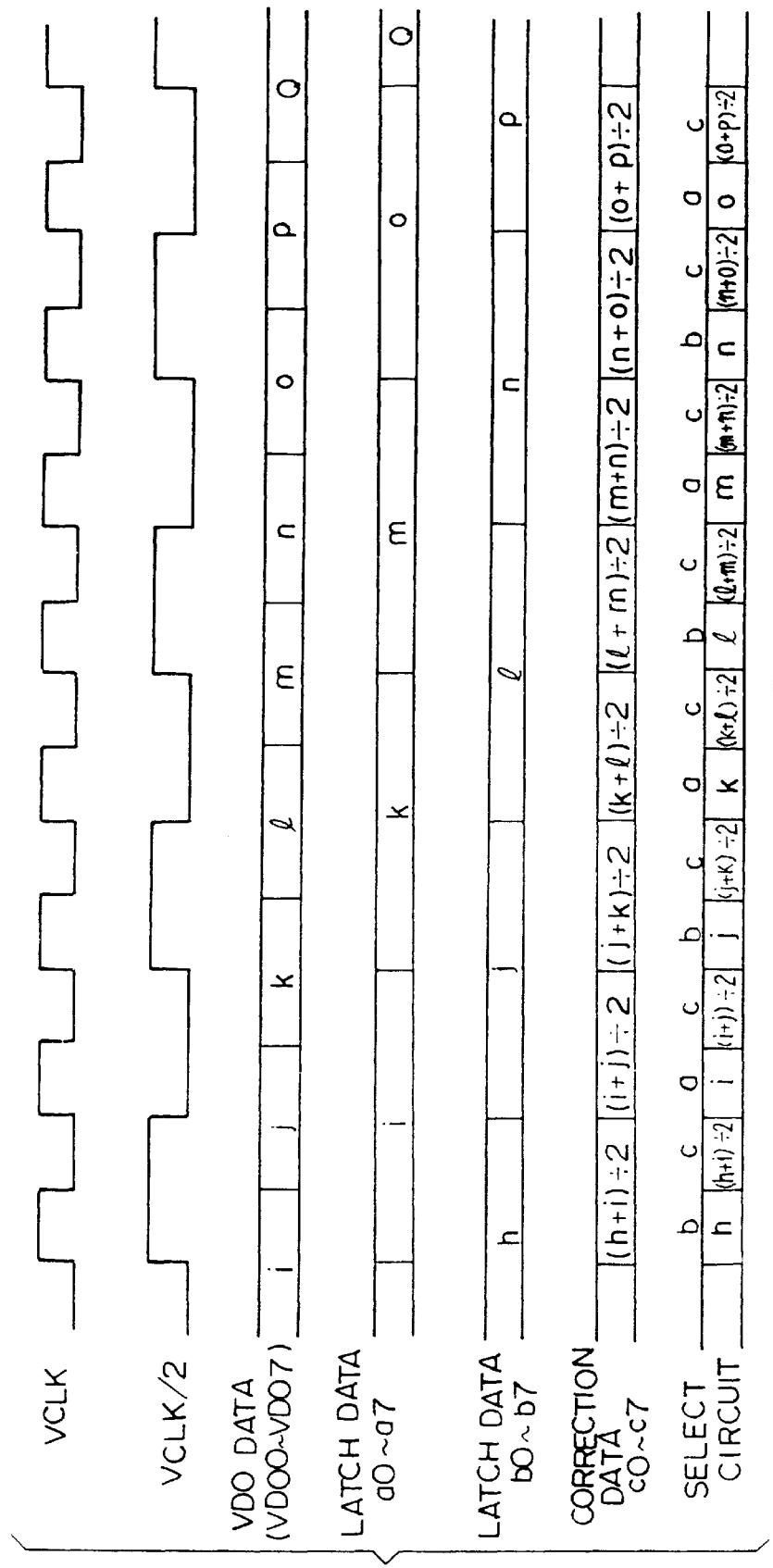
FIG. 43 is a timing chart of a main scanning direction interpolating circuit 80.

FIG. 43 is a timing chart for the operation performed by the interpolating circuit 170 shown in FIG. 41.

The interpolating circuit 170 shown in FIG. 40 acts to interpolate the horizontal scanning, while the interpolation in the sub-scanning direction (in the vertical direction) is conducted by the interpolating circuit 171.

Figure 44:
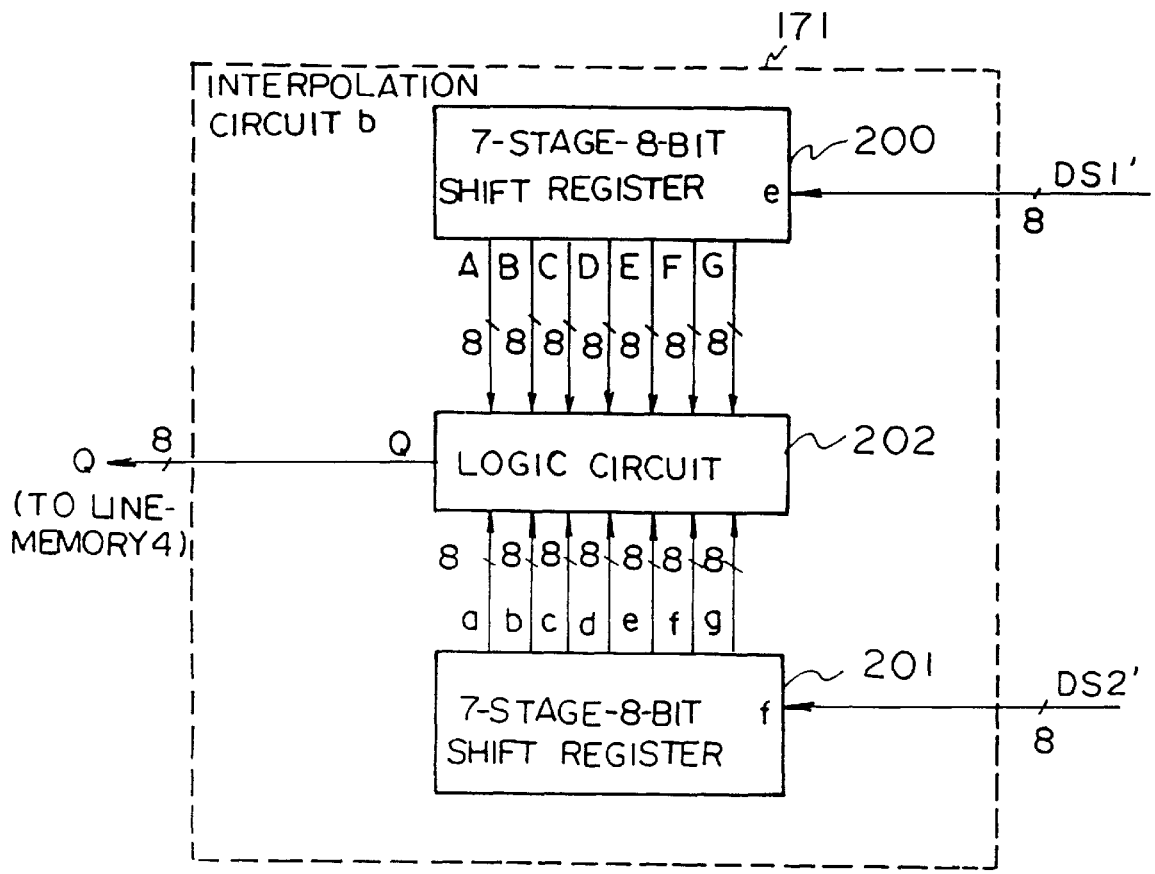
FIG. 44 is a detailed view which illustrates the interpolating circuit 171.

The interpolating circuit b (represented by reference numeral 171) is structured as shown in FIG. 44, the interpolating circuit b processing the interpolated data in the vertical direction from data interpolated in the main scanning direction by the interpolating circuit 170. That is, the data interpolated in the main scanning direction is cut off such that a block formed by 2 pixels in the vertical direction and 7 pixels in the lateral direction is cut off in the form of the signals DS1' and DS2 by the line memories 96', 97', and 98' and the data selectors 104' and 105'. The thus-cut pixel blocks are interpolated in the sub-scanning direction by the interpolating circuit 171.

The data interpolated as the DS1' and DS2' in the horizontal direction are input to the interpolating circuit 171 as 8 bits multi-level signal.

As shown in FIG. 44, the interpolating circuit 171 comprises: a shift register e (represented by reference numeral 200) formed by 7 stages which receive the 8 bits data DS1' and each of which is formed by 8 bits; a shift register f (represented by reference numeral 201) of 7 stages and 8 bits capable of receiving the 8 bits data DS2'; and a logical circuit 202 capable of receiving data from the shift registers e and f and transmitting interpolated data of 8 bits as the output Q in accordance with a predetermined logic.

The logic for the data interpolation conducted by the interpolating circuit 171 will be described with reference to FIGS. 45 and 46.

Figure 45:
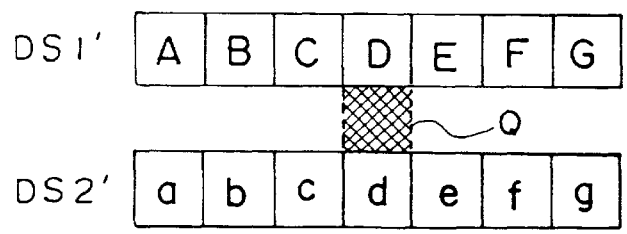
FIGS. 45 and 46 are views which illustrate the logic for a data interpolation in the interpolating circuit 171.

FIG. 45 is a view which illustrates the relationship between the line data which is stored in the shift registers e and f of 8×7 bits and which are transmitted to the logical circuit 202 and the subject pixel Q to be data-interpolated by the logical circuit 202. The symbols A to G and a to g represent 8 bits data, and the data Q to be generated by the interpolation is also 8 bits data. The DSI2' is a pixel of lower by one line from the DSI1' in the density of 300 dpi. The subject pixel Q to be data-interpolated is defined by DS1' data for 7 pixels and DS2' data for 7 pixels.

As described later, in the interpolation in the sub-scanning direction, a fact is determined either the binary expression or the multi-level expression is a suitable pixel in consideration of the density of the pixel in the above-described block. In accordance with the thus-made determination, the logical calculation for the interpolation is made different.

Figure 46:
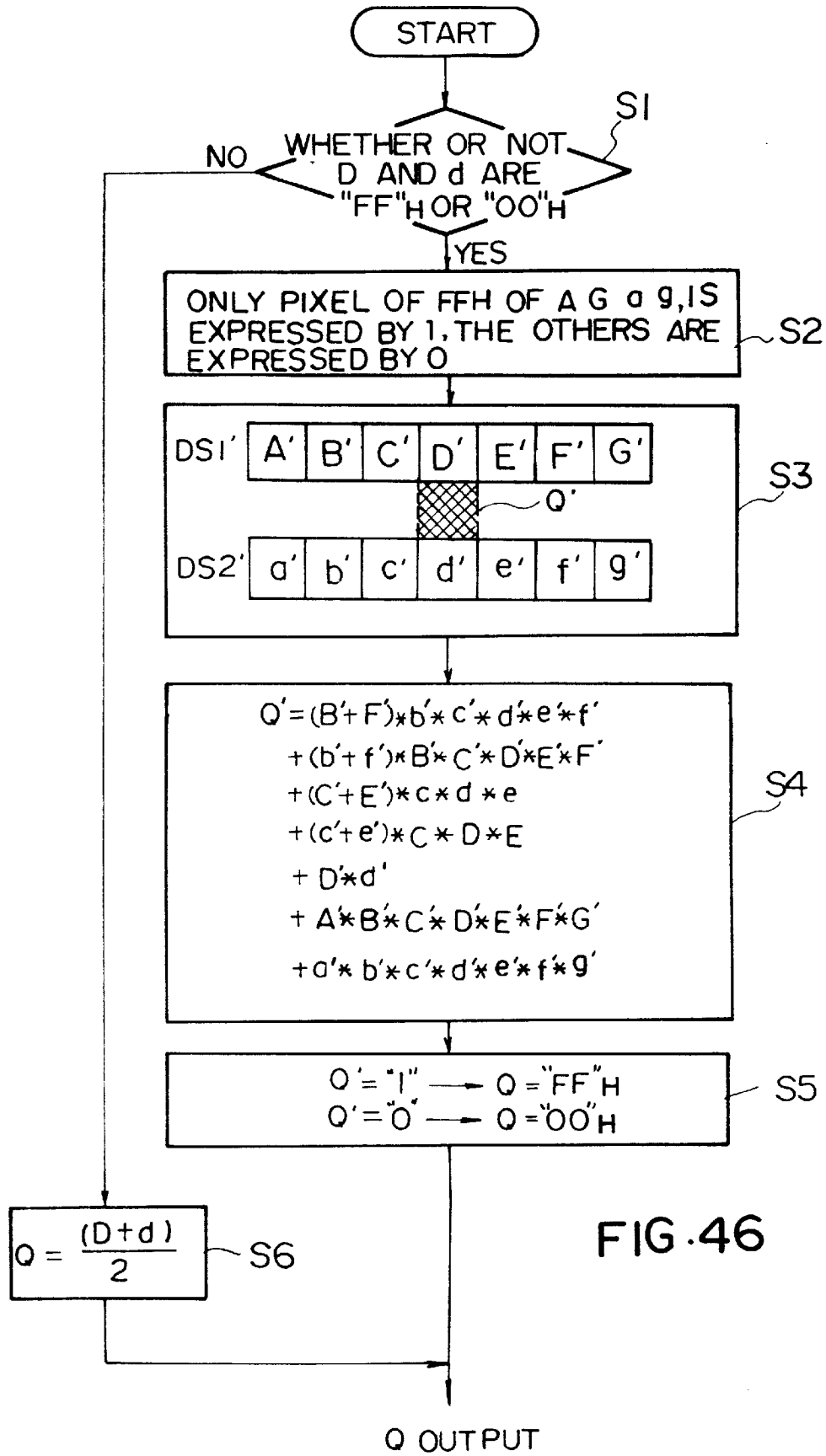

FIG. 46 is a view which illustrates the logic for determining the interpolated data for the subject pixel Q. Referring to this drawing, the logic performed by the logical circuit 202 will be described in detail. In step S1, it is determined that the pixels D and d (each of which is formed by 8 bits) disposed next to the subject pixel Q in the vertical direction is either "FF"$_H$ or "00"$_H$. That is, if the determination is made to be YES, any of the following expressions holds:

$$D=d=FF_H \tag{6}$$

$$D=d=00_H \tag{7}$$

$$D =00_H, d=FF_H \tag{8}$$

$$D=FF_H, d=00_H \tag{9}$$

Expression (6) or (7) means a fact that both the pixels D and d are disposed in the black portion or the white portion in the binary image. Expression (8) or (9) means a fact that the pixels D and d span the edge of the black portion and the same of the white portion of the binary image. In these four cases, the interpolated data Q needs to be subjected to the binary interpolation.

If the result of the determination in step S1 is YES, it is determined that the subject pixel Q to be interpolated is the data interpolation in which the binary expression of a character or the like needs to be conducted. In step S2, each 8 bits data of A to G and a to g are replaced by binary data A' to G' and a' to g'. In this replacement, only the pixels of "FF"$_H$ selected from a group consisting of 14 image data A to G and a to g are converted into "1" and all of the other data (that is, "00"$_H$ to "FE"$_H$) are converted into "0", the thus-converted binary data being then stored in the 14 bits latches A' to G' and a' to g' similarly to the processing in step S3. The reason for the fact that the contents of the two shift registers of 8 bits×7 stages shown in FIG. 45 are not replaced lies in that, if the pixels at the positions D and d were, during the shifting of the image data by the shift register, determined to be suitable for the binary expression, but the pixels shifted and disposed at the next positions D and d are not necessarily determined to be suitable for the binary expression. Therefore, the density needs to be retained to correspond to this case. In step S4, the binary data interpolation is conducted on the basis of the contents of the latches A' to G' and a' to g' so that interpolation result Q' is obtained. Since the logical expression for Q' in step S4 is the same as Expression (1) described relating to the interpolation by the binary data print board, the description about it is omitted here. Thus, the binary expression Q' for the interpolated data at the position of the pixel to be interpolated in the case where it is determined to be suitable for the binary expression in consideration from the surrounding pixels is obtained.

In step S5, the Q' is converted into the multi-level expression. That is, when the binary interpolated data Q' is "1", it is arranged to be: Q="FF"$_H$ as the multi-level interpolated data, while it is "0", it is arranged to be Q="00"$_H$.

In a case where both the pixels D and d adjacent vertically to the subject pixel Q are not the combination formed by either the "FF"$_H$ or "00"$_H$, but if either of them contains either data of "01"$_H$ or "FE"$_H$, the subject pixel Q to be interpolated is determined to be the data interpolation in which the multi-grade expression such as a photograph needs to be conducted (NO). In this case, the flow advances to step S6 in which the value obtained by addition of each 8 bits data for the pixels D and d neighboring vertically the subject pixel Q before being halved, that is, the following value is arranged t be the multi-level interpolated data:

$$Q = \frac{D+d}{2}$$

Thus, the interpolating processing shown in FIG. 46 is subjected to the binary interpolation for the purpose of retaining the sharp outline in the portion which is suitable for the binary expression, while the half tone portion is subjected to the interpolation in which the smoothing is taken into consideration.

The thus-interpolated multi-level data Q is stored in the 8 bits line memory 99'. The data selector 106' selects any of the outputs D1' to D4' of the line memories 96', 97', 98', and 99' under control of the control circuit 93' so as to transmit it as the interpolated image signal VDO'.

Figure 47:
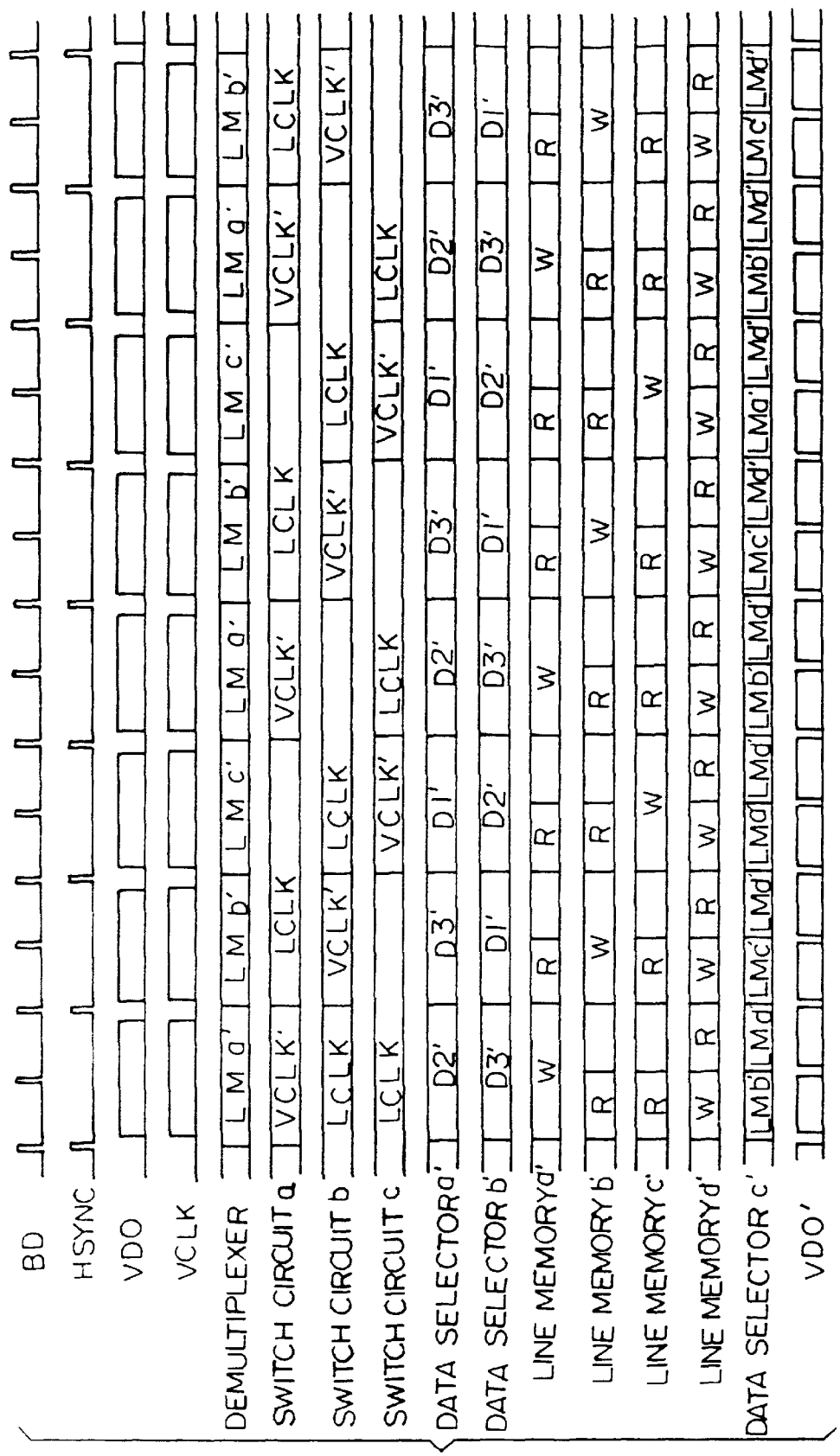
FIG. 47 is a view which illustrates the timing chart for the circuit shown in FIG. 40.

The timing chart for the circuit shown in FIG. 40 is shown in FIG. 47.

Density Compensation

Figure 48:
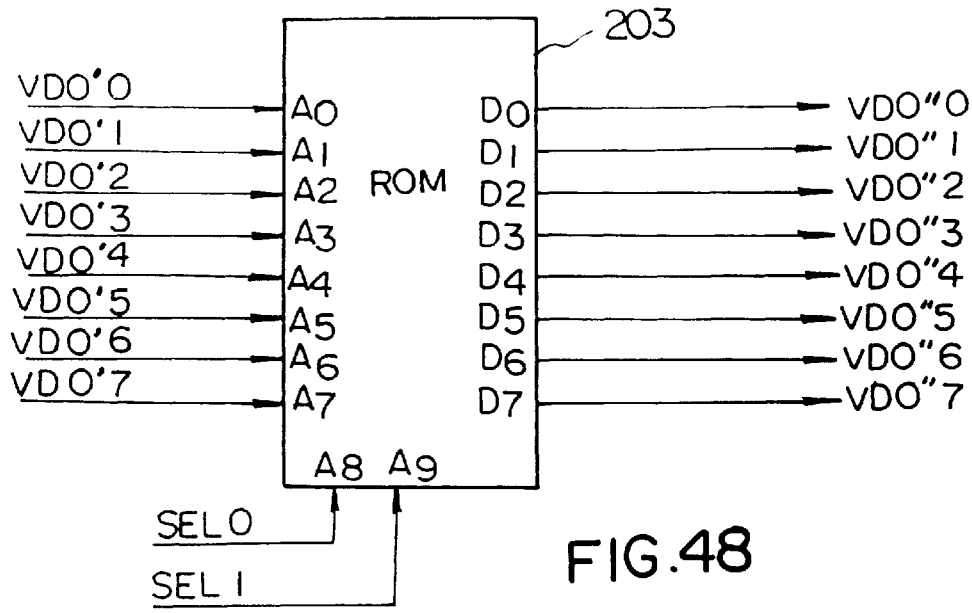
FIG. 48 is a circuit diagram which illustrates an example of a density compensating circuit 81.

The 8 bits multi-level data VDO' of the pixel density of 600 dot/inch obtained in the multi-level data interpolating circuit 80 is input to the density compensating circuit 81 (see FIG. 20A). FIG. 48 is a view which illustrates an example of the density compensating circuit 81. This density compensation is conducted for the purpose of compensating the specific characteristics of the multi-level data VD00 to VD07 transmitted from the printer controller 152, the characteristics corresponding to the characteristics of the sources. According to this embodiment, four types of compensating characteristics for compensating the characteristics of the sources are previously prepared so as to be switched by the density compensating circuit 81 in accordance with the characteristics notified by the controller 152.

Referring to FIG. 48, a ROM 203 is a read only memory capable of storing the above-described four types compensating characteristics, the ROM 203 having address lines $A_0$ to $A_7$ to which 8 bits multi-level data VDO'0 to VDO'7 which have been interpolated are input. These compensating data store in the memory addresses to be addressed by VDO'0 to VDO'7 are transmitted from data output terminals $D_0$ to $D_7$ as 8-bits data of VDO" 0 to VDO" 7.

The addresses $A_8$ and $A_9$ in the ROM 203 are connected to the memory block signals SEL0 and SEL1. That is, a first memory block can be assigned when SEL0="0" and SEL1="0", a second memory block can be assigned when SEL0="1" and SEL1="0", a third memory block can be assigned when SEL0="0" and SEL1="1", and a fourth memory block can be assigned when SEL0="1" and SEL1="1". These four memory blocks are arranged such that when there are four types of characteristics about the density of the 8 bits data VD00 to VD07 transmitted from the printer controller 152 as follows:

(i): linear characteristic 1

(ii): linear characteristic 2 {which is different in the inclination of the characteristics from (i)}

(iii): CCD characteristic (iv): CRT characteristic the compensating data corresponding to the characteristics (i) to (iv) are stored in the corresponding four memory blocks.

According to this embodiment, when the characteristic about density of data transmitted from the printer controller is any of the characteristics shown in (i) to (iv), an edge 151 transmits the switch signals SEL0 and SEL1 in accordance with the characteristic of data which is previously assigned with a command transmitted from the controller so that the memory block corresponding to the assigned characteristic is selected. Therefore, the obtainable 8 bits data VD00' to VD07' become multi-level data having a linear characteristic whose gradation characteristic has been standardized as the printer engine with respect to any data characteristic.

Gradation Processing

Eight bits signals VDO"0 to VDO"7 whose characteristic has been made linear by the density compensating circuit 81 are transmitted to the PWM dither processing circuit 85 serving as the first gradation processing circuit and the dither processing circuit 38 serving as the second gradation processing circuit.

Figure 49:
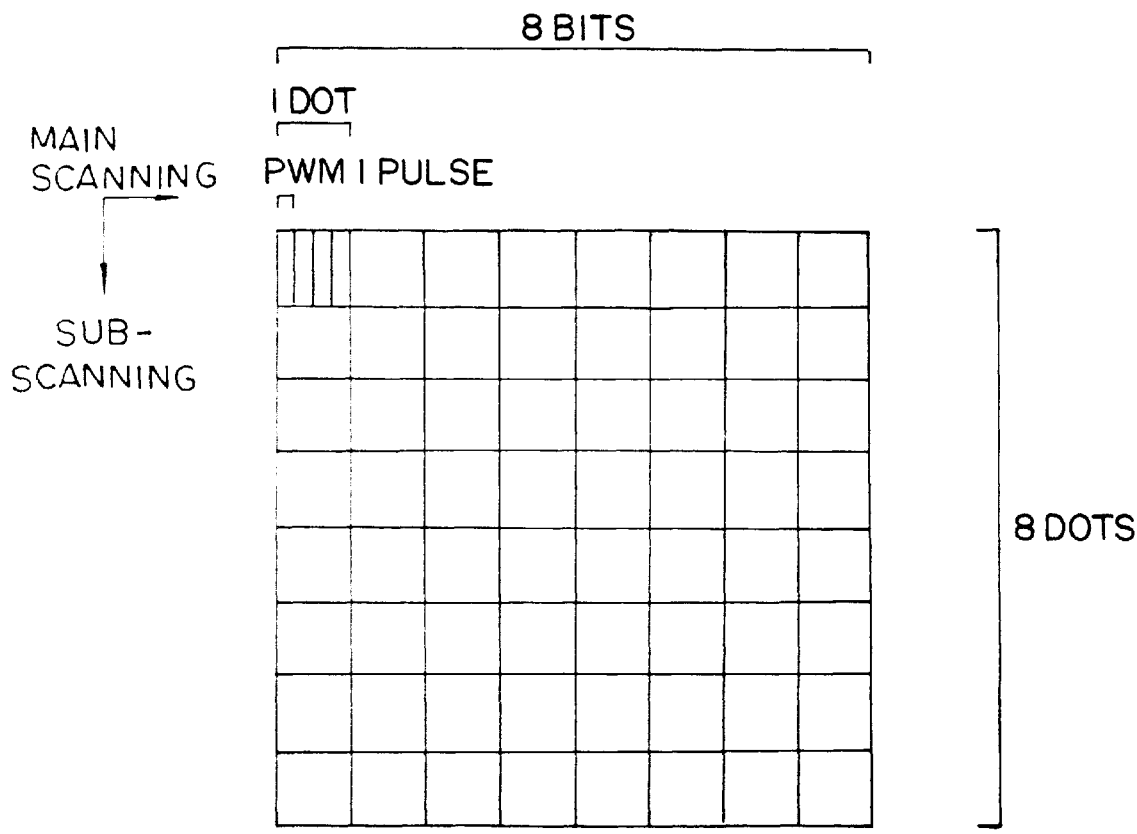
FIG. 49 is a view which illustrates the processing to be conducted by a PWM dither circuit 85.

FIG. 49 is a view which illustrates the processing conducted by the PWM dither processing circuit 38. Referring to this drawing, a pixel is gradation-expressed by using 64 dots consisting of 8 dots in the main scanning direction and 8 dots in the sub-scanning direction. In this case, a dot has small dots divided into four portions, these small dots in one dot can be expressed by a pulse of the PWM signal in accordance with the pulse width modulation (PWM) method. As a result, the density of 256 (=8×8×4) gradations can be expressed by 8 dots in the main scanning direction×8 dots in the sub-scanning direction.

Alternatively, the 256 gradations can be expressed in accordance with the pulse width modulation method arranged such that one dot is divided into 16 portions by way of forming the stricture of one pixel by 4 dots in the main scanning direction×4 dots in the sub-scanning direction. When one dot is divided into four portions, a density of 64 gradations can be, of course, expressed.

Figure 50:
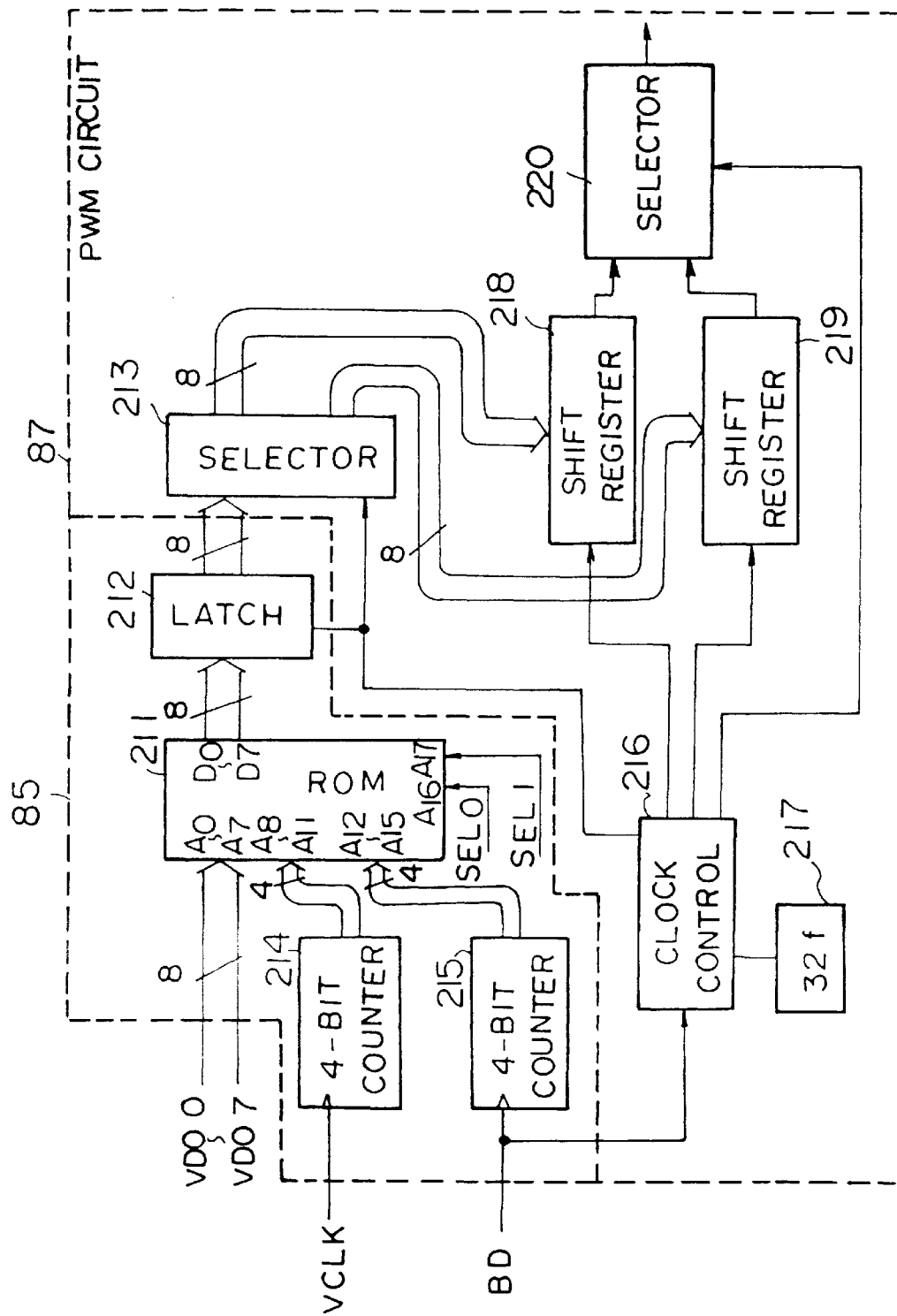
FIG. 50 is a view which illustrates the PWM dither circuit 85 and a PWM circuit 87.

FIG. 50 is a view which illustrates a specific example of the PWM dither processing circuit 85 and the PWM circuit 87 connected to the PWM dither processing circuit 85.

Referring to this drawing, the multi-level data VDO"0 to VDO"7 are input to the address terminals $A_0$ to $A_7$ of the ROM211. The image clock VCLK is input to a 4-bit counter 214, the 4-bit output from the counter being connected to the addresses $A_8$ to $A_{11}$ of the ROM 211. The signal BD is input to the 4-bit counter 215, the 4-bit output from the counter 215 being then connected to the addresses $A_{12}$ to $A_{15}$ of the ROM 211.

The ROM 211 thus transmits the memory data selected by the address lines $A_0$ to $A_{15}$ as the data outputs $D_0$ to $D_7$. This 8-bit data is data-latched by the latch 212, and is then data-loaded alternately to the 8-bit parallel-in serial-out shift registers 218 and 219 via the selector 213.

Reference numeral 217 represents an oscillating circuit capable of obtaining a clock signal whose phase has been synthesized with the BD signal by the clock control portion 216. The thus-obtained clock is supplied to the latch 212, selector 213, selector 220, shift registers 218 and 219. When the shift register 218 has been selected by the selector 220 and has been thereby brought to reading state, data in the latch 212 is loaded in the shift register 219 by the selector 213. On the other hand, when the shift register 219 is selected by the selector 220 and has been thereby brought to reading state, data in the latch 212 is loaded in the shift register 218 by the selector 213.

Data to be loaded in shift registers 218 and 219 comprises 8 bits data with which the four density gradation of the image to be printed is corrected by the pulse width modulation in corporation with the frequency of the above-described reading clock.

The addresses A16 and A17 are connected to the switch signals SEL0 and SEL1 which can be assigned by a command from the printer controller or by a signal from the gamma correction switch circuit 83 or a signal from the number of lines/gradation switch circuit 84, this SEL signal being able to switch the memory bank of the ROM 211. That is, the characteristics of the PWM dither can be switched.

The multi-level outputs VDO"0 to VDO"7 from the density compensating circuit 81 are supplied also to the dither processing circuit 38.

Figure 51:
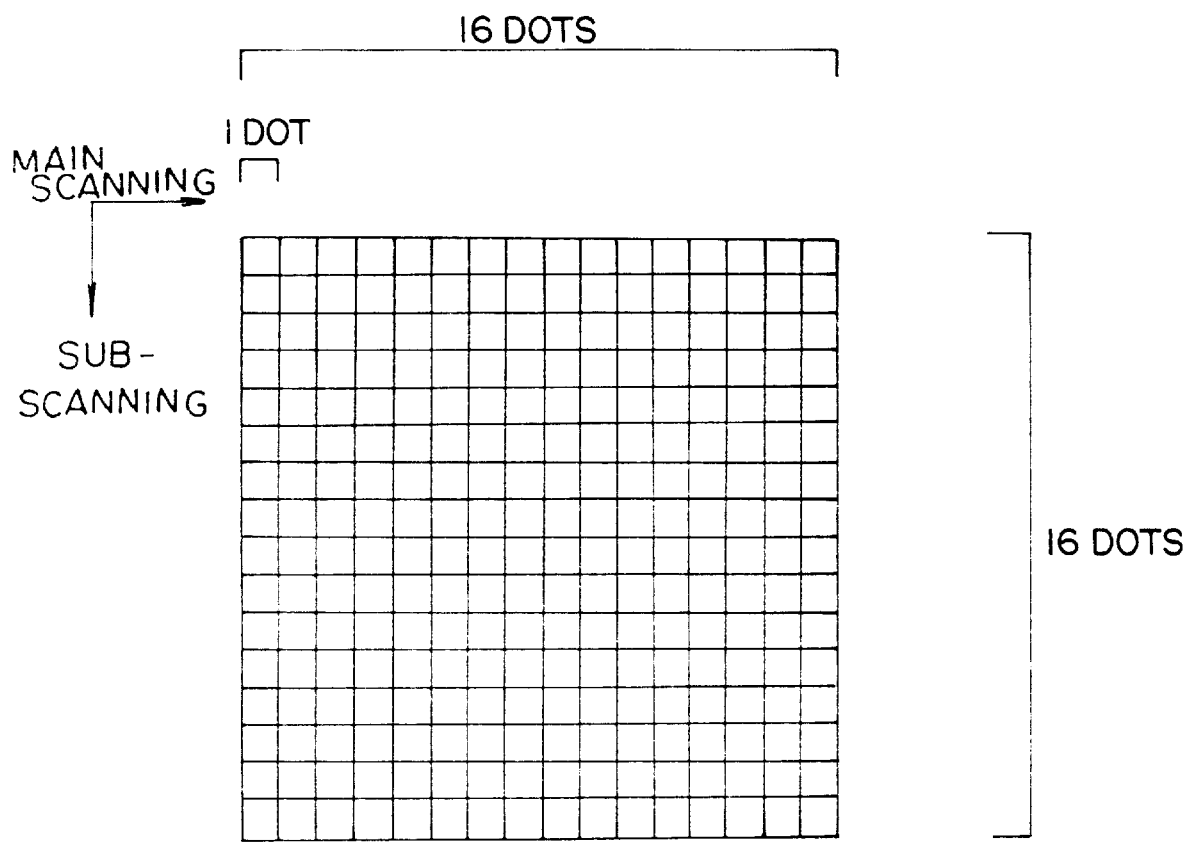
FIG. 51 is a view which illustrates the dither processing.

FIG. 51 is a view which illustrates the structure of a pixel formed in accordance with the dither method according to this embodiment, in which the pixel is expressed by 16 dots in the main scanning direction×16 dots in the sub-scanning direction so that the density expression displaying 256 gradations can be realized. When the pixel is formed by 8 dots in the main scanning direction×8 dots in the sub-scanning direction, a density expression displaying 64 gradations can be realized.

Figure 52:
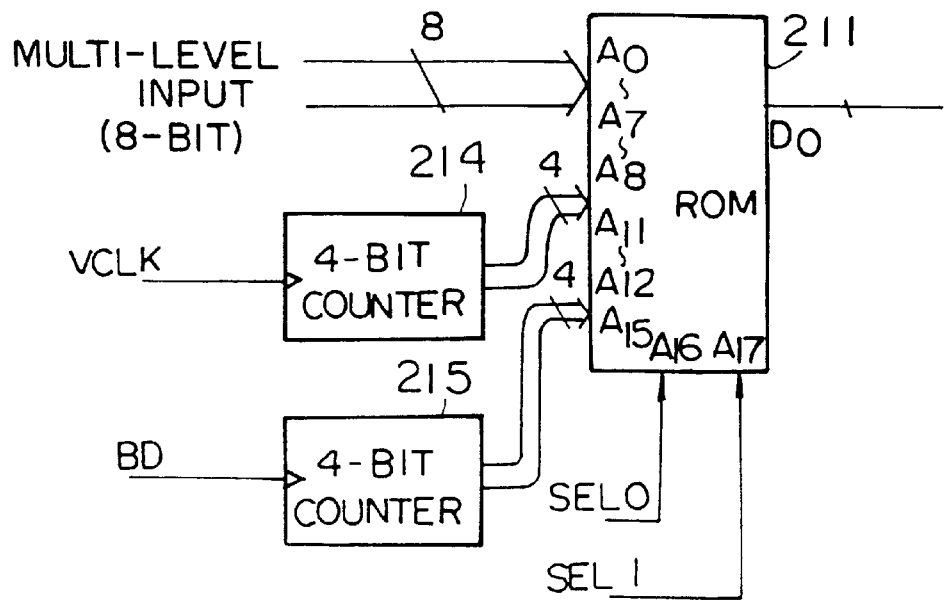
FIG. 52 is a view which illustrates a dither processing circuit 38.

FIG. 52 is a view which illustrates a specific example of the dither processing circuit 38. Referring to this drawing, the same components give the reference numerals as those shown in FIG. 50 have the same function. Similarly to FIG. 50, the ROM 211 is addressed by the address lines $A_0$ to $A_{15}$ so that 1-bit data $D_0$ is transmitted. The memory addresses addressed by the address lines $A_0$ to $A_{15}$ store a plurality of sets of data which is capable of determining the dither pattern, data in the sets being able to be switched by switch signals SEL0 and SEL1 connected to the address lines $A_{16}$ and $A_{17}$ which can be switched by a command from the printer controller or by a signal from the gamma correction switch circuit 83 or a signal from the number of lines/ gradation switch circuit 84.

According to this embodiment, the structure is, in accordance with this embodiment, the laser driving signal obtained by the pulse width modulation processing and the laser driving signal obtained by the dither processing can be selected by the switch circuit 88. The reason for this lies in that: although the image recorded with a signal which has been subjected to the pulse width modulation can be observed as high grade by the human's eyes in terms of the resolution, the quality of the recorded image can deteriorate when it is copied by a copier or the like. On the contrary, the image whose resolution is deteriorated by the dither processing is preferable for the copying. Therefore, the structure is so arranged that the switch circuit 88 can be switched from the controller.

Transmission to the Binary Board 60

Referring to FIG. 20A, either the pulse width modulation signal obtained from the PWM circuit 87 and the dither processing signal obtained from the dither processing circuit 38 is selected by the selection circuit 88 in accordance with a command from the printer controller, the thus-selected signal being then input to either of the terminals of the OR circuit 39 of the binary data print board 60 via the inverter 88' and the connectors 65 and 64. The input signal is given an OR with the binary data input from the other input terminal of the OR circuit 39 before being applied to the laser driver 40. As a result, the laser 51 is driven.

Control of the Screen Angle

The multi-level data VD00 to VD07 obtained from the above-described binary component separation circuit 76 is supplied to the multi-level data interpolating circuit 80, and is also supplied to the D—D conversion circuit 82.

Figure 53:
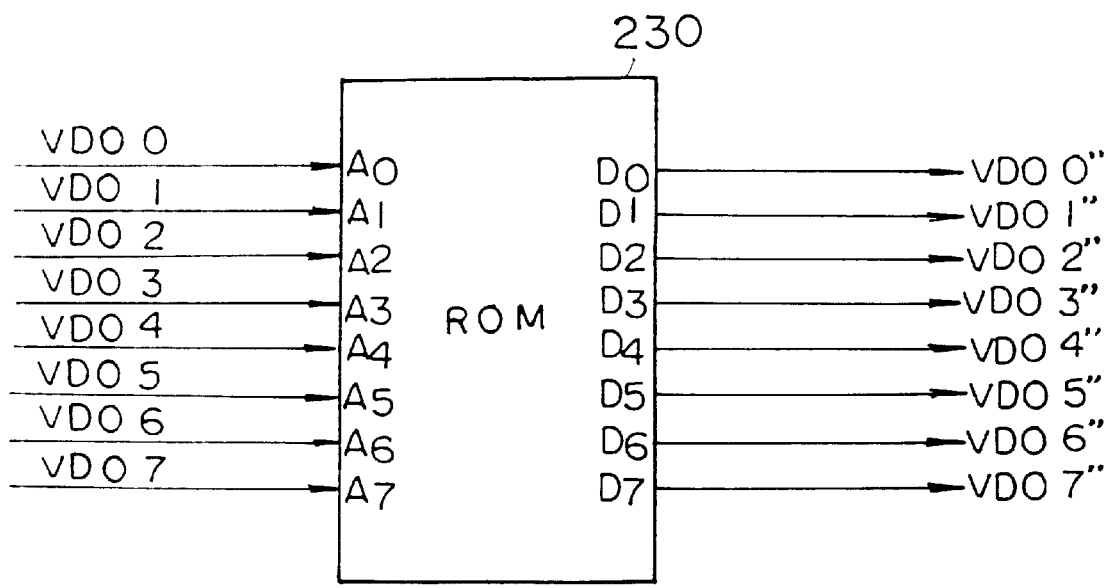
FIG. 53 is a view which illustrates a D—D conversion circuit 82.

The D—D conversion circuit 82 is structured as shown in FIG. 53. Referring to this drawing, 8-bit multi-level signals VDO0 to VDO7 are input to the address lines $A_0$ to $A_7$ of the ROM 230, while the converted multi-level signals VDOO to VDO7 are output from the data output terminals $D_0$ to $D_7$. That is, the ROM 230 is data conversion circuit having a function with which the density characteristics of signals can be corrected. The data VDO0 to VDO7 which have been data-converted are input to the selector 213 which has been described with reference to FIG. 50, the data being input in the manner described above via the screen angle switch circuit 86.

Although the 8-bit data supplied from the PWM dither processing circuit 85 is also input to this selector 213 as described above, the selector 213 input either the 8-bit data from the processing circuit 85 and the 8-bit output from the screen angle switch circuit 86. Therefore, a selection circuit (omitted from illustration) is provided in the front step of the selector 213, this selector circuit being able to select either of the outputs from the ROM 211 and ROM 230 in accordance with a command transmitted from the printer controller so as to input it to the selector 213.

Figure 54A:
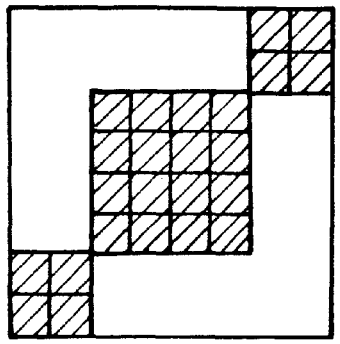
FIGS. 54A(a) to 54A(c) and 54B(a) to 54B(c) are views which illustrate various screen angles.

Then, the screen angle switch circuit 86 will be described in terms of the function thereof with reference to FIGS. 54A and 54B. For example, the tone of the image is, as shown in FIG. 54A, varied in accordance with the arrangement of the point at which the growth of the half tone pattern starts or a manner of the growth to be diagonal {see FIG. 54A(a)}, longitudinal {see FIG. 54A(b)}, or lateral {see FIG. 54A(c) }. On the basis of this, the screen angle switch circuit 86 is able to optionally vary the point at which the growth starts or the manner of the growth by switching the screen angle. As a result of this switching, an image which meets the necessity or the desire of the operator can be obtained. This function has been especially desired in the DTP field recently.

Where the image shown in FIG. 54A(a) corresponds to the screen angle of 45°, FIG. 54A(b) corresponds to the screen angle of 90°, and FIG. 54A(c) corresponds to the screen angle of 0°.

Figure 54B:
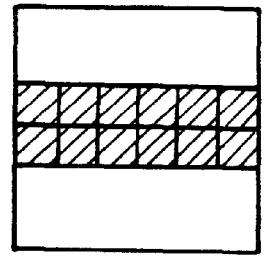
Figure 54A:
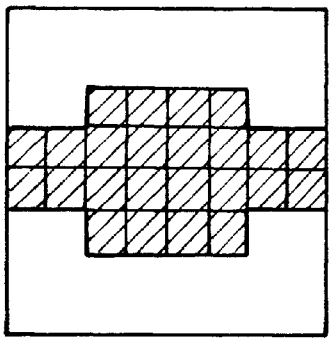
Figure 54B:
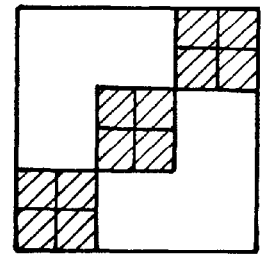
Figure 54A:
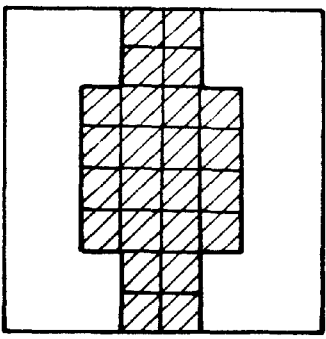
Figure 54B:
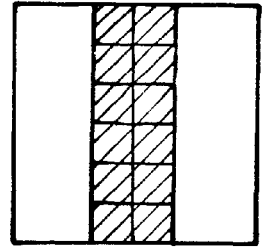

For example, in a case where the gradation is expressed by 6 pixels×6 pixels and 12 pixels of the 6×6=36 pixels are printed, the printing is conducted as shown in FIG. 54B (a)

when the screen angle is 0°, the printing is conducted as shown in FIG. 54B (b) when the screen angle is 45°, and the printing is conducted as shown in FIG. 54B(c) when the screen angle is 90°.

The screen angle switch circuit 86 can be readily formed by changing data stored in the ROM 211 of the circuit shown in FIG. 50. In this case, a further precise control of the screen angle can be conducted by adding an SEL signal capable of selecting the pattern to the address lines $A_{18}$, $A_{19}$, $A_{20}$, ... (omitted from illustration) for the purpose of selecting the data switching.

In the half tone processing circuit is arranged such that the PWM dither processing circuit 85, the dither processing circuit 38, and the screen angle switch circuit 86 are individually provided. However, the above-described three circuits may be integrated in a circuit since they include the overlapped portion. Furthermore, a structure may be employed which is structured such that screen angle is arranged to be switched by switching the ROM table for controlling the screen angle in accordance with the command transmitted from the printer controller 152.

(DPI Switching)

Then, the DPI switch processing circuit 74 In the binary data print board 60 will be described. The DPI switch processing circuit 74 conduct the following operation control in accordance with a command upon the density of the image signal transmitted from the printer controller 152 via the SC interface signal.

When a command which instructs the signal density of 300 dots/inch is transmitted, the binary data interpolating circuit 67 and the multi-level data interpolating circuit 80 are brought to the operative state in response to this command so that the data interpolation processing from the 300 dots/inch to the 600 dots/inch is conducted.

When a command which instructs the signal density of 400 dots/inch is transmitted, the binary data interpolating circuit 67 and the multi-level data interpolating circuit 80 are brought to the non-operative state in response to this command. Simultaneously, the rotational speed of the polygon scanner motor is changed from the rotational speed which is suitable for the 600 dots/inch to that which is suitable for 400 dots/inch by the scanner motor rotational speed control circuit 75 so that the printing at a density of 400 dots/inch is conducted by the printer engine.

When a command which instructs the signal density of 600 dots/inch is transmitted, the binary data interpolating circuit 67 and the multi-level data interpolating circuit 80 are brought to the non-operative state in response to this command, and printing at the density of 600 dots/inch is conducted.

According to this embodiment, the structure is formed such that the quantity of laser is changed by varying the laser driving current in response to the switching of the printing density.

As briefly described as #1 to #11, the printer controller 152 is capable of communicating the command and the status with the SC signal therefrom. It will be again described. The printer engine 151 is able to instruct at least the following instruction in accordance with the command from the printer controller 152.

(a) instruction upon the density of the image signal to be transmitted
(b) instruction to change the rotational speed of the polygonal scanner motor
(c) instruction to switch the switch circuits 72 and 73
(d) instruction to switch the switch circuits 72 and 73
(e) instruction upon a fact whether or not the binary data interpolation is conducted
(f) instruction upon a fact whether or not the smoothing processing is conducted
(g) instruction upon a fact whether or not the solid black correction is conducted
(h) instruction to change the quantity of laser by changing the laser driving current
(i) instruction upon a fact that the image signal to be transmitted from the printer controller comprise only the binary signal, only the multi-level signal, or both of them
(j) instruction upon a fact whether or not the binary component separation processing is conducted
(k) instruction upon a fact whether or not the interpolating processing of the multi-level data is conducted
(l) instruction upon a fact whether or not the gradation smoothing processing of the multi-level data is conducted
(n) instruction upon the density compensating characteristics
(p) instruction to select the data line 78 or 79
(q) instruction upon the screen angle
(r) instruction to select the PWM print or printing in accordance with the dither processing (selection of the switch circuit 88)
(s) instruction upon the gamma correction characteristics
(t) size of the pixel in the multi-level printing (the number of the line)
(u) the number of the gradations of the pixel in the multi-level printing
(v) the number of bits of the signal to be transmitted by the printer controller As a default when no command is transmitted, a variety of specific instruction is conducted after turning on the power. The printer engine 151 notifies the printer controller 152 through the status of a state in which the setting of the above-described items in the printer engine.

When an additional command to the above-described commands is received during the printing, the printer engine operates in either of the following ways:

(1) When the command is received during the printing, this command is ignored.
(2) when the command is received during the printing, the receipt of the command is temporarily stored and it is executed after the printing of the page which is being printed or the printing of the serial job has been ended.

Although the example is described in the above-described embodiment in which the printer controller of the printing density of 300 dpi and the print engine of 600 dpi are combined, the present invention can be applied to the combination of the printer controller of 400 dpi and the print engine of 800 dpi.

Furthermore, the number of dots to be interpolated is arranged to be one in accordance with this embodiment, the present invention is effective in the case in which a plurality of dots are interpolated or the case in which a high gradation data such as 256 gradations is processed.

In addition, the printer engine may comprise an LED printer or an ink jet printer as an alternative to the laser beam printer.

Furthermore, the multi-level data whose dot density has been converted may be imaged by the dither method or the error diffusion method. Alternatively, the PWM method and the dither method or the PWM method and the error diffusion method may be combined.

The basic structure and the operation according to this embodiment of the present invention are arranged as described above.

(Summary of the Effect of the Apparatus According To This Embodiment)

(1) The binary data processing print board 60 and the multi-level data processing print board 61 are arranged to be an individual module respectively. At least the multi-level data processing board 61 is arranged to be an optional module in accordance with the controller to be connected thereto.

The multi-level print board 61 has a function of receiving the binary data and a function of transmitting the thus-received binary data to the binary data processing board 60. In a case where the binary data processing board 60 is provided individually, the operation of the circuit for transmitting/receiving data between the boards 60 and 61 is stopped.

(2) By means of the binary board 60 having the binary data receiving system, the binary data processing system (the circuits 67, 68 and the like); and the multi-level board 61 having the multi-level data receiving system, the multi-level data processing systems (circuits 80, 81, and the like), and the circuit (the separation circuit 76) capable of separating the binary data from the received multi-level data, that is, by way of the established capability of separating the binary data from the multi-level data and synthesizing the thus-separated binary data and the binary data transmitted from the controller, the apparatus according to the present invention can correspond to a variety of data transmitted from the controller.

(3) Since the pulse width modulation system and the dither processing system are provided for the half tone processing system in such a manner that they can be optionally selected, deterioration in the quality of the printed image can be prevented if the recorded image is further copied.

(4) As a result of the established structure in which the smoothing processing which also acts as the interpolating processing is able to have a plurality of characteristics (the PROM 147 shown in FIG. 35) in the binary data processing system (the print board 60), the logical expression can be automatically switched to correspond to the cases, the cases being exemplified by a case in which data includes "kanji" having a relatively large proportion of the straight portions, a case in which alphabetical character data in which a relatively large curved portions are included, a case in which the data includes graphics such as a triangle or a circle, and a case in which the data includes gradation expression such as photograph or the like formed by means of binary data which has been dither-processed.

Then, modified examples of the above-described basic embodiment will be described.

(A Modified Example of the Interpolating Processing)

Figure 2:
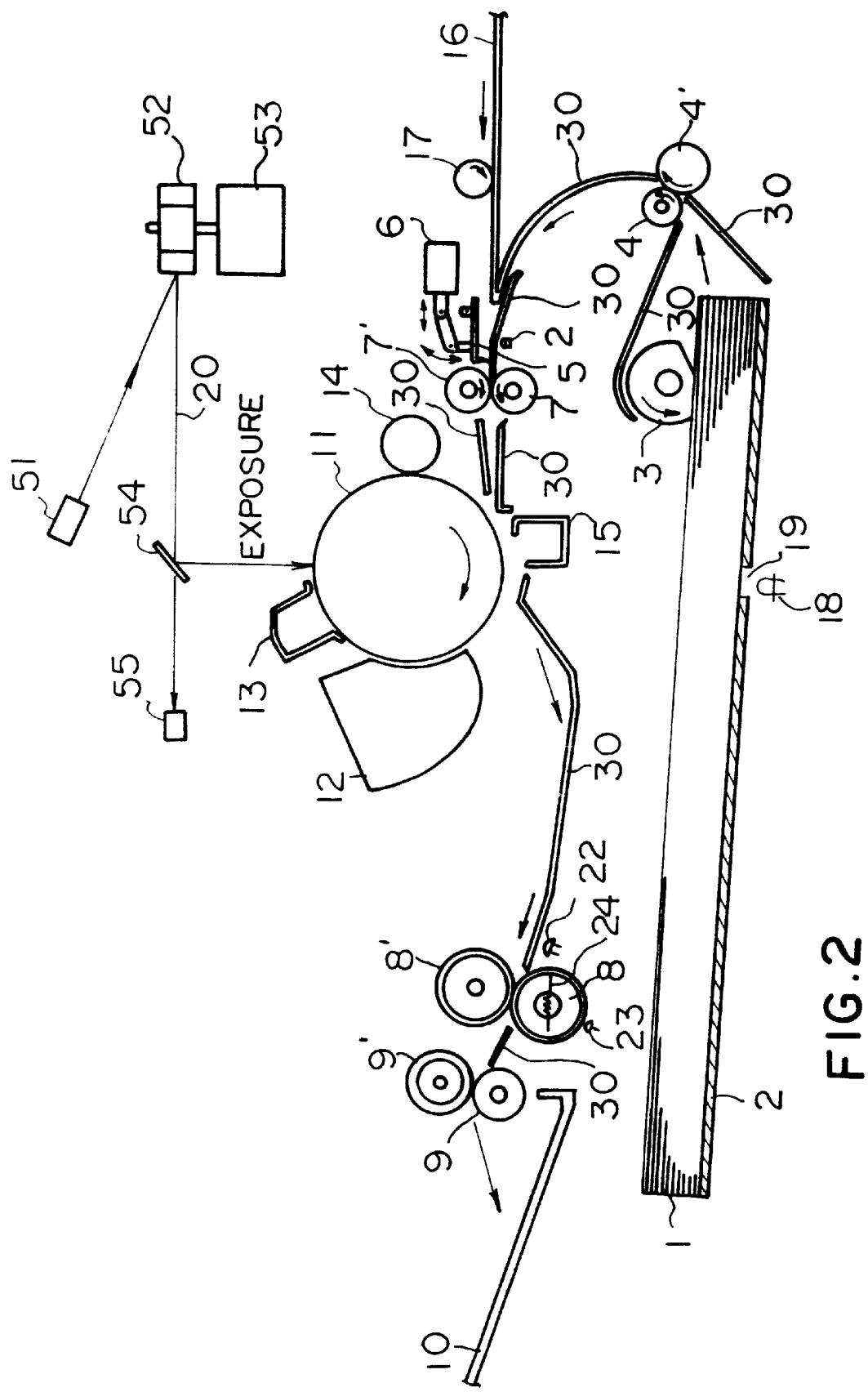
FIG. 2 is a structural view which illustrates the printer engine.

The multi-level data print board 61 of the image output apparatus which serves as the recording apparatus in the embodiment (to be called "the basic embodiment" hereinafter) which has been described with reference to FIGS. 1 to 54B is arranged such that: it conducts the vertical interpolation upon a determination of a fact that the characteristics of the source image is suitable for the binary interpolation or the multi-level interpolation, it conducts the binary logical calculation if the characteristics of the source image is suitable for the binary interpolation, while it conducts the calculation for the smoothing (the calculation for obtaining the average value) if the characteristics of the source image is suitable for the multi-level interpolation (see FIG. 46).

First Modified Example

The following first modified example is suggested: the smoothing processing is also applied to the source image which is suitable for the binary interpolation. As a result, if a binary image is included in the source image, apparatus can be simplified and the processing speed can be raised although the sharpness of the binary image deteriorates slightly.

Figure 55:
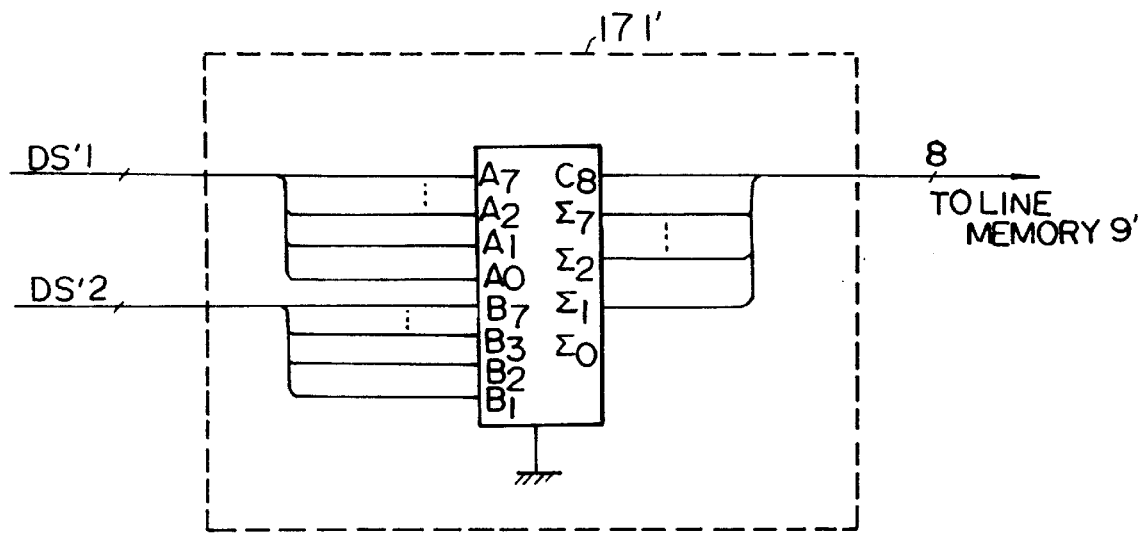
FIG. 55 is a view which illustrates the structure of another modified example of a sub-scanning direction interpolating circuit.

This modification is subjected to the interpolating circuit 171 shown in FIG. 40. FIG. 55 is a view which illustrates an interpolating circuit 171' according to this modified example. The interpolating circuit 171' shown in FIG. 40 is replaced by the interpolating circuit shown in FIG. 55, the interpolating circuit 171' being formed b an 8-bit adder. The signal DS1' and DS2' from the data selectors 104' and 105' shown in FIG. 40 are input to inputs A and B of this adder, while the 8-bit output (C8, Σ7 to Σ1) of the adder are input to the line memory 99'. As a result, the smoothing processing in the sub-scanning direction can be simultaneously conducted. This modified example is particularly effective in a case where the source image is consisting of a half tone image only.

The above-described basic embodiment and the modified example can be employed in the case where the gradation value of the transmitted image data and the gradation value of the printer engine are the same. Then, the modification to be conducted when the gradation of the printer engine 151 is higher than that of the transmitted image data will be described.

In a case in which the interpolated data which has been averaged by the interpolating circuit 171 is obtained, the gradation value involves a quantization error of 0.5 when the sum of the two data D and d to be averaged becomes an odd number.

$$Q = \frac{D+d}{2} + 0.5 \tag{11}$$

The thus-expressed quantization error of 0.5 is a bit of the fist place when the interpolated data Q is designated by a binary number.

Therefore, if the printer engine is an engine capable of expressing a 256 (or 32) gradation or more, interpolated data is processed by 9 bits (5 bits) in addition to the above-described bit of the first place.

Figure 56:
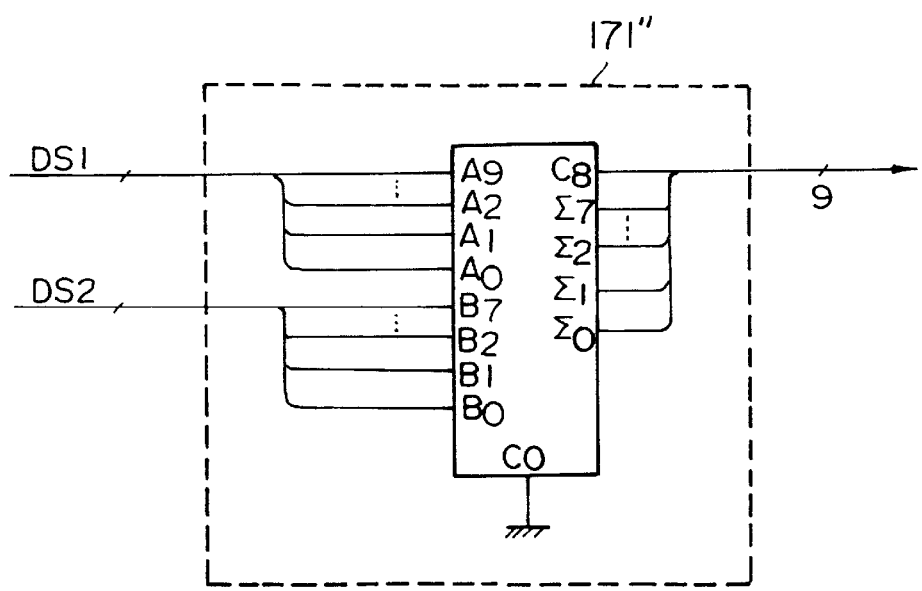
FIG. 56 is a view which illustrates the structure of the sub-scanning direction interpolating circuit according to other modified example.

FIG. 56 is a view which illustrates a circuit formed by modifying the modified example shown in FIG. 55 in order to take a countermeasure against the case in which the number of gradations transmitted and the number of the gradations of the printer engine do not agree with each other. The result of the addition Σ0 of this circuit corresponds to the bit of the first place.

Thus, the first modified example of the interpolating processing of the multi-level data is formed. Specifically, the structure according to this modified example is formed by two averaging circuits capable of averaging the two gradation data. As a result, the interpolating between dots is conducted in the main scanning direction and in the sub-scanning direction. The interpolated dot is obtained by averaging the gradation of the dots neighboring the interpolated dot in both the main scanning direction and in the sub-scanning direction. As a result, a precise image can be obtained simply with a quarter page memory, in addition, the conventional application softwares can intact be used.

Second Modified Example

In the multi-level data print board 61 of the image output apparatus which serves as the recording apparatus according to the basic embodiment described with reference to FIGS. 1 to 54B, the horizontal interpolation is, as shown in FIG. 41, achieved by a simple averaging processing. Therefore, if a binary image is contained in the source image, the sharpness of the binary image can deteriorated in the recorded image. On the other hand, the vertical interpolation is conducted such that the characteristics of the source image is suitable for the binary interpolation or the multi-level interpolation is determined. If it is determined that the characteristics of the source image is suitable for the binary interpolation, the binary logical calculation is conducted. On the other hand, if the same is suitable for the multi-level interpolation, the calculation for the smoothing (the calculation for obtaining the average value) is conducted. The above-described determinations are made upon a fact whether both the values of the dots of the pixels D and d disposed vertically adjacently to the subject pixel Q are either $00_H$ or $FF_H$, this determination being conducted by using a software. That is, according to the above-described basic embodiment, there is a fear of deterioration in the horizontal sharpness and the edge of the image. Furthermore, since the determination about the application of the above-described processing is conducted by means of a software in the vertical interpolation, the processing speed is insufficient.

Then, the second modified example will be described. According to the second embodiment, the fact that the characteristics of the source image is suitable for the binary interpolation or suitable for the multi-level interpolation is determined by means of a hardware circuit in both the horizontal and vertical interpolations.

Figure 57:
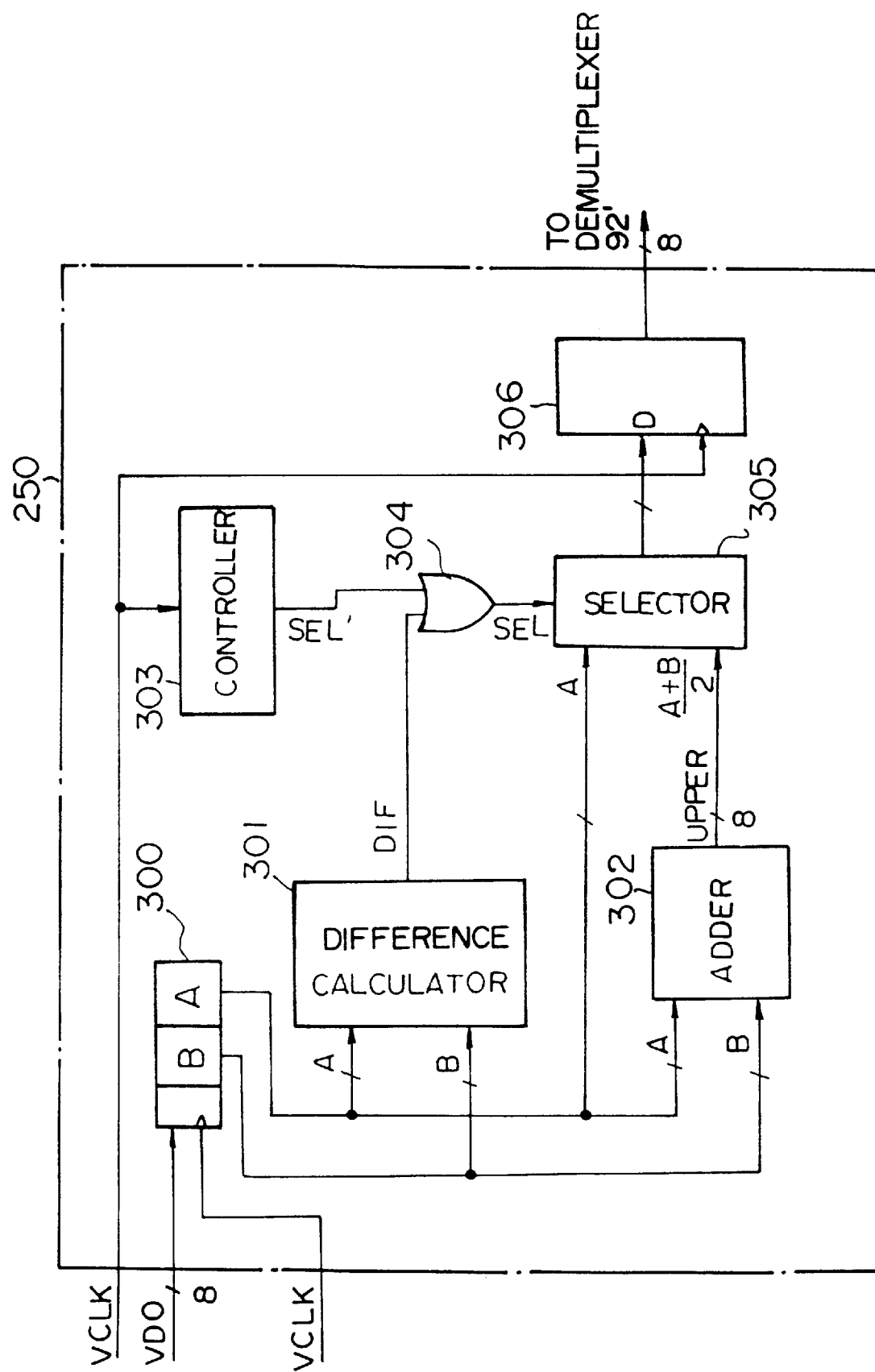
FIG. 57 is a view which illustrates the structure of the circuit for main scanning direction interpolation in the multi-level interpolating processing according other modified example.

This second modified example will be described in detail with reference to FIGS. 57 to 60. FIG. 57 is view which illustrates a circuit 250 formed by modifying the interpolating circuit 170 according to the above-described basic embodiment. FIG. 59 is a view which illustrate a circuit 260 formed by modifying the interpolating circuit 171. The interpolating circuit 250 can be intact replaced by the circuit 170 shown in FIG. 40. The interpolating circuit 260 can be intact replaced by the circuit 171 shown in FIG. 40. Therefore, the circuits around the interpolating circuits 250 and 260 and the operations conducted by them are omitted from description here.

First, the interpolating circuit 250 will be described with reference to FIG. 57. The input image signal VDO of 8-bit and 256 gradations is input to a shift register 300 and then shift outputs B and A are successively transmitted by means of the image clock signal VCLK. These shift outputs B and A are the image data neighbored in the main scanning direction.

An adder 302 calculates the average of the data A and data B obtained by the shift output so as to transmit the thus-calculated result. That is, the average (A+B)/2 of the two data B and A can be obtained by taking the upper 8 bits from 9-bit data which is the result of addition of the 8-bit data B and A including the carry output. This average data (A+B)/2 and the shift output data A are input to a selector 305 so that when the selection signal SEL is "1", the data A is transmitted, while when the selection signal SEL is "0", the average data (A+B)/2 is transmitted.

The control circuit 303 alternately switches the original image data and the interpolated data by transmitting the selection signal SEL' at every cycle of the doubled image-clock signal VCLK'. On the other hand, a difference calculating circuit 301 calculates the difference between the neighboring image data B and A and transmits the edge detection signal DIF on the basis of the determination that the subject portion is the edge of the image if the difference exceeds a predetermined value.

Figure 58:
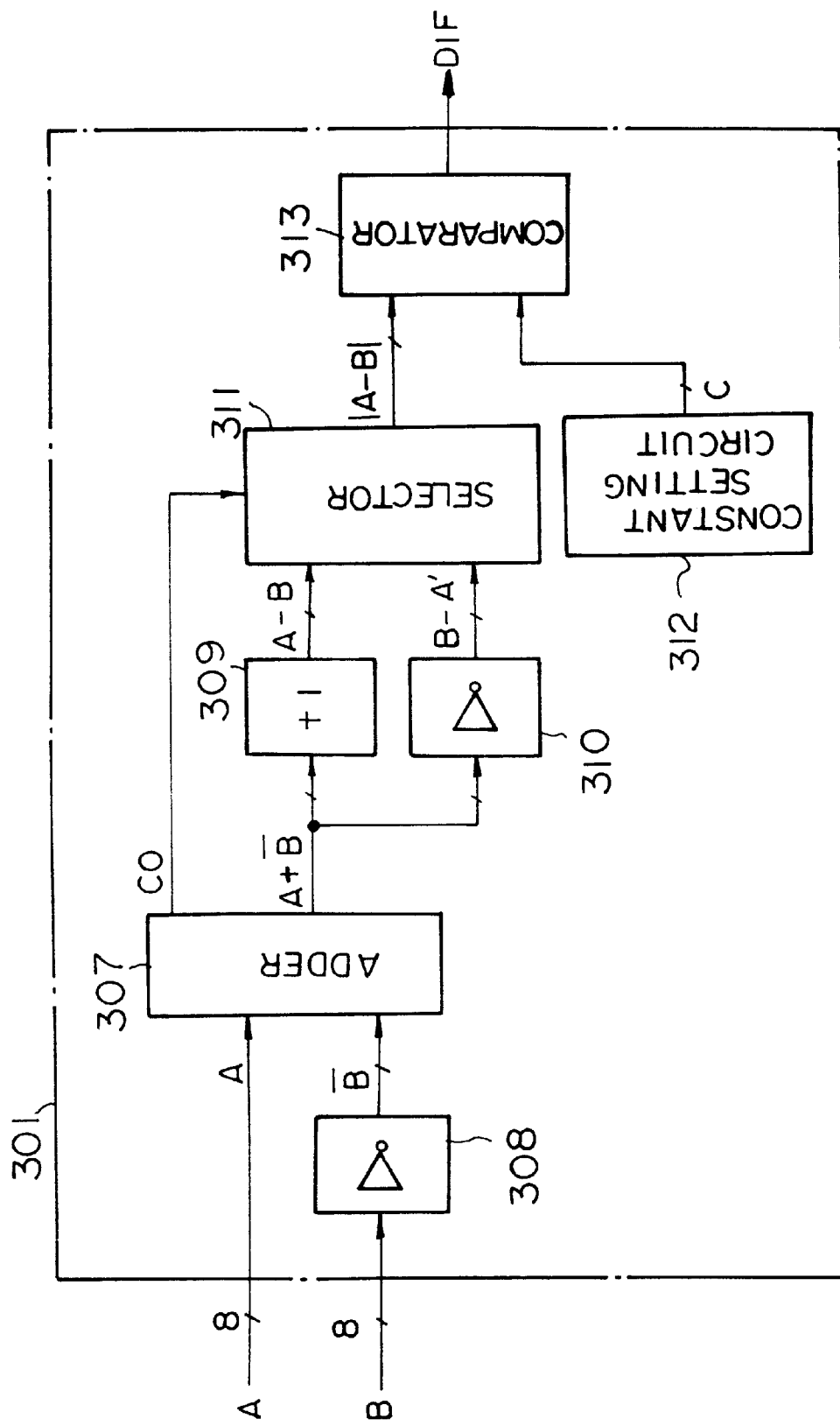
FIG. 58 is a detailed view which illustrates the circuit shown in FIG. 57.
Figure 59:
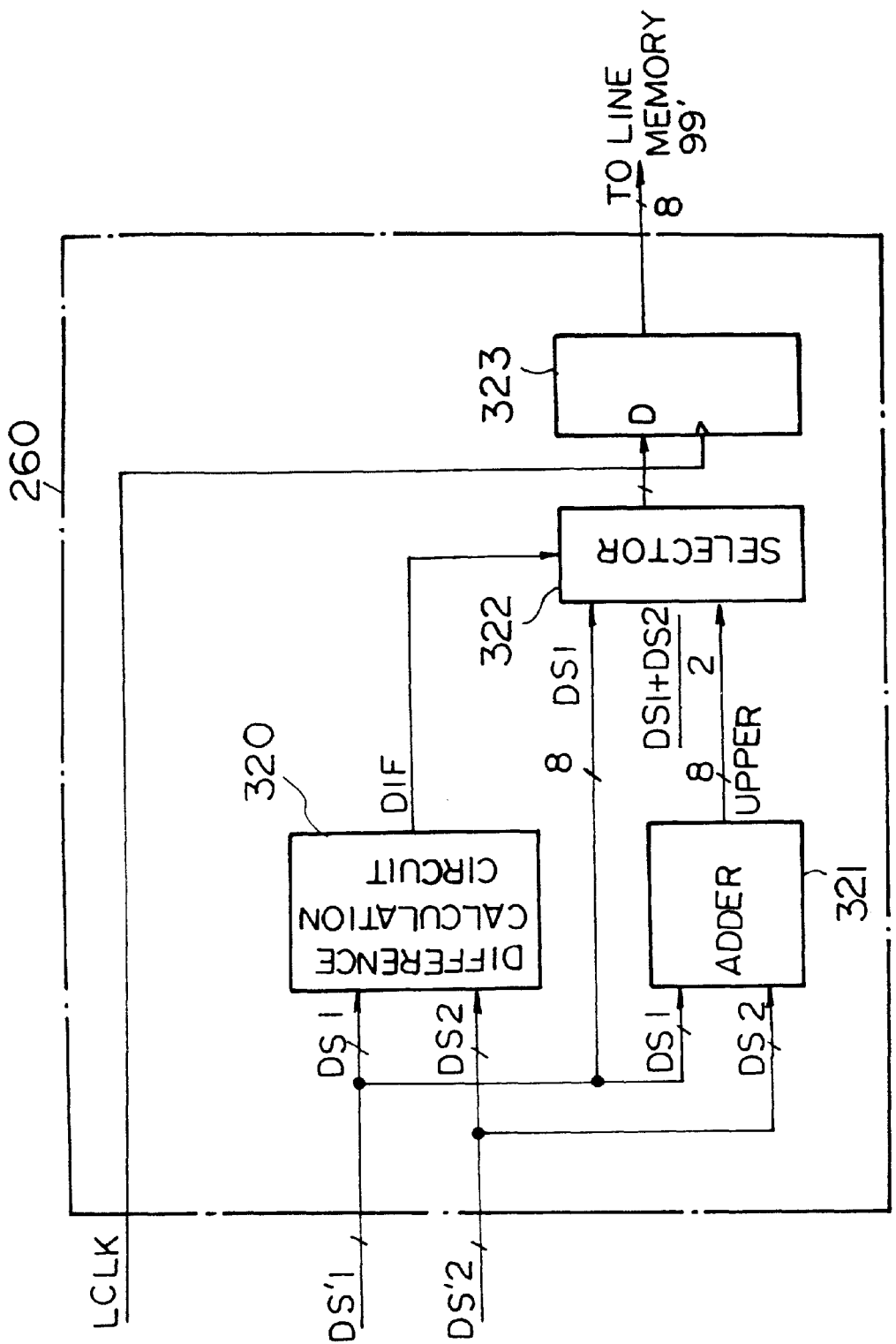
FIG. 59 is a view which illustrates the structure of the circuit for sub-scanning direction interpolation in the multi-level interpolation according to other modified example.

FIG. 58 is a block diagram which illustrates the structure of the difference calculating circuit 301. Referring to this drawing, inverting circuits 308 and 310 respectively have a function of inverting the logic for each of the bits of the input 8-bit data. An adder circuit 309 transmits data of the lower 8 bits obtained by the addition of 1 to the input data. The 8-bit data A is input to one of the data input terminal of an adder 307. On the other hand, the 8-bit data B is input to the other data input terminal of the adder 307 after each of bits has been inverted by the inverting circuit 308. The adder 307 adds the two input data and transmits carry output CO when A>0. The carry output CO is used as the selection signal of the selector 311.

The structure is so arranged that "1", that is, 8-bit data "$0001"_B$ (B represents a binary number) is added by the adder circuit 309 to the 8-bit data from which the carry output is omitted, the 8-bit data being obtained from the above-described addition. The output from this adder circuit 307 becomes the difference A−B when the value of the input data is A>B, this data A−B being then input to one of the input terminal of the selector 311.

When the value of the input data is A≦B, the value obtained by inverting, by the inverting circuit 310, each of the bits of the result of the addition transmitted from the adder 307 becomes the difference B−A, this value B−A being then input to the other input terminal of the selector 311. This selector 311 selects and outputs the data A−B when the carry output from the adder 307 of the above-described two input data is "1", that is, when A>B. On the other hand, when the carry output is "0", that is, when A≦B, the data B−A is selected and transmitted. This output data becomes the absolute value |A−B| between A and B. This data |A−B| is then subjected to comparison with a predetermined value C set by a predetermined-value setting circuit 312, this comparison being made by a comparison circuit 313. When the difference between the input data A and B is larger than the predetermined value C, the edge detection signal DIF is transmitted. Where the above-described predetermined-value setting circuit 312 comprises, for example, a ROM. It may be arranged such that the predetermined value can be varied by a dip switch or the like.

When the edge detection signal DIF is transmitted, it can be determined that the data A and B are the data of the pixel forming the edge of the image. Therefore, the edge detection signal DIF is input as a selection signal SEL for the selector 305 via the OR circuit 304 (see FIG. 57). When the edge detection signal DIF is "1", the average-value interpolation of the data A and B is not conducted but the interpolation is conducted with the same data as that for the previous pixel, that is the data A. The data which has been interpolated in the main scanning direction is brought into synchronization with the doubled image clock signal VCLK' by an 8-bit flip-flop 306 so as to be input to the de-multiplexer 92' shown in FIG. 40.

Referring to FIG. 59, the interpolating circuit 260 capable of interpolating in the sub-scanning direction will be described. The algorithm for the interpolation performed in this circuit 260 is the same as that for the interpolating circuit 250. That is, in the difference calculating circuit 320 calculates the difference between the input data DS'1 and DS'2. It transmit the above-described detection signal DIF when the difference exceeds a predetermined value. Since all of data output becomes the interpolated data in this interpolating circuit 260, the signal DIF intact becomes the selection signal for the selector 322. This selector 322 transmits the average value (DS1+DS2)/2 when the edge detection signal DIF is "0", while it transmits the data DS1 when the edge detection signal DIF is "1". As a result, the interpolated data is processed. This interpolated data is brought into synchronization with the clock signal LCLK by a flip-flop 323 so as to be input to the line memory 99' (see FIG. 40). The difference calculating circuit 320 is substantially the same as the difference calculating circuit 301 show in FIG. 58.

Figure 60:
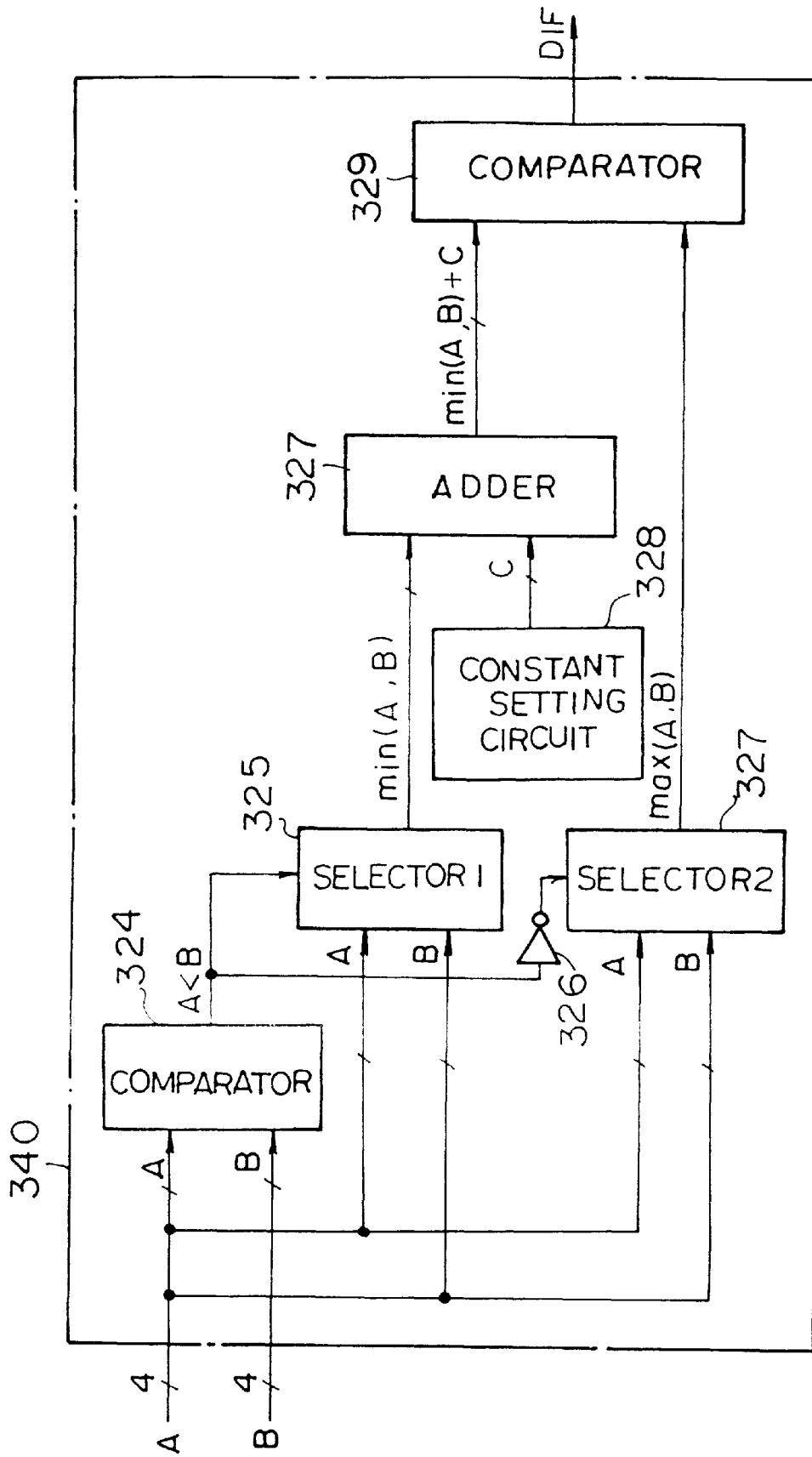
FIG. 60 is a detailed view which illustrates a portion of the circuit shown in FIG. 59.

FIG. 60 is a block diagram which illustrates another example of the difference calculating circuits (301 and 320).

In this difference calculating circuit 340, the value of the 8-bit input data A and that of B are made comparison by a comparison circuit 324. Then, only when A<B, a signal A<B is transmitted so as to be used as the selection signal for the selectors 325 and 327.

The selector 325 selects the smaller data from the two input data A and B by means of the selection signal so as to be transmitted as a min (A, B) signal. The selector 327 selects the larger data from the two input data A and B so as to be transmitted as a max (A, B) signal.

In the adder circuit 327, the predetermined value C is added to the value of the min (A, B) signal so as to transmit an addition signal min (A, B)+C. This min (A, B)+C and the max (A, B) signals are made comparison by a comparison circuit 329. Then, the edge detection signal DIF is transmitted only in the following case:

$$\{min(A+B)+C\} < max(A, B)$$

According to this second modified example, the edge portion of the source image can be retained and reproduced also in the horizontal interpolation. Furthermore, the determination of a fact that the characteristics of the source image are suitable for the binary interpolation or suitable for the multi-level interpolation is made by means of a hardware, a high speed processing can be conducted.

In particular, this second modified example is characterized in that it comprises means for detecting the edge portion of the image on the basis of the difference in the density of the multi-level image data of the neighboring pixels whereby the interpolation is conducted by using the averaged data for the reference pixels in the portion other than the edge portion while the interpolation is conducted by repeating the original data of 300 dpi in the edge portion when the data interpolation from 300 dpi to 600 dpi is conducted. As a result, sharpness of the edge portion can be significantly reproduced in the obtained image.

(Improvement in the Case Where the Numbers of Bits To Be Processed Do Not Agree With Each Other)

In the multi-level data print board 61 of the image output apparatus according to the basis embodiment described with reference to FIGS. 1 to 54B, the number of the gradations of the multi-level data transmitted from the controller and the number of the gradations which can be processed by the printer engine are the same, that is, it is 8 bits. However, an object of the present invention is not only to provide an image output apparatus in which a variety of application softwares can be applied but also to provide an image output apparatus capable of serving as an interface with a variable host computer. There are host computers of the type which is arranged to process the data of the number of gradations which does not agree with the number of the gradations processed by the printer engine. A modified example of the gradation processing to be described later is formed for the purpose of making the apparatus capable of always transmitting the most suitable image output.

Then, the modified example will be described.

First Modified Example

Figure 61:
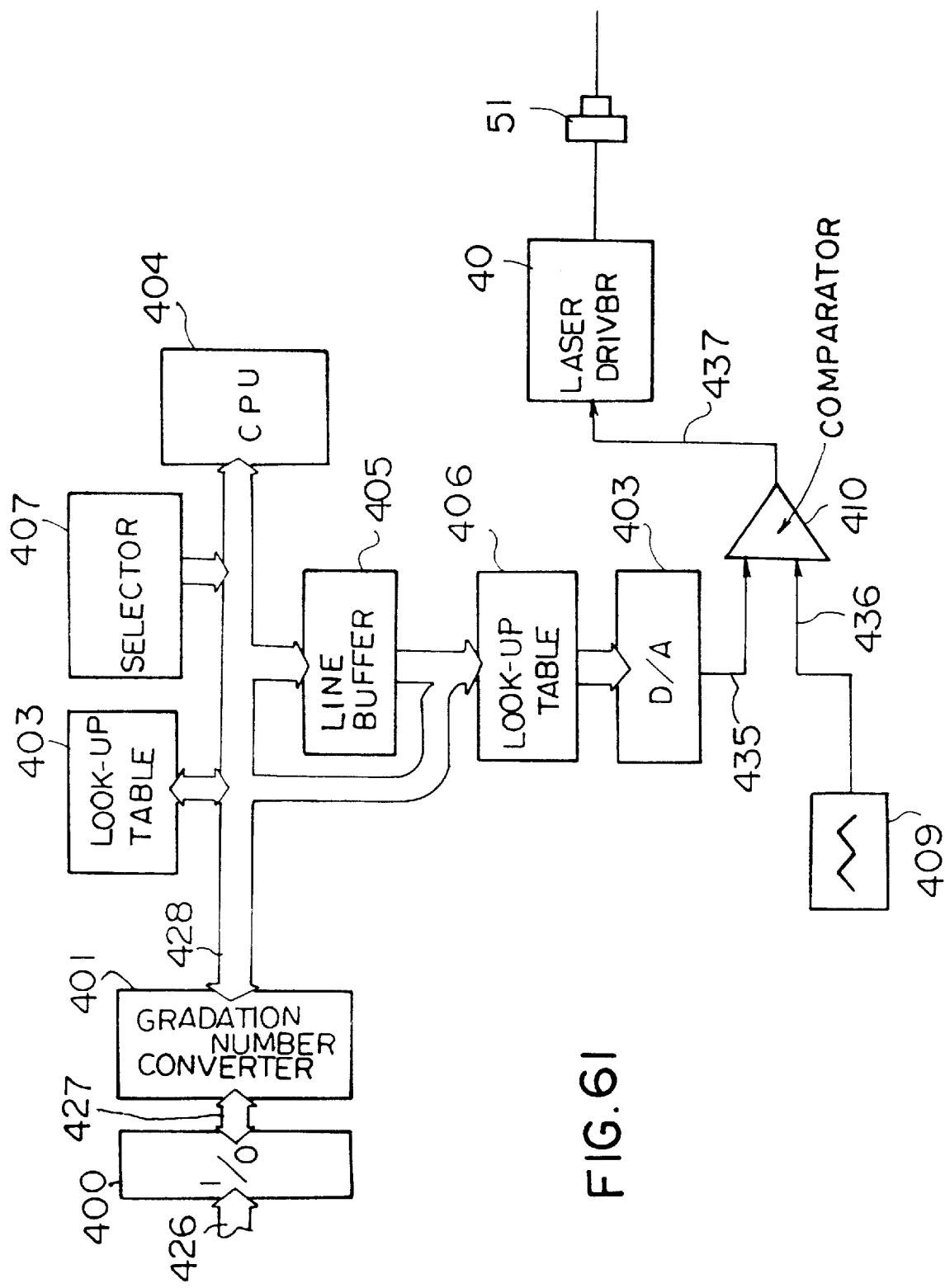
FIG. 61 is a view which illustrates the structure of a modified example arranged for the purpose of overcoming a case in which the number of bits of the received multi-level image data and the number of the bits to be processed in the printer engine do not agree with each other.

In order to simplify the description of this modified example, FIG. 61 is shown, this drawing being illustrated by simplifying the structure shown in FIG. 1 in a conceptive manner and to which a modification is added in accordance with the object of this modified example.

Referring to this drawing, reference numeral 426 represents a multi-level digital image data to be input from the controller 152 or the like to the laser beam printer, this multi-level image data 426 being input to a gradation number conversion portion 410 via an I/O port 400. The gradation number conversion portion 401 acts to covert the number of bits of the image data from m bit to n bit when the number of gradations of the multi-level image data 426 is m bits and when the number of the gradations of the image data which is processed by the laser beam printer is n bits.

According to this modified example, the gradation number m of the input multi-level image data is arranged to be 10 bits, while the gradation number n of the printer is arranged to be 8 bits so that the gradation number conversion portion 401 conducts the conversion from 10 bits to 8 bits.

Figure 62A:
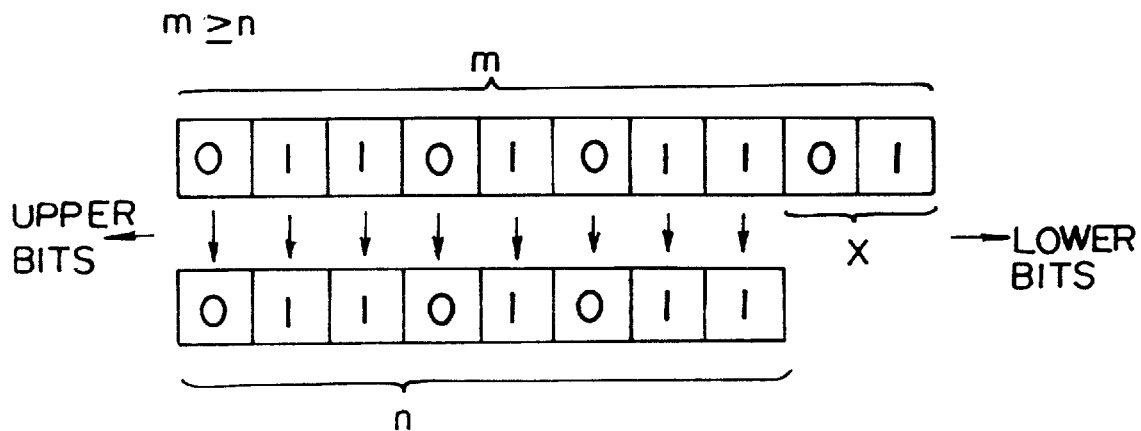
FIGS. 62A and 62B are views which illustrate an example of the varying of the number of gradations of the multi-level image data in the gradation number varying portion shown in FIG. 61.
Figure 62B:
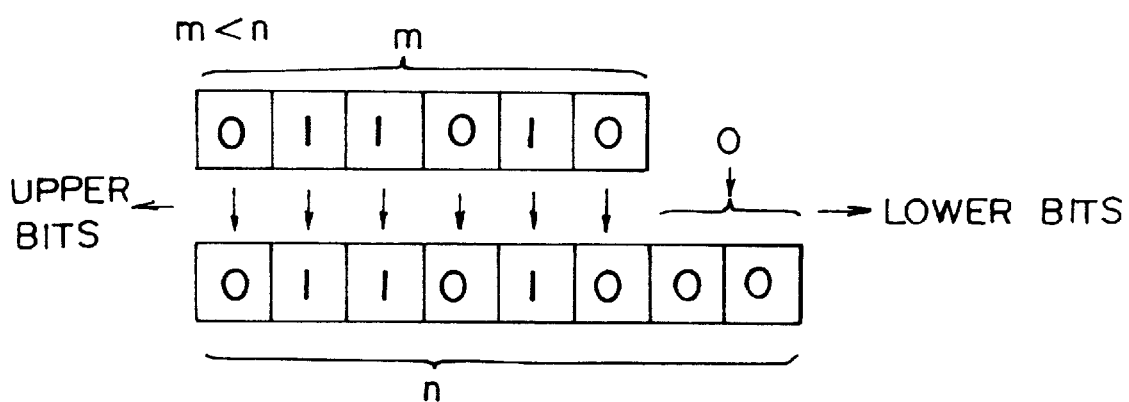

FIGS. 62A and 62B are views which illustrate the method of converting the number of bits performed In the gradation number conversion portion 401.

FIG. 62A is a view which illustrates an example in which a conversion from m bits to n bits is conducted when m=10 bits and n=8 bits (m≧n) where the upper 8 bits of image data of 10 bits is printed by a printer to form an image. FIG. 62B is a view which illustrates an example in which a conversion from m bits to n bits is conducted when m=6 bits and n=8 bits (m<n). In this case, 2-bit "00" is added to the high order of the m-bit data so as to process n-bit data. The image data converted into n-bit data is read through a bus line 428 of a CPU 404 (which corresponds to the control circuit 93 shown in FIG. 26 or the like). The data read as the multi-level image data is successively read out in the line buffer in synchronization with the recording speed during the printing action, the data being read under the control of the CPU 404. The image data corresponding to one line is subjected to a density-conversion processing by a look-up table 406 formed by a RAM.

Figure 63:
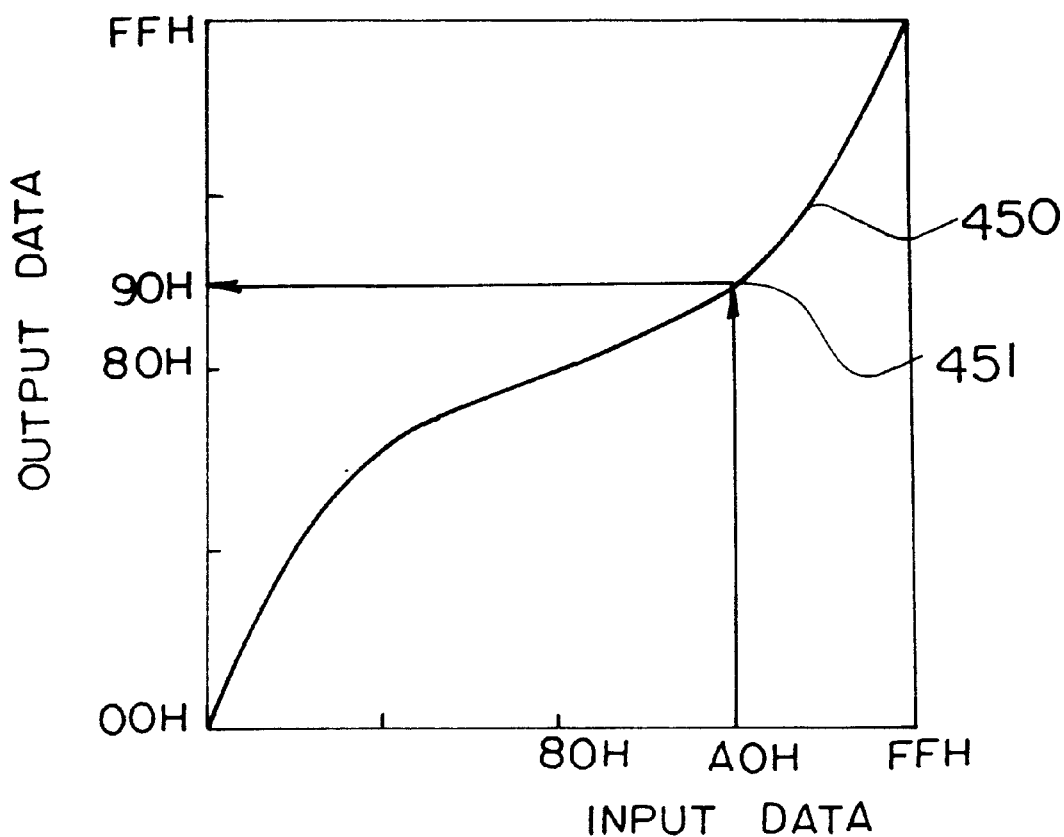
FIG. 63 is a view which illustrates an example of the varying of the image data in a system in the look up table shown in FIG. 1.

FIG. 63 is a view which illustrates an example of the contents of the look-up table 406. As show in this drawing, the look-up table 406 stores the characteristics of the output data designated by a curve 450 with respect to the input data. That is, the input data (the 8-bit image data) is input to the address line of the look-up table 406 and data stored in this address is transmitted to a D/A converter 408. Therefore, as designated by the curve 451 shown in FIG. 63, when $AO_H$ (H represents a hexadecimal number) in input as the density data for the image, it is converted by the look-up table 406 into $90_H$ so as to be transmitted.

Then, the description is made with reference back to FIG. 61, reference numeral 407 represents a selector capable of selecting the most suitable conversion table from a plurality of look-up tables 403 formed by ROMs. The conversion table selected by the selector 407 is loaded in the look-up table 406 formed by RAMs under the control of the CPU 404.

Figure 64A:
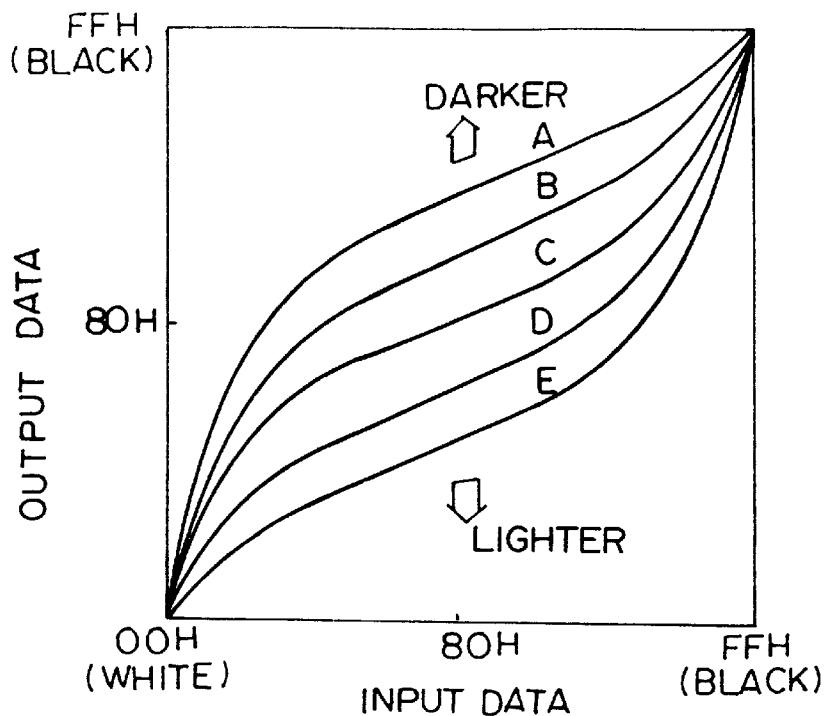
FIGS. 64A and 64B are views which illustrate an example of the varying of the image data in a system in the look up table shown in FIG. 1.
Figure 64B:
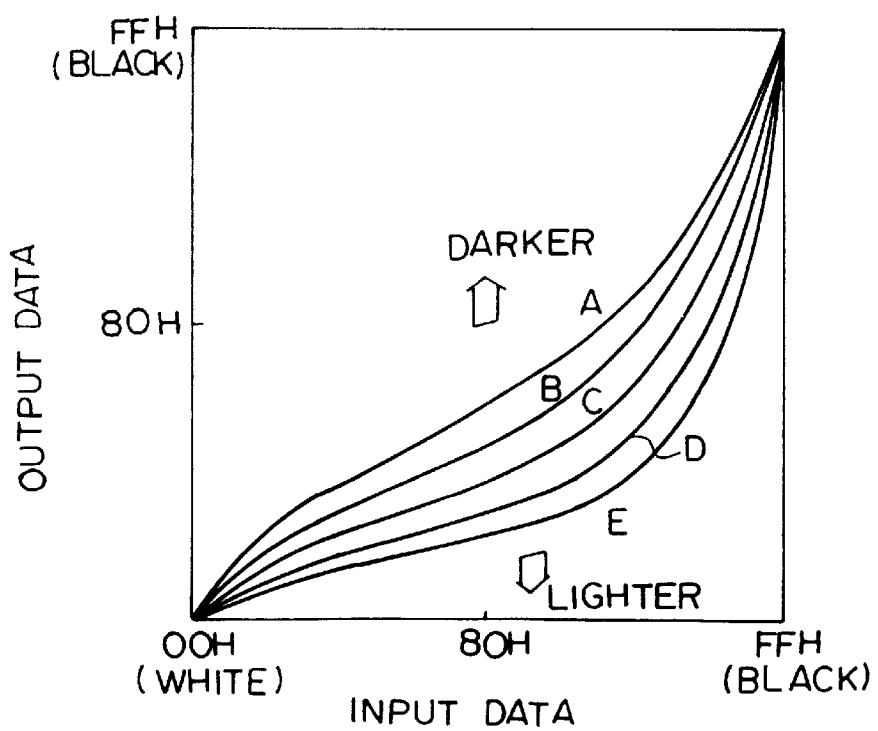

It is assumed that a plurality of conversion tables are stored in the look-up table, the conversion tables having the data characteristics shown in FIGS. 64A and 64B.

The data characteristics shown in FIG. 64A are formed in consideration of the output characteristics of the printer, with which when B and A are selected with respect to a standard value C, the output image can be made dark, while when D and E are selected, the output image can be made light. The data characteristics shown in FIG. 64B are formed by correcting the characteristics shown in FIG. 64 with logarithm, the data characteristics including both the output characteristics of the printer and the input signal characteristics of CCD such as the image input apparatus.

Figure 71A:
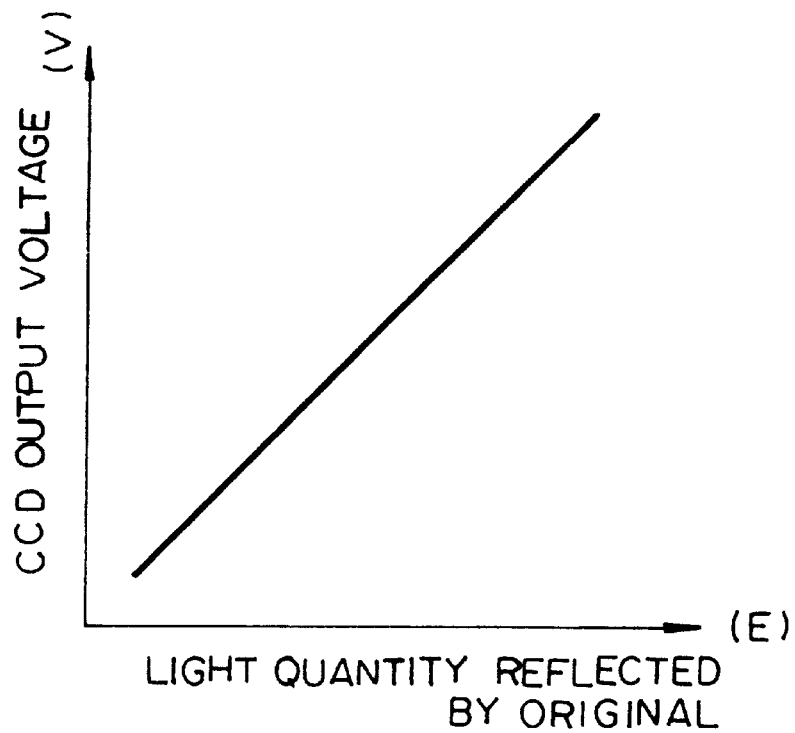
FIGS. 71A and 71B are views which illustrate the relationship between the output voltage from a CCD and the light quantity reflected from the original or the density of the original.
Figure 71B:
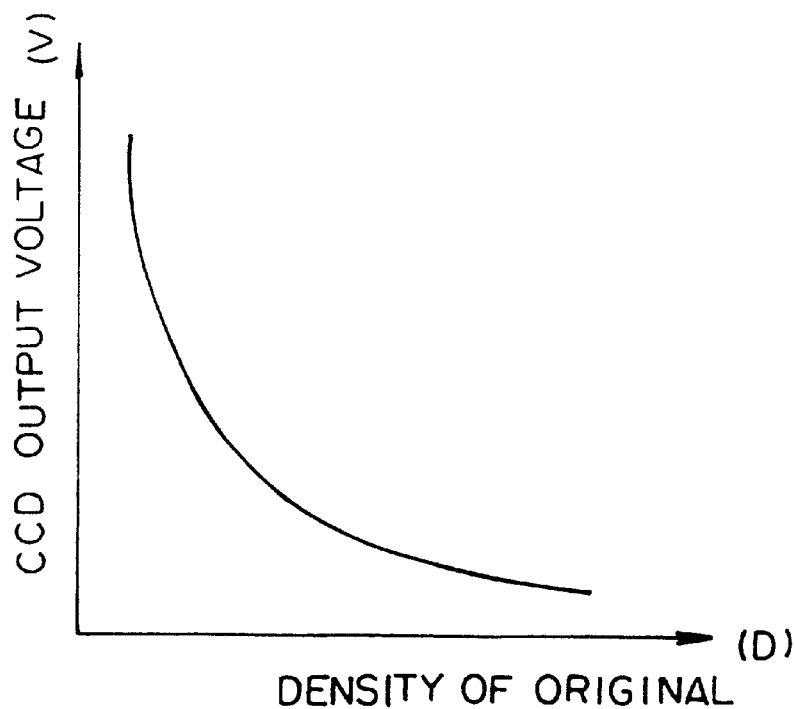
Figure 72:
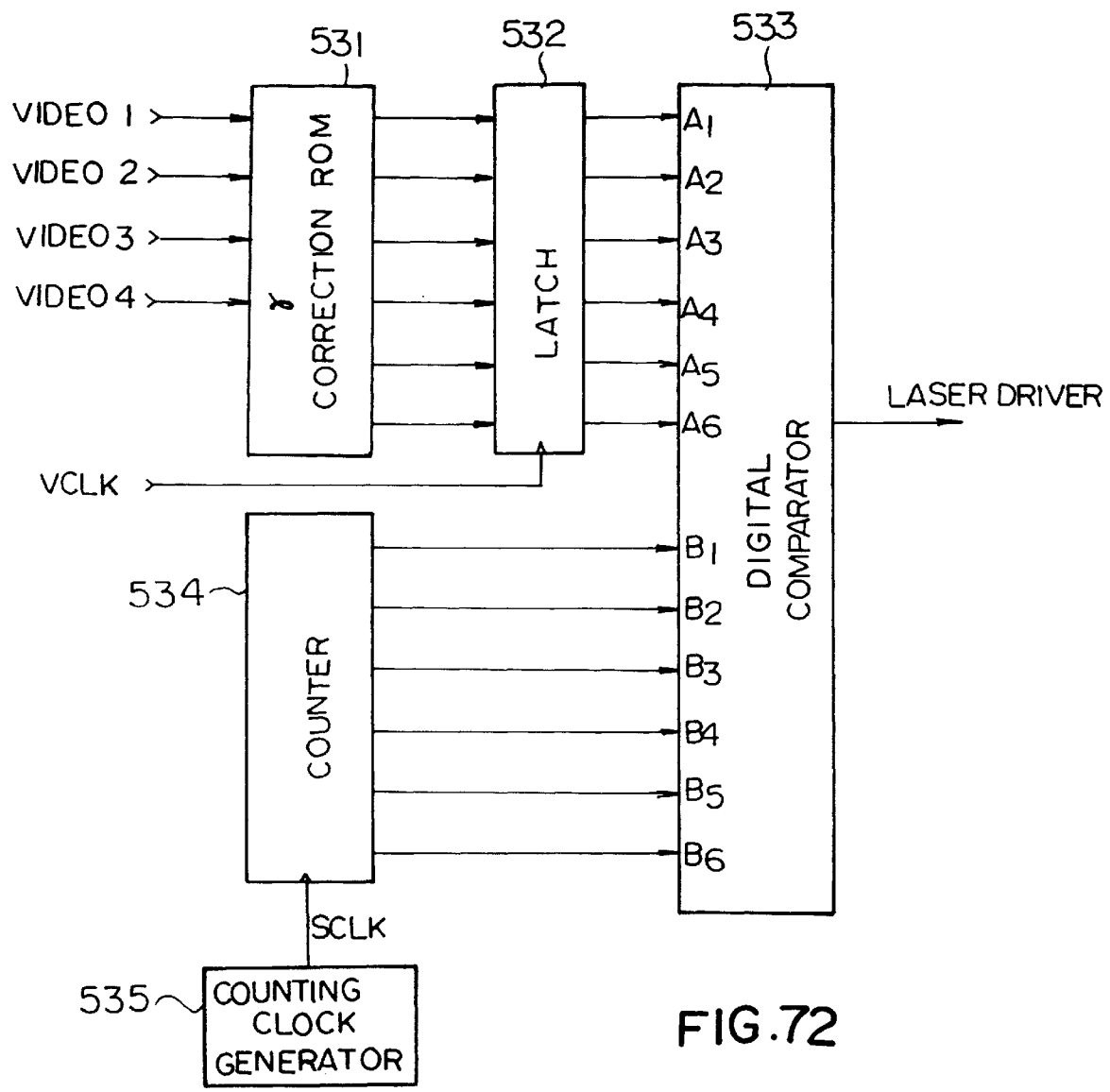
FIG. 72 is a block diagram which illustrates an image processing portion of an image forming apparatus according to a modified example of the γ correction.

The characteristics of the output voltage from the CCD are shown in FIGS. 71A and 71B. FIG. 71A is a view which illustrates the relationship between the quantity of light reflected by the original and the output voltage from the CCD. As is shown from this drawing, the quantity of light reflected and the output voltage from the CCD is substantially in proportion with each other. FIG. 71B is a view which illustrates the relationship between the density of the original and the output voltage from the CCD. As is shown from this drawing, the relationship between the density of the original and the output voltage from the CCD does not display the linear form. Therefore, FIG. 64B is a view which illustrates the corrected relationship between the density of the original and the output voltage, where B and A act to adjust the output image to darker side while D and E act to adjust the output image to lighter side.

Figure 65:
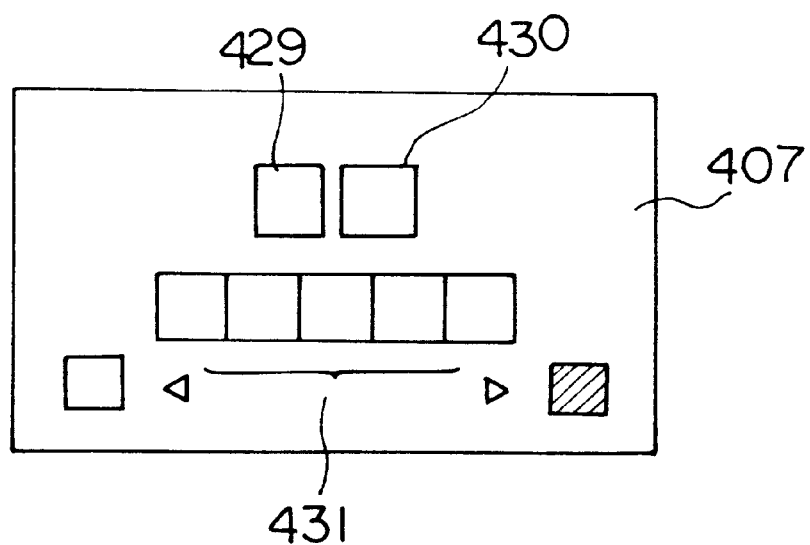
FIG. 65 is a view which illustrates an example of the structure of the selector shown in FIG. 1.

FIG. 65 is a view which illustrates the structure of the selector 407 according to this embodiment, this selector 407 being provided on the operation panel of the printer. As a result, it can be operated by the operator whereby a desired table can be selected from the look-up table 403. Referring to FIG. 65, reference numerals 429 and 430 represent switches each of which acts to correspond to the characteristics of the image reading apparatus. When the switch 429 is pressed, the characteristic table shown in FIG. 64A is selected, while when the switch 430 is pressed, the look-up table having the characteristic shown in FIG. 64B is selected. The witch 431 formed by 5 series portions serves as a switch with which the density can be adjusted so that any of the characteristics A to E shown in FIG. 64A or 64B is selected. The switch 431 is arranged such that the density is raised along the direction from left to right, where the portions of the switch 431 correspond, from left to right, to E, D, C, B, and A.

Since the multi-level image data is arranged to be 8 bit, that is 256 gradations according to this modified example, the look-up table 406 needs to have a memory region of 256 bytes. Since the look-up table 403 stores, as shown in FIGS. 64A and 64B, 10 types of look-up tables in all, it needs to have a memory region of about 2.5 K bytes. In the case where a further large number of the look-up table is necessary, memory is intended to be saved by, for example, a method arranged such that a logarithmic conversion table is prepared as an alternative to the look-up table shown in FIG. 64B, and a table shown in FIG. 64B is synthesized from the logarithmic conversion table and the look-up table shown in FIG. 64A.

The 8-bit gradation data which has been thus corrected by the look-up table 406 is, by the D/A converter 408, converted into an analog signal 435 of 256 levels. This analog signal is subjected, by a comparator 410, to a comparison with a triangular wave 436 having a predetermined cycle and transmitted from a signal generator 409 so that it is subjected to the conversion from a signal in the direction of the depth to a signal in the direction of the length, that is, the pulse width modulation. An output signal 437 from the comparator 410 is input to the laser driver 40 so that the semiconductor laser 51 is operated. The signal generator 409 and the comparator 410 are the similar components to those in the PWM circuit 87 shown in FIG. 20A.

Figure 66:
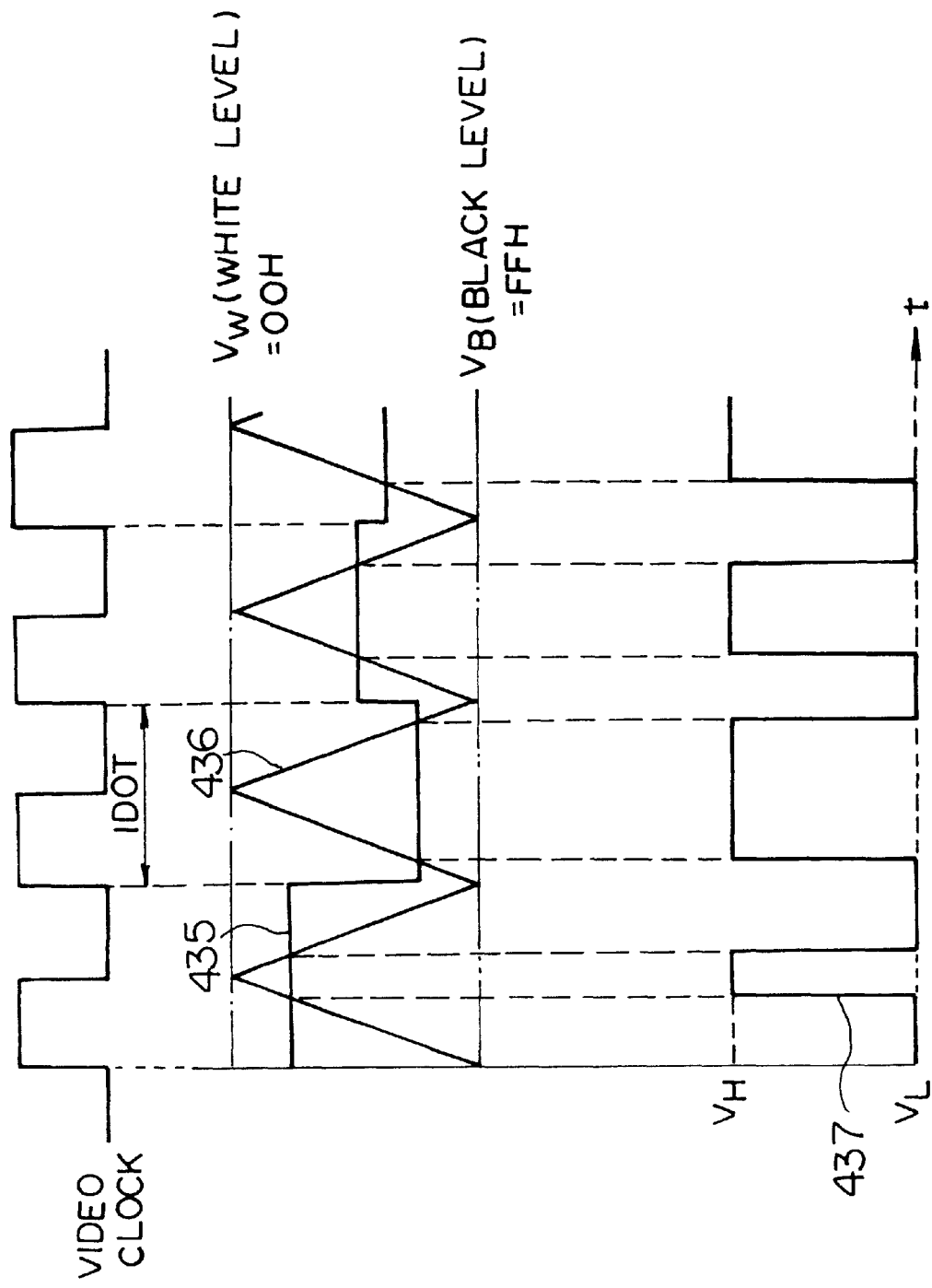
FIG. 66 is a view which illustrates an example of the modification of the pulse width performed by a comparator.

FIG. 66 is a view which illustrates an example of binary data to be transmitted from the comparator 410. The signal 435 shown in FIG. 66 is the analog signal transmitted from the D/A converter 408, while the signal 436 is the triangular wave 436 transmitted from the signal generator 409, they being brought into synchronization with a video clock as illustrated. The signal 437 is a signal obtained by synthesizing the signals 435 and 436 show in FIG. 66 after the comparison made by the comparator 410, that is, it is the signal which has been pulse-width modulated. That is, when signal 435≦signal 436, the output from the comparator 410 becomes "1".

The signal 436 transmitted from the signal generator 409 may be so far as it is a repetition signal with a predetermined cycle. It does not need to be the triangle wave according to this embodiment.

As described above, the number of gradations of the image signal from the host side can be made correspond to the number of gradations of the printer side and the gradation correction characteristics can be selected and adjusted by the selector, as shown in FIG. 65, which is capable of adjusting the image quality.

The image signal 426 input from the host computer to the printer may be either the parallel signal or a serial signal. The number of gradations of the multi-level image data 426 may be switched upon an instruction with a signal supplied from the host side. Alternatively, it may be instructed by switching a dip switch provided on the operation panel or the like on the printer. In addition, the number of bits of image data to be processed in the printer side may be switched. In this case, the gradation number conversion portion 1 may be used, and also a structure may be employed which is arranged such that the number of bits of the image data to be recorded can be switched by the look-up table 406.

Second Modified Example

According to the first modified example, the number of gradations for the input and that for the output in the gradation number conversion portion 401 shown in FIG. 61 are matched as shown in FIGS. 62A and 62B. In this state, in case where:

(the number of bits m for the input gradation)<(the number of bits n for the output gradation)

data "00" is arranged to be added to the lower bits in which corresponding data is not present as shown in FIG. 62B.

Figure 67:
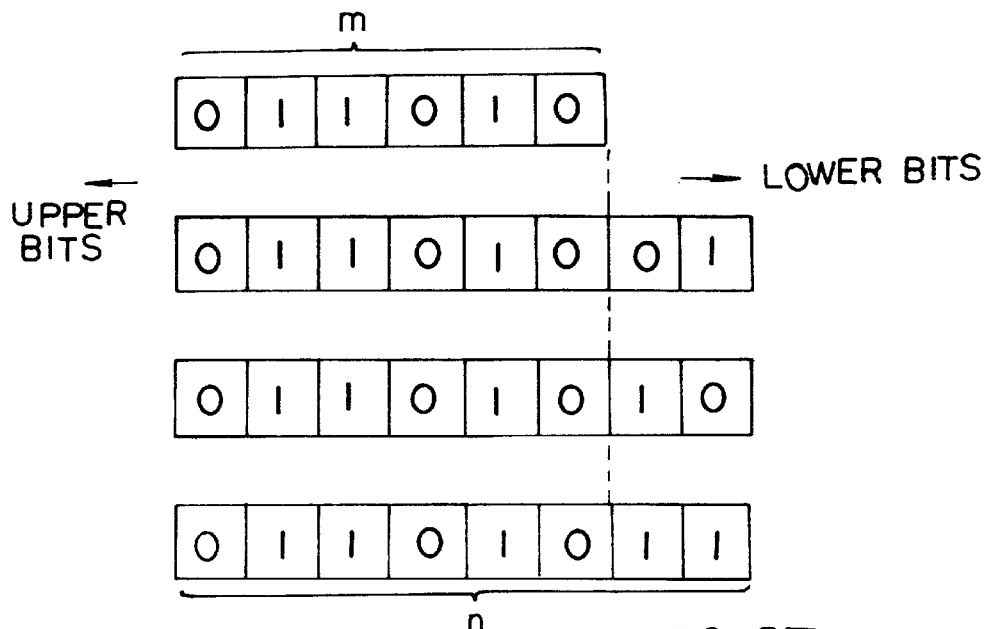
FIG. 67 is a view which illustrates a modified example of the structure shown in FIG. 62, and in which an example of the number of gradations in the gradation number varying portion is illustrated.
Figure 68:
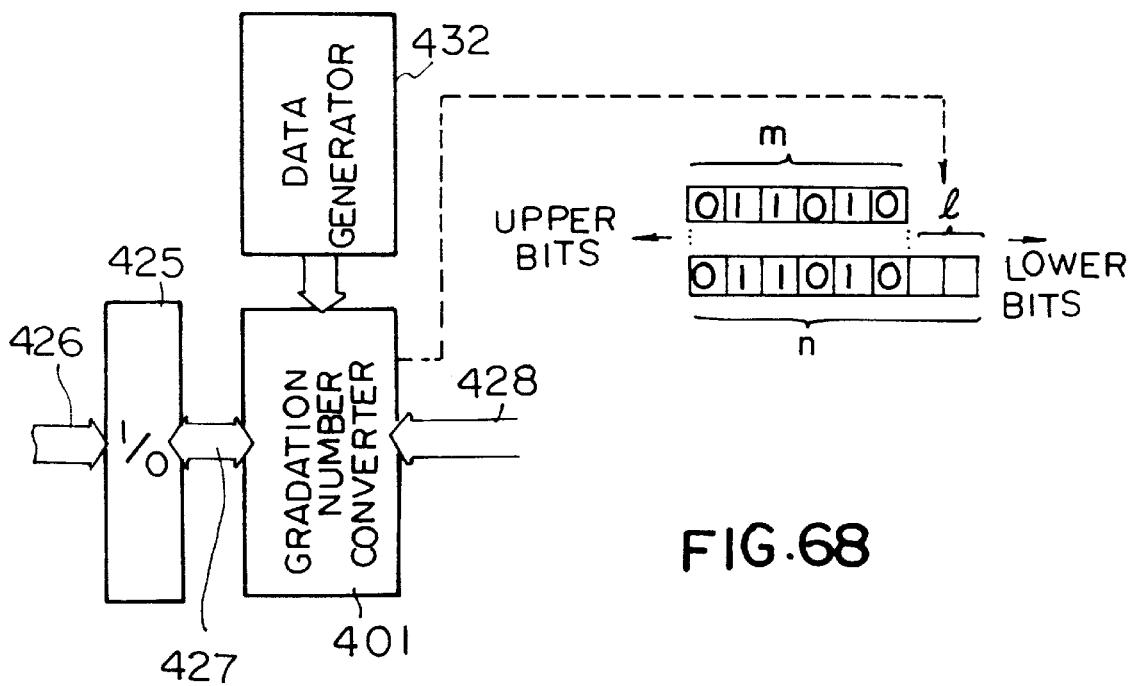
FIG. 68 is a view which illustrates the gradation number varying portion according to the modified example shown in FIG. 67.

Then, a second modified example will be described. For example, when the lower two bits are, as shown in FIG. 62B, left, "01", "10", or "11" may be input as shown in FIG. 67 as an alternative to "00". However, when the constant as described above is input, a false outline can be formed in the half tone portion in the print output in a case where the number of bits n for the input gradation is not sufficiently large. Therefore, a data generator 432 capable of inputting suitable data to the subject portion as shown in FIG. 68 and data to be added to the lower bit 1 for the output is instructed when $$l=(\text{output bit } n)-(\text{input bit } m)$$

so that the generation of the false outline can be prevented. According to this modified example, a random number generator used to serve as the data generator 432 displayed an excellent result.

If the lower 1 bit is covered by using a periodically variable, a periodical stripes can be generated when a half tone which changes gradually is reproduced. In terms of this, the random number as described above is preferably employed.

Third Modified Example

According to the second modified example, when (the number of bits m for the input gradation)<(the number of bits n for the output gradation), the random number is applied to the lower bit (n−m) of the output. In a case where the density is gradually changed, a bit (n−m) may be formed on the basis of data about the density of the pixels surrounding the subject pixel.

FIGS. 69 and 70 are views which illustrate an example in which a subject pixel disposed at i-row and j-column is corrected in the input multi-level data. FIG. 69 is a view which illustrates the data before the correction, while FIG. 70 is a view which illustrates data after the correction. Where m=6 bits and n=8 bits. This correction is conducted by averaging the density of the region formed by 5×5=25 pixels (a region 490 shown in FIG. 69), this region having a side of (n−m)×2+1=5 centering the subject pixel $x_{ij}$. That is, the pixel after the correction can be given by:

$$x'_{ij} = \sum_{k=i-2}^{i+2} \sum_{l=j-2}^{j+2} \frac{x_{kl}}{25} \quad (12)$$

When a correction was conducted on the basis of information about the surrounding pixels, the false stripe can be prevented in the case where m is not sufficiently large with respect to n. However, the processing of the type described above arose a problem in that the sharpness of the portion in which the density is rapidly changed can be made dull. Therefore, the change in the density in the region 490 shown in FIG. 69 is examined and the thus-obtained result is taken in consideration in the correction, causing the above-described problem to be overcome.

For example, an excellent result was obtained from a processing arranged such that the above-described averaging correction is not conducted if a pixel which displays a change exceeding $x_{ij} \pm 2^{(n-m)}$ with respect to the subject pixel $x_{ij}$ is present.

Although the description was made about the structure according to the pulse-width modulation method in which laser beam printer is employed, the image forming apparatus may comprise an electrophotography printer such as an LED printer whose light source is arranged to be an LED array or an LCD printer. Furthermore, it may comprise a thermal printer, thermal transfer printer, or an ink jet printer. This modified example can be applied not only to the case in which the output in the direction of the depth for one dot but also to the printers capable of creating half tone by using the binary processing in accordance with the dither method so far as the printers processes the multi-level input image information.

According to the above-described three modified examples, the number of gradations of the input image data and the same of the printer can be matched by inputting multi-level image data and by converting the number of gradations of the thus-input multi-level image data to match the number of gradations which can be processed by the printer. Furthermore, the number of gradations and the gradation characteristics of the data source such as the host computer and those of the printer portion can be readily matched by adjusting the gradation characteristics and the gradation correction characteristics of the image data after the conversion.

(Modified Example of γ Correction)

Figure 12:
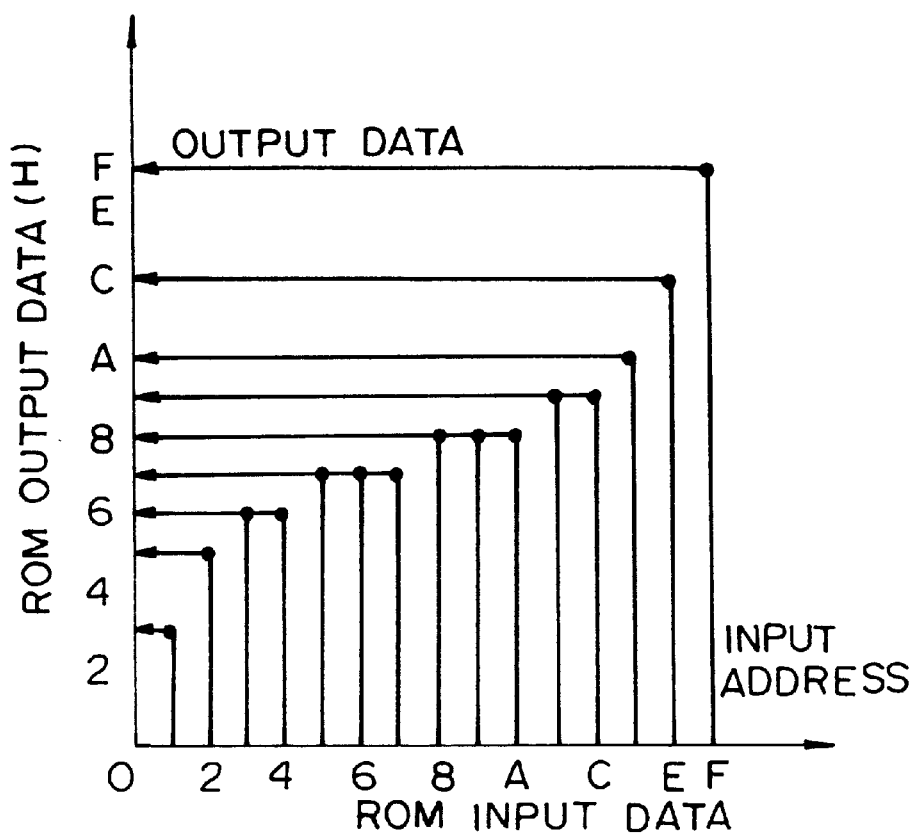
FIG. 12 is a view which illustrates an example of a conventional γ correction characteristic.
Figure 14:
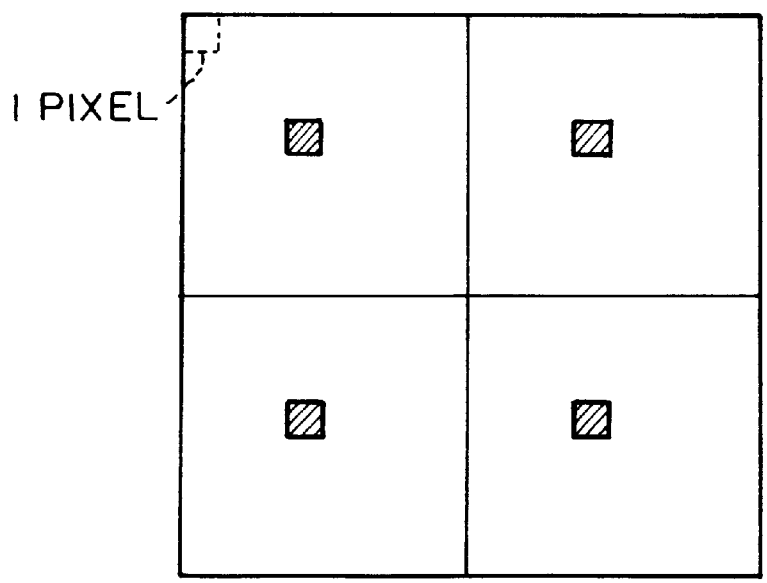
FIG. 14 is a schematic view which illustrates a case in which the minimum density printing conducted in accordance with the conventional dither method.

In the multi-level data print board 61 of the image output apparatus serving as the recording apparatus according to the embodiment described with reference to FIGS. 1 to 54, the γ correction is conducted in the D—D conversion circuit 82 shown in FIG. 53. Its characteristics involve a defect similarly to the characteristics described with reference to FIG. 12 (which are the same as the characteristics of the 4-bit data), the defect being arisen in that the gradation of the input image signal substantially deteriorates at the output stage.

This modified example is suggested in order to overcome the above-described problem. An example of the specific stricture is shown in FIG. 71. The modified example shown in FIG. 71 is applied to a case in which 4-bit image data is processed for the convenience of the description. Referring to this drawing, a γ correction ROM 531 inputs 4-bit density (16 gradations) image data VIDEO1 to VIDEO4 from the external device and transmits 6-bit image data which has been γ-corrected. A latch 532 latches the image data which has been γ-corrected, this latching being conducted with the image clock signal VCLK. A clock generator 535 generates the counter clock signal SCLK whose frequency is 64 times that of the image clock signal VCLK. The counter 4 counts the clock signal SCLK between the image clock signals VCLK. That is, 64 clock signals VCLK are counted between the image clock signals VCLK. A digital comparator 533 modulates the pulse width of the image data after the γ correction by making a comparison between the latch 532 and the output of the counter 534 so that a laser driver (omitted from illustration) is driven by the thus-obtained pulse width modulation signal.

Figure 73:
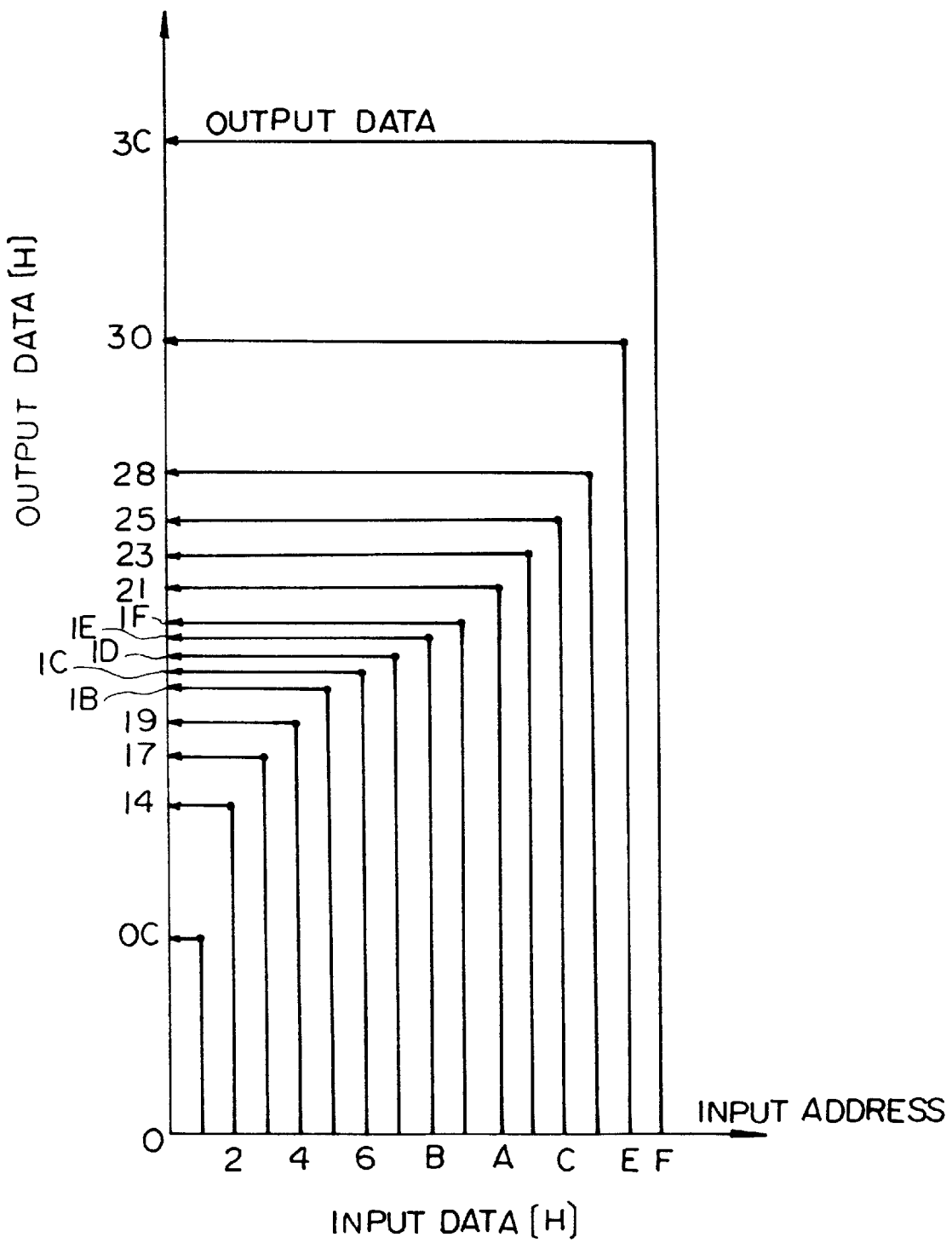
FIG. 73 is a view which illustrates an example of the γ correction characteristic according to the modified example shown in FIG. 72.

FIG. 73 is a view which illustrates an example of the γ correction characteristics according to this modified example. Referring to this drawing, one pixel input is arranged to display 16 gradations ($O_H$ to $F_H$), this pixel being converted with a predetermined γ characteristic and this γ characteristic being then subjected to a sampling by 64 resolutions. Therefore, input 16 gradations is transmitted by 6-bit data with 16 gradations ($00_H$ to $3C_H$) displayed without deterioration in the gradation after the γ correction. FIG. 75 is a view which illustrates the address map for the γ correction ROM according to this modified example.

Figure 74:
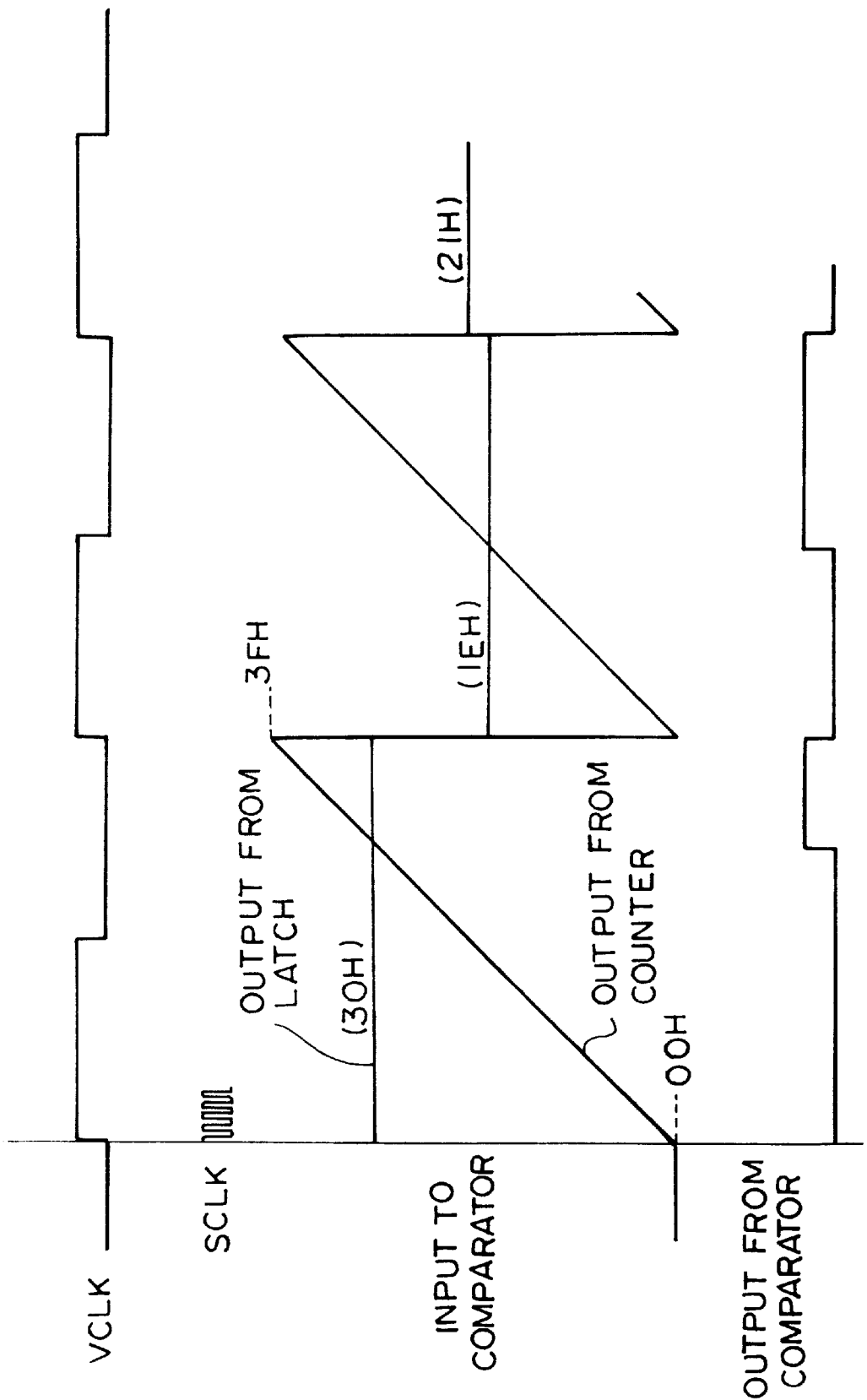
FIG. 74 is a timing chart which illustrates the operation of the structure shown in FIG. 72.

FIG. 74 is a timing chart about the operation performed by the structure shown in FIG. 71. Referring to this drawing, 64 counter clock signals SCLK are present in one cycle of the image clock signal VCLK. The counter 534 counts $00_H$ to $3F_H$ at each cycle of the image clock signal VCLK so that a so-called saw-tooth-wave is formed. On the other hand, the output from the latch 2 is changed every cycle of the image clock signal VCLK, this change being ranged for 16 types. A comparator 533 transmits a signal of a logical level of "1" only in the region in which the output from the counter 534 exceeds the output from the latch 532 on the basis of the result of a comparison between the output from the latch 532 and the counter 534. As a result, a so-called PWM signal having a pulse width (16 gradation) which corresponds to the density of the image data can be obtained.

Figure 76:
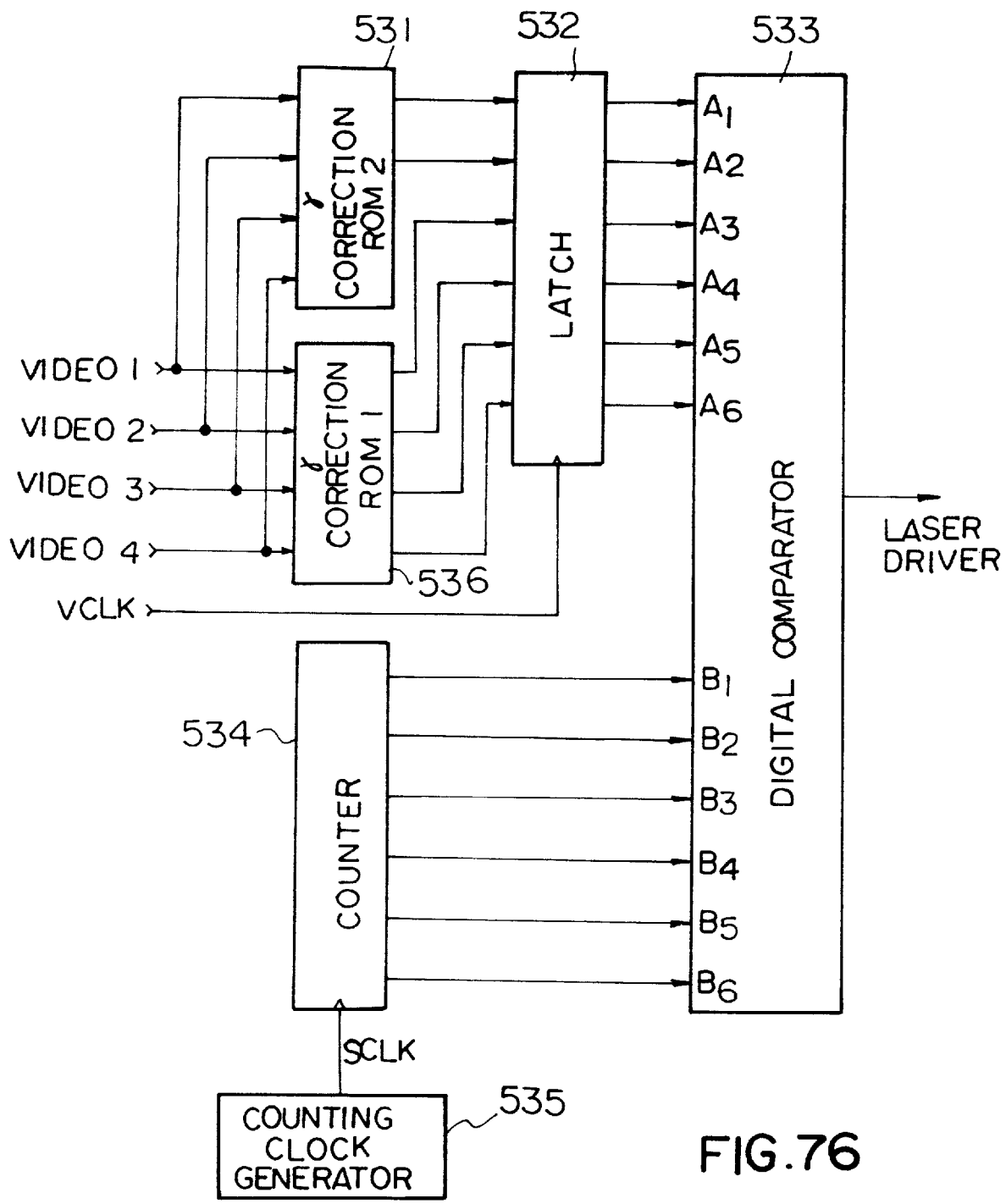
FIG. 76 is a block diagram which illustrates the image processing portion of the image forming apparatus according to other modified example of the modified example shown in FIG. 72.

FIG. 76 is a block diagram which illustrates a further modified example of the gradation processing portion according to the modified example shown in FIG. 71. The same components as those shown in FIG. 71 are given the same reference numerals. Referring to this drawing, a first γ correction ROM 536 has a γ conversion characteristics of the type for example shown in FIG. 12, this γ correction ROM 536 being capable of inputting and transmitting 4-bit data. This 4-bit output is input to the upper 4 bits of the digital comparator 533 via the latch 532. A second γ correction ROM 537 has a conversion characteristics as shown in the address map of the type, for example, shown in FIG. 77, this second γ correction ROM 537 being capable of inputting 4-bit data and transmitting the lower 2-bit data. The 2-bit output is input to the lower 2 bits of the digital comparator 533 via the latch 532. The digital comparator 533 conducts comparison between the output from the latch 532 and the same from the counter 534 and thereby modulates the pulse width of the image data after the γ-correction so that the laser driver 40 is driven by this pulse width modulation signal.

Figure 78:
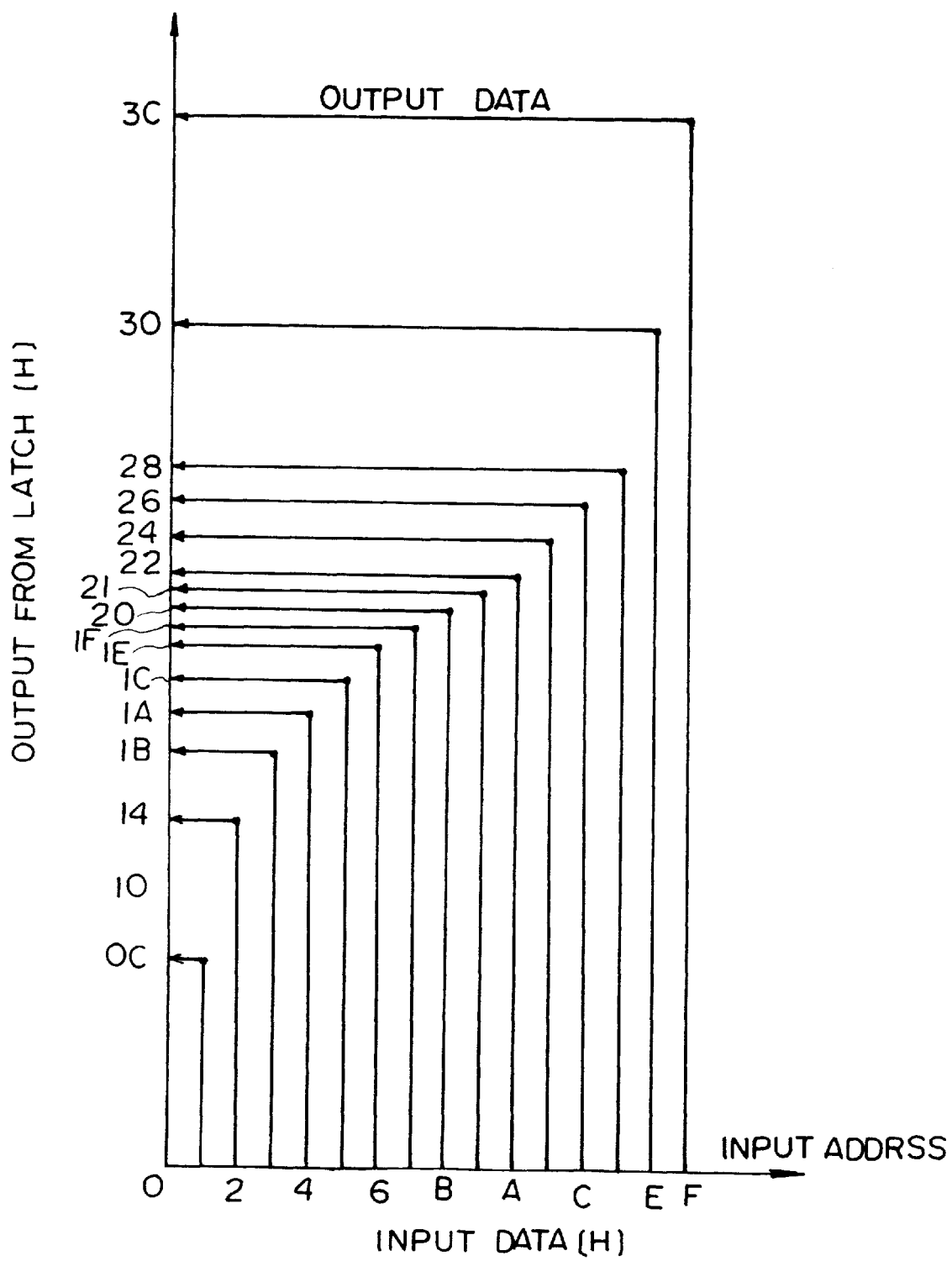
FIG. 78 is a view which illustrates an example of γ correction characteristics according to other modified example.

FIG. 78 is a view which illustrates an example of the γ correction according to the modified example shown in FIG. 76.

Two examples of the modified example of the γ correction have been described. Although the processing of 4-bit image signal is described in these modified example, it can, of course, be applied to the 8-bit image signal similarly to the printer engine shown in FIG. 20A. Furthermore, according to these two modified examples, the pulse width modulation is utilized for realizing the conversion from the density of the input image signal to the output image signal. Alternatively, the dither processing or the like may be utilized.

Thus, according to the modified example of the γ correction, the resolution is raised by making the number of bits input to the address of the γ correction ROM larger than that of data input so that the γ correction is conducted without any lowering of the number of gradations. As a result, if the number of dots is the same between the input to the ROM and the output from the same, the γ correction can be conducted without any lowering of the gradation.
(Modified Example of the Pulse Width Modulation Processing)

Figure 13:
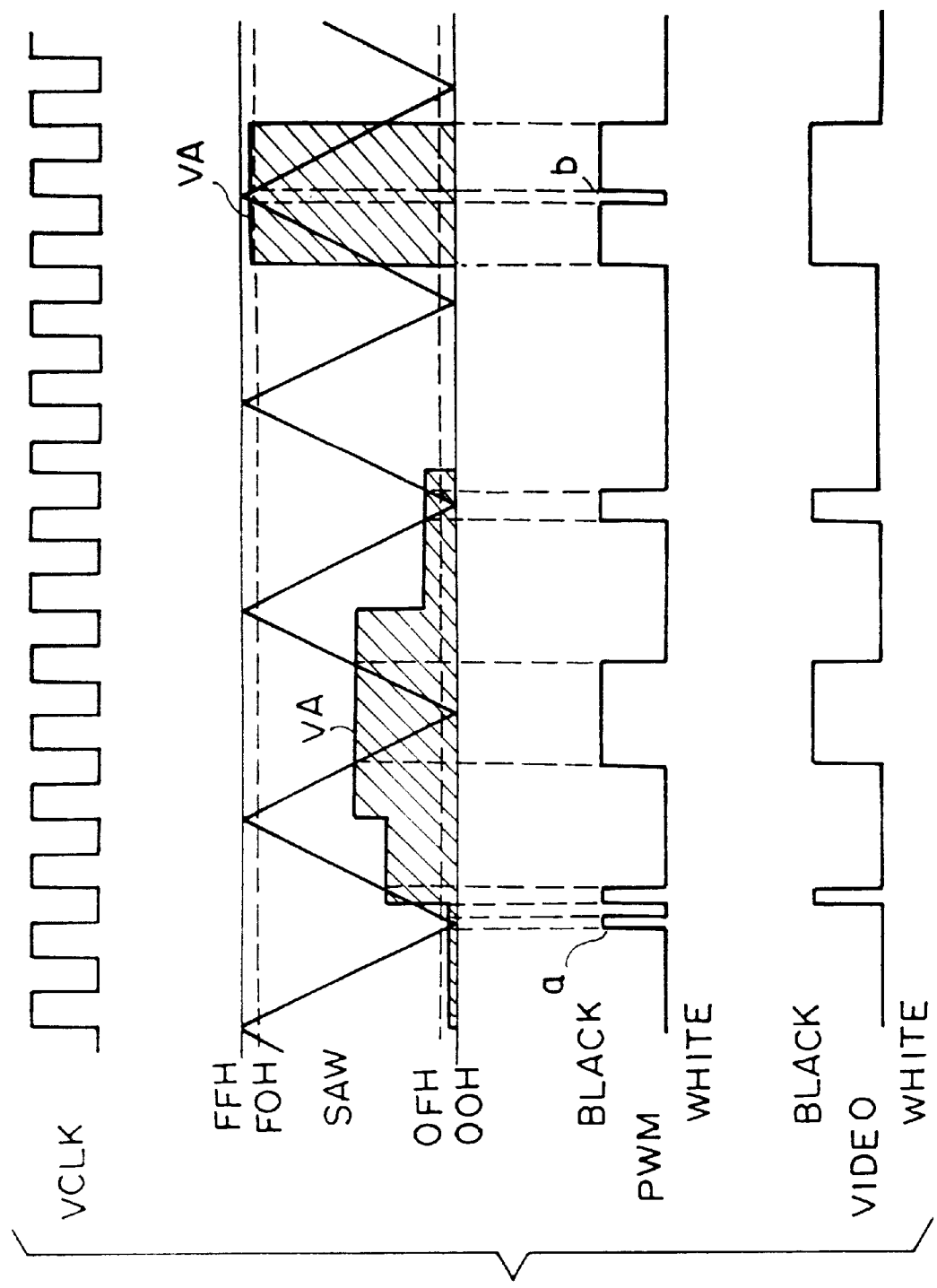
FIG. 13 is a timing chart which illustrates a state in which "fog" or "clear portion" generates in a block or a white portion.
Figure 15:
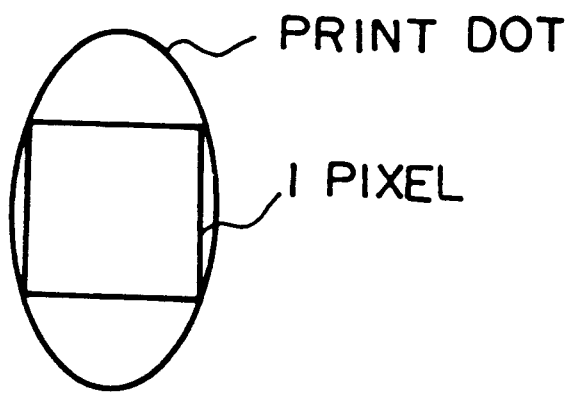
FIG. 15 is a schematic view which illustrates a pattern of a pixel to be actually printed.
Figure 16:
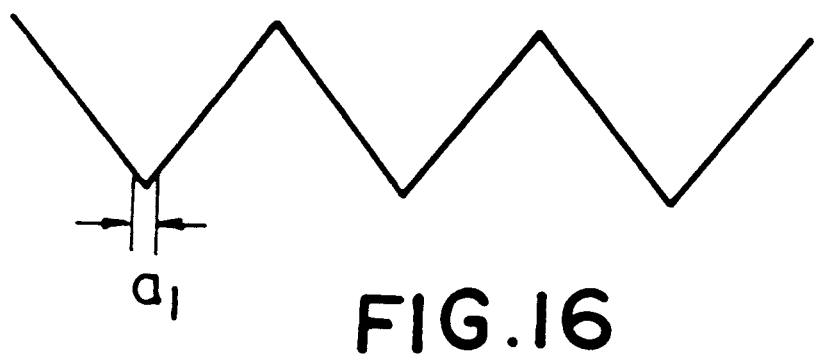
FIG. 16 is a view which illustrates the waveform of a pattern signal used in the conventional pulse width modulation method.
Figure 17:
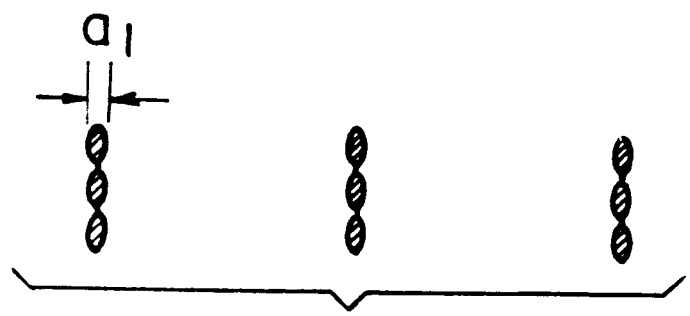
FIG. 17 is a schematic view which illustrates the minimum printing width in an electrophotographic printer.
Figure 18A:
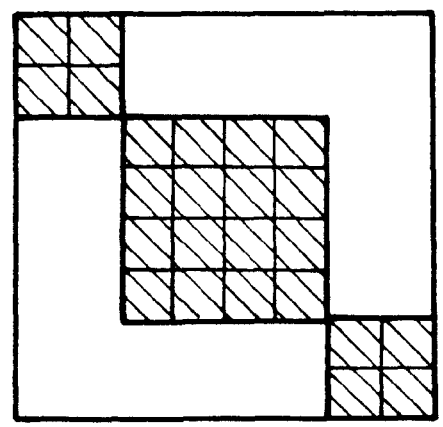
FIGS. 18A to 18C are schematic views which illustrate a specific example of the half-tone pattern when the screen angle is changed in accordance with the conventional method.
Figure 18B:
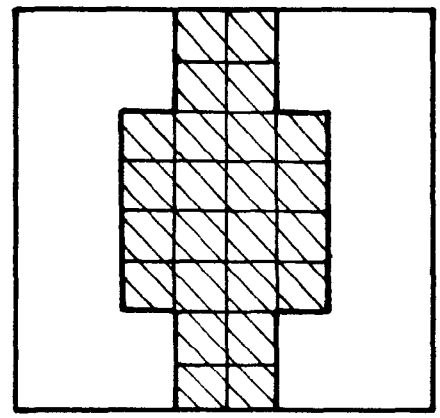
Figure 18C:
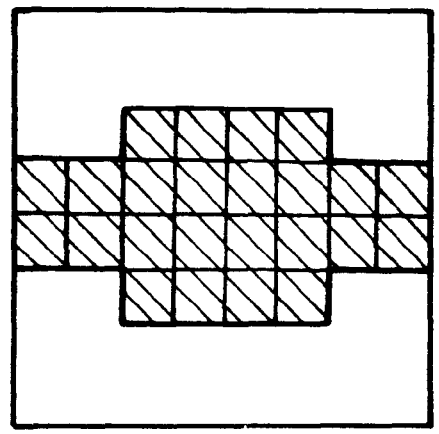
Figure 19C:
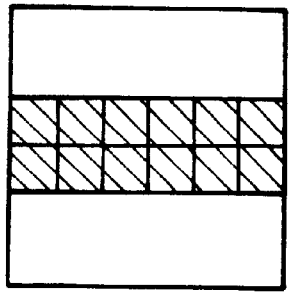
FIGS. 19A to 19E are schematic views which illustrate a specific example of the half-tone pattern when the screen angle is changed in accordance with another conventional method.
Figure 19B:
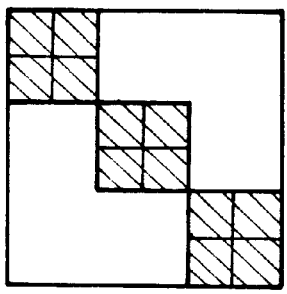
Figure 19E:
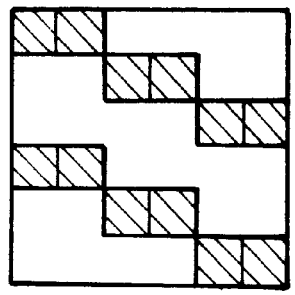
Figure 19A:
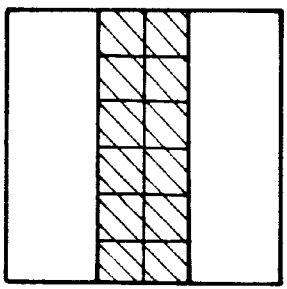
Figure 19D:
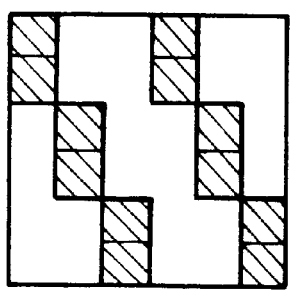
Figure 79:
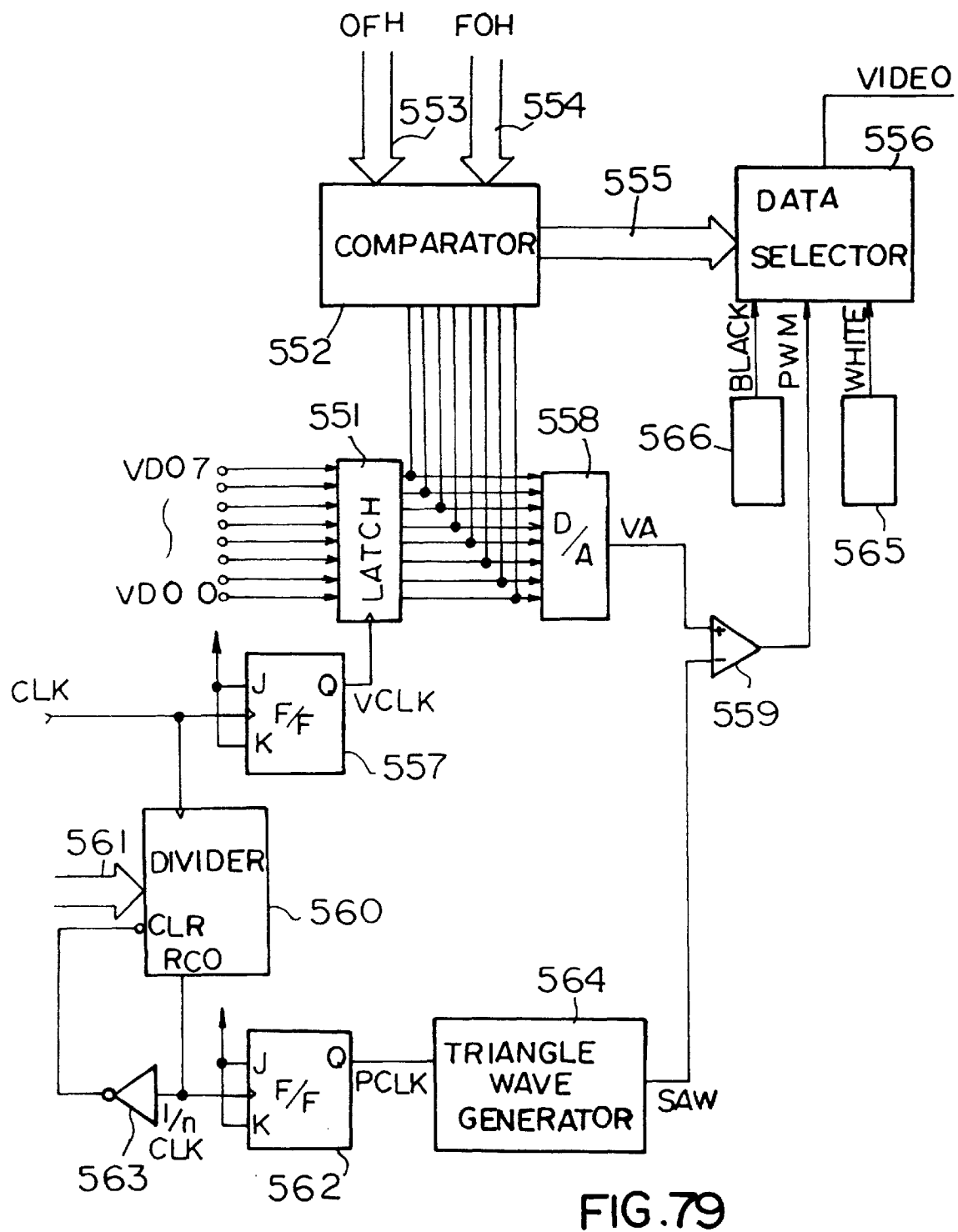
FIG. 79 is a view which illustrates the structure of a modified example of the pulse width modulation.

This modified example is capable of overcoming the conventional problem described in the chapter (e) with reference made to FIG. 13. This problem is a problem in that the quality of the reproduced recorded image deteriorates due to generation of fog in the white portion in the recorded image and lack in the black portion. In order to this problem, the following three modified examples are suggested.
First Modified Example FIG. 79 is a view which illustrates the structure of a first modified example of the pulse width modulation processing. Referring to this drawing, reference numeral 552 represents a comparison circuit which is capable of making a comparison between the digital value of the 8-bit digital image signals $VDO_0$ to $VDO_7$ and predetermined values 553 and 554 and thereby transmitting the result of the comparison as output data 555. A data selector 556 selects any of three input signals to be described later so as to transmit the selected signal as the image signal Video in accordance with output data from the comparison circuit 552, the three input signals representing "White", "PWM", and "Black".

The operation of the image processing apparatus according to this modified example will be described with reference to the timing charts shown in FIG. 79 and 13. First, 8-bit digital image signals $VDO_0$ to $VDO_7$ latched by the latch circuit 551 with the image clock signal VCLK are input to the comparison circuit 552 in which a comparison between the predetermined value 553 and 554 is made. Where the predetermined value 553 is a value which determines the slice level of the white pixel of the image signals $VDO_0$ to $VDO_7$, it being arranged to be, for example, "FO"$_H$. The result of the comparison made in the comparison circuit 552 is transmitted on to the data bus 555 so as to be input to the data selector 556.

On the other hand, the three signals are input to the data selector 556, the three signals being consisting of a signal "White" transmitted from a white pixel signal generating circuit 565, the signal "PWM" which has been subjected to the pulse width modulation by the triangular wave SAW generated by a triangular wave generating circuit 514 (which corresponds to the counter 534 shown in FIG. 71), and the signal "Black" transmitted from a black pixel signal generating circuit 566. These three signals are selected on the basis of the result of the output from the comparison circuit 552. For example, when the digital value of the image signals $VDO_0$ to $VDO_7$ is smaller than the predetermined value 553 "OF"$_H$ (a shown in FIG. 13), the signal "White" is selected by the data selector 556, this signal being then transmitted as the image signal Video. As a result, the subject pixel is printed as a binary white pixel. When the digital value of the image signals $VDO_0$ to $VDO_7$ is larger than the predetermined value 554 "FO"$_H$ (b shown in FIG. 13), the signal "Black" is transmitted as the image signal Video by the data selector 556. As a result, the subject pixel is printed as a binary black pixel. In a case other than the case described above (when the digital value of the image signals $VDO_0$ to $VDO_7$ is between the predetermined values 553 and 554), the data selector 556 transmits the image signal "PWM" which has been subjected to the pulse width modulation as the Video signal.

This PWM signal is a signal which has been subjected to the pulse width modulation in accordance with the density by way of making a comparison between the analog video signal VA obtained by DA-converting the value of the image signals $VDO_0$ to $VDO_7$ and the triangular wave signal SAW. That is, when the value of the image signals $VDO_0$ to $VDO_7$ is between the predetermined values 553 and 554, a fact is determined that the image signal is a signal for the half tone portion so that the half tone expression is conducted. On the other hand, when the value of the signals $VDO_0$ to $VDO_7$ is not in the above-described range, a fact is determined that the image signal is a signal for the binary white or black pixel so that printing for each pixel is conducted.

FIG. 13 is a view which illustrates the relationship among the image clock signal VCLK, analog video signal VA, triangular wave signal SAW, image signal PWM which has been subjected to the pulse width modulation, and the Video signal. Although the case is illustrated in FIG. 13 where the division ratio at the divider 10 is 3, the division ratio can be varied by changing the value 561 set as the division ratio.

As illustrated, when the value of the digital image signals $VDO_0$ to $VDO_7$ is smaller than the predetermined value "FO"$_H$, it is determined to be a binary white data, or when the same is larger than the predetermined value "FO"$_H$, it is determined to be a binary black data, causing the binary printing for each pixel. As a result, noise portions designated by a or b shown in FIG. 13 can be prevented from generation, causing the deterioration in the quality of image to be prevented. In addition, when the value of the image data $VDO_0$ to $VDO_7$ is between the predetermined values "OFH" and "FO"$_H$, the three pixels are collectively subjected to the pulse-width modulation. As a result, a half tone expression displaying high gradation can be conducted.

Figure 80:
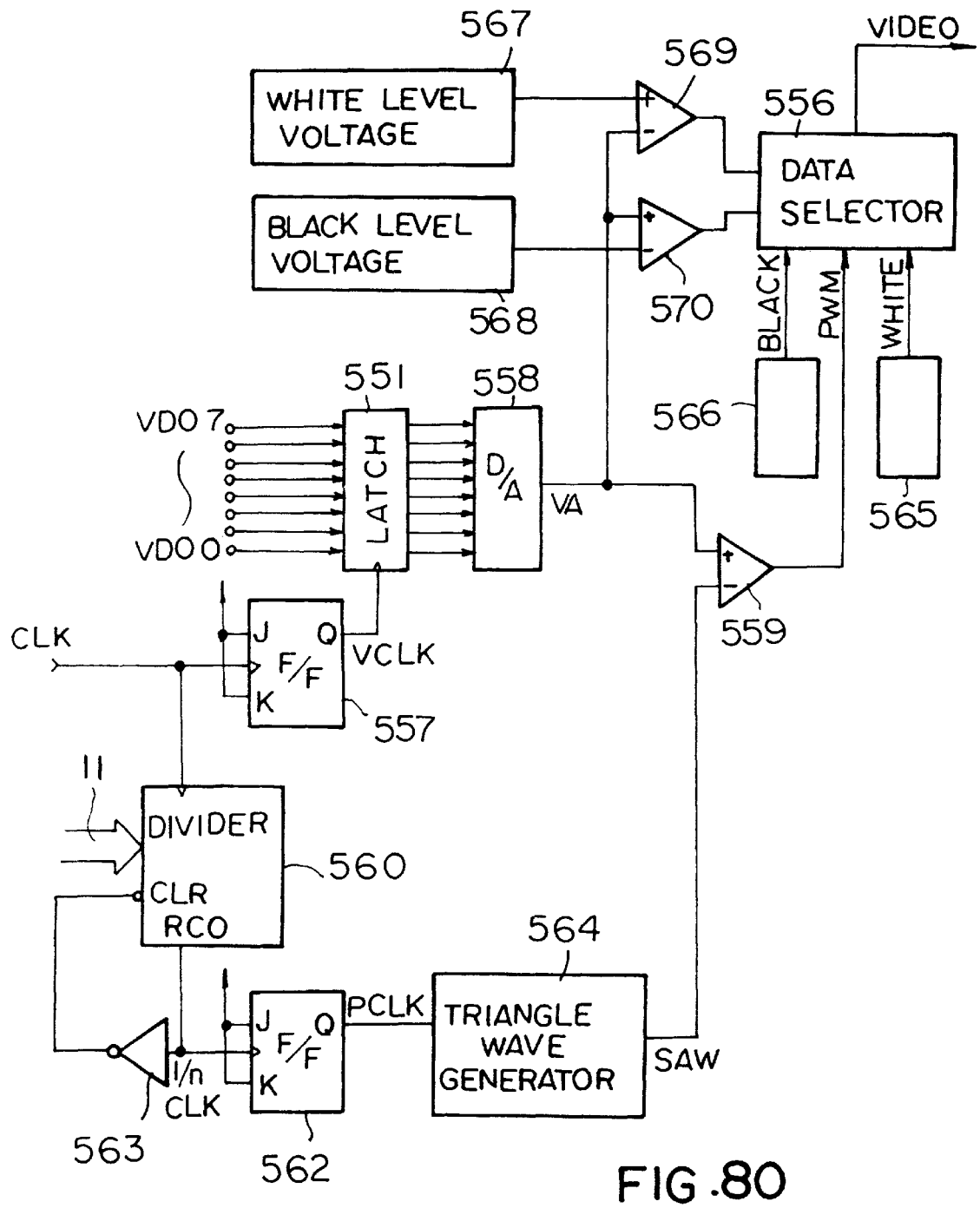
FIG. 80 is a view which illustrates the structure of other modified example of the modified example shown in FIG. 79.

Although an example is described according to the first modified example, this example being arranged such that the threshold level for white is fixed to "OFH", while, the black threshold level is fixed to "FO"$_H$. These level may be arranged to be variable by an external switch or command. Alternatively, a structure may be employed which is arranged such that it can be automatically set.
Second Modified Example According to the first modified example, the comparison among the input image signal, white level, and black level is made by way of making the comparison among the digital value of $VDO_0$ to $VDO_7$, the predetermined values 553 and 554. However, the comparison may, as shown in FIG. 80, be conducted by comparators 569 and 570 such that the analog video signal VA after being DA-converted by the DA converter 558, the voltages set by the white level voltage setting circuit 567 and the black level voltage setting circuit 568 are compared. In this case, a structure may, of course, be employed, the structure being arranged such that the setting voltage for the white level and black level can be varied by a volume or the like.

Third Modified Example

Figure 81:
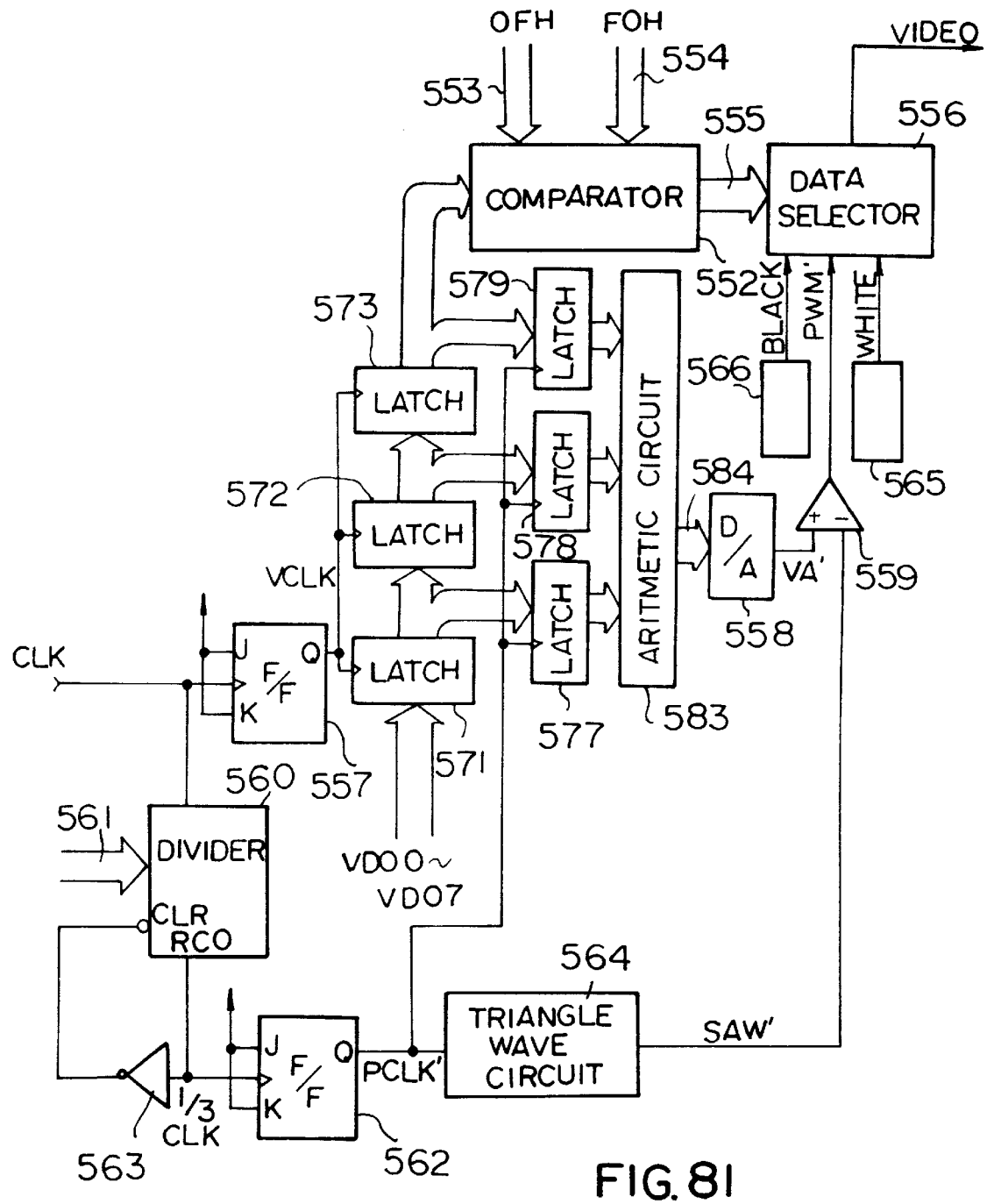
FIG. 81 is a view which illustrates the structure of other modified example.

Then, a third modified example of the pulse width modulation processing will be described with reference to FIG. 81. Referring to FIG. 81, the same components as those described in the first modified example (see FIG. 79) are given the same reference numerals.

The third modified example is arranged to be different in the method of the pulse width modulation from the first modified example, where the average value of the 8-bit digital image data $VDO_0$ to $VD07$ for three pixels is calculated so as to be analog-converted as the density data, and the signal VA' having a period of three times that of the image clock VCLK and the triangular wave signal SAW' having the same period as that of VA' are compared so that the pulse width modulation is conducted. As a result, an image displaying high gradation can be obtained.

First, the 8-bit digital image signals $VDO_0$ to $VDO_7$ is synchronized with the image clock VCLK so as to successively pass through the corresponding lathes 571, 572, and 573. An output signal 576 from the latch 573 is input to the comparison circuit 552 in which a comparison with the predetermined values 553 and 554 is made. In accordance with the result of the comparison, any of the signals "White", "Black", and "PWM" is selected by the data selector 556 so as to be transmitted as the image signal Video. The above-described operation is the same as that according to the first modified example.

On the other hand, the output signals 574 to 576 from the latches 571 to 573 are input to the latches 577 to 579. These latches 577 to 579 are arranged to be operated in synchronization with the signal PCLK' having the period of three times that of the image clock VCLK. An arithmetic circuit 583 calculates the average value of the output signals 580 to 582 from the latches 577 to 579 and then transmits the result as a signal 584. The averaged signal 584 is converted into an analog value by a D/A converter 558 so as to be the analog video signal VA'. This analog video signal VA' is subjected to the pulse width modulation on the basis of the result of a comparison made with the triangular wave signal SAW' having the same period so that it becomes the signal PWM'.

Also according to the third modified example, since the period of the signal VA' and that of SAW' to be subjected to the comparison become the same, an image displaying an excellent gradation can be obtained. According to the three modified examples described above, when the digital value of the digital image signal is smaller than a first predetermined value, the subject pixel is printed as binary white, while the same is larger than a second predetermined value, the subject pixel is printed as binary black. Furthermore, when the digital value of the image signal is between the first and second predetermined values, a predetermined number of the pixels are collected so as to be printed with a signal which has been subjected to the pulse width modulation. As a result, high grade half tone image without involving any fog in the white portion and lack in the black portion can be obtained.

(Modified Example of Gradation Processing)

This modified example is established for the purpose of eliminating undesirable influence of the shape of the laser spot upon the gradation expression or the resolution described with reference to FIGS. 20 to 50B (the problem described in chapter (f) in the conventional art). Then, two modified examples will be described for the purpose of achieving the problem described above. For the convenience for making a description, these two modified examples are applied to the dither method.

First Modified Example

Figure 82:
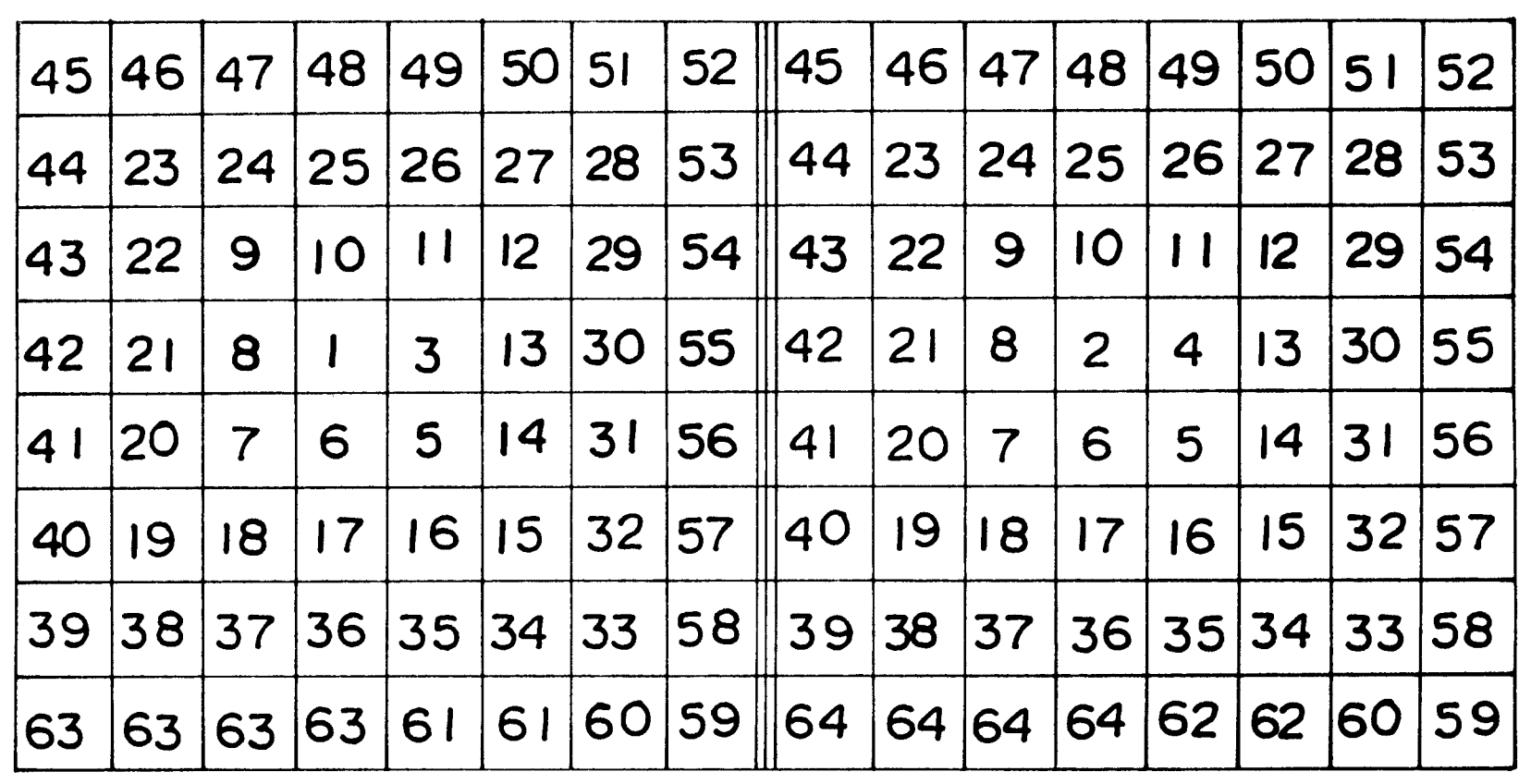

FIG. 82 is a schematic view which illustrates a dither matrix to be applied to a first modified example.

For the convenience in making a description, 6-bit image data is subjected to this first modified example. The thesis of this first modified example can, of course, be applied to an 8-bit image signal.

The dither matrix according to the first modified example is arranged to have a size twice that of the original matrix. That is, the dither matrix according to this modified example is arranged to be 8×16 with respect to the size of the original dither matrix of 8×8. According to this first modified example, printing is arranged to be conducted when the above-described image data exceeds the threshold of the dither matrix. Therefore, it becomes white when data is "00", while the same becomes "black" when the data is "64".

The matrix of 8×16 shown in FIG. 82 is characterized in that it is not formed by simply arranging two 8×8 matrices. When a comparison is made between the component of the matrix which is disposed at the same position in the right and left 8×8 matrices shown in FIG. 82, the coefficient of a region in a low density threshold (1 to 4) and that in a high density region (61 to 64) are different from each other, the two regions corresponding to each other. That is, the 8×16 matrix is formed in the following procedure: in the light tone region, the overall body of the 8×16 matrix is assumed to be a matrix and as shown in FIG. 82 each matrix is arranged as "1", "2", "3", and "4". Then, in the range from "5" to "60", 8×8 matrix is assumed to be a matrix, that is, the 8×16 matrix is halved and each matrix is arranged as "6", "7", "8", "9", . . . , "59", and "60".

Then, in the range from "60" to "64", the 8×16 matrix is again assumed to be a dither matrix. Since this region approximate to solid black and the non-printing area is extremely reduced, the gradation is not influenced by increase in the printing region by a pixel. Therefore, a plurality of pixels are covered by the same value and the matrix 8×16 is employed in order to retain the number of gradations. Therefore, the 8×16 matrix is formed in a successive manner as "61", "62", "63", and "64".

According to the dither matrix arranged as described above, tone which can be expressed with two gradations for a region of 4 pixels in a region of 8×16=128 pixels in a low density region in the conventional example can be improved to 4 gradations which is twice the conventional gradations. In the density region of "5" to "60", the gradation can be expressed by the conventional resolution. In a high density region of "61" to "64", the gradation can be again sufficiently expressed by the 8×16 matrix.

Although the description is made about a case in which a dither matrix of a so-called spiral pattern type is employed. A variety of patterns such as Bayer pattern can, of course, be employed.

Second Modified Example

Figure 83:
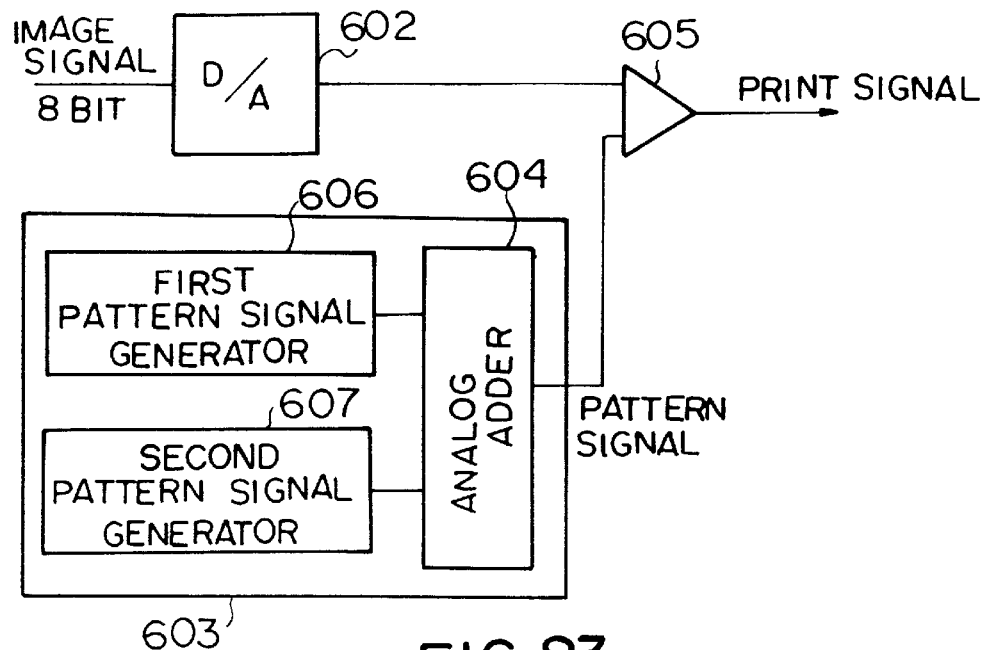
FIG. 83 is a block diagram which illustrates the structure of the image processing apparatus according to other example of the dither processing.
Figure 84:
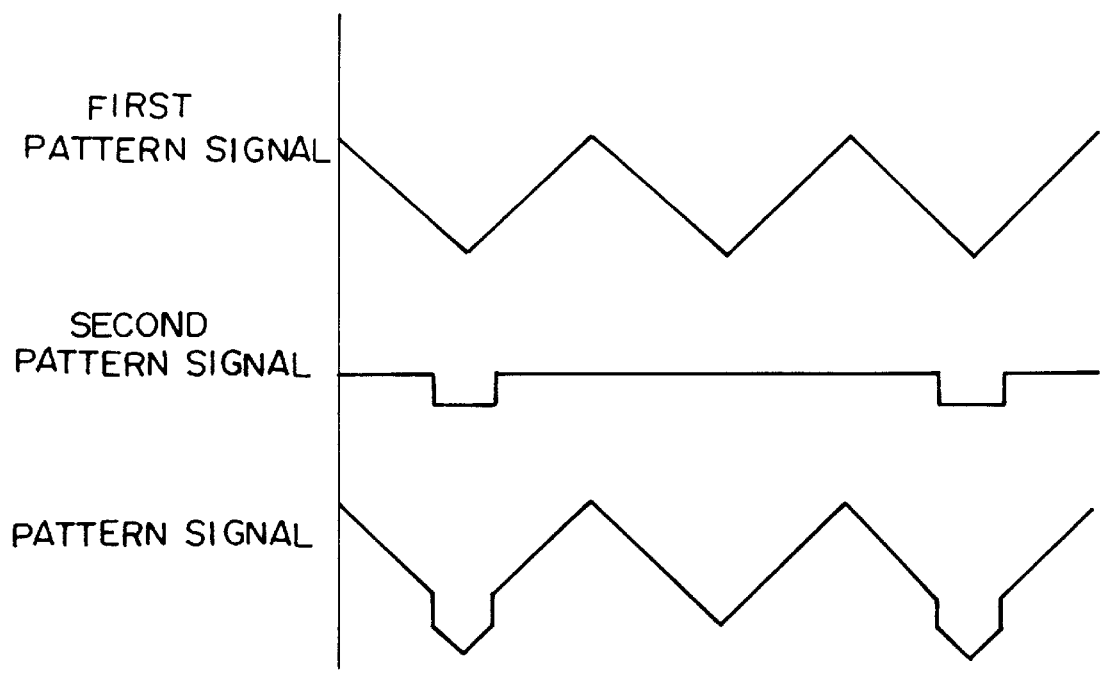
FIG. 84 is a view which illustrates the waveform of the pattern signal according to the modified example shown in FIG. 83 so as to illustrate the process of generating the pattern signal.

A second modified example will be described with reference t FIG. 83. FIG. 83 is a view which illustrates a case in which a pulse width modulation type is employed as the gradation processing according to the second modified example, where the structure according to the second modified example comprises a D/A converter 602, a pattern signal generating circuit 603 (which corresponds to 514 shown in FIG. k or the like), and a comparator circuit 605. In this apparatus, an 8-bit input image data is converted into an analog signal by the D/A conversion so that it is subjected to a comparison with a pattern signal from the pattern signal generating circuit 603. As a result, a printing signal is generated.

The pattern signal generating circuit 603 comprises a first pattern signal generating portion 606, a second pattern signal generating portion 607, and an analog adder 604. As a result, a first pattern signal from the fist pattern signal generating portion 606 and a second pattern signal from the second pattern signal generating portion 607 are synthesized by the analog adder 604 so as to be transmitted as the pattern signal.

That is, the first pattern signal comprises a triangular wave, and the second pattern signal comprises a rectangular pulse wave having a period twice that of the first pattern signal. Therefore, each of the triangular wave of the firs pattern signal is synthesized with the rectangular pulse of the second pattern signal at every other signal. The triangular wave which is not synthesized with the rectangular pulse is transmitted intact as the pattern signal, while the triangular wave synthesized with the rectangular pulse is transmitted having a vertical portion in a portion thereof due to the rectangular pulse.

As shown in FIG. 85 (a), the triangular wave synthesized with the rectangular pulse has signal levels from "0" to "x" where the range thereof from "q" to "p" is arranged to be a vertical portion realized by the rectangular pulse. The triangular wave which is not synthesized with the rectangular pulse has a signal levels from "q" to "x".

According to the second modified example, when the image signal is larger than the pattern signal shown in FIG. 85 (a), the printing is conducted. That is, when signal level "0" is white, and when signal level "x" is black, the printing is conducted.

When the printing is conducted in accordance with the pattern signals describe above, only the printing pattern which corresponds to the triangular wave which has been synthesized with the rectangular pulse grows from width "a" to "b" as shown in FIG. 85 (b) when the signal level of the image data is from "0" to "p". When the signal level is from "p" to "q", the printing pattern retains its width b as shown in FIG. 85 (c), the printing pattern corresponding to the triangular wave which has been synthesized with the rectangular pulse. In order to cover this gap, the printing pattern grows from the width "a" to "b", the printing pattern corresponding to the triangular wave which is not synthesized with the rectangular pulse. When the signal level exceeds "q", each printing pattern equally grows as shown in FIG. 85 (d).

Therefore, the light tone assuredly increase its gradation although it becomes sparse, causing the resolution to be improved due to the rise in the pattern density. As a result, an image displaying both excellent resolution and gradation can be obtained.

As an alternative to the structure according to the first and second modified examples and arranged such that the digital image signal is converted as to be subjected to a comparison with the pattern signal, the present invention can be applied to the pulse width modulation in which the digital signals are subjected to the comparison.

According to the modified examples of the gradation processing, a most suitable balance can be arranged between the resolution and the gradation can be established in each of the half tone levels by changing the unit area for expressing the half tone by the area gradation means with the level of the half tone. That is, in the half-tone level in which a high resolution is required, the above-described unit area is reduced to a certain small value. On the other hand, in the half tone level in which a high gradation is required, the unit area is made a certain large value. As a result, the most suitable resolution and gradation can be obtained in accordance with the level of the half tone. The portion in which a high resolution is strictly required from the image characteristics for the half tone expression, that is, the portion in which the rough surface of the image appears excessively has tone adjacent to the central portion in the half tone levels, that is, it is near the density level of 0.5 to 1.0. The rough surface of the image cannot appear excessively in the light or dark regions. In the tone adjacent to the central portion, a high resolution can be obtained by making the unit area small.

On the other hand, tone in the dark region or tone in the light region does not excessively display the rough surface. However, the image quality can easily deteriorate due to false outlines. Therefore, the above-described unit area is brought to a large value for the purpose of obtaining a high resolution in the tone of the type described above.

As a result, half tone expression displaying both excellent resolution and gradation can be realized.

(Modified Example of the Control of Screen Angle)

In the multi-level data print board 61 of the image output apparatus which serves as the recording apparatus according to the basic embodiment described with reference to FIGS. 20A to 50B, the screen angle is controlled insufficiently as 0 degree, 45 degrees and 90 degrees. This modified example is established to overcome the conventional problem described in chapter (g) by arranging the structure such that the change in the screen angle can be finer and further precisely set, which is necessary in the DTP field in particular.

First Modified Example

Figure 86:
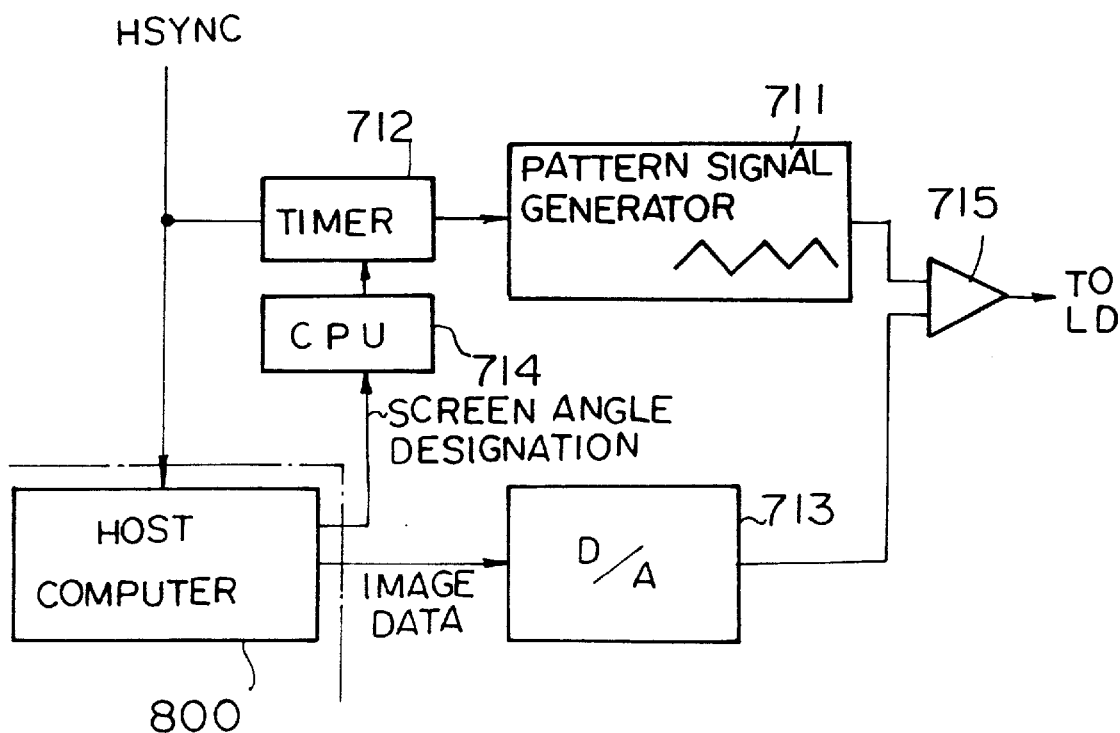
FIG. 86 is a block diagram which illustrates the structure of a modified example of the controlling of the screen angle.

FIG. 86 is a block diagram which illustrates a first modified example of control of the screen angle.

The printer apparatus according to this modified example comprises a pattern signal generating circuit 711, timer 712, D/A converter 713, CPU 714, and a comparator 715. It is capable of changing the start point of the generation of half tone in accordance with a command transmitted from a host computer 800.

The host computer 800 transmits a printing command for staring the printer apparatus and supplies a command to set the screen angle. When the printer apparatus has completed its preparation for the printing and a state is realized in which a vertical synchronization signal (Vsync) can be allowed, the host computer 800 transmits the vertical synchronization signal to the printer apparatus. When the printer apparatus receives the vertical synchronization signal and returns a horizontal synchronization signal (Hsync), an image data is transmitted at a predetermined timing and in synchronization with this horizontal synchronization signal.

On the other hand, the CPU 714 sets a timer 712 for each line in accordance with the command to set the screen angle transmitted from the host computer 800 so that the timer 712 is started by the horizontal synchronization signal. Thus, the pattern signal is generated in the pattern signal generating circuit 711 in synchronization with the signal transmitted fro the timer 712.

Figure 87:
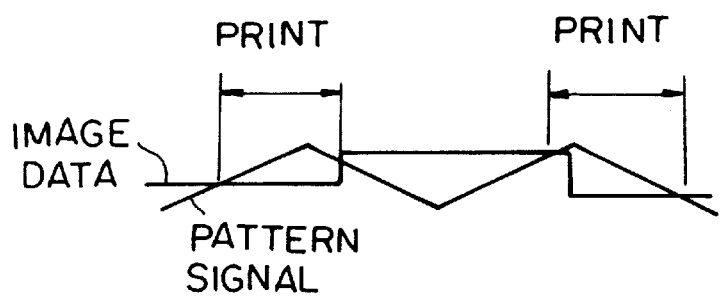
FIG. 87 is a schematic view which illustrates the principle in which the start point of the printing is deflected in comparison made between the pattern signal and the image data according to the modified example shown in FIG. 86.
Figure 88:
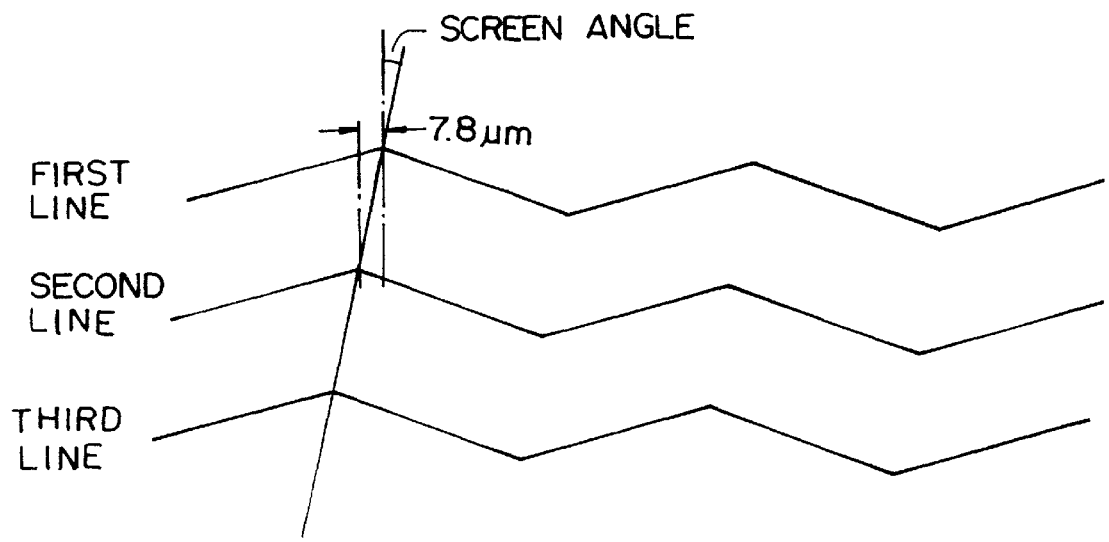
FIG. 88 is a schematic view which illustrates the state in which the pattern signal is deflected in the main scanning direction for every line according to the modified example shown in FIG. 86.

The input image data is D/A converted by the D/A converter 713 so as to be subjected to a comparison with the above-described pattern signal by the comparator 715. As a result, only the portion in which the pattern signal is higher is thus subjected to the printing as shown in FIG. 87. A method arranged such that the screen angle is obtained by making a comparison between the image data and the pattern signal has been disclosed in, for example, Japanese Patent Laid-Open No. 62-42693.

Then, the operation of the printer apparatus of the type described above will be specifically described.

It is assumed that the printing density of the printer apparatus is 300 dpi, and one cycle of the pattern signal corresponds to 50 liens, that is, 6 pixels in the sub-scanning direction. The printer apparatus is capable of transmitting about 8 sheets per minute when an A4 size sheet is longitudinally fed, where the image clock is arranged to be 1.86 MHz.

When a command of screen angle 85° is transmitted, the lag between the pattern signal for the first line and the pattern signal for the second signal is arranged to be about 7.4 μm since the scanning density is 300 dpi (the interval between pixels is about 85 μm). The pattern signal can be shifted by 1.97 μm (0.0125 μsec) by arranging the clock of the timer 712 to be 79.98 MHz. Therefore, when the command of screen angle of 85° is transmitted, the CPU 714 sets the timer 712 with Tsec which serves as a reference. Then, the timer 712 starts in synchronization with the horizontal synchronization signal, and the pattern signal is generated after Tsec. Then, the pattern signal and the image data for the first line is made comparison so that laser is turned on.

As for the second line, the timer 712 is set to be (T-0.05×$10^{-6}$)sec. The timer also starts in synchronization with the horizontal synchronization signal, and the pattern signal is generated after (T-0.05×$10^{-6}$)sec, that is, the pattern signal which is shifted from the pattern signal for the first line by 7.8 μm is generated so that the laser is turned on upon the comparison with the second image data.

Then, the similar processing is conducted to the third line and its ensuing lines in which successively time lag of (T-0.05×$10^{-6}$)sec is provided.

At this time, if the value to be set to the timer 712 shifts over one cycle of the reference wave, that is, when the value to be set to the timer 712 exceeds (T+0.05×$10^{-6}$)sec, (0.538 × $10^{-6}$) is added to the former so as to shift by (0.05×$10^{-6}$) from the next line by making (0.538×$10^{-6}$) as a reference. As a result, the screen angle connecting the print start points for each line becomes about 85°. Therefore, an excellent gradation can be obtained by the PWM method and the screen angle can be arranged to be a desired value.

Second Modified Example

Figure 89:
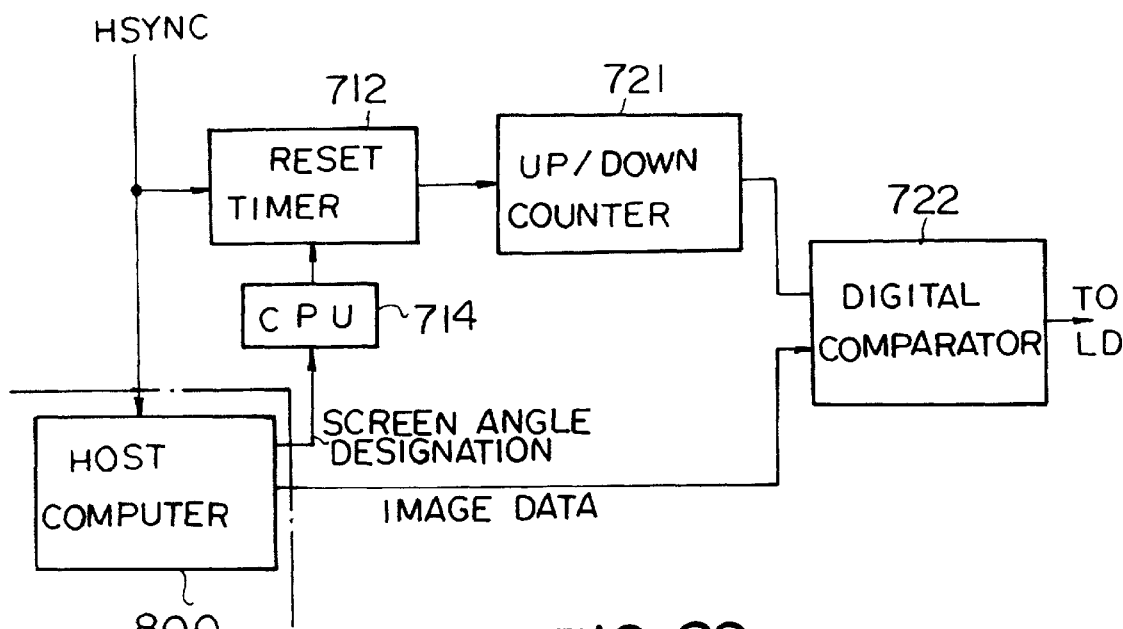
FIG. 89 is a block diagram which illustrates the structure of other structure for controlling the screen angle.

FIG. 89 is a block diagram which illustrates a second modified example.

According to this modified example, the relationship between the printing command, screen angle setting command, and the vertical synchronization signal is the same as that arranged in the first modified example. However, the difference from this lies in that the print start point is shifted by a up-down counter 721.

That is, in the printer apparatus, the rest timer 712 is set in accordance with the command to set the screen angle from the host computer 800. It then starts the reset timer 712 in synchronization with the horizontal synchronization signal. The up-down counter 721 is reset by this reset timer 712 after a predetermined time period so that counting is started from this point.

Then, data from this up-down counter 721 and the image data is made comparison with each other by a digital comparator 722. When the image data is larger than the data from the up-down counter 721, the printing is conducted. For example in a laser beam printer of the image exposure type, an action of turning on of the laser is conducted.

As for the second line, the setting time for the reset timer is, similarly to the first modified example, reduced in accordance with the command to set the screen angle. As a result, the starting time of the up-down counter 721 is shifted and the starting point for expressing the gradation is shifted. Therefore, the screen angle can be expressed precisely similarly to the first modified example. In particular, according to this modified example, since the up-down counter 721 is employed, the image signal is also processed intact as digital data. Consequently, very stable images can be obtained.

Third Modified Example

Figure 90:
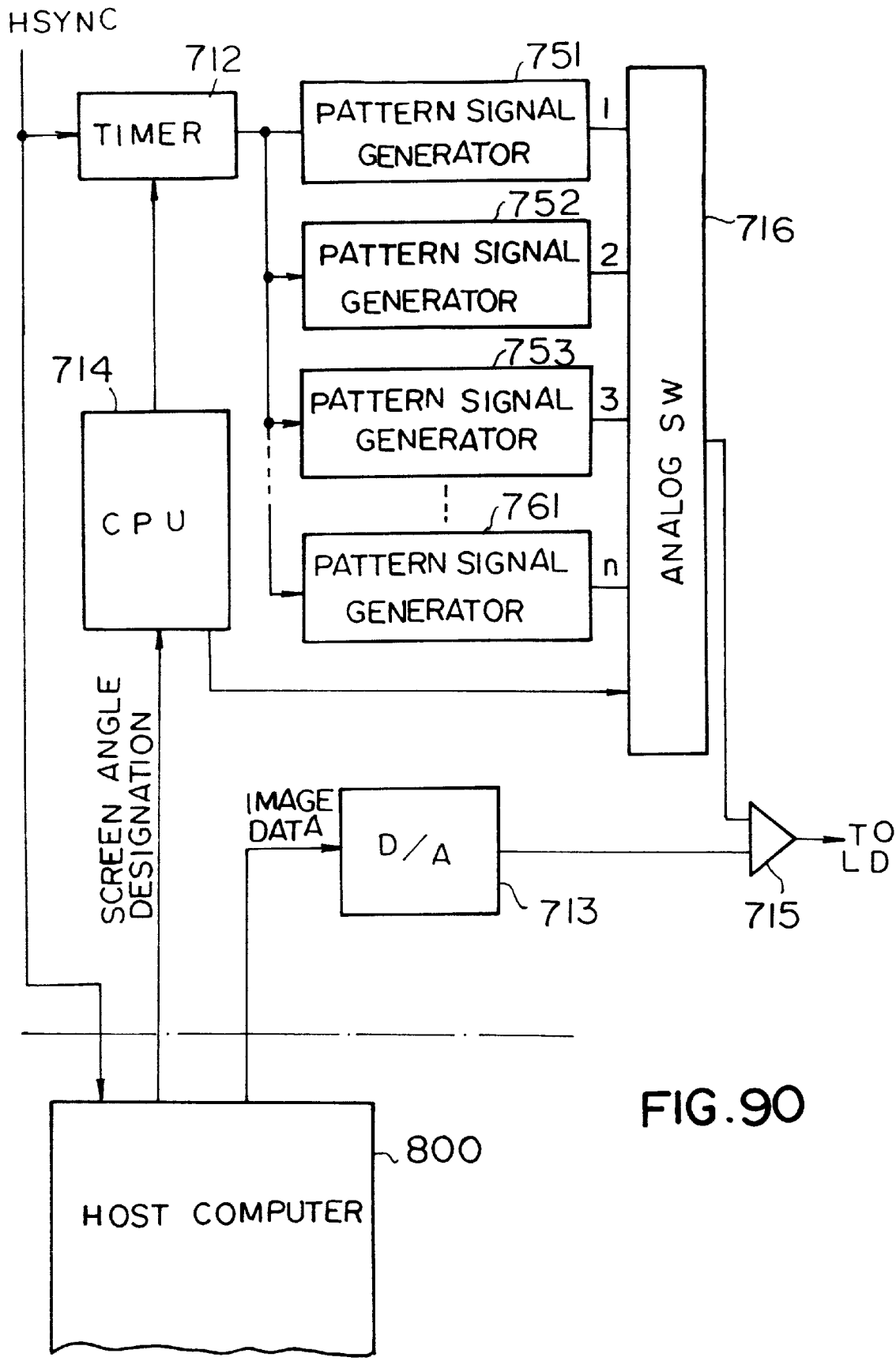
FIG. 90 is a block diagram which illustrates the structure of other modified example of the controlling of the screen angle.

FIG. 90 is a block diagram which illustrates a third modified example.

The printer apparatus according to this modified example comprises pattern signal generating circuits 751 to 761 capable of generating n pieces of pattern signals having the same frequency but individual amplitudes and waveforms, where each of the pattern signals is successively switched for each line from 1 to n, and the switching from the pattern signal 1 is repeated from the n+1 th line. According to this modified example, the start points for the pattern signals is arranged to be shifted for each line in accordance with the command to set the screen angle similarly to the first modified example.

Figure 91:
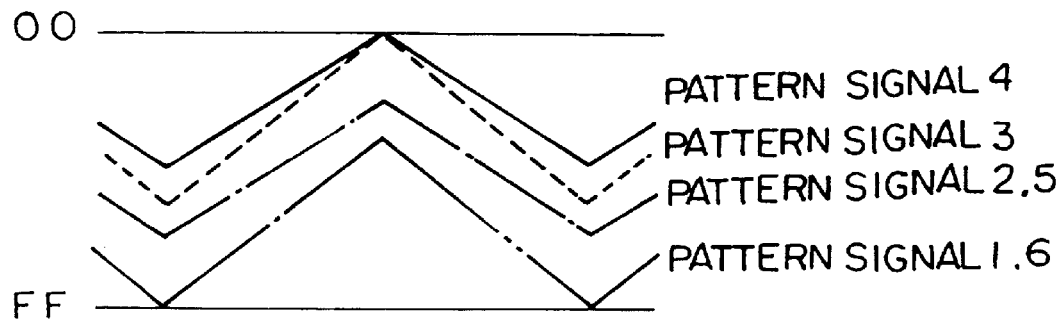
FIG. 91 is a schematic view which illustrates a state in which a plurality of pattern signals are weighted in the sub-scanning direction according to the modified example shown in FIG. 90.
Figure 92:
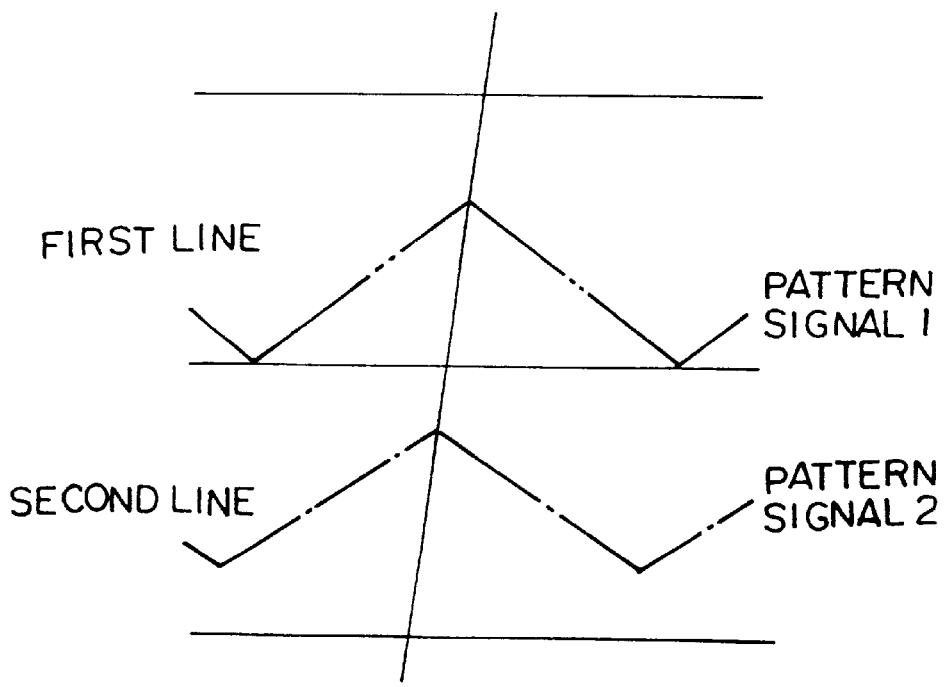
FIG. 92 is a schematic view which illustrates a state in which the pattern signal weighted in the sub-scanning direction is deflected in the main scanning direction for every line according to the modified example shown in FIG. 90.
Figure 93:
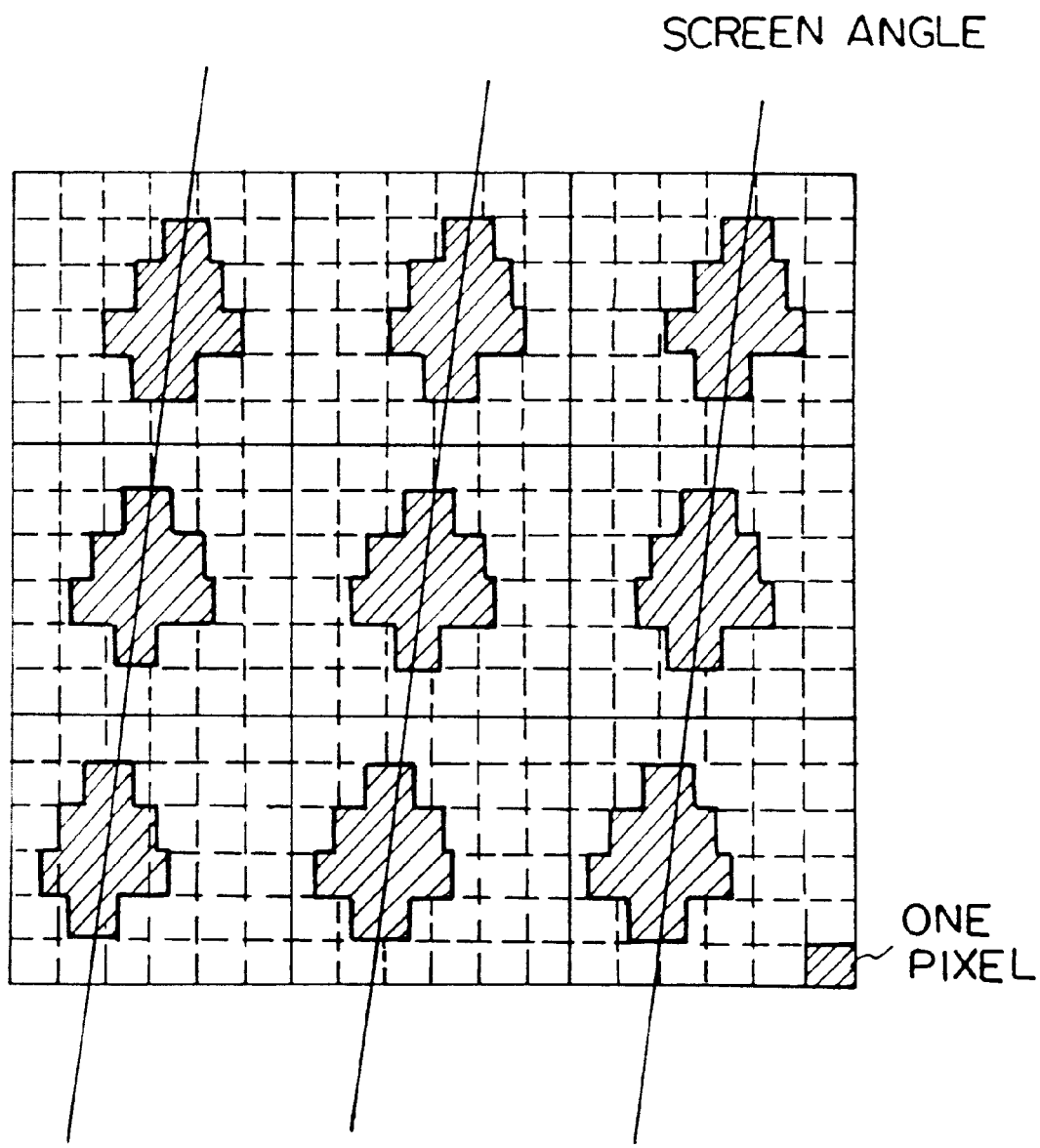
FIG. 93 is a schematic view which illustrates a specific example of a half-tone pattern according to the modified example shown in FIG. 90.

Furthermore, the pattern signals 1 to 6 are weighed as shown in, for example, FIG. 91, these signals are arranged to be a pattern signal 1 at the first line, and be a pattern signal 2 at the second line, these signals being successively shifted in accordance with the screen angle.

According to the first and second modified examples, the gradation is expressed only in the main scanning direction. However, according to the third modified example, since weight is added in the sub-scanning direction, a further improved gradation can be obtained and the screen angle can be freely set. For example, in an example shown in FIG. ar, the patterns disposed both sides are reproduced finer with respect to the central pattern. Since the sub-scanning direction is weighed by a plurality of pattern signals, a finer gradation control can be conducted.

As an alternative to the pattern signal generating circuits 751 to 761 according to the third modified example, the up-down counter according to the second modified example can be employed.

According to the three modified examples of the screen angle control from the basic embodiment, the half tone is reproduced by the pulse width modulation, and the start point for the pulse width modulation is slightly shifted for each line in accordance with the external command to set the screen angle. As a result, a reproduced image exhibiting excellent gradation and resolution can be obtained. In addition, the screen angle can be changed in an analog manner as an alternative to a dispersed manner. In particular, it is effectively employed in printers which can correspond to postscript.

As many apparently widely different embodiments of this invention may be made without departing from the spirit and scope thereof, it is to be understood that the invention is not limited to the specific embodiments thereof except as defined in the appended claims.

What is claimed is:

1. An image process apparatus comprising:

first input means for inputting multi-level dot information each pixel of which comprises a plurality of bits;

separating means for separating each multi-level dot information input by the first input means into a pair of multi-level dot information and binary dot information;

first signal processing means for subjecting the multi-level dot information of each pair of multi-level dot information and binary dot information separated by the separating means to signal processing;

second signal processing means for subjecting the binary dot information of the pair to signal processing;

synthesizing means for synthesizing a signal processed by the first processing means and a signal processed by the second signal processing means; and output means for outputting a visible image based on the signals synthesized by the synthesizing means.

2. An apparatus according to claim 1, wherein the first signal processing means comprises interpolating means for subjecting the multi-level dot information separated by the separating means to an interpolating process.

3. An apparatus according to claim 1, wherein the first signal processing means comprises binarizing means for converting the multi-level dot information separated by the separating means to binary dot information.

4. An apparatus according to claim 1, wherein the second signal processing means comprises smoothing means for subjecting the binary dot information separated by the separating means to a smoothing process.

5. An apparatus according to claim 1, further comprising:

second input means for inputting binary dot information each pixel of which comprises a bit; and second synthesizing means for synthesizing the binary dot information input by the second input means and the binary dot information separated by the separating means.

6. A method of processing an image comprising:

a first inputting step of inputting multi-level dot information each pixel of which comprises a plurality of bits;

a separating of separating each multi-level dot information input by the first input means into a pair of multi-level dot information and binary dot information;

a processing step of subjecting the separated multi-level dot information of each pair of multi-level dot information and binary dot information to fist signal processing, while subjecting the separated binary dot information of the pair to second signal processing;

a first synthesizing step of synthesizing a signal processed in the first signal processing and a signal processed in the second signal processing; and an outputting step of outputting a visible image based on the signals synthesized in the first synthesizing step.

7. A method according to claim 6, wherein, in the processing step, the multi-level dot information separated in the separating step is subject to an interpolating process.

8. A method according to claim 6, wherein, in the processing step, the multi-level dot information separated in the separating step is converted to binary dot information.

9. A method according to claim 6, wherein, in the processing step, the binary dot information separated in the separating step is subjected to a smoothing process.

10. A method according to claim 6, further comprising:

a second inputting step of inputting binary dot information each pixel of which comprises a bit; and a second synthesizing step fo synthesizing the binary dot information input in the second inputting step and the binary dot information separated in the separating step.

* * * * *